United States Patent
Godo et al.

(10) Patent No.: US 12,197,646 B2
(45) Date of Patent: Jan. 14, 2025

(54) ELECTRONIC DEVICE

(71) Applicant: Semiconductor Energy Laboratory Co., Ltd., Atsugi (JP)

(72) Inventors: Hiromichi Godo, Isehara (JP); Yoshiyuki Kurokawa, Sagamihara (JP); Seiko Inoue, Atsugi (JP); Kazuaki Ohshima, Atsugi (JP); Shunpei Yamazaki, Setagaya (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 18/569,785

(22) PCT Filed: Jun. 20, 2022

(86) PCT No.: PCT/IB2022/055685
§ 371 (c)(1),
(2) Date: Dec. 13, 2023

(87) PCT Pub. No.: WO2023/275661
PCT Pub. Date: Jan. 5, 2023

(65) Prior Publication Data
US 2024/0256033 A1   Aug. 1, 2024

(30) Foreign Application Priority Data
Jun. 30, 2021   (JP) .................. 2021-109366

(51) Int. Cl.
*G06F 3/01* (2006.01)
*G06T 1/20* (2006.01)
(Continued)

(52) U.S. Cl.
CPC .............. *G06F 3/013* (2013.01); *G06T 1/20* (2013.01); *G06T 7/75* (2017.01); *G06V 10/141* (2022.01);
(Continued)

(58) Field of Classification Search
CPC ... G06F 3/013; G06T 7/75; G06T 1/20; G06T 2207/20081; G06T 2207/30041;
(Continued)

(56) References Cited

U.S. PATENT DOCUMENTS

| 7,948,481 B2 | 5/2011 | Vilcovsky |
| 8,624,883 B2 | 1/2014 | Vilcovsky |

(Continued)

FOREIGN PATENT DOCUMENTS

| CN | 105556508 A | 5/2016 |
| CN | 106653802 A | 5/2017 |

(Continued)

OTHER PUBLICATIONS

International Search Report (Application No. PCT/IB2022/055685) Dated Sep. 27, 2022.
(Continued)

*Primary Examiner* — Sejoon Ahn
(74) *Attorney, Agent, or Firm* — Eric J. Robinson; Robinson Intellectual Property Law Office, P.C.

(57) ABSTRACT

An electronic device that enables smooth communication is provided. The electronic device includes a display portion including a first camera; a second camera; and an image processing portion. The second camera is positioned in a region not overlapping with the display portion. The first camera has a function of generating a first image of a subject, and the second camera has a function of generating a second image of the subject. The image processing portion includes a generator that performs learning using training data. The training data includes an image including a person's face. The image processing portion has a function of making the first image clear when the first image is input to the generator and a function of tracking the gaze of the subject on the basis of the second image.

10 Claims, 44 Drawing Sheets

(51) Int. Cl.
*G06T 7/73* (2017.01)
*G06V 10/141* (2022.01)
*G06V 40/18* (2022.01)
*H04N 23/611* (2023.01)
*H04N 23/617* (2023.01)
*H04N 23/90* (2023.01)

(52) U.S. Cl.
CPC ......... *G06V 40/193* (2022.01); *H04N 23/611* (2023.01); *H04N 23/617* (2023.01); *H04N 23/90* (2023.01); *G06T 2207/10048* (2013.01); *G06T 2207/20081* (2013.01); *G06T 2207/30041* (2013.01); *G06T 2207/30201* (2013.01)

(58) Field of Classification Search
CPC ........ G06T 2207/30201; G06V 10/141; G06V 40/193; H04N 23/617; H04N 23/90; H04N 23/611
See application file for complete search history.

(56) References Cited

U.S. PATENT DOCUMENTS

| | | | |
|---|---|---|---|
| 8,970,569 | B2 | 3/2015 | Vilcovsky et al. |
| 8,976,160 | B2 | 3/2015 | Vilcovsky et al. |
| 8,982,109 | B2 | 3/2015 | Vilcovsky et al. |
| 8,982,110 | B2 | 3/2015 | Saban et al. |
| 9,269,157 | B2 | 2/2016 | Saban et al. |
| 9,369,638 | B2 | 6/2016 | Saban et al. |
| 10,109,315 | B2 | 10/2018 | Saban et al. |
| 10,682,038 | B1 | 6/2020 | Zhang et al. |
| 10,789,714 | B2 | 9/2020 | Kang et al. |
| 11,288,546 | B2 | 3/2022 | Lee et al. |
| 11,513,409 | B2 | 11/2022 | Toyotaka et al. |
| 11,631,180 | B2 | 4/2023 | Kang et al. |
| 11,647,152 | B2 | 5/2023 | Kokura |
| 2014/0055342 | A1 | 2/2014 | Kamimura et al. |
| 2014/0225977 | A1 | 8/2014 | Vilcovsky et al. |
| 2015/0049165 | A1 | 2/2015 | Choi |
| 2018/0069060 | A1 | 3/2018 | Rappoport et al. |
| 2018/0245840 | A1* | 8/2018 | Chen ................... F25D 29/005 |
| 2018/0246566 | A1* | 8/2018 | Bitauld .............. G02B 27/0172 |
| 2018/0246567 | A1* | 8/2018 | Campbell ............ G06V 40/382 |
| 2018/0246568 | A1* | 8/2018 | Holz ........................ G06V 40/20 |
| 2018/0246846 | A1* | 8/2018 | Takimoto ................ G06F 15/76 |
| 2019/0197690 | A1 | 6/2019 | Kang et al. |
| 2019/0370608 | A1 | 12/2019 | Lee et al. |
| 2020/0219947 | A1 | 7/2020 | Yang et al. |
| 2020/0396415 | A1 | 12/2020 | Kokura |
| 2021/0026176 | A1 | 1/2021 | Toyotaka et al. |
| 2021/0176383 | A1 | 6/2021 | Kim et al. |
| 2022/0197582 | A1 | 6/2022 | Yokoi et al. |
| 2023/0006010 | A1 | 1/2023 | Abe et al. |
| 2023/0088632 | A1 | 3/2023 | Toyotaka et al. |

FOREIGN PATENT DOCUMENTS

| | | |
|---|---|---|
| CN | 109951698 A | 6/2019 |
| CN | 111047507 A | 4/2020 |
| CN | 111902856 A | 11/2020 |
| CN | 113011271 A | 6/2021 |
| EP | 2884738 A | 6/2015 |
| EP | 3404619 A | 11/2018 |
| EP | 3502959 A | 6/2019 |
| EP | 3588388 A | 1/2020 |
| EP | 4184443 A | 5/2023 |
| JP | 11-122544 A | 4/1999 |
| JP | 2014-039617 A | 3/2014 |
| JP | 2016-532197 | 10/2016 |
| JP | 2018-124457 A | 8/2018 |
| JP | 2019-115037 A | 7/2019 |
| JP | 2020-201823 A | 12/2020 |
| JP | 2021-503613 | 2/2021 |
| JP | 2021-045990 A | 3/2021 |
| KR | 2016-0041965 A | 4/2016 |
| KR | 2019-0075501 A | 7/2019 |
| KR | 2019-0136833 A | 12/2019 |
| KR | 2020-0139701 A | 12/2020 |
| WO | WO-2006/092793 | 9/2006 |
| WO | WO-2014/100250 | 6/2014 |
| WO | WO-2015/020703 | 2/2015 |
| WO | WO-2016/112346 | 7/2016 |
| WO | WO-2018/086353 | 5/2018 |
| WO | WO-2019/186339 | 10/2019 |
| WO | WO-2021/054222 | 3/2021 |
| WO | WO-2021/124449 | 6/2021 |

OTHER PUBLICATIONS

Written Opinion (Application No. PCT/IB2022/055685) Dated Sep. 27, 2022.

Slobodin.D, "Displays with Integrated Microcamera Arrays for Image Capture and Sensing", SID Digest '21 : SID International Symposium Digest of Technical Papers, May 17, 2021, pp. 745-748.

Feng.Y et al., "Joint 3D Face Reconstruction and Dense Alignment with Position Map Regression Network", arXiv.org: Computer Vision and Pattern Recognition (cs.CV); Graphics (cs.GR), Mar. 21, 2018, pp. 1-18, Cornell University.

Karras.T et al., "Analyzing and Improving the Image Quality of StyleGAN", arXiv.org: Computer Vision and Pattern Recognition (cs.CV); Machine Learning (cs.LG); Neural and Evolutionary Computing (cs.NE); Image and Video Processing (eess.IV); Machine Learning (stat.ML), Mar. 23, 2020, pp. 1-21, Cornell University.

* cited by examiner

FIG. 3A
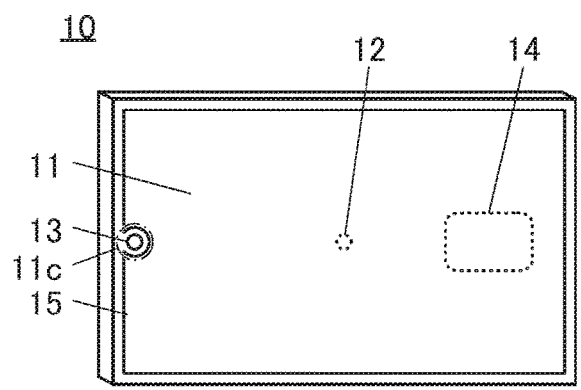
FIG. 3B
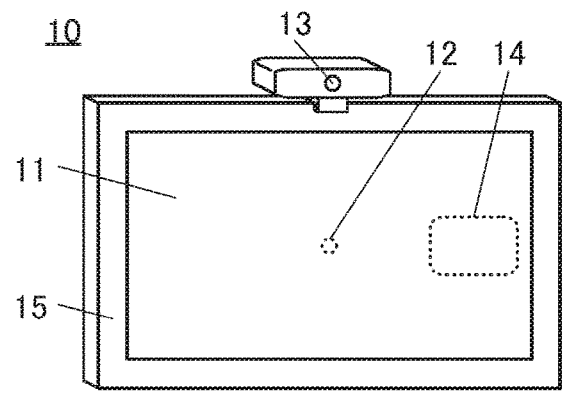
FIG. 3C
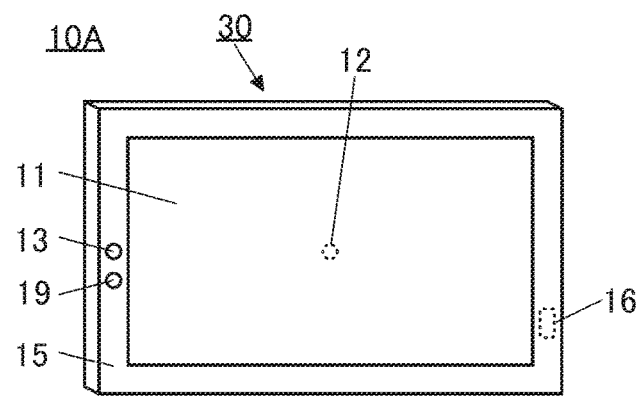
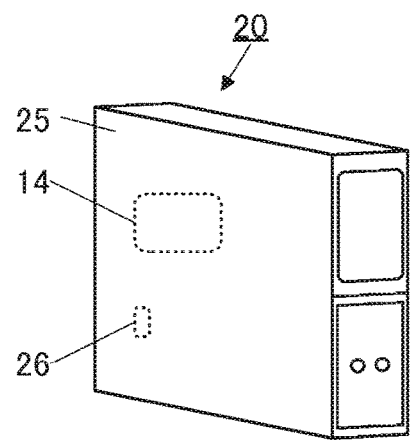

FIG. 8A
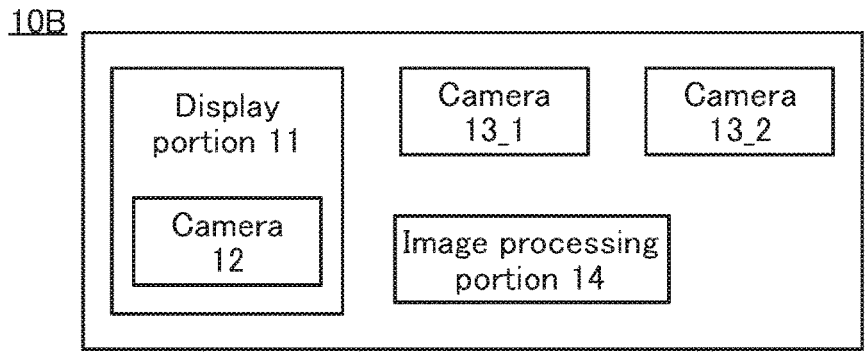
FIG. 8B
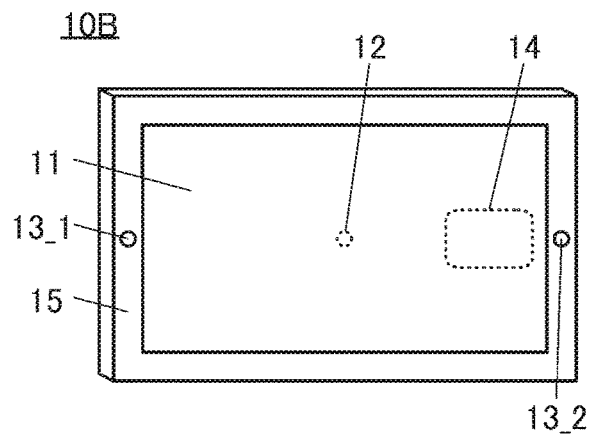
FIG. 8C
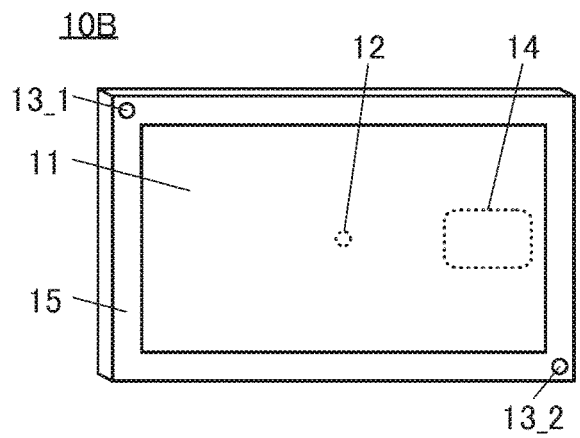
FIG. 8D
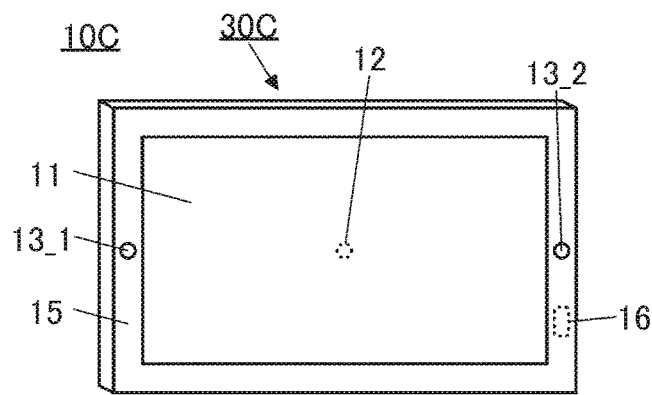
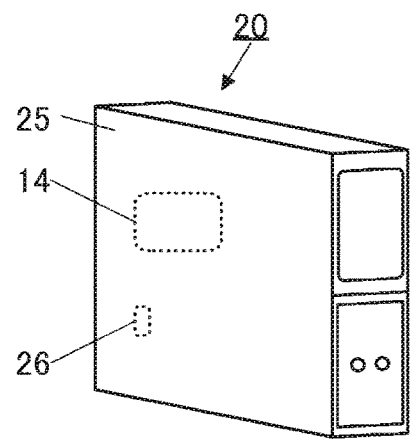

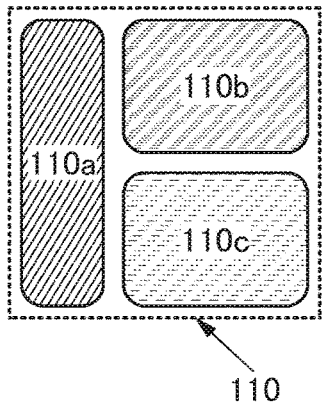
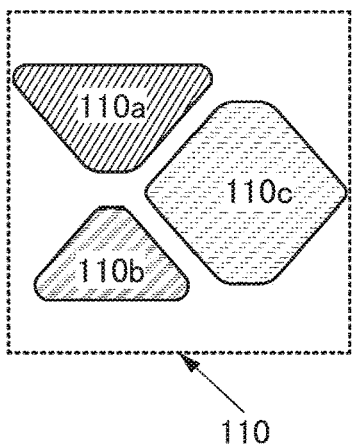
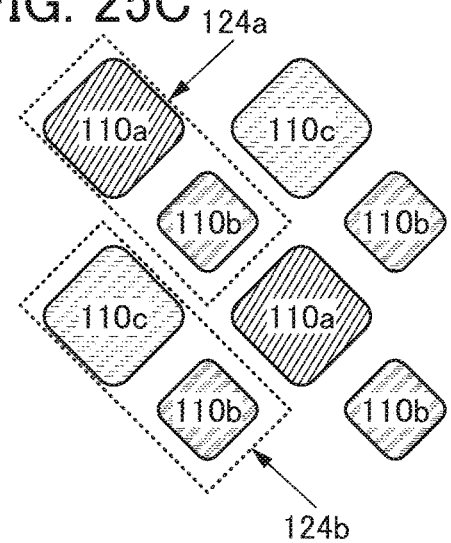
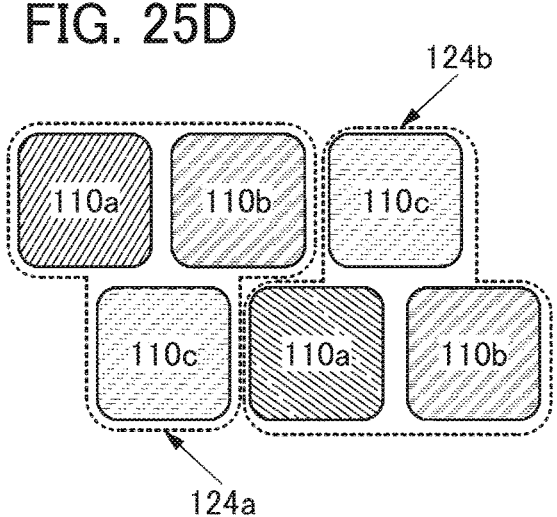
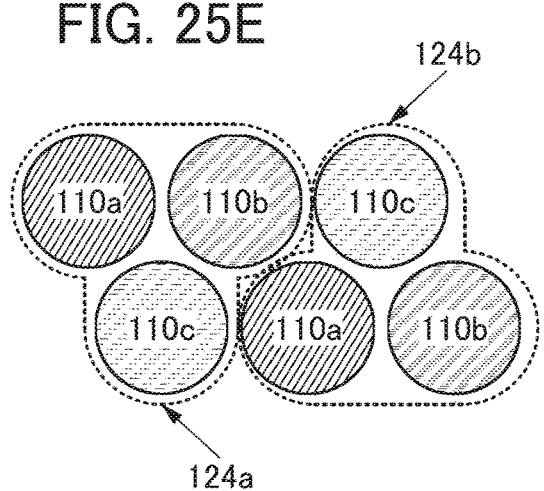
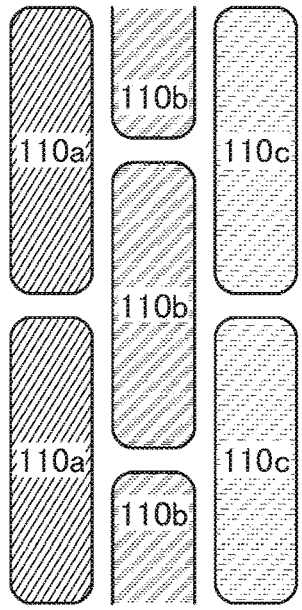

FIG. 27A
FIG. 27B
FIG. 27C
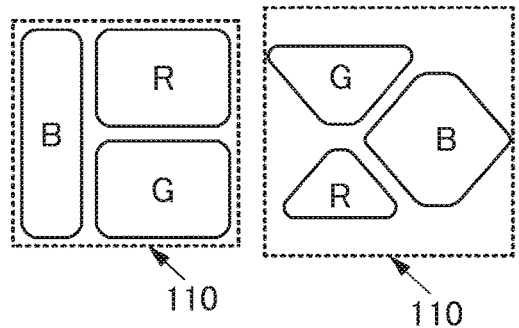
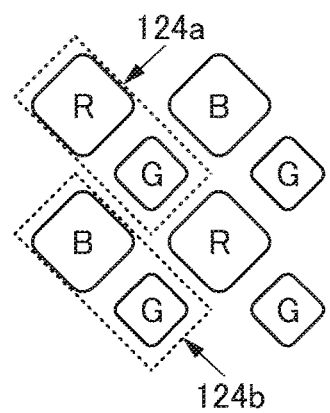
FIG. 27D
FIG. 27E
FIG. 27F
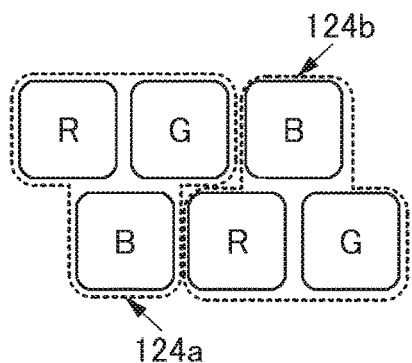
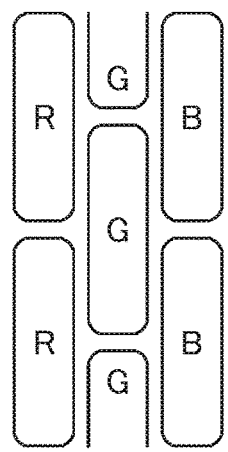
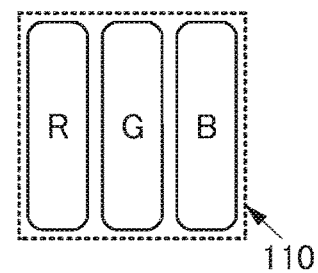
FIG. 27G
FIG. 27H
FIG. 27I
FIG. 27J
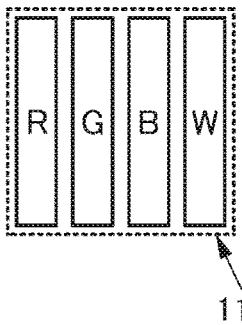
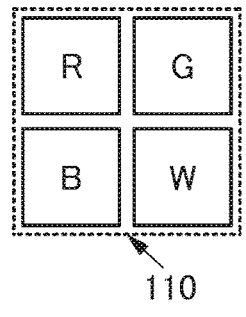
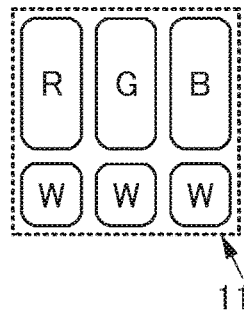
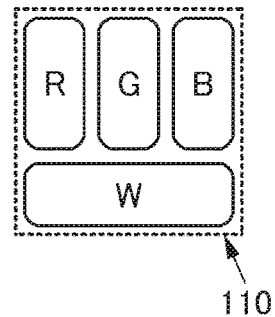

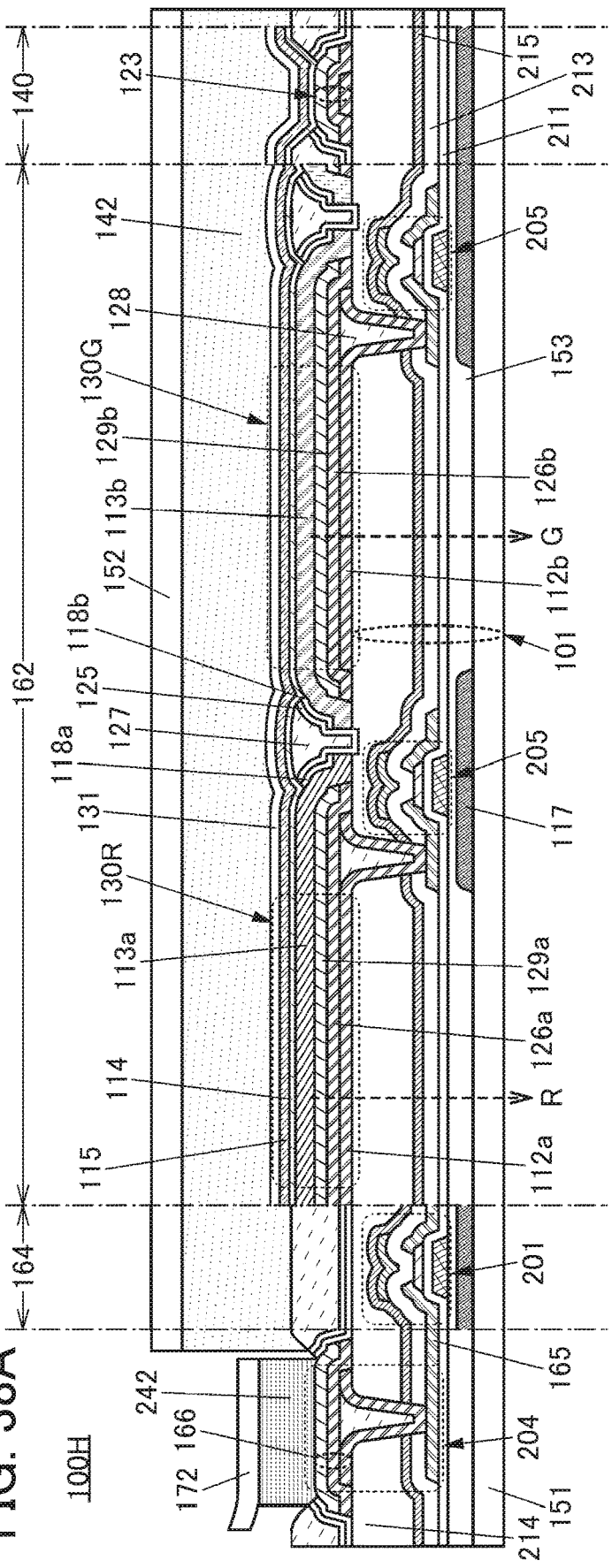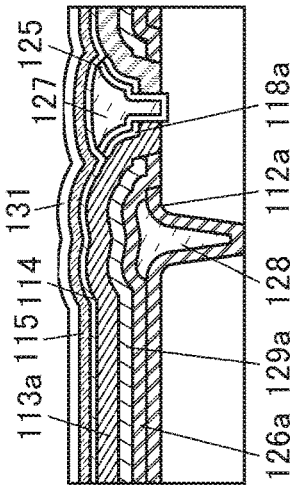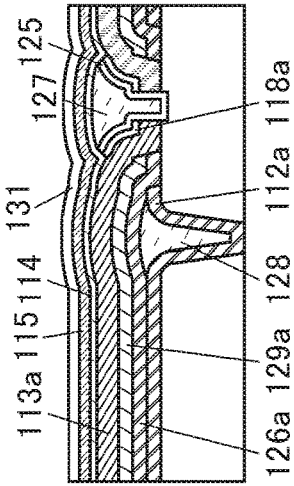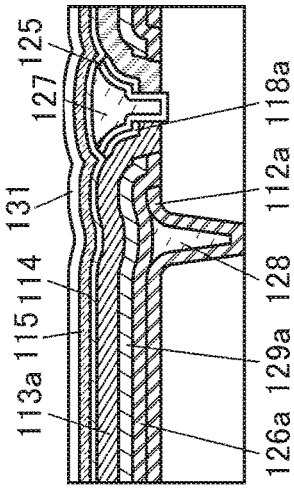

ELECTRONIC DEVICE

TECHNICAL FIELD

One embodiment of the present invention relates to an electronic device.

Note that one embodiment of the present invention is not limited to the above technical field. Examples of the technical field of one embodiment of the present invention disclosed in this specification and the like include a semiconductor device, a display apparatus, a light-emitting apparatus, a power storage device, a memory device, an electronic device, a lighting device, an input device, an input/output device, a driving method thereof, and a manufacturing method thereof.

BACKGROUND ART

In recent years, with the progress of shifting to remote classes, remote working, or the like, opportunities of holding remote meetings with the use of electronic devices having display functions have increased. In addition, opportunities of keeping in touch with far-away family and friends, for example, with the use of electronic devices having display functions have increased. Such electronic devices each include a camera and a display portion.

Furthermore, a technique for providing a camera under a display screen of an electronic device has been developed. For example, Patent Document 1 discloses a terminal that includes a display portion having a main display region and a sub-display region and a camera provided under the sub-display region.

REFERENCE

Patent Document

[Patent Document 1] Japanese Translation of PCT International Application No. 2021-503613

SUMMARY OF THE INVENTION

Problems to be Solved by the Invention

In the case where a meeting is held through display screens of electronic devices, the position of the display screen showing a user's face and the position of a camera are different from each other and thus the eyes of the users do not meet, which sometimes hinders smooth communication.

As described above, the technique for providing a camera under a display screen of an electronic device has been developed. With the use of such a camera, the users can make eye contact. However, since the camera captures an image through the display screen, the image has a lot of noise and a small amount of detected light. Thus, an image captured by the camera is blurred, which makes smooth communication difficult.

An object of one embodiment of the present invention is to provide an electronic device that enables smooth communication. Another object of one embodiment of the present invention is to provide an electronic device capable of generating a clear image. Another object of one embodiment of the present invention is to provide an electronic device capable of tracking the gaze of a subject. Another object of one embodiment of the present invention is to provide an electronic device capable of creating an avatar linked with the movement of a subject's face. Another object of one embodiment of the present invention is to provide a novel electronic device.

Note that the description of these objects does not preclude the existence of other objects. In one embodiment of the present invention, there is no need to achieve all of these objects. Note that objects other than these can be derived from the description of the specification, the drawings, the claims, and the like.

Means for Solving the Problems

One embodiment of the present invention is an electronic device including a display portion that includes a first camera; a second camera; and an image processing portion. The second camera is positioned in a region not overlapping with the display portion. The first camera has a function of generating a first image of a subject, and the second camera has a function of generating a second image of the subject. The image processing portion includes a generator performing learning using training data. The training data includes an image including a face of a person. The image processing portion has a function of making the first image clear when the first image is input to the generator and a function of tracking a gaze of the subject on the basis of the second image.

In the above electronic device, it is preferable that a light source emitting infrared light be further included, the light source be positioned in a region not overlapping with the display portion, the light source be used for detection of the gaze of the subject, and the gaze of the subject be tracked by repeating the detection of the gaze of the subject.

Another embodiment of the present invention is an electronic device including a display portion that includes a first camera; a second camera; a third camera; and an image processing portion. The second camera and the third camera are each independently positioned in a region not overlapping with the display portion. The first camera has a function of generating a first image of a subject, the second camera has a function of generating a second image of the subject, and the third camera has a function of generating a third image of the subject. The image processing portion has a function of making the first image clear, a function of recognizing a face of the subject from the clear first image, a function of recognizing a three-dimensional shape of the face of the subject from the second image and the third image, and a function of creating an avatar from the face of the subject and the three-dimensional shape of the face of the subject.

In the above electronic device, the first camera is preferably positioned behind a pixel included in the display portion when seen from the subject.

Alternatively, in the above electronic device, the first camera is preferably positioned in a region including a pixel included in the display portion when seen from the subject.

Another embodiment of the present invention is an electronic device including a display portion that includes a first camera and a fourth camera; and an image processing portion. The first camera has a function of generating a first image of a subject, and the fourth camera has a function of generating a fourth image of the subject. The image processing portion includes a generator performing learning using training data. The training data includes an image including a face of a person. The image processing portion has a function of activating one of the first camera and the fourth camera and a function of making the first image or the fourth image clear when the first image or the fourth image generated using the activated one of the first camera and the fourth camera is input to the generator.

In the above electronic device, the first camera and the fourth camera are preferably positioned behind a pixel included in the display portion when seen from the subject.

Alternatively, in the above electronic device, the first camera and the fourth camera are preferably positioned in a region including a pixel included in the display portion when seen from the subject.

Effect of the Invention

According to one embodiment of the present invention, an electronic device that enables smooth communication can be provided. According to another embodiment of the present invention, an electronic device capable of generating a clear image can be provided. According to another embodiment of the present invention, an electronic device capable of tracking the gaze of a subject can be provided. According to another embodiment of the present invention, an electronic device capable of creating an avatar linked with the movement of a subject's face can be provided. According to another embodiment of the present invention, a novel electronic device can be provided.

Note that the description of these effects does not preclude the existence of other effects. One embodiment of the present invention does not have to have all these effects. Other effects will be apparent from the description of the specification, the drawings, the claims, and the like, and other effects can be derived from the description of the specification, the drawings, the claims, and the like.

BRIEF DESCRIPTION OF THE DRAWINGS

FIG. 3A to FIG. 3C are perspective views illustrating structure examples of electronic devices of one embodiment of the present invention.

FIG. 8A is a block diagram illustrating a structure example of an electronic device of one embodiment of the present invention. FIG. 8B to FIG. 8D are perspective views illustrating structure examples of electronic devices of one embodiment of the present invention.

FIG. 25A to FIG. 25F are top views illustrating examples of pixels.

FIG. 27A to FIG. 27J are top views illustrating examples of pixels.

FIG. 38A to FIG. 38D are cross-sectional views illustrating examples of a display panel.

MODE FOR CARRYING OUT THE INVENTION

Figure 1A:
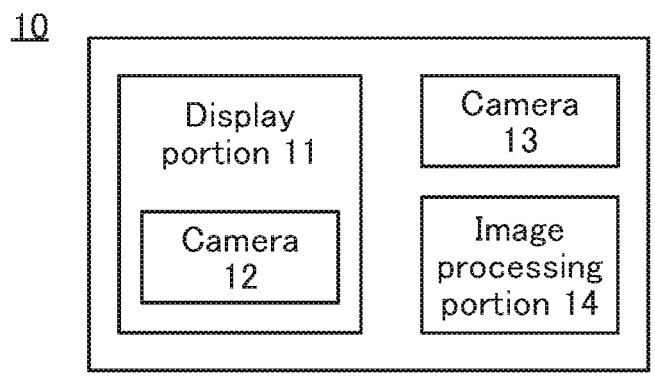
FIG. 1A is a block diagram illustrating a structure example of an electronic device of one embodiment of the present invention.

Embodiments will be described in detail with reference to the drawings. Note that the present invention is not limited to the following description, and it will be readily understood by those skilled in the art that modes and details of the present invention can be modified in various ways without departing from the spirit and scope of the present invention. Therefore, the present invention should not be construed as being limited to the description in the following embodiments.

Note that in structures of the invention described below, the same portions or portions having similar functions are denoted by the same reference numerals in different drawings, and the description thereof is not repeated. The same hatching pattern is applied to portions having similar functions, and the portions are not especially denoted by reference numerals in some cases.

The position, size, range, or the like of each component illustrated in drawings does not represent the actual position, size, range, or the like in some cases for easy understanding. Therefore, the disclosed invention is not necessarily limited to the position, size, range, or the like disclosed in the drawings.

Note that the term "film" and the term "layer" can be interchanged with each other depending on the case or the circumstances. For example, the term "conductive layer" can be replaced with the term "conductive film". For another example, the term "insulating film" can be replaced with the term "insulating layer".

In this specification and the like, when an electronic device is seen from above, a region of the electronic device other than a display portion is referred to as a frame. That is, the frame of the electronic device corresponds to a portion where an image is not displayed. The frame is part of a housing of the electronic device. Thus, a frame in this specification and the like can be rephrased as a housing in some cases. In addition, a housing in this specification and the like can be rephrased as a frame in some cases.

Embodiment 1

Structure Example 1

FIG. 1A is a block diagram illustrating a structure example of an electronic device of one embodiment of the present invention. An electronic device 10 illustrated in FIG. 1A includes a display portion 11, a camera 13, and an image processing portion 14. The display portion 11 includes a camera 12.

The display portion 11 has a function of displaying a variety of information (a still image, a moving image, a text image, and the like). The display portion 11 may also have a touch panel function.

The camera 12 and the camera 13 each function as an image capturing portion. The image capturing portion has a function of performing image capturing to obtain image data. An image sensor can be used for the image capturing portion.

The image processing portion 14 has a function of generating an image. Note that the function of generating an image includes a function of making an image clear, a function of creating an avatar, and the like. The image processing portion 14 also has a function of detecting the gaze and a function of tracking the gaze.

An algorithm using a neural network may be used for one or more of image generation, making an image clear, avatar creation, gaze detection, gaze tracking, and the like. That is, the image processing portion 14 may include at least one of a processing device capable of executing a program including a neural network, a circuit in which a neural network is formed, and the like.

In this specification and the like, a program including a neural network, a circuit in which a neural network is formed, or the like is sometimes referred to as a generator. The image processing portion 14 may include a generator.

In the case where an image is generated using a neural network, the neural network has performed learning in advance using images including people's faces as training data. The images including people's faces are preferably clear images of people's faces, for example. In other words, the neural network performs learning using training data including clear images of people's faces.

An image captured by the camera 12 is input to the generator. Thus, the generator generates an image. In addition, the generator makes the image clear.

As described above, the neural network performs the learning using training data including clear images of people's faces, for example. Thus, even when an unclear image of a subject's face is input to the generator, an image with less noise is output. That is, a clear image of the subject's face is output.

Note that a method for generating a clear image, a method for tracking the gaze, and a method for creating an avatar will be described later.

Figure 1B:
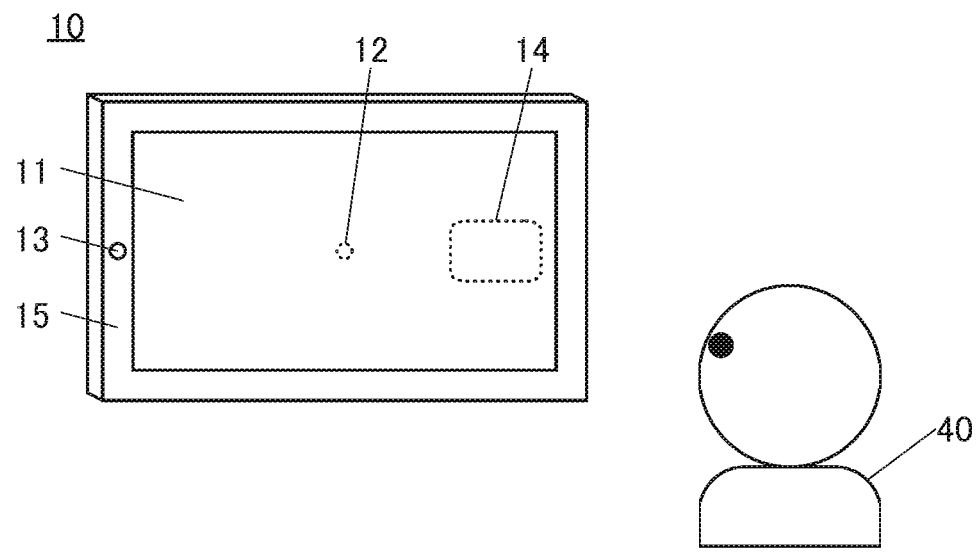
FIG. 1B is a perspective view illustrating the structure example of the electronic device of one embodiment of the present invention.

FIG. 1B is a perspective view illustrating the structure example of the electronic device 10 illustrated in FIG. 1A. The electronic device 10 includes the display portion 11 including the camera 12; the camera 13; the image processing portion 14; and a frame 15.

Note that FIG. 1B illustrates a user 40 of the electronic device 10. The user 40 is a subject whose image is captured by the camera 12 and the camera 13.

The top surface shape of the display portion 11 illustrated in FIG. 1B is a rectangle; however, the top surface shape of the display portion 11 is not limited thereto. For example, the top surface shape of the display portion 11 may be a polygon such as a triangle, a quadrangle (including a rectangle and a square), or a pentagon, a polygon with rounded corners, an ellipse, a circle, or a shape obtained by combining any of them.

The top surface shape of the frame 15 illustrated in FIG. 1B is a rectangle; however, the top surface shape of the frame 15 is not limited thereto. For example, the top surface shape of the frame 15 may be a polygon such as a triangle, a quadrangle (including a rectangle and a square), or a pentagon, a polygon with rounded corners, an ellipse, a circle, or a shape obtained by combining any of them.

The camera 12 is positioned in a region overlapping with the display portion 11. In FIG. 1B, the camera 12 is positioned in the center of the display portion 11. Note that the camera 12 is not necessarily positioned in the center of the display portion 11. The camera 12 may be positioned in an area other than the center of the display portion 11, and may be positioned on the left side, the right side, the upper side, the lower side, the upper left side, the upper right side, the lower left side, or the lower right side of the display portion 11, for example.

Figure 2A:
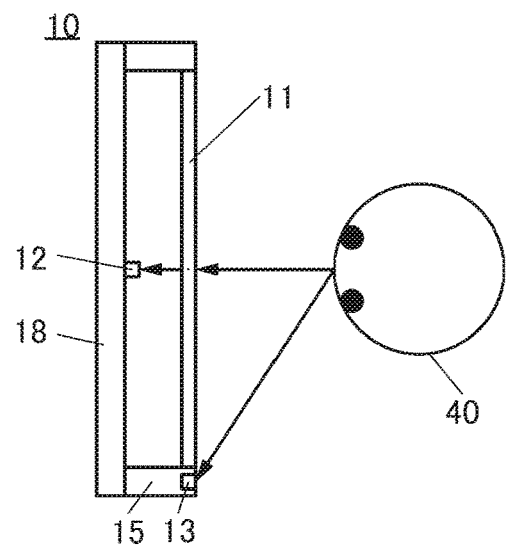
FIG. 2A is a top view schematically illustrating a structure of an electronic device of one embodiment of the present invention.

FIG. 2A is a top view schematically illustrating the structure of the electronic device 10. Note that FIG. 2A illustrates the user 40 of the electronic device 10 and does not illustrate the image processing portion 14. Although FIG. 2A illustrates the frame 15 and a support 18 separately, the frame 15 and the support 18 may be a single component.

Figure 2B:
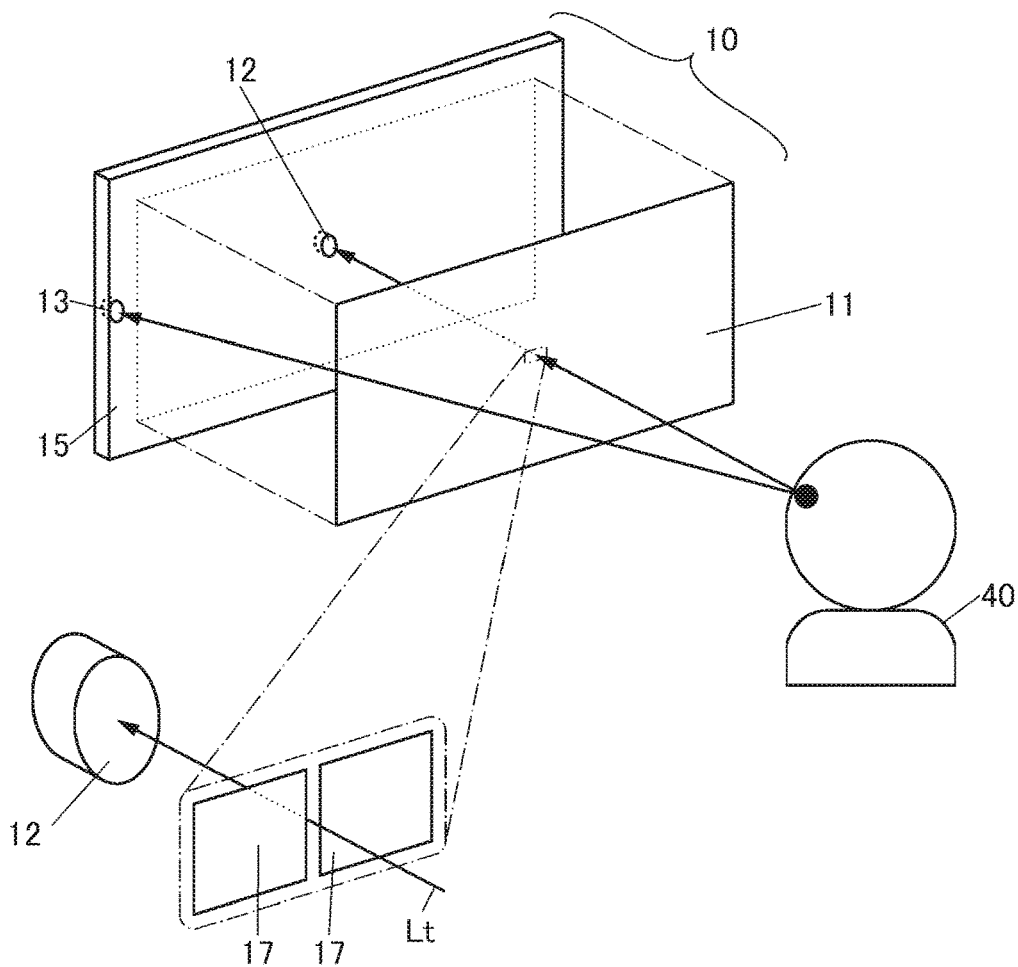
FIG. 2B is a perspective view schematically illustrating a state where light enters a camera included in the electronic device of one embodiment of the present invention.

FIG. 2B is a perspective view schematically illustrating a state where light enters the camera 12. For easy understanding of the structure of the electronic device 10, FIG. 2B illustrates the display portion 11 and the frame 15 separately. An enlarged view of the camera 12 and some pixels 17 included in the display portion 11 is shown on the lower left side of FIG. 2B. Note that each of the pixels 17 may be regarded as a subpixel included in the pixel 17.

As illustrated in FIG. 2A, the camera 12 is positioned closer to the support 18 side of the electronic device 10 than the display portion 11 or each pixel included in the display portion 11 is. In addition, the camera 12 is positioned behind the display portion 11 or each pixel included in the display portion 11 when seen from the user 40. In other words, the display portion 11 or each pixel included in the display portion 11 is positioned between the eye of the user 40 and the camera 12. The camera 12 is positioned such that an intersection point of a plane including each pixel included in the display portion 11 and a straight line connecting the eye of the user 40 and the camera 12 is located in the display portion 11. In the case where the camera 12 is positioned closer to the support 18 side than each pixel is, the camera 12 captures an image of light Lt passing through a space between the pixels 17 as illustrated in FIG. 2B.

Thus, an image captured by the camera 12 has a lot of noise and a small amount of light. Accordingly, an image captured by the camera 12 is more blurred than an image captured by the camera 13.

Note that the camera 12 and the pixels may be positioned over the same layer. In other words, the camera 12 may be positioned in a region including the display portion 11 or each pixel included in the display portion.

The details of the arrangement of the camera 12 and the pixels will be described in Embodiment 4.

The camera 13 is positioned in a region not overlapping with the display portion 11. For example, the camera 13 is positioned in the frame 15. In FIG. 1B, the camera 13 is positioned on the short side of the frame 15. Note that the camera 13 is not necessarily positioned on the short side of the frame 15. For example, the camera 13 may be positioned on the long side of the frame 15 or near the vertex of the frame 15.

FIG. 3A is a perspective view illustrating a structure example of the electronic device of one embodiment of the present invention. As illustrated in FIG. 3A, the camera 13 may be positioned in a notch portion 11c of the display portion 11. When the camera 13 is positioned in the notch portion 11c of the display portion 11, the electronic device 10 can have a narrower frame.

FIG. 3B is a perspective view illustrating a structure example of the electronic device of one embodiment of the present invention. The camera 13 is positioned in a region not overlapping with the display portion 11; for example, as illustrated in FIG. 3B, the camera 13 may be fixed to the outside of the frame 15.

Although FIG. 1B, FIG. 3A, and the like illustrate the structure examples in each of which the display portion 11 and the image processing portion 14 are provided in one housing, the present invention is not limited thereto. For example, the display portion 11 and the image processing portion 14 may be provided in different housings. Specifically, the electronic device of one embodiment of the present invention may include a display apparatus and a computer.

Examples of the computer include a personal computer and a server.

FIG. 3C is a perspective view illustrating another structure example of the electronic device of one embodiment of the present invention. An electronic device 10A illustrated in FIG. 3C includes a display apparatus 30 and a computer 20. The display apparatus 30 includes the display portion 11 including the camera 12; the camera 13; the frame 15; and a communication portion 16. The computer 20 includes the image processing portion 14, a housing 25, and a communication portion 26. The display portion 11 is provided in a housing of the display apparatus 30, and the image processing portion 14 is provided in the housing 25 of the computer 20. That is, in the electronic device 10A, the display portion 11 is provided in a first housing, and the image processing portion 14 is provided in a second housing.

With the use of the communication portion 16 and the communication portion 26, data can be transmitted and received between the display apparatus 30 and the computer 20. As the communication portion 16 and the communication portion 26, a hub, a router, a modem, or the like can be used. Data may be transmitted and received through wire communication or wireless communication (e.g., radio waves or infrared rays).

Note that communication between the display apparatus 30 and the computer 20 may be performed by connection with a computer network such as the Internet, which is an infrastructure of the World Wide Web (WWW), an intranet, an extranet, a PAN (Personal Area Network), a LAN (Local Area Network), a CAN (Campus Area Network), a MAN (Metropolitan Area Network), a WAN (Wide Area Network), or a GAN (Global Area Network).

The electronic device described in this embodiment preferably includes a light source that emits infrared light. The light source that emits infrared light is preferably positioned in a region not overlapping with the display portion 11, for example. Specifically, as illustrated in FIG. 3C, the electronic device 10A preferably includes a light source 19 that emits infrared light in the frame 15. For another example, the light source that emits infrared light is preferably positioned in a region overlapping with the display portion 11. Specifically, the display portion 11 preferably includes light-emitting elements for display (R, G, B, and the like) and a light-emitting element that emits infrared light.

The electronic device 10 including the light source that emits infrared light can perform gaze detection and gaze tracking of a subject, for example.

[Method for Making Image Clear and Tracking Gaze]

In this section, a method for making an image of a subject clear and tracking the gaze of the subject with the use of the camera 12, the camera 13, and the image processing portion 14 will be described.

Figure 4:
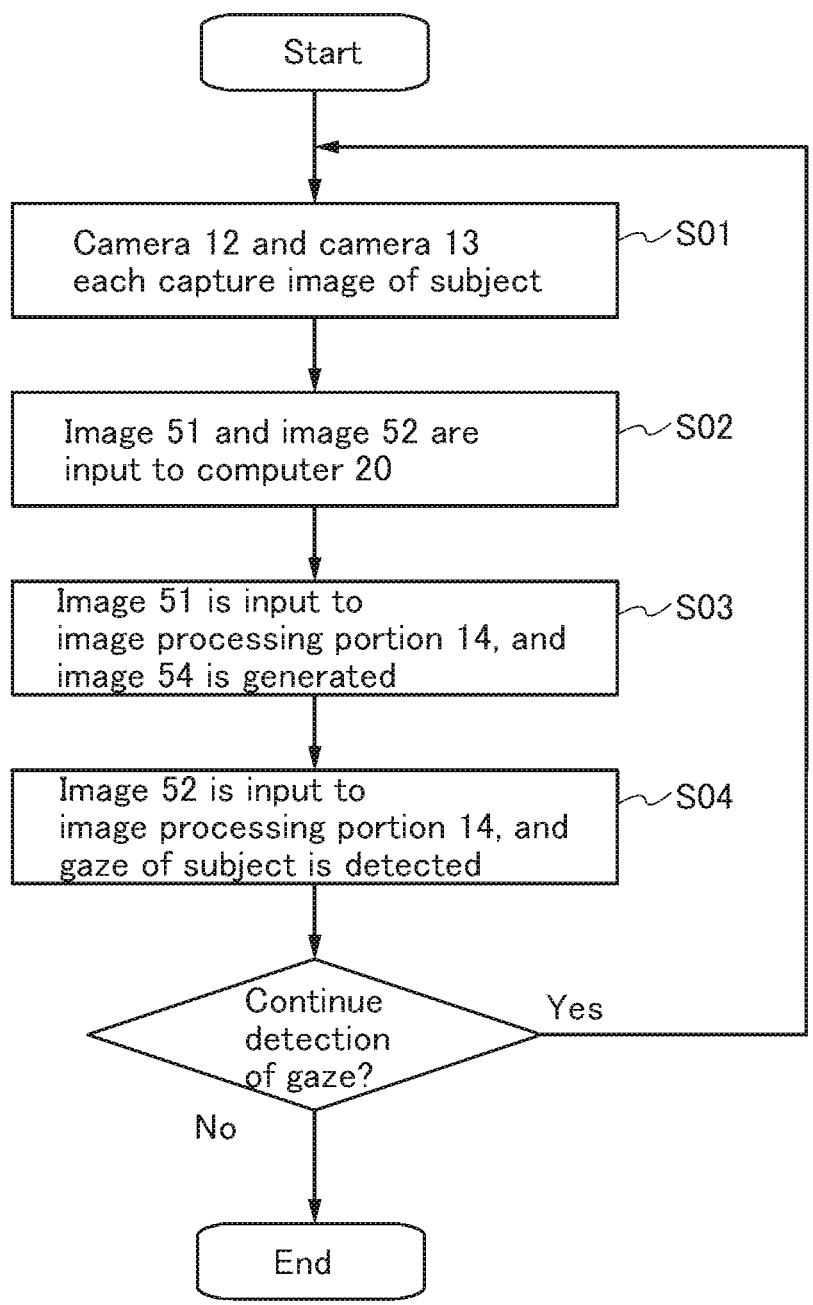
FIG. 4 is a flowchart showing a method for generating an image.
Figure 5A:
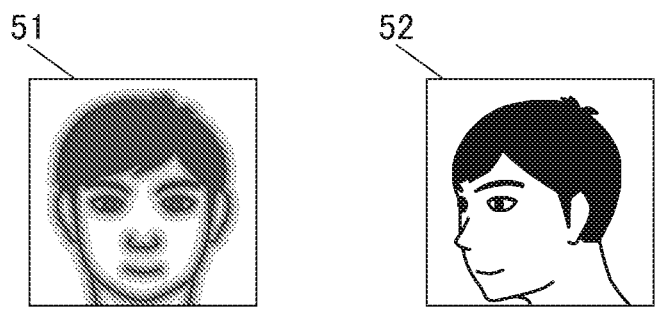
FIG. 5A and FIG. 5B are schematic views illustrating part of processing.
Figure 5B:
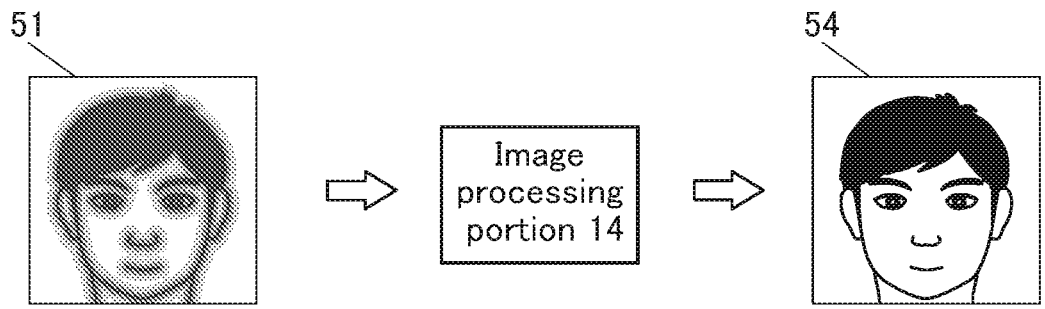

FIG. 4 is a flowchart showing an example of the method. Note that the method shown in FIG. 4 is described using the electronic device 10A illustrated in FIG. 3C. FIG. 5A and FIG. 5B are schematic views illustrating part of the processing shown in FIG. 4.

The method for making the image of the subject clear and tracking the gaze of the subject includes Step S01 to Step S04 as shown in FIG. 4.

Step S01 is a step in which the camera 12 and the camera 13 each capture an image of the subject. The camera 12 captures an image of the subject to generate an image 51. The camera 13 captures an image of the subject to generate an image 52. As described above, the image 51 is more blurred than the image 52 (FIG. 5A).

Step S02 is a step in which the image 51 and the image 52 are input to the computer 20 through the communication portion 16 and the communication portion 26.

Note that in the case where the electronic device 10 illustrated in FIG. 1B, FIG. 3A, or the like is used, Step S02 can be omitted owing to the image processing portion 14 included in the electronic device 10.

Step S03 is a step in which the image 51 is input to the image processing portion 14 and an image 54 is generated (FIG. 5B). The image 54 can be regarded as the image 51 with less noise. In addition, the image 54 can be regarded as the image 51 that is made clear. Thus, Step S03 can be rephrased as a step of making the image 51 clear with the use of the image processing portion 14.

Note that the image processing portion 14 preferably includes a generator. In that case, the image 54 is generated using the generator. That is, Step S03 can be rephrased as a step in which the image 51 is input to the generator so that the image 51 is made clear. The image processing portion 14 has a function of making the image 51 clear when the image 51 is input to the generator. A neural network included in the generator has performed learning in advance. In other words, the neural network included in the generator has performed learning using training data. Note that the learning of the neural network will be described later.

Step S04 is a step in which the image 52 is input to the image processing portion 14 and the gaze of the subject is detected on the basis of the image 52. That is, the image processing portion 14 has a function of detecting the gaze of the subject on the basis of the image 52.

The gaze of the subject is detected by analyzing an image of the subject's eye captured by the camera 13. Specifically, a first method in which the gaze is detected from the positional relationship between the inner corner of the eye (or the outer corner of the eye) and the iris (or the pupil) or a second method in which the gaze is detected from the positional relationship between the corneal reflection and the pupil is used. It is particularly preferable to use the second method utilizing the corneal reflection that enables more accurate gaze detection. The second method utilizing the corneal reflection requires irradiation of the subject's eye with infrared rays; thus, an electric device preferably includes a light source that emits infrared light.

In the case of continuing the detection of the gaze of the subject after Step S04 is finished, the process returns to Step S01. Alternatively, in the case of not continuing the detection of the gaze of the subject after Step S04 is finished, the process is terminated.

When one cycle including Step S01 to Step S04 is repeated, the image of the subject can be made clear and the gaze of the subject can be tracked using the electronic device of one embodiment of the present invention. As described above, the image processing portion 14 has a function of detecting the gaze of the subject on the basis of the image 52. The detection of the gaze of the subject is repeated by repeating the above cycle, whereby the gaze of the subject can be tracked. Thus, the image processing portion 14 has a function of tracking the gaze of the subject on the basis of the image 52.

In the case where a remote meeting (online meeting) is held using the electronic device of one embodiment of the present invention, the image 54 is preferably transmitted to the other side. The image 54 is generated on the basis of an image captured by the camera 12 positioned in the gaze direction of the user; thus, when the user shows the image 54 to participants of the remote meeting, the user and the participants can make eye contact and they can communicate smoothly. Since the image 54 is a clear image with less noise, the participants of the remote meeting hardly feel uncomfortable. The electronic device of one embodiment of the present invention having a gaze detection function enables a remote meeting with high realistic sensation. Note that an example of a remote meeting using gaze detection will be described in Embodiment 2 and later embodiments.

[Learning]

Figure 6:
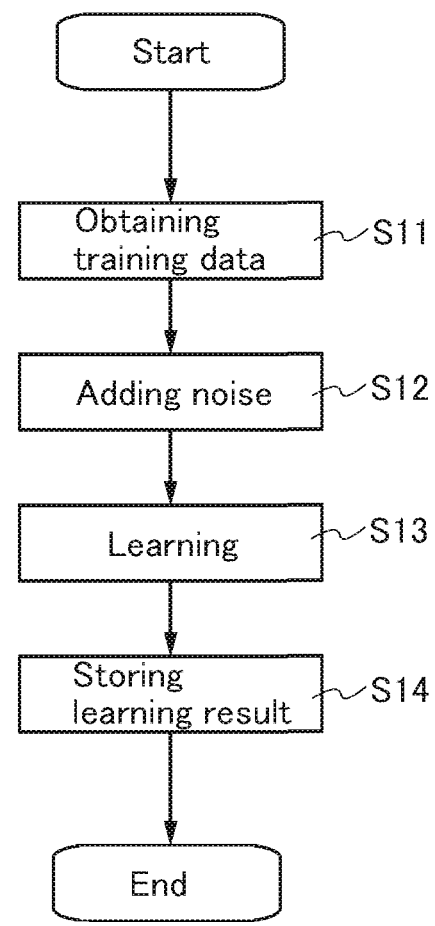
FIG. 6 is a flowchart showing an example of a procedure of processing.
Figure 7A:
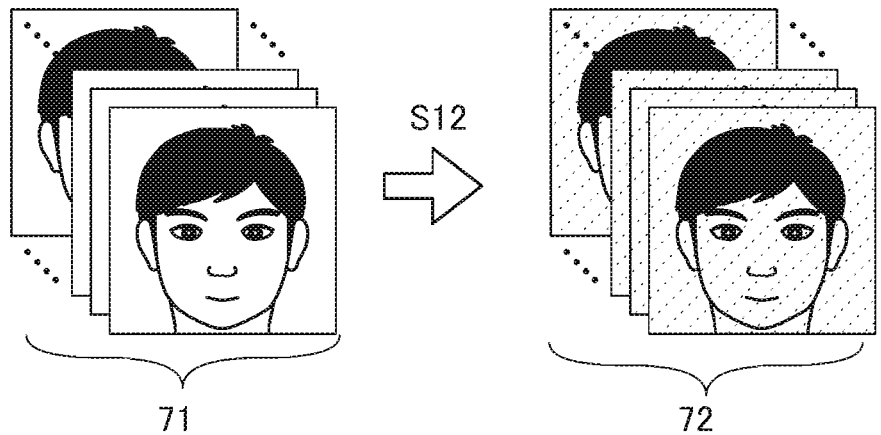
FIG. 7A and FIG. 7B are schematic views illustrating part of processing.
Figure 7B:
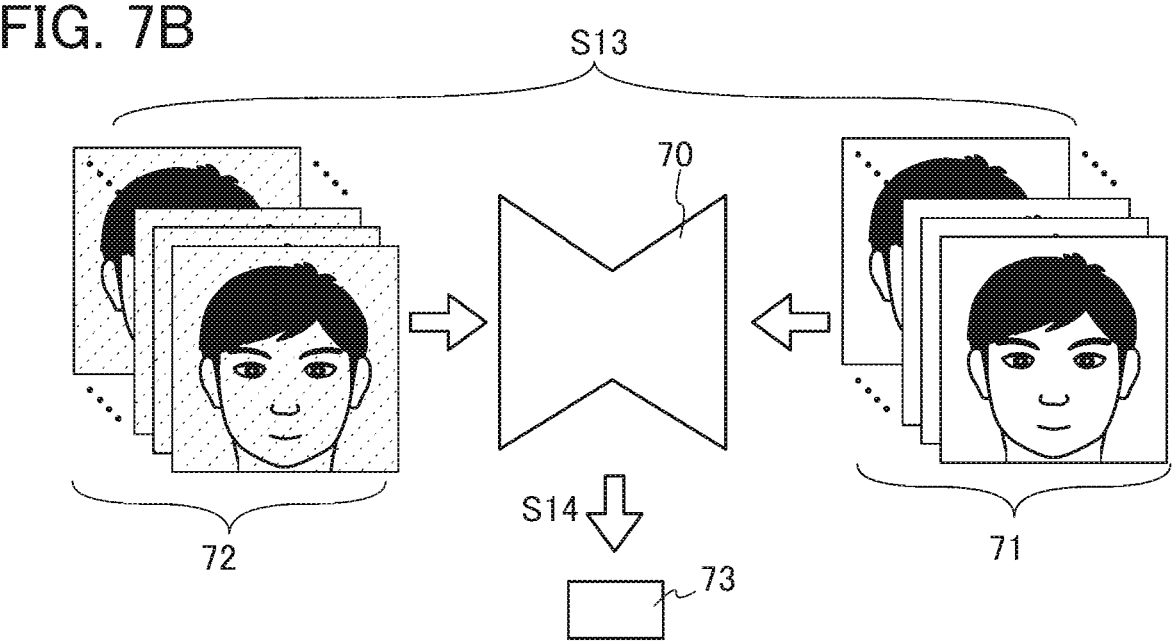

In the method for making an image clear, learning has been performed in advance using training data. FIG. 6 is a flowchart showing an example of a procedure of processing. The processing shown in FIG. 6 can be rephrased as learning. FIG. 7A and FIG. 7B are schematic views illustrating part of the processing shown in FIG. 6. Note that in this embodiment, description is made using, as an example, the case where an image including a person's face is made clear.

Although the processing shown in FIG. 6 is preferably performed with a computer that is different from the computer 20 included in the electronic device 10 or the electronic device 10A, part or the whole of the processing may be performed with the computer 20 included in the electronic device 10 or the electronic device 10A in some cases. Description here is made assuming that the processing shown in FIG. 6 is performed with a computer that is different from the computer 20 included in the electronic device 10 or the electronic device 10A.

The learning includes Step S11 to Step S14 as shown in FIG. 6.

First, training data 71 is obtained in Step S11. The training data 71 preferably includes a clear image of a person's face. Furthermore, the training data 71 preferably includes a plurality of clear images of people's faces. The number of images is preferably larger than or equal to 1000, further preferably larger than or equal to 5000, still further preferably larger than or equal to 10000. As the number of images is larger, the learning can be performed with higher accuracy; however, the number of images is actually limited by the performance of the computer that performs the learning. Specifically, the number of images is limited by the processing capability of a CPU and an AI chip and the storage capacity of a main memory device in the computer.

In Step S11, the definition of the images included in the training data 71 is preferably converted into an appropriate value. As the definition of the images increases, the learning can be performed with higher accuracy; however, the definition is actually limited by the performance of the computer that performs the learning. Specifically, the definition is limited by the processing capability of the CPU and the AI chip and the storage capacity of the main memory device in the computer.

Next, in Step S12, noise is added to all of the images included in the training data 71 to generate data 72 (FIG. 7A). Examples of noise to be added include noise based on Gaussian distribution (also referred to as Gaussian noise)

and noise that is position independent and appears randomly with a certain frequency (also referred to as impulse noise).

Next, the learning is performed in Step S13. The learning is performed using the training data 71, the data 72, and a generator 70 (FIG. 7B).

The generator 70 is a program including a neural network and can generate an image corresponding to input data. Examples of the generator 70 include an Autoencoder (AE) and a Convolutional Autoencoder (CAE). Alternatively, generative adversarial networks (GAN) or a model utilizing GAN may be used as the generator 70. Examples of the model utilizing GAN include DCGAN (Deep Convolutional GAN), StyleGAN, and Progressive GAN. An AI chip can be regarded as having a function of the generator 70.

The generator 70 performs the learning using the data 72 as input data such that output data is close to the training data 71. In other words, the generator 70 updates the weight of the neural network using the data 72 as input data such that output data is close to the training data 71.

Next, in Step S14, a learning result 73 is stored (FIG. 7B). More specifically, the weight of the neural network obtained by the learning is stored. The learning result 73 is stored in an auxiliary memory device of the computer or an auxiliary memory device of the electronic device 10 or the electronic device 10A.

Through the above steps, the learning is completed.

Structure Example 2

Although the electronic device 10 illustrated in FIG. 1A and FIG. 1B includes one camera 13, the present invention is not limited thereto. The electronic device of one embodiment of the present invention may include a plurality of the cameras 13. Note that differences from Structure example 1 above will be mainly described below, and the description of portions already described above is omitted.

FIG. 8A is a block diagram illustrating a structure example of an electronic device of one embodiment of the present invention. An electronic device 10B illustrated in FIG. 8A is different from the electronic device 10 illustrated in FIG. 1A in including two cameras 13. Specifically, the electronic device 10B illustrated in FIG. 8A includes the display portion 11, the two cameras 13 (a camera 13_1 and a camera 13_2), and the image processing portion 14. The display portion 11 includes the camera 12.

FIG. 8B and FIG. 8C are perspective views illustrating structure examples of the electronic device 10B illustrated in FIG. 8A. The electronic device 10B includes the display portion 11 including the camera 12; the camera 13_1; the camera 13_2; the image processing portion 14; and the frame 15.

The camera 13_1 and the camera 13_2 are each positioned in a region not overlapping with the display portion 11. For example, the camera 13_1 and the camera 13_2 are positioned in the frame 15.

The camera 13_1 and the camera 132 are preferably positioned to sandwich the display portion 11. For example, the camera 13_1 and the camera 13_2 are preferably positioned on the opposite short sides or long sides of the frame 15. In FIG. 8B, the camera 131 is positioned on one of the opposite short sides of the frame 15 and the camera 132 is positioned on the other of the opposite short sides of the frame 15.

For another example, the camera 13_1 and the camera 13_2 are preferably positioned near vertices of the frame 15 on the diagonal line of the display portion 11. In FIG. 8C, the camera 13_1 is positioned near a vertex of the frame 15, and the camera 132 is positioned near a diagonal vertex.

Note that the positions of the camera 13_1 and the camera 13_2 are not limited thereto. For example, the camera 131 may be positioned on the short side of the frame 15, and the camera 13_2 may be positioned on the long side of the frame 15. Alternatively, the camera 131 may be positioned on the long side or the short side of the frame 15, and the camera 132 may be positioned near the vertex of the frame 15. Alternatively, the camera 13_1 and the camera 13_2 may be positioned at two vertices of the frame 15.

Although the positions of the camera 13_1 and the camera 13_2 are described above assuming that the top surface shape of the frame 15 is a rectangle, the camera 13_1 and the camera 13_2 are positioned as appropriate in the case where the top surface shape of the frame 15 is not a rectangle.

One or both of the camera 13_1 and the camera 13_2 may be positioned in the notch portion of the display portion 11. Alternatively, one or both of the camera 13_1 and the camera 13_2 may be fixed to the outside of the frame 15.

Although the electronic device 10 illustrated in FIG. 1A and FIG. 1B includes one camera 13 and the electronic device 10B illustrated in FIG. 8A to FIG. 8C includes two cameras 13, the present invention is not limited thereto. The electronic device of one embodiment of the present invention may include three or more cameras 13.

Although FIG. 8B illustrates the structure example in which the display portion 11 and the image processing portion 14 are provided in one housing, the present invention is not limited thereto. For example, the display portion 11 and the image processing portion 14 may be provided in different housings. Specifically, the electronic device of one embodiment of the present invention may include a display apparatus and a computer. Examples of the computer include a personal computer and a server.

FIG. 8D is a perspective view illustrating another structure example of the electronic device of one embodiment of the present invention. An electronic device 10C illustrated in FIG. 8D includes a display apparatus 30C and the computer 20. The display apparatus 30C includes the display portion 11 including the camera 12; the camera 13_1; the camera 13_2; the frame 15; and the communication portion 16. The computer 20 includes the image processing portion 14, the housing 25, and the communication portion 26. The display portion 11 is provided in a housing of the display apparatus 30C, and the image processing portion 14 is provided in the housing 25 of the computer 20. That is, in the electronic device 10C, the display portion 11 is provided in a first housing, and the image processing portion 14 is provided in a second housing.

In the case where gaze detection and gaze tracking of a subject are performed using the electronic device 10B illustrated in FIG. 8A to FIG. 8C or the electronic device 10C illustrated in FIG. 8D, it is preferable to use one or both of the camera 13_1 and the camera 13_2.

As will be described later, the electronic device 10B illustrated in FIG. 8A to FIG. 8C or the electronic device 10C illustrated in FIG. 8D may include two or more cameras 12 in the display portion 11.

[Method for Creating Avatar]

In this section, a method for creating an avatar using the camera 12, the camera 13_1, the camera 13_2, and the image processing portion 14 will be described.

When an avatar is created using one camera (e.g., the camera 12 illustrated in FIG. 8B), a change in the orientation of a subject's face might result in insufficient performance of recognizing the subject's face and thus the avatar might not be correctly created.

In the method for creating an avatar described in this section, the camera 13_1 and the camera 13_2 are used as stereo cameras (also referred to as parallax cameras).

Figure 9:
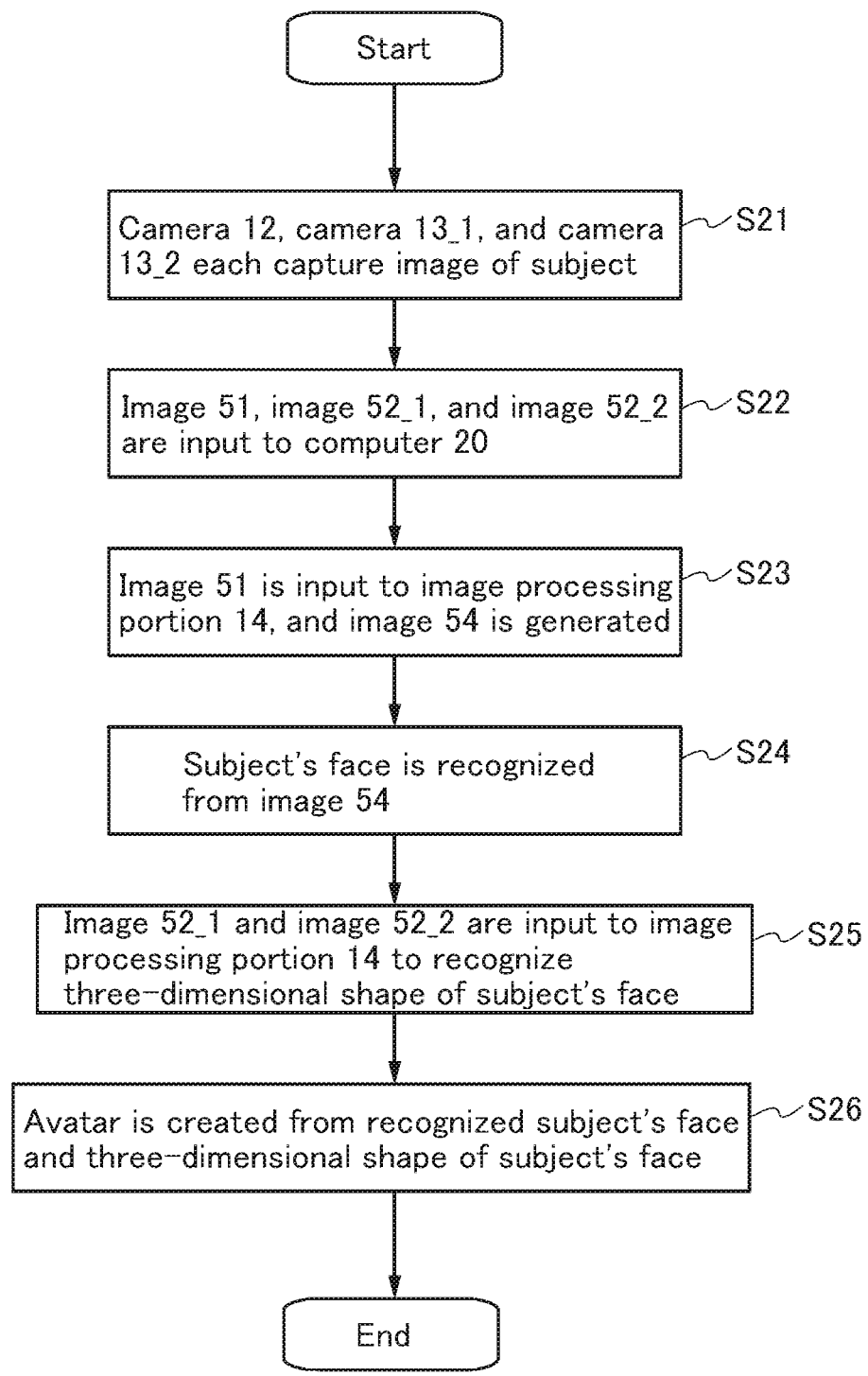
FIG. 9 is a flowchart showing a method for creating an avatar.

FIG. 9 is a flowchart showing an example of the method for creating an avatar. Note that the method for creating an avatar shown in FIG. 9 is described using the electronic device 10C illustrated in FIG. 8D. FIG. 10A to FIG. 10D are schematic views illustrating part of the processing shown in FIG. 9.

As shown in FIG. 9, the method for creating an avatar includes Step S21 to Step S26.

Figure 10A:
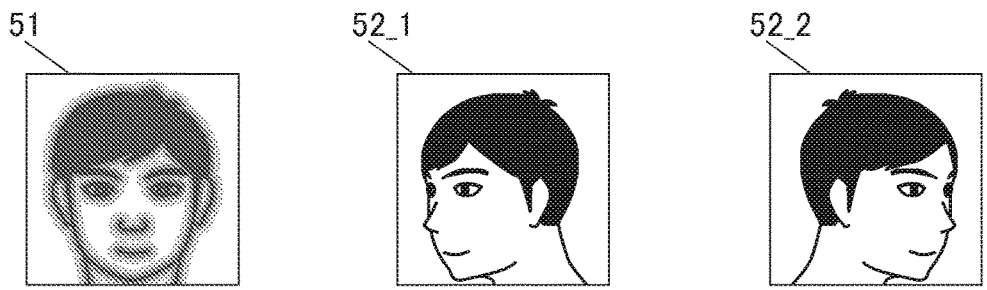
FIG. 10A to FIG. 10D are schematic views illustrating part of processing.

Step S21 is a step in which the camera 12, the camera 13_1, and the camera 13_2 each capture an image of the subject. The camera 12 captures an image of the subject to generate the image 51. The camera 131 captures an image of the subject to generate an image 52_1. The camera 13_2 captures an image of the subject to generate an image 52_2. As described above, the image 51 is more blurred than the image 52_1 and the image 52_2 (FIG. 10A).

Step S22 is a step in which the image 51, the image 52_1, and the image 52_2 are input to the computer 20 through the communication portion 16 and the communication portion 26.

Note that in the case where the electronic device 10B illustrated in FIG. 8A to FIG. 8C is used, Step S22 can be omitted owing to the image processing portion 14 included in the electronic device 10B.

Step S23 is a step in which the image 51 is input to the image processing portion 14 and the image 54 is generated. Refer to the description of Step S03 for Step S23.

Step S24 is a step in which the subject's face is recognized from the image 54 with the use of the image processing portion 14. That is, the image processing portion 14 has a function of recognizing the subject's face from the image 54.

Figure 10B:
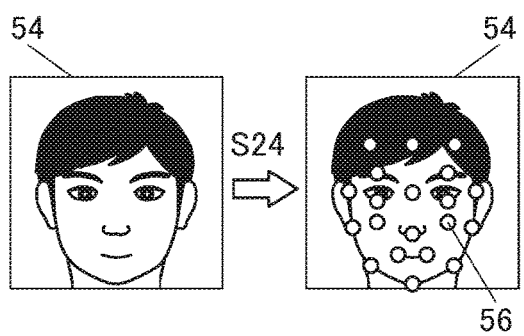

As an example of a method for recognizing the subject's face, a method illustrated in FIG. 10B can be given in which feature points 56 are extracted from the features of the subject's face (the eyes, the nose, the mouth, the eyebrows, the forehead, the contours, and the like) and the positions of the feature points 56, the distance between the feature points 56, and the like are measured. In that case, the subject's face is recognized as being flat (two-dimensional). Although 20 feature points 56 are extracted in FIG. 10B, the number of feature points 56 to be extracted may be 19 or less or 21 or more. The method for recognizing the subject's face is not limited thereto.

The image 54 used in the step of recognizing the subject's face is the image 51 that is made clear. Furthermore, the image 51 is captured from the direction close to the front of the subject. Thus, the use of the image 54 facilitates extraction of the features of the subject's face and enables the subject's face to be recognized with high accuracy.

Figure 10C:
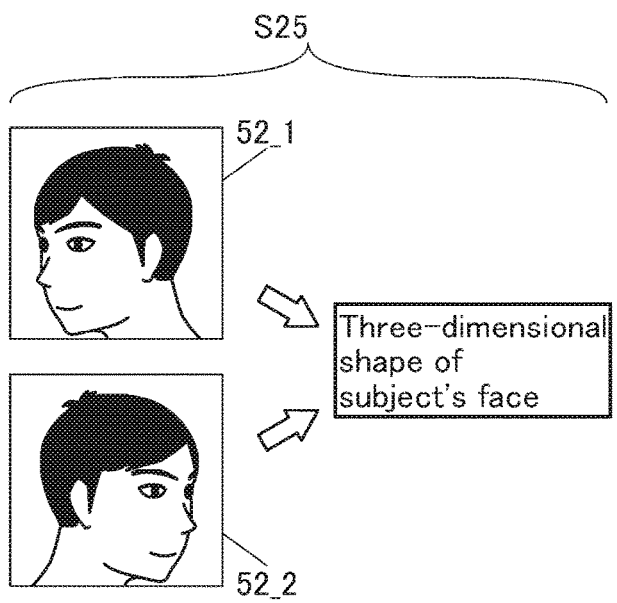

Step S25 is a step in which the image 52_1 and the image 52_2 are input to the image processing portion 14 to recognize a three-dimensional shape of the subject's face (FIG. 10C). That is, the image processing portion 14 has a function of recognizing the three-dimensional shape 30 of the subject's face from the image 52_1 and the image 52_2. Note that the three-dimensional shape of the subject's face described in this specification and the like may be rephrased as the orientation of the subject's face.

As described above, the camera 13_1 and the camera 13_2 are used as stereo cameras in the method for creating an avatar described in this section. Thus, three-dimensional information of the subject's face can be obtained. That is, the three-dimensional shape of the subject's face can be recognized. Note that the three-dimensional shape of the subject's face may be recognized using a neural network from the image 52_1 and the image 52_2 captured by the camera 13_1 and the camera 13_2.

Figure 10D:
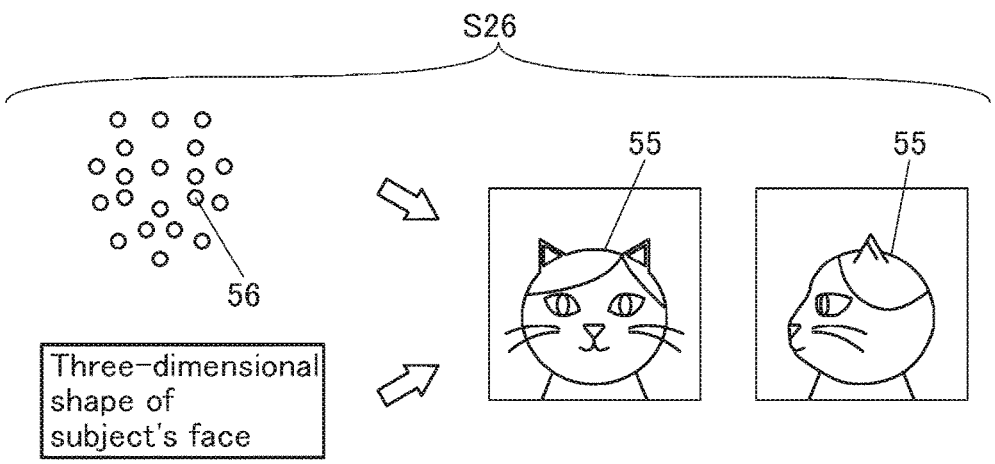

Step S26 is a step in which an avatar 55 is created using the image processing portion 14 from the recognized subject's face and the recognized three-dimensional shape of the subject's face (FIG. 10D). That is, the image processing portion 14 has a function of creating the avatar 55 from the subject's face and the three-dimensional shape of the subject's face.

The avatar 55 may be a person that reflects the features of the subject's face (the eyes, the nose, the mouth, the eyebrows, the forehead, the contours, and the like), a person who has some of the emphasized features of the subject's face (the eyes, the nose, the mouth, the eyebrows, the forehead, the contours, and the like), or a person different from the subject. Alternatively, the avatar 55 may be an animal or an illustration. FIG. 10D illustrates an example in which the created avatar 55 is an avatar of a cat facing forward and an avatar of a cat turning to the side. Note that the avatar can be rephrased as an object, a character, or the like.

Note that Step S26 may be a step in which the avatar 55 is created using the image processing portion 14 from the recognized subject's face and the orientation of the avatar 55 is adjusted to match the recognized three-dimensional shape of the subject's face.

In this manner, the electronic device 10C can create the avatar 55 linked with the movement of the subject's face from the combination of the feature points 56 obtained by the camera 12 and the three-dimensional shape of the subject's face obtained by the cameras 13_1 and 13_2, resulting in smoother communication using the avatar 55.

When one cycle including Step S21 to Step S26 is repeated, the avatar 55 that reflects the facial expression of the subject, the three-dimensional shape of the subject's face, and the like can be continuously created.

In Step S24 to Step S26, the avatar 55 is created from the subject's face recognized as being flat (two-dimensional) and the orientation of the avatar 55 is adjusted to match the recognized three-dimensional shape of the subject's face; however, one embodiment of the present invention is not limited thereto. The subject's face may be recognized as being three-dimensional from the image 54. Alternatively, the subject's face may be recognized as being three-dimensional from the image 54 and at least one of the image 52_1 and the image 52_2.

Structure Example 3

The electronic device 10 illustrated in FIG. 1A and FIG. 1B has the structure in which the display portion 11 includes one camera 12. Note that the number of cameras 12 included in the display portion 11 is not limited to one. The display portion 11 may include two or more cameras 12. Note that differences from Structure example 1 above will be mainly described, and the description of portions already described above is omitted.

Figure 11A:
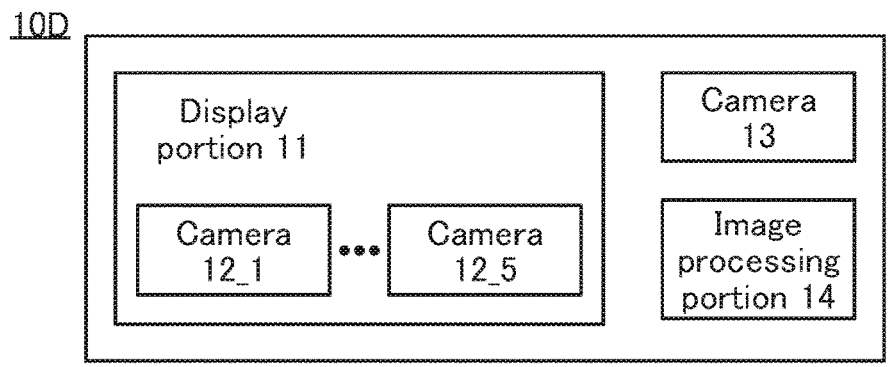
FIG. 11A is a block diagram illustrating a structure example of an electronic device of one embodiment of the present invention.

FIG. 11A is a block diagram illustrating a structure example of an electronic device of one embodiment of the present invention. An electronic device 10D illustrated in FIG. 11A is different from the electronic device 10 illustrated in FIG. 1A in that the display portion 11 includes five cameras 12. Specifically, the electronic device 10D illustrated in FIG. 11A includes the display portion 11, the camera 13, and the image processing portion 14. The display portion 11 includes the five cameras 12 (a camera 12_1 to a camera 12_5).

Figure 11B:
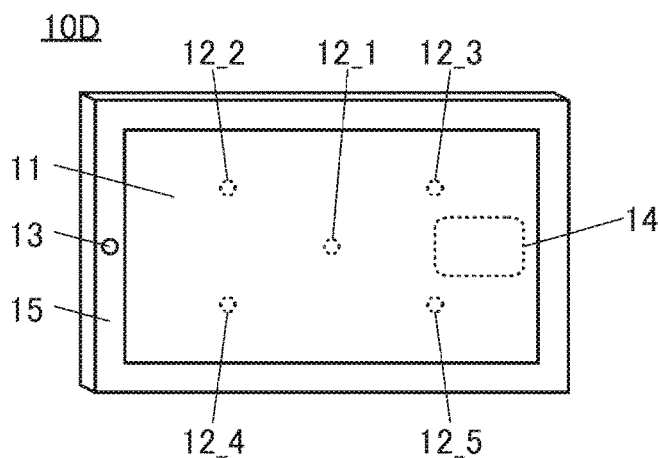
FIG. 11B and FIG. 11C are perspective views illustrating structure examples of electronic devices of one embodiment of the present invention.

FIG. 11B is a perspective view illustrating the structure example of the electronic device 10D illustrated in FIG. 11A. The electronic device 10D includes the display portion 11 including the camera 12_1 to the camera 12_5; the camera 13; the image processing portion 14; and the frame 15. Although the camera 12_2 to the camera 125 are positioned in a radial manner with the camera 12_1 at the center in FIG. 11B, the positions of the plurality of cameras 12 are not limited thereto. The plurality of cameras 12 may be arranged in a matrix.

With the use of the camera 12 that is close to an intersection point of the gaze of the user of the electronic device 10D and the display portion 11 (the point of view of the user on the display portion 11) among the plurality of cameras 12, the users can make eye contact. This allows smooth communication.

As described above in Structure example 2, the electronic device 10D may include two or more cameras 13.

Although FIG. 11B illustrates the structure example in which the display portion 11 and the image processing portion 14 are provided in one housing, the present invention is not limited thereto. For example, the display portion 11 and the image processing portion 14 may be provided in different housings. Specifically, the electronic device of one embodiment of the present invention may include a display apparatus and a computer. Examples of the computer include a personal computer and a server.

Figure 11C:
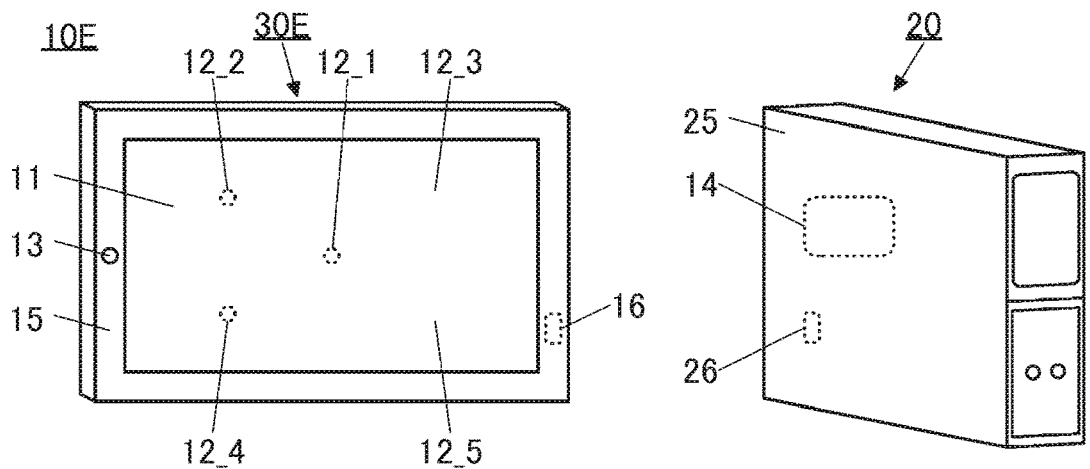

FIG. 11C is a perspective view illustrating another structure example of the electronic device of one embodiment of the present invention. An electronic device 10E illustrated in FIG. 11C includes a display apparatus 30E and the computer 20. The display apparatus 30E includes the display portion 11 including the camera 12_1 to the camera 12_5; the camera 13; the frame 15; and the communication portion 16. The computer 20 includes the image processing portion 14, the housing 25, and the communication portion 26. The display portion 11 is provided in a housing of the display apparatus 30E, and the image processing portion 14 is provided in the housing 25 of the computer 20. That is, in the electronic device 10E, the display portion 11 is provided in a first housing, and the image processing portion 14 is provided in a second housing.

At least part of this embodiment can be implemented in combination with the other embodiments described in this specification as appropriate.

Embodiment 2

Figure 12A:
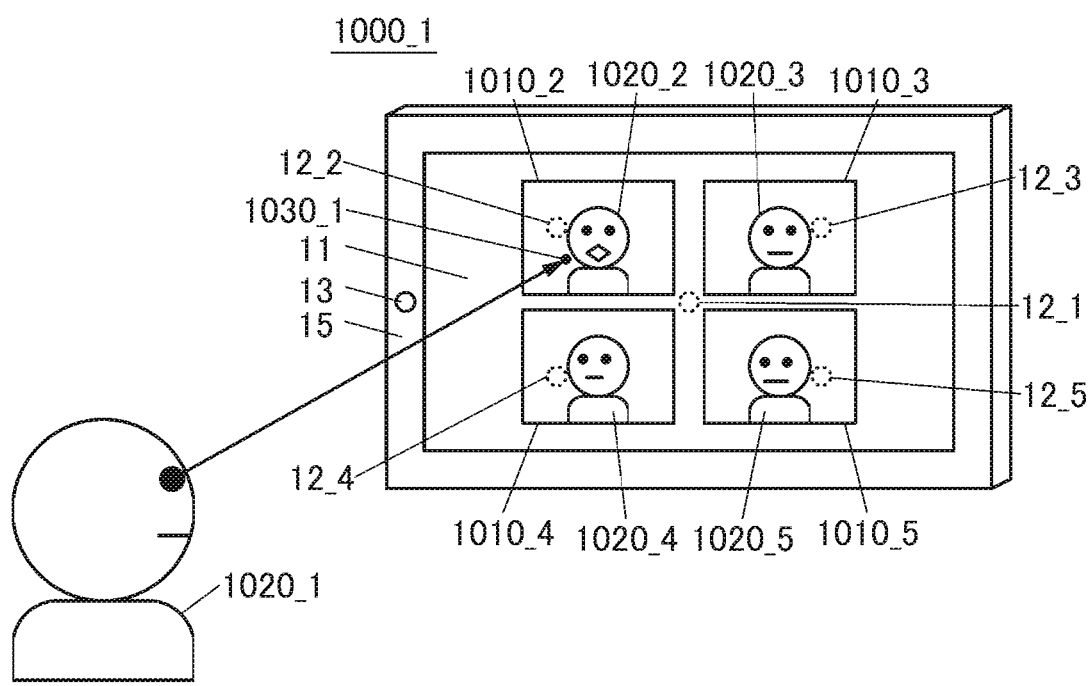
FIG. 12A and FIG. 12B are diagrams illustrating application examples of electronic devices.
Figure 12B:
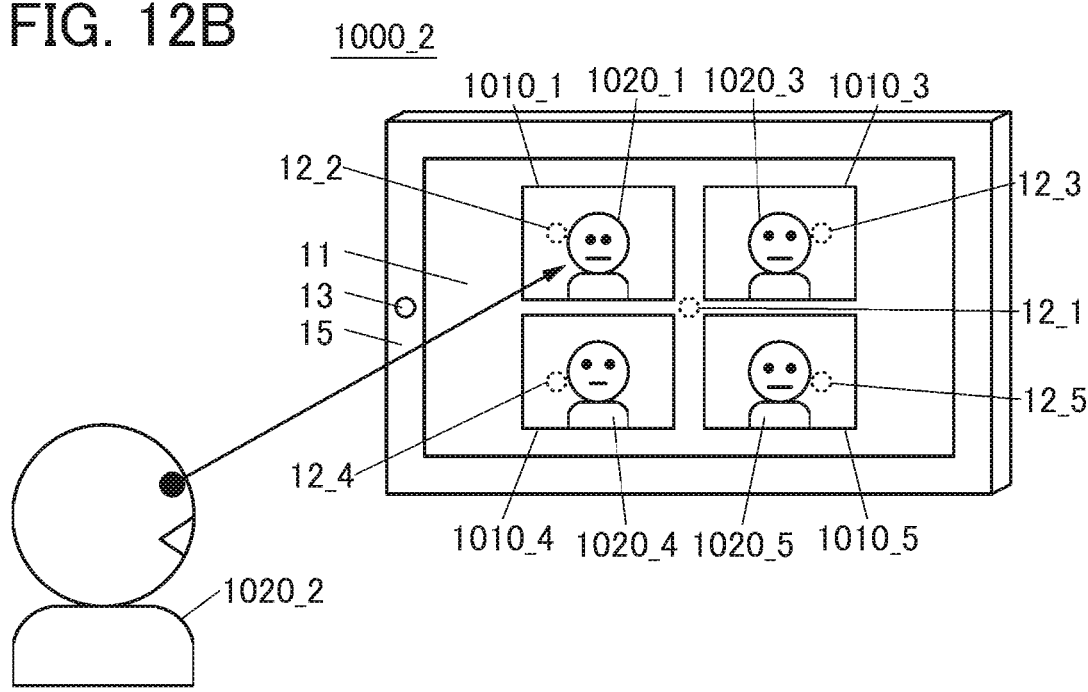

An example of the case of using an electronic device of one embodiment of the present invention will be described with reference to FIG. 12A and FIG. 12B. FIG. 12A and FIG. 12B illustrate examples of a remote meeting held using five electronic devices (an electronic device 1000_1 to an electronic device 1000_5). The electronic devices used in the remote meeting are each preferably any of the electronic devices described in the above embodiment.

In the following description, an online meeting in which five users (a user 1020_1 to a user 1020_5) participate is assumed as the remote meeting. Here, the user 1020_1 to the user 10205 respectively use the electronic device 1000_1 to the electronic device 1000_5.

FIG. 12A and FIG. 12B illustrate examples of display on the electronic device 1000_1 and the electronic device 10002, respectively, in the situation where the user 1020_2 speaks.

The electronic device 1000_1 illustrated in FIG. 12A and the electronic device 1000_2 illustrated in FIG. 12B each include the five cameras 12 (the camera 12_1 to the camera 12_5) like the electronic device 10D illustrated in FIG. 11B. Note that the image processing portion 14 is not illustrated in FIG. 12A and FIG. 12B.

FIG. 12A illustrates the example of display on the electronic device 1000_1. The display portion 11 of the electronic device 1000_1 displays an image 10102 captured by the camera included in the electronic device 1000_2, an image 1010_3 captured by the camera included in the electronic device 10003, an image 1010_4 captured by the camera included in the electronic device 1000_4, and an image 10105 captured by the camera included in the electronic device 1000_5. The image 1010_2 to the image 1010_5 respectively include the user 1020_2 to the user 1020_5.

FIG. 12B illustrates the example of display on the electronic device 1000_2. The display portion 11 of the electronic device 1000_2 displays an image 10101 captured by the camera included in the electronic device 1000_1, the image 1010_3 captured by the camera included in the electronic device 10003, the image 10104 captured by the camera included in the electronic device 1000_4, and the image 1010_5 captured by the camera included in the electronic device 1000_5. The image 1010_1, the image 10103, the image 10104, and the image 1010_5 respectively include the user 1020_1, the user 10203, the user 10204, and the user 1020_5.

First, one of the camera 12_1 to the camera 12_5 included in the electronic device 1000_1 is activated. As an example of a method for activating one of the camera 12_1 to the camera 12_5, a method can be given in which the electronic device 1000_1 senses a user (the user 1020_2) who speaks and a camera (the camera 12_2 in FIG. 12A) that is in or closest to an image (the image 1010_2) including the user who speaks is activated. The gaze of a person who looks at the display portion 11 tends to turn to the speaker spontaneously; thus, with the use of the method, the camera that is close to the point of view of the user 1020_1 on the display portion 11 can be activated.

As an example of a method for sensing a user who speaks by the electronic device 1000_1, a method in which the coordinates of the image or the display portion 11 on which the movement of the subject is biggest among the image 1010_2 to the image 1010_5 are detected, a method in which the image of the subject whose voice obtained by a microphone of each of the electronic device 1000_2 to the electronic device 10005 is biggest among the image 1010_2 to the image 1010_5 is detected, or the like can be given.

The method for activating one of the camera 12_1 to the camera 12_5 is not limited thereto. For example, one of the camera 12_1 to the camera 125 may be activated when the electronic device 1000_1 detects the gaze of the user 1020_1. The user 1020_1 watches the image 1010_2 displaying the user (the user 1020_2) who speaks. At this time, the electronic device 1000_1 detects the gaze of the user 10201 by the method for tracking the gaze described in Embodiment 1. Furthermore, the electronic device 1000_1 estimates a point of view 1030_1 of the user 1020_1 on the display portion 11 on the basis of the detected gaze. The electronic device 1000_1 activates the camera (the camera 12_2 in FIG. 12A) at the shortest distance from the point of view 1030_1 among the camera 12_1 to the camera 12_5. Although the point of view 1030_1 is illustrated in FIG. 12A for easy understanding, the point of view 1030_1 is not necessarily displayed on the display portion 11.

Either the image processing portion included in the electronic device 1000_1 or an arithmetic portion other than the image processing portion included in the electronic device 10001 may have a function of activating one of the camera 12_1 to the camera 12_5.

The electronic device 10001 captures an image of the user 1020_1 with the use of the activated camera (the camera 12_2 in FIG. 12A) and the camera 13. By the image capturing, two images are generated. The electronic device 1000_1 generates a clear image of the user 1020_1 by the method for making an image of a subject clear described in Embodiment 1. The clear image includes the user 1020_1 looking at the user (the user 1020_2) who speaks.

Either the image processing portion included in the electronic device 1000_1 or an arithmetic portion other than the image processing portion included in the electronic device 10001 may have a function of making an image generated using the activated camera clear. Note that in the case where the image processing portion includes the generator described in Embodiment 1, the above function can be rephrased as a function of making an image clear when the image generated using the activated camera is input to the generator.

The electronic device 1000_1 transmits the clear image to the electronic device (the electronic device 1000_2) used by the user 1020_2. The electronic device 1000_2 receives the clear image and displays it on the display portion 11 of the electronic device 1000_2. Note that the clear image corresponds to the image 1010_1 illustrated in FIG. 12B. When the user 1020_2 looks at the image 10101, the eye of the user 1020_2 meets that of the user 1020_1.

In this manner, the remote meeting can be held while the user who speaks and the user who pays attention to the speaking are making eye contact. Thus, the users can communicate smoothly during the remote meeting, which enhances the realistic sensation of the remote meeting.

Note that in the remote meeting, the users displayed on the electronic devices may be replaced with avatars. The avatars to be displayed on the electronic devices are preferably created by the method for creating an avatar described in Embodiment 1. The avatars reflect the facial expression of the subjects, the orientations of the subjects' faces, and the like; thus, the remote meeting with high realistic sensation can be held while the users are relaxing.

In the case where the image of the user who does not speak is displayed on the display portion of the electronic device used by another user who does not speak, the image may be an image captured by the camera 13 of the electronic device used by the user who does not speak. For example, in the case where the user 1020_1 and the user 1020_4 do not speak, the image 10104 displayed on the display portion 11 of the electronic device 10001 may be an image captured by the camera 13 of the electronic device 1000_4. That is, the image 10104 displayed on the display portion 11 of the electronic device 10001 may be an image captured from the oblique direction of the user 1020_4.

In a meeting held in a conference room, the users who do not speak rarely make eye contact, and the same applies to a remote meeting. Thus, even when images captured (using the cameras 13) from the oblique directions of the users who do not speak are displayed on the display portions of their electronic devices, it hardly interferes with a remote meeting. With this structure, the electronic device 1000_1 does not perform image processing, which can ease the burden of a CPU, an AI chip, and the like included in the electronic device 1000_1.

Although the example of the state where the remote meeting is held using the five electronic devices (the electronic device 1000_1 to the electronic device 1000_5) is described above, the number of electronic devices used in the remote meeting is not limited to five and may be two or more and four or less, or six or more.

At least part of this embodiment can be implemented in combination with the other embodiments described in this specification as appropriate.

Embodiment 3

Figure 13A:
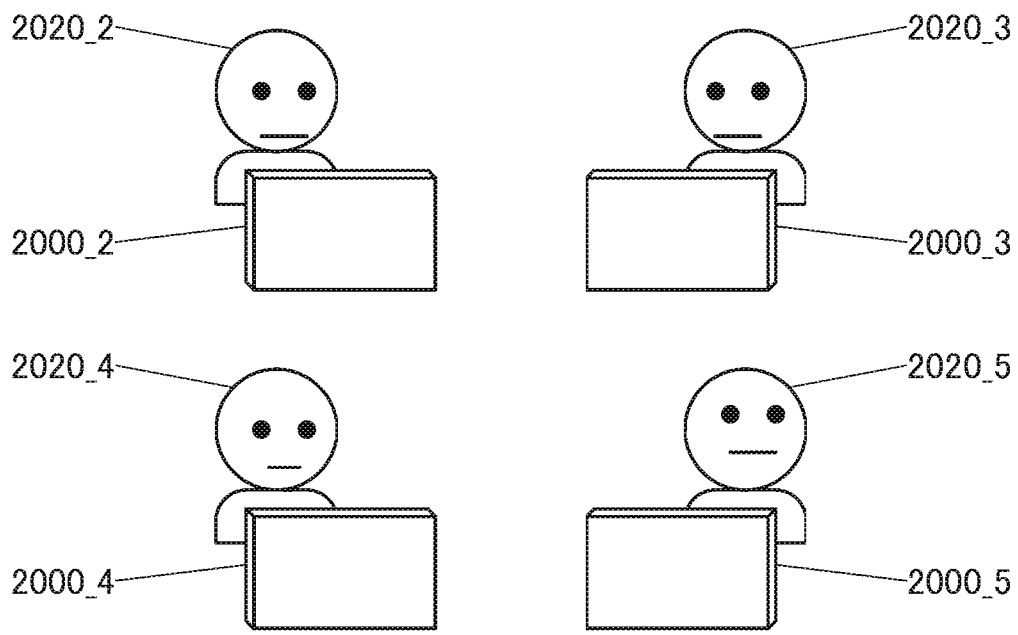
FIG. 13A and FIG. 13B are diagrams illustrating application examples of electronic devices.
Figure 13B:
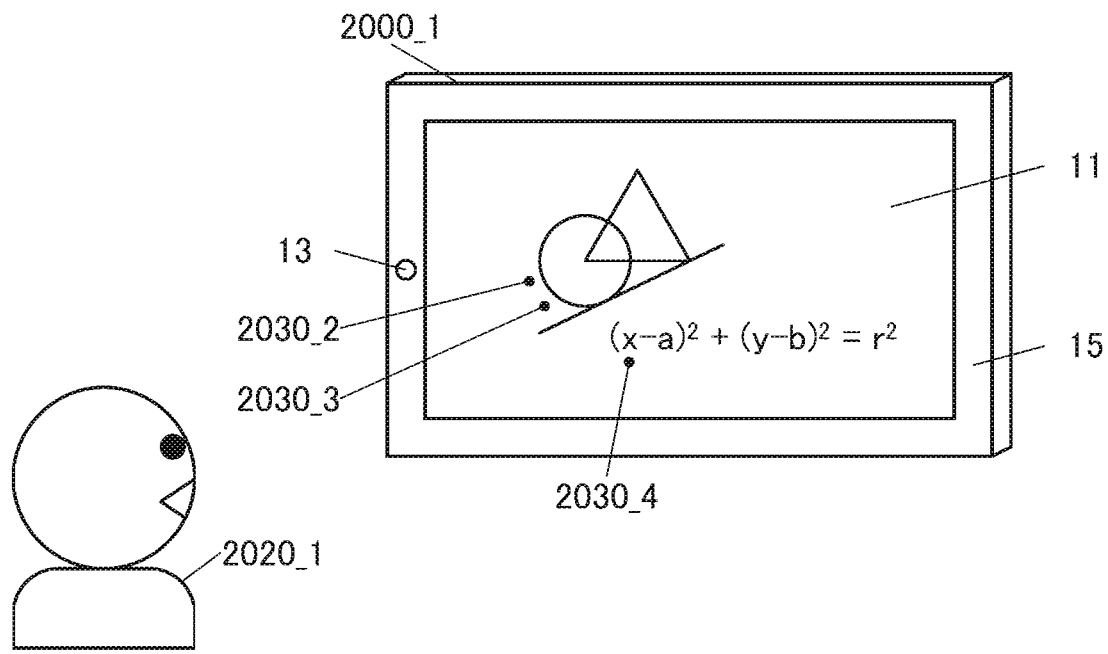

An example of the case of using an electronic device of one embodiment of the present invention will be described with reference to FIG. 13A and FIG. 13B. FIG. 13A and FIG. 13B illustrate an example of a remote meeting held using five electronic devices (an electronic device 2000_1 to an electronic device 2000_5). The electronic devices used in the remote meeting are each preferably any of the electronic devices described in the above embodiment.

Description is made assuming that the remote meeting is a remote lecture. One lecturer (a lecturer 2020_1) and four students (a student 2020_2 to a student 2020_5) participate in the remote lecture. Note that in the case where the remote lecture is a remote class (an online class) of a school, it is preferable that the lecturer be rephrased as a teacher or a host and the student be rephrased as a pupil, a client, or a guest.

The lecturer 2020_1 uses the electronic device 2000_1, and the student 2020_2 to the student 2020_5 respectively use the electronic device 2000_2 to the electronic device 2000_5.

FIG. 13A is a diagram illustrating usage examples of the electronic device 2000_2 to the electronic device 2000_5. FIG. 13A illustrates a state where each of the student 2020_2 to the student 2020_5 is listening to a remote lecture at a home, a cafe, a coworking space, or the like. A display portion of each of the electronic device 2000_2 to the electronic device 20005 displays an image including a state of a class that is captured by a camera included in the electronic device 2000_1 or an electronic device (a digital video camera or the like) different from the electronic device 2000_1, electronic data used as an educational material, or the like.

FIG. 13A illustrates a state where the student 2020_2 watches the display portion of the electronic device 2000_2. A state where the student 2020_3 watches the display portion of the electronic device 2000_3 is also illustrated. A state where the student 2020_4 watches the display portion of the electronic device 2000_4 is also illustrated. A state where the student 2020_5 does not watch the display portion of the electronic device 2000_5 is also illustrated.

The electronic device 2000_2 detects the gaze of the student 20202 by the method for tracking the gaze described in Embodiment 1. Moreover, the electronic device 2000_2 estimates the point of view of the student 2020_2 on the display portion of the electronic device 2000_2 on the basis of the detected gaze. Similarly, the electronic device 2000_3 estimates the point of view of the student 2020_3 on the display portion of the electronic device 20003, and the electronic device 2000_4 estimates the point of view of the student 2020_4 on the display portion of the electronic device 2000_4.

The electronic device 2000_5 detects the gaze of the student 2020_5. Note that since the student 2020_5 does not watch the display portion of the electronic device 20005, the electronic device 2000_5 estimates that the point of view of the student 2020_5 is not on the display portion of the electronic device 2000_5.

The electronic device 2000_2 to the electronic device 2000_5 transmit information on the estimated points of view of the student 2020_2 to the student 2020_5, respectively, to the electronic device 2000_1. Examples of the information include the coordinates of the display portions and the length of time during which the points of view are on the coordinates.

The points of view of the student 2020_2 to the student 2020_5 on the electronic device 2000_2 to the electronic device 2000_5 are preferably estimated in a period during which the remote lecture is being delivered.

FIG. 13B is a diagram illustrating a usage example of the electronic device 2000_1. FIG. 13B illustrates an example of display on the electronic device 2000_1. The display portion 11 of the electronic device 2000_1 displays an image including a state of a class that is captured by the camera included in the electronic device 2000_1 or an electronic device (a digital video camera or the like) different from the electronic device 2000_1, electronic data used as an educational material, or the like.

Furthermore, the display portion 11 of the electronic device 2000_1 displays the information on the points of view of the student 2020_2 to the student 2020_5 received from the electronic device 2000_2 to the electronic device 2000_5. For example, a point of view 2030_2 of the student 20202, a point of view 2030_3 of the student 20203, and a point of view 2030_4 of the student 2020_4 are output to the display portion 11 of the electronic device 2000_1 illustrated in FIG. 13B. Note that the point of view of the student 2020_5 is not positioned on the display portion and thus is not output to the display portion 11 of the electronic device 2000_1.

The lecturer 2020_1 looks at the display portion 11 of the electronic device 2000_1 while delivering a remote lecture in a conference room, an office, or the like (an ordinary classroom, a special purpose classroom, or the like in the case of a remote class of a school). The lecturer 2020_1 can easily know the portion that the student watches by recognizing the point of view of the student output to the display portion 11 of the electronic device 2000_1. Thus, the lecturer 2020_1 can know the reaction of the student even without asking a question to the student. In addition, the lecturer 2020_1 can recognize that the student 2020_5 looks away or dozes off, for example, and thus does not concentrate on the remote lecture. Hence, the lecturer 2020_1 can urge the student 2020_5 to regain the concentration on the remote class by talking to or asking a question to the student 20205, for example.

Although the example of the state where the remote lecture is held using the five electronic devices (the electronic device 2000_1 to the electronic device 2000_5) is described above, the number of electronic devices used in the remote lecture is not limited to five and may be two or more and four or less, or six or more.

At least part of this embodiment can be implemented in combination with the other embodiments described in this specification as appropriate.

Embodiment 4

In this embodiment, a display portion included in an electronic device of one embodiment of the present invention and a camera included in the display portion will be described with reference to FIG. 14 to FIG. 17.

Figure 14A:
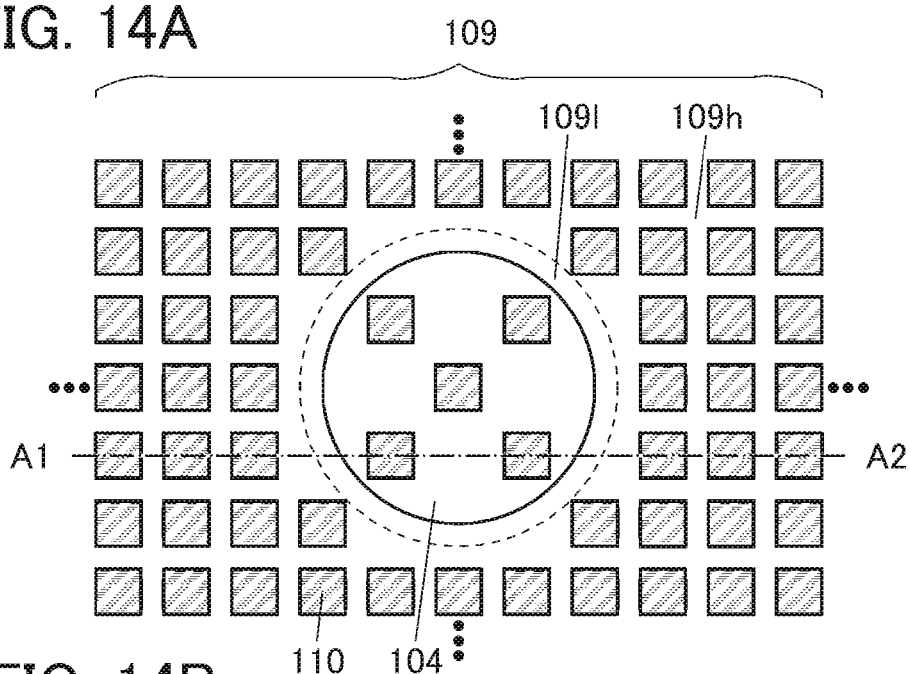
FIG. 14A is a top view of a display portion included in an electronic device.
Figure 14B:
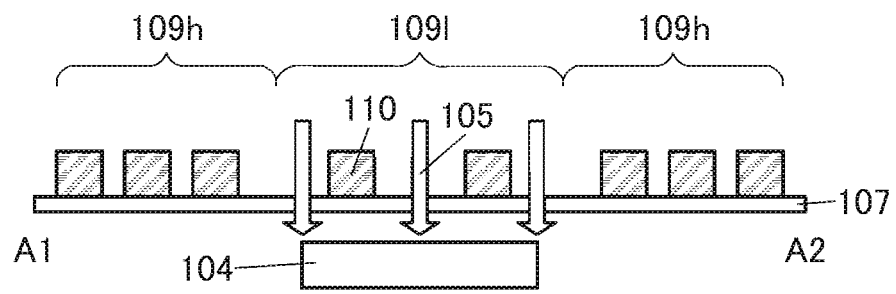
FIG. 14B is a cross-sectional view of the display portion included in the electronic device.

FIG. 14A is a top view of the display portion included in the electronic device of one embodiment of the present invention. FIG. 14B is a cross-sectional view taken along the dashed-dotted line A1-A2 in FIG. 14A.

As illustrated in FIG. 14A, a display portion 109 includes a display region 109$l$ and a display region 109$h$. The display region 109$l$ is a region inside a circle denoted by a dashed line in FIG. 14A, and the display region 109$h$ is a region outside the circle denoted by the dashed line in FIG. 14A. That is, the display region 109$h$ is positioned around the display region 109$l$. A camera 104 is provided in a region overlapping with the display region 109$l$. The display portion 109 corresponds to the display portion 11 described in Embodiment 1, and the camera 104 corresponds to the camera 12 described in Embodiment 1.

A plurality of pixels 110 are arranged in each of the display region 109$h$ and the display region 109$l$. In the display region 109$h$, the plurality of pixels 110 are arranged in a matrix. In the display region 109$l$, the plurality of pixels 110 are radially arranged from the center of the display region 109$l$. Note that the plurality of pixels 110 may be arranged in a matrix in the display region 109$l$.

Although FIG. 14A illustrates the case where the top surface shape of each of the pixels 110 is a square, one embodiment of the present invention is not limited thereto. Examples of the top surface shape of each of the pixels 110 include polygons such as a triangle, a quadrangle (including a rectangle and a square), and a pentagon; polygons with rounded corners; an ellipse; and a circle.

The number of pixels 110 per unit area in the display region 109$l$ is preferably smaller than the number of pixels 110 per unit area in the display region 109$h$. In other words, the pixel density in the display region 109$l$ is preferably lower than the pixel density in the display region 109$h$. The display portion 109 preferably includes the display region 109$h$ and the display region 109$l$ having a lower pixel density than the display region 109$h$.

As illustrated in FIG. 14B, the plurality of pixels 110 arranged in the display region 109$h$ and the plurality of pixels 110 arranged in the display region 109$l$ are provided over a substrate 107. The camera 104 is provided in a region that overlaps with the display region 109$l$ and is below the substrate 107. Providing the camera 104 to overlap with the display region 109$l$ can increase the amount of external light 105 detected by the camera 104.

Note that the area of the pixels 110 arranged in the display region 109$h$ and the area of the pixels 110 arranged in the display region 109$l$ may be different from each other. That is, the area of the pixels 110 arranged in the display region 109$l$ may be larger or smaller than the area of the pixels 110 arranged in the display region 109$h$. In that case, the proportion of the pixels 110 per unit area in the display region 109$l$ is preferably lower than the proportion of the pixels 110 per unit area in the display region 109$h$.

The camera 104 captures an image by detecting the external light 105 passing through the substrate 107. Thus, the substrate 107 needs to transmit visible light. Accordingly, the substrate 107 preferably has a visible-light-transmitting property.

For the substrate 107, an insulator such as glass, quartz, ceramic, sapphire, or stabilized zirconia (e.g., yttria-stabilized zirconia), a resin such as an insulating resin or a conductive resin, a semiconductor such as silicon, germanium, silicon carbide, silicon germanium, gallium arsenide, indium phosphide, or zinc oxide, a metal, an alloy, or the like can be used. When the substrate 107 is formed using a flexible material, the electronic device can have increased flexibility, and moreover, the electronic device can be reduced in weight and thickness. Furthermore, a polarizing plate may be used as the substrate 107.

For the substrate 107, any of the following may be used: polyester resins such as polyethylene terephthalate (PET) and polyethylene naphthalate (PEN), a polyacrylonitrile resin, an acrylic resin, a polyimide resin, a polymethyl methacrylate resin, a polycarbonate (PC) resin, a polyethersulfone (PES) resin, polyamide resins (e.g., nylon and aramid), a polysiloxane resin, a cycloolefin resin, a polystyrene resin, a polyamide-imide resin, a polyurethane resin, a polyvinyl chloride resin, a polyvinylidene chloride resin, a polypropylene resin, a polytetrafluoroethylene (PTFE) resin, an ABS resin, cellulose nanofiber, and the like. Glass that is thin enough to have flexibility may be used for the substrate 107.

An optical system such as a lens, a reflective plate, or a half mirror may be provided between the substrate 107 and the camera 104. When a lens is provided between the substrate 107 and the camera 104, light can be collected. When a reflective plate is provided between the substrate 107 and the camera 104, the path of light can be changed. For example, a reflective plate can guide light passing through the substrate 107 overlapping with the display region 109*l* to the camera 104 positioned in the region overlapping with the display region 109*h*. Thus, the layout flexibility of the camera 104 can be increased.

The pixels 110 each preferably include a light-emitting device. Examples of the light-emitting device include an organic EL (Electro Luminescence) device and a light-emitting diode (LED).

The basic structure of an organic EL device is, for example, a structure in which a layer containing a light-emitting organic compound is provided between a pair of electrodes. By voltage application to this device, light emission can be obtained from the light-emitting organic compound. A display apparatus using such an organic EL device does not need a backlight that is necessary for a liquid crystal display apparatus; thus, a thin, lightweight, high-contrast, and low-power display apparatus can be achieved. The pixels 110 each including an organic EL device will be described in an embodiment below.

In the case where a light-emitting diode, which is a self-luminous device, is used as a display device, a backlight is unnecessary and a polarizing plate does not have to be provided in a display apparatus. Thus, the display apparatus can have lower power consumption and can be thin and lightweight. Such a display apparatus using alight-emitting diode can have high display quality because of its high luminance (e.g., higher than or equal to 5000 cd/m$^2$, preferably higher than or equal to 10000 cd/m$^2$), high contrast, and wide viewing angle. Furthermore, with the use of an inorganic material as a light-emitting material, the lifetime of the display apparatus can be extended and the reliability can be increased.

As the light-emitting device, an LED having a double heterojunction, an LED having a quantum well junction, a nanocolumn LED, or the like may be used.

The area of a light-emitting region of the light-emitting diode is preferably less than or equal to 1 mm$^2$, further preferably less than or equal to 10000 µm$^2$, still further preferably less than or equal to 3000 µm$^2$, yet still further preferably less than or equal to 700 µm$^2$. The area of the region is preferably greater than or equal to 1 µm$^2$, further preferably greater than or equal to 10 µm$^2$, still further preferably greater than or equal to 100 µm$^2$. Note that in this specification and the like, a light-emitting diode in which the area of a light-emitting region is less than or equal to 10000 µm$^2$ may be referred to as a micro LED or a micro light-emitting diode.

The camera 104 has a function of capturing an image corresponding to incident light. As the camera 104, for example, a CCD (Charge Coupled Device) sensor, a CMOS (Complementary Metal Oxide Semiconductor) sensor, or the like may be used.

Figure 15A:
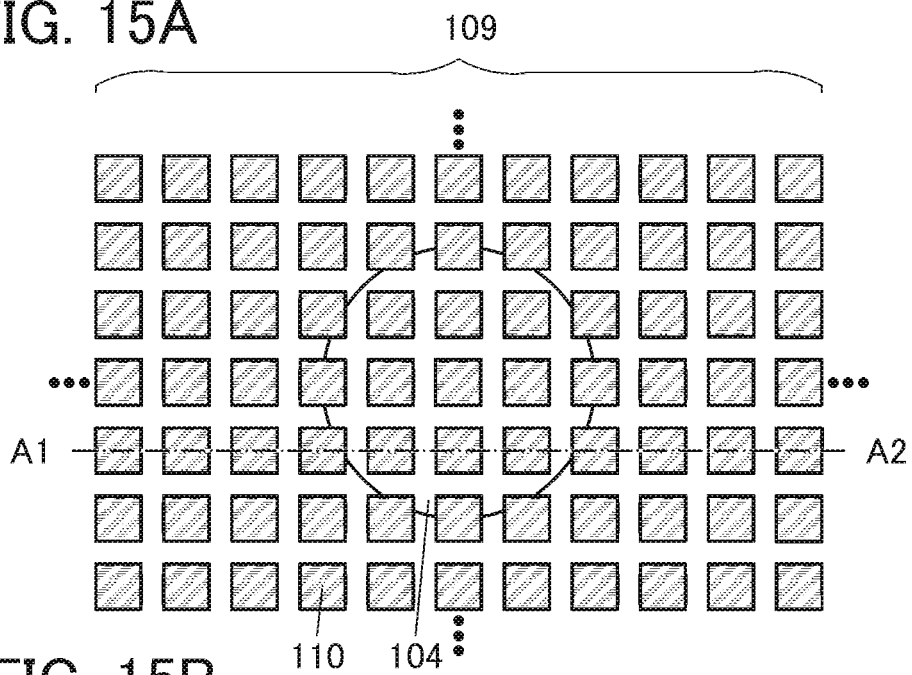
FIG. 15A is a top view of a display portion included in an electronic device.
Figure 15B:
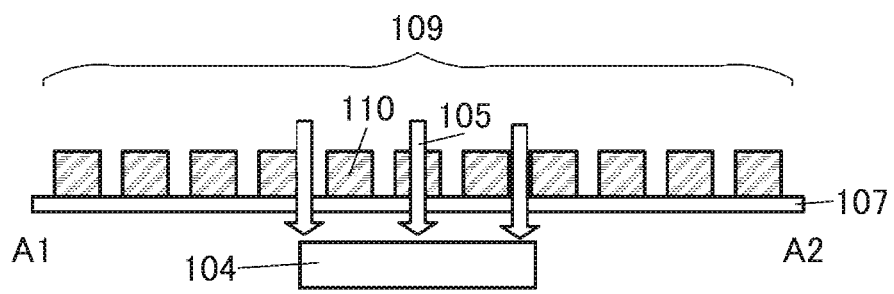
FIG. 15B is a cross-sectional view of the display portion included in the electronic device.

FIG. 15A is a top view of the display portion included in the electronic device of one embodiment of the present invention. FIG. 15B is a cross-sectional view taken along the dashed-dotted line A1-A2 in FIG. 15A.

The display portion 109 illustrated in FIG. 15A and FIG. 15B is different from the display portion 109 illustrated in FIG. 14A and FIG. 14B in that the plurality of pixels 110 are uniformly arranged.

The substrate 107 and the plurality of pixels 110 preferably have a visible-light-transmitting property. The substrate 107 and the plurality of pixels 110 that have a visible-light-transmitting property can increase the amount of external light 105 detected by the camera 104.

In the case where the light-emitting device included in each of the pixels 110 is a light-emitting device including an EL layer between a pair of electrodes, a material having a high visible-light-transmitting property is preferably used for the pair of electrodes. Note that in the case where a transistor for driving the pixels is provided above the camera 104, it is preferable to use a transistor having a light-transmitting property, such as an organic transistor formed using an organic semiconductor material or a transistor using an oxide semiconductor.

With this structure, the resolution or definition of the display portion can be increased while the amount of external light 105 detected by the camera 104 is being increased.

Figure 16A:
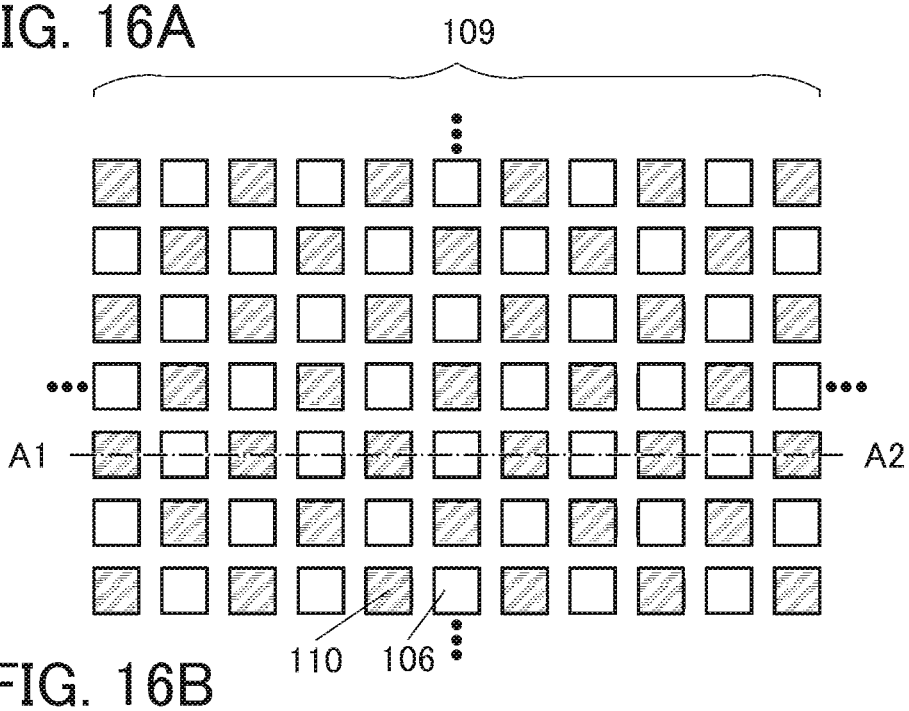
FIG. 16A is a top view of a display portion included in an electronic device.
Figure 16B:
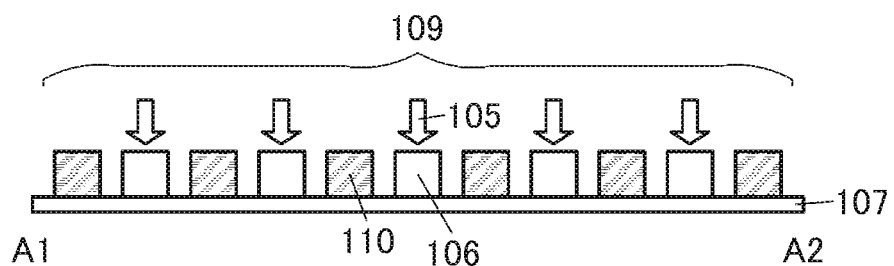
FIG. 16B is a cross-sectional view of the display portion included in the electronic device.

FIG. 16A is a top view of the display portion included in the electronic device of one embodiment of the present invention. FIG. 16B is a cross-sectional view taken along the dashed-dotted line A1-A2 in FIG. 16A.

In the display portion 109 illustrated in FIG. 16A, the plurality of pixels 110 and a plurality of imaging pixels 106 are uniformly arranged.

The plurality of imaging pixels 106 function as an image capturing portion. That is, imaging data is obtained using the plurality of imaging pixels 106. The imaging pixels 106 each include, for example, a photoelectric conversion device (also referred to as a photoelectric conversion element or an imaging element) and four transistors (an amplifier transistor, a reset transistor, a transfer transistor, and a selection transistor). Note that the imaging pixels 106 may each include a capacitor. The imaging pixels 106 do not necessarily include selection transistors in some cases. The imaging pixels 106 may each include a plurality of photoelectric conversion devices and four transistors. A reset transistor, an amplifier transistor, and a selection transistor may be shared by the plurality of imaging pixels 106.

As illustrated in FIG. 16B, the plurality of pixels 110 and the plurality of imaging pixels 106 are provided over the substrate 107. That is, the image capturing portion and the pixels included in the display portion are positioned over the same layer.

Figure 17A:
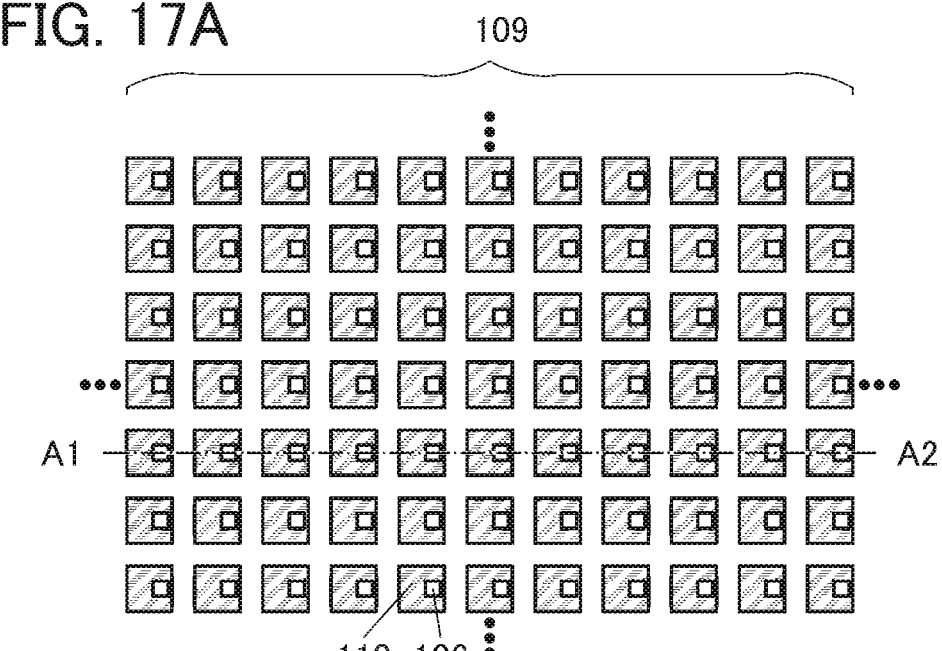
FIG. 17A is a top view of a display portion included in an electronic device.
Figure 17B:
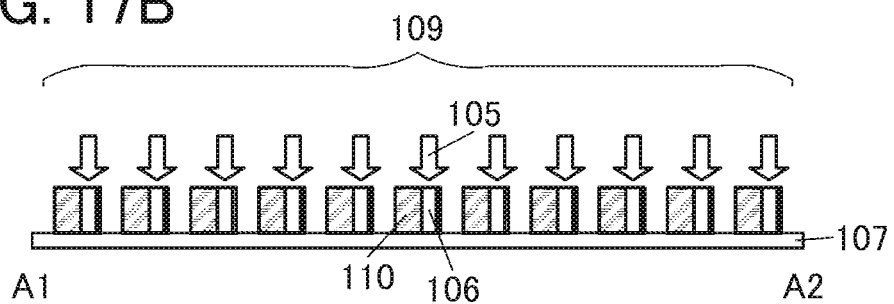
FIG. 17B is a cross-sectional view of the display portion included in the electronic device.

FIG. 17A is a top view of the display portion included in the electronic device of one embodiment of the present invention. FIG. 17B is a cross-sectional view taken along the dashed-dotted line A1-A2 in FIG. 17A.

In the display portion 109 illustrated in FIG. 17A and FIG. 17B, the plurality of pixels 110 are uniformly arranged. The imaging pixel 106 is provided in each of the plurality of pixels 110. With this structure, the resolution or definition of the display portion can be increased.

At least part of this embodiment can be implemented in combination with the other embodiments described in this specification as appropriate.

Embodiment 5

In this embodiment, a display panel of one embodiment of the present invention will be described with reference to FIG. 18 to FIG. 23.

One embodiment of the present invention is a display panel that includes a display portion capable of full-color display. The display portion includes a first subpixel and a second subpixel that emit light of different colors. The first subpixel includes a first light-emitting device that emits blue light and the second subpixel includes a second light-emitting device that emits light of a color different from the color of light emitted from the first light-emitting device. At least one material is different between the first light-emitting device and the second light-emitting device; for example, a light-emitting material in the first light-emitting device is different from a light-emitting material in the second light-emitting device. That is, light-emitting devices for different emission colors are separately formed in the display panel of one embodiment of the present invention.

A structure in which light-emitting layers in light-emitting devices of different colors (e.g., blue (B), green (G), and red (R)) are separately formed or separately patterned is sometimes referred to as an SBS (Side By Side) structure. The SBS structure allows optimization of materials and structures of light-emitting devices and thus can extend freedom of choice of the materials and the structures, which makes it easy to improve the luminance and the reliability.

In the display panel of one embodiment of the present invention, in an emission spectrum of blue display provided by a display portion at a first luminance, the intensity of a first emission peak at a wavelength longer than or equal to 400 nm and shorter than 500 nm is assumed to be 1; in this case, the intensity of a second emission peak at a wavelength longer than or equal to 500 nm and shorter than or equal to 700 nm in the emission spectrum is higher than or equal to 0 and lower than or equal to 0.5, and the first luminance is any value higher than 0 cd/m$^2$ and lower than 1 cd/m$^2$. That is, when blue display is provided by the display panel of one embodiment of the present invention at a low luminance, blue light is mainly observed while light having a longer wavelength than blue light is less observed (including the case where substantially no light having a longer wavelength than blue light is observed).

In a light-emitting device having a single structure (a structure including only one light-emitting unit) with a plurality of light-emitting layers emitting light of different colors, the carrier balance cannot be easily adjusted and the emission color at a low luminance might be different from that at a high luminance. For example, in a white-light-emitting device having a single structure, the emission color at a low luminance might be different from that at a high luminance. By contrast, in a light-emitting device having the SBS structure that emits light of red, green, blue, or the like, the carrier balance can be more easily adjusted and the emission color at a low luminance is less different from that at a high luminance than in a white-light-emitting device having a single structure. Consequently, the display panel of one embodiment of the present invention exhibits a small difference in color between low-luminance display and high-luminance display and can achieve high display quality.

In the case of fabricating a display panel that includes a plurality of light-emitting devices emitting light of different colors, the light-emitting layers emitting light of different colors each need to be formed into an island shape.

For example, an island-shaped light-emitting layer can be formed by a vacuum evaporation method using a metal mask (also referred to as a shadow mask). However, this method causes a deviation from the designed shape and position of an island-shaped light-emitting layer due to various influences such as the low accuracy of the metal mask, the positional deviation between the metal mask and a substrate, a warp of the metal mask, and the vapor-scattering-induced expansion of the outline of the formed film; accordingly, it is difficult to achieve high resolution and a high aperture ratio. In addition, the outline of the layer may blur during vapor deposition, whereby the thickness of an end portion may be reduced. That is, the thickness of the island-shaped light-emitting layer may vary from area to area. In the case of fabricating a display panel with a large size, high definition, or high resolution, the manufacturing yield might be reduced because of low dimensional accuracy of the metal mask and deformation due to heat or the like.

In a method for fabricating a display panel of one embodiment of the present invention, a first layer (which can be referred to as an EL layer or part of an EL layer) including a light-emitting layer emitting light of a first color is formed over the entire surface, and then a first sacrificial layer (which may be referred to as a mask layer) is formed over the first layer. Then, a first resist mask is formed over the first sacrificial layer and the first layer and the first sacrificial layer are processed using the first resist mask, so that the first layer is formed into an island shape. Next, in a manner similar to that for the first layer, a second layer (which can be referred to as an EL layer or part of an EL layer) including a light-emitting layer emitting light of a second color is formed into an island shape using a second sacrificial layer and a second resist mask.

In the case of processing the light-emitting layer into an island shape, a structure is possible in which the processing is performed directly on the light-emitting layer by a photolithography method. In that case, damage to the light-emitting layer (e.g., processing damage) might significantly degrade the reliability. In view of the above, in the fabrication of the display panel of one embodiment of the present invention, a sacrificial layer or the like is preferably formed over a layer above the light-emitting layer (e.g., a carrier-transport layer or a carrier-injection layer, specifically, an electron-transport layer or an electron-injection layer), followed by the processing of the light-emitting layer into an island shape. Such a method provides a highly reliable display panel.

As described above, the island-shaped EL layers fabricated in the method for fabricating a display panel of one embodiment of the present invention are formed not by using a metal mask having a fine pattern but by processing an EL layer formed over the entire surface. Accordingly, a high-resolution display panel or a display panel with a high aperture ratio, which has been difficult to achieve, can be obtained. Moreover, EL layers can be formed separately for the respective colors, enabling the display panel to perform extremely clear display with high contrast and high display quality. In addition, the sacrificial layers provided over the EL layers can reduce damage to the EL layers during the fabrication process of the display panel, increasing the reliability of light-emitting devices.

It is difficult to set the distance between adjacent light-emitting devices to less than 10 µm with a formation method using a metal mask, for example; however, with the above method, the distance can be reduced to less than 10 µm, less than or equal to 5 µm, less than or equal to 3 µm, less than or equal to 2 µm, or less than or equal to 1 µm. Furthermore, for example, with the use of a light exposure apparatus for LSI, the distance between adjacent light-emitting devices can be reduced to less than or equal to 500 nm, less than or equal to 200 nm, less than or equal to 100 nm, or even less than or equal to 50 nm. Accordingly, the area of a non-light-emitting region that may exist between two light-emitting devices can be significantly reduced, and the aperture ratio can be close to 100%. For example, the aperture ratio higher than or equal to 50%, higher than or equal to 60%, higher than or equal to 70%, higher than or equal to 80%, or higher than or equal to 90% and lower than 100% can be achieved.

Furthermore, a pattern of the EL layer itself (also referred to as a processing size) can be made much smaller than that in the case of using a metal mask. For example, in the case of using a metal mask for forming EL layers separately, a variation in the thickness occurs between the center and the edge of the light-emitting layer, which causes a reduction in an effective area that can be used as a light-emitting region with respect to the area of the light-emitting layer. By contrast, in the above fabrication method, a film formed to have a uniform thickness is processed, so that island-shaped EL layers can be formed to have a uniform thickness. Accordingly, even in a fine pattern, almost the whole area can be used as a light-emitting region. Consequently, a display panel having both high resolution and a high aperture ratio can be fabricated.

In addition, in the method for fabricating a display panel of one embodiment of the present invention, it is preferable that a layer (which can be referred to as an EL layer or part of an EL layer) including a light-emitting layer be formed over the entire surface, and then a sacrificial layer be formed over the EL layer. Next, it is preferable that a resist mask be formed over the sacrificial layer, the EL layer and the sacrificial layer be processed using the resist mask, and an island-shaped EL layer be thereby formed.

Provision of a sacrificial layer over an EL layer can reduce damage to the EL layer during a fabrication process of the display panel and increase the reliability of the light-emitting device.

Here, each of the first layer and the second layer includes at least a light-emitting layer and is preferably composed of a plurality of layers. Specifically, each of the first layer and the second layer preferably includes one or more layers over the light-emitting layer. A layer between the light-emitting layer and the sacrificial layer can inhibit the light-emitting layer from being exposed on the outermost surface during the fabrication process of the display panel and can reduce damage to the light-emitting layer. Thus, the reliability of the light-emitting device can be increased. Accordingly, each of the first layer and the second layer preferably includes the light-emitting layer and a carrier-transport layer (an electron-transport layer or a hole-transport layer) over the light-emitting layer.

Note that it is not necessary to form all layers included in the EL layers separately for the respective light-emitting devices emitting light of different colors, and some layers of the EL layers can be formed in the same step. Examples of the layers included in the EL layer include a light-emitting layer, carrier-injection layers (a hole-injection layer and an electron-injection layer), carrier-transport layers (a hole-transport layer and an electron-transport layer), and carrier-blocking layers (a hole-blocking layer and an electron-blocking layer). In the method for fabricating a display panel of one embodiment of the present invention, after some layers included in the EL layer are formed into an island shape separately for each color, the sacrificial layer is removed at least partly; then, the other layers included in the EL layers and a common electrode (also referred to as an upper electrode) are formed (as a single film) to be shared by the light-emitting devices of different colors. For example, a carrier-injection layer and a common electrode can be formed to be shared by the light-emitting devices of different colors.

In this specification and the like, a hole or an electron is sometimes referred to as a "carrier". Specifically, a hole-injection layer or an electron-injection layer may be referred to as a "carrier-injection layer", a hole-transport layer or an electron-transport layer may be referred to as a "carrier-transport layer", and a hole-blocking layer or an electron-blocking layer may be referred to as a "carrier-blocking layer". Note that the above-described carrier-injection layer, carrier-transport layer, and carrier-blocking layer cannot be distinguished from one another on the basis of the cross-sectional shape, properties, or the like in some cases. Furthermore, one layer may have two or three functions of the carrier-injection layer, the carrier-transport layer, and the carrier-blocking layer in some cases.

Meanwhile, the carrier-injection layer often has relatively high conductivity in the EL layer. Therefore, when the carrier-injection layer is in contact with the side surface of any layer of the EL layer formed into an island shape or the side surface of the pixel electrode, the light-emitting device might be short-circuited. Note that also in the case where the carrier-injection layer is provided in an island shape and the common electrode is formed to be shared by the light-emitting devices of different colors, the light-emitting device might be short-circuited when the common electrode is in contact with the side surface of the EL layer or the side surface of the pixel electrode.

In view of the above, the display panel of one embodiment of the present invention includes an insulating layer covering at least the side surface of an island-shaped light-emitting layer. Note that the side surface of the island-shaped light-emitting layer here refers to the plane that is not parallel to the substrate (or the surface where the light-emitting layer is formed) among the interfaces between the island-shaped light-emitting layer and other layers. The side surface is not necessarily one of a flat plane and a curved plane in an exactly mathematical perspective.

This can inhibit at least some layers of the island-shaped EL layers and the pixel electrodes from being in contact with the carrier-injection layer or the common electrode. Hence, a short circuit of the light-emitting device is inhibited, and the reliability of the light-emitting device can be increased.

The insulating layer preferably has a function of a barrier insulating layer against at least one of water and oxygen. Alternatively, the insulating layer preferably has a function of inhibiting diffusion of at least one of water and oxygen. Alternatively, the insulating layer preferably has a function of capturing or fixing (also referred to as gettering) at least one of water and oxygen.

Note that in this specification and the like, a barrier insulating layer refers to an insulating layer having a barrier property. A barrier property in this specification and the like refers to a function of inhibiting diffusion of a particular substance (also referred to as having low permeability).

Alternatively, a barrier property refers to a function of capturing or fixing (also referred to as gettering) a particular substance.

With the use of an insulating layer having a function of the barrier insulating layer or a gettering function, entry of impurities (typically, at least one of water and oxygen) that might diffuse into the light-emitting devices from the outside can be inhibited. With this structure, a highly reliable light-emitting device and a highly reliable display panel can be provided.

The display panel of one embodiment of the present invention includes a pixel electrode functioning as an anode; an island-shaped hole-injection layer, an island-shaped hole-transport layer, an island-shaped light-emitting layer, and an island-shaped electron-transport layer that are provided in this order over the pixel electrode; an insulating layer provided to cover the side surfaces of the hole-injection layer, the hole-transport layer, the light-emitting layer, and the electron-transport layer; an electron-injection layer provided over the electron-transport layer; and a common electrode that is provided over the electron-injection layer and functions as a cathode.

Alternatively, the display panel of one embodiment of the present invention includes a pixel electrode functioning as a cathode; an island-shaped electron-injection layer, an island-shaped electron-transport layer, an island-shaped light-emitting layer, and an island-shaped hole-transport layer that are provided in this order over the pixel electrode; an insulating layer provided to cover the side surfaces of the electron-injection layer, the electron-transport layer, the light-emitting layer, and the hole-transport layer; a hole-injection layer provided over the hole-transport layer; and a common electrode that is provided over the hole-injection layer and functions as an anode.

The hole-injection layer, the electron-injection layer, or the like often has relatively high conductivity in the EL layer. Since the side surfaces of these layers are covered with the insulating layer in the display panel of one embodiment of the present invention, these layers can be inhibited from being in contact with the common electrode or the like. Consequently, a short circuit of the light-emitting device can be inhibited, and the reliability of the light-emitting device can be increased.

The insulating layer covering the side surface of the island-shaped EL layer may have a single-layer structure or a stacked-layer structure.

When an insulating layer is formed to have a single-layer structure using an inorganic material, for example, the insulating layer can be used as a protective insulating layer for the EL layer. This can increase the reliability of the display panel.

In the case where an insulating layer having a stacked-layer structure is used, a first layer of the insulating layer is preferably formed using an inorganic insulating material because it is formed in contact with the EL layer. In particular, the first layer is preferably formed by an atomic layer deposition (ALD) method, which causes less film formation damage. Alternatively, an inorganic insulating layer is preferably formed by any of a sputtering method, a chemical vapor deposition (CVD) method, and a plasma-enhanced chemical vapor deposition (PECVD) method, which have higher film formation speed than an ALD method. In that case, a highly reliable display panel can be fabricated with high productivity. A second layer of the insulating layer is preferably formed using an organic material to fill a depressed portion formed by the first layer of the insulating layer.

For example, an aluminum oxide film formed by an ALD method can be used as the first layer of the insulating layer, and an organic resin film can be used as the second layer of the insulating layer.

In the case where the side surface of the EL layer and the organic resin film are in direct contact with each other, the EL layer might be damaged by an organic solvent or the like that might be contained in the organic resin film. The use of an inorganic insulating film such as an aluminum oxide film formed by an ALD method as the first layer of the insulating layer enables a structure in which the organic resin film and the side surface of the EL layer are not in direct contact with each other. Thus, the EL layer can be inhibited from being dissolved by the organic solvent, for example.

In the display panel of one embodiment of the present invention, an insulating layer covering an end portion of the pixel electrode does not need to be provided between the pixel electrode and the EL layer, so that the distance between adjacent light-emitting devices can be extremely short. As a result, higher resolution or higher definition of the display panel can be achieved. In addition, a mask for forming the insulating layer is not needed, reducing the manufacturing cost of the display panel.

Furthermore, light emitted from the EL layer can be extracted efficiently with a structure in which an insulating layer covering the end portion of the pixel electrode is not provided between the pixel electrode and the EL layer, i.e., a structure in which an insulating layer is not provided between the pixel electrode and the EL layer. Therefore, the display panel of one embodiment of the present invention can significantly reduce the viewing angle dependence. A reduction in the viewing angle dependence leads to an increase in visibility of an image on the display panel. For example, in the display panel of one embodiment of the present invention, the viewing angle (the maximum angle with a certain contrast ratio maintained when the screen is seen from an oblique direction) can be greater than or equal to 100° and less than 180°, preferably greater than or equal to 150° and less than or equal to 170°. Note that the viewing angle refers to that in both the vertical direction and the horizontal direction.

To prevent crosstalk, one embodiment of the present invention is not limited to the structure in which the island-shaped EL layers are formed for the respective light-emitting devices. For example, crosstalk can be prevented also by the structure in which a region where the EL layer is thinner is formed between adjacent light-emitting devices. The existence of the region where the EL layer is thinner between adjacent light-emitting devices prevents current flow through the outside of a region of the EL layer that is in contact with the pixel electrode. The region of the EL layer that is in contact with the pixel electrode can be used mainly as a light-emitting region.

For example, the ratio of a thickness T1 of the pixel electrode to a thickness T2 of the EL layer, i.e., T1/T2, is preferably higher than or equal to 0.5, further preferably higher than or equal to 0.8, still further preferably higher than or equal to 1.0, yet still further preferably higher than or equal to 1.5. In the region between adjacent light-emitting devices, the thickness T1 of the pixel electrode may be smaller in some cases when a depressed portion is formed in the insulating layer having the surface where the pixel electrode is formed (refer to an insulating layer 255c described later (FIG. 18B or the like)). Specifically, the ratio of T3, which is the sum of the thickness of the pixel electrode and the depth of the depressed portion, to the thickness T2 of the EL layer, i.e., T3/T2, is preferably higher than or equal to 0.5, further preferably higher than or equal to 0.8, still further preferably higher than or equal to 1.0, yet still further preferably higher than or equal to 1.5. When T1 and T2, or T2 and T3 have the above relationship, the region where the EL layer is thinner can be formed easily between adjacent light-emitting devices. The EL layer may have a region where the EL layer is extremely thinner, so that part of the EL layer may be separated.

Each of the thickness T1 of the pixel electrode and the sum T3 is, for example, preferably greater than or equal to 160 nm, greater than or equal to 200 nm, or greater than or equal to 250 nm and less than or equal to 1000 nm, less than or equal to 750 nm, less than or equal to 500 nm, less than or equal to 400 nm, or less than or equal to 300 nm.

The angle (also referred to as a taper angle) between the side surface of the pixel electrode and the substrate surface (or the formation surface) is preferably greater than or equal to 600 and less than or equal to 140°, further preferably greater than or equal to 70° and less than or equal to 140°, still further preferably greater than or equal to 80° and less than or equal to 140°. When the taper angle of the pixel electrode has the above value, the region where the EL layer is thinner can be formed easily between adjacent light-emitting devices.

Structure Example 1 of Display Panel

FIG. 18 and FIG. 19 illustrate a display panel of one embodiment of the present invention.

Figure 18A:
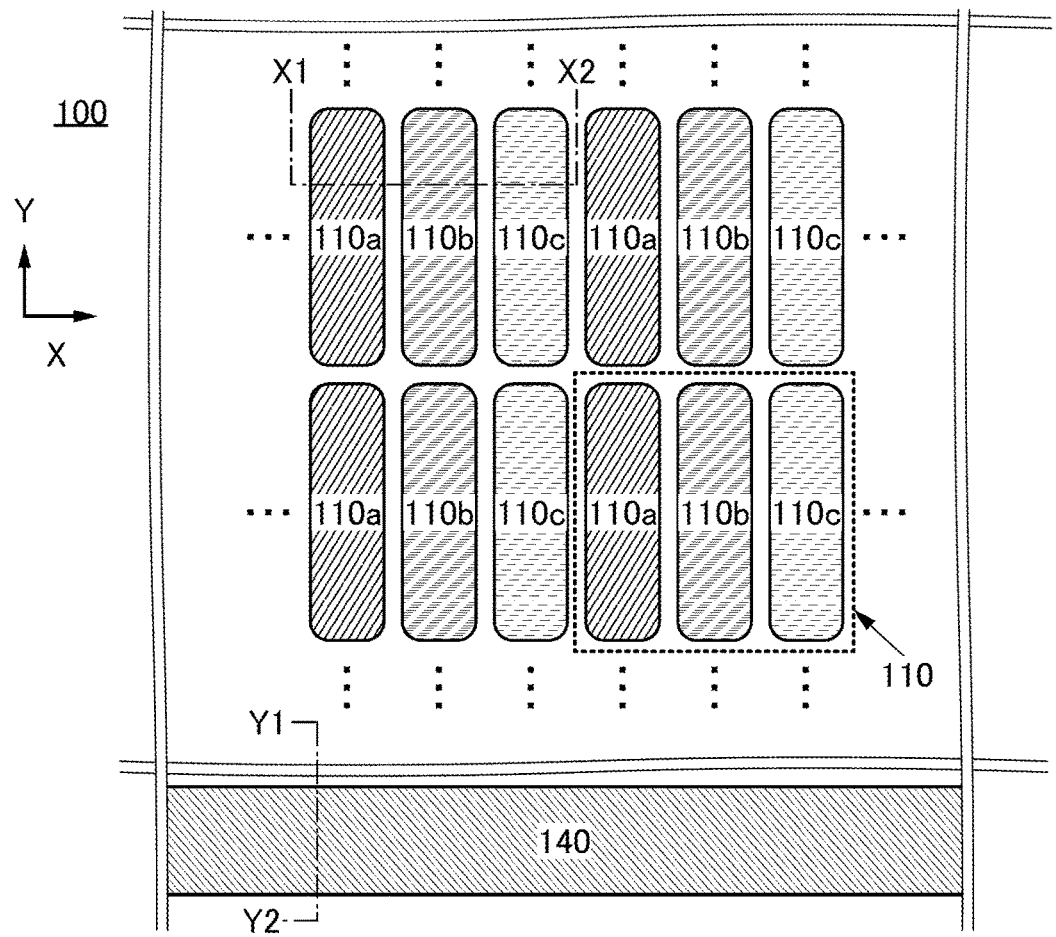
FIG. 18A is a top view illustrating an example of a display panel.

FIG. 18A is a top view of a display panel 100. The display panel 100 includes a display portion in which the plurality of pixels 110 are arranged, and a connection portion 140 outside the display portion. A plurality of subpixels are arranged in a matrix in the display portion. FIG. 18A illustrates subpixels arranged in two rows and six columns, which form pixels in two rows and two columns. The connection portion 140 can also be referred to as a cathode contact portion.

The display portion corresponds to the display portion 11 described in Embodiment 1. The pixels 110 correspond to the pixels 17 described in Embodiment 1. The pixels 110 correspond to the pixels 110 described in Embodiment 4.

The pixels 110 illustrated in FIG. 18A employ stripe arrangement. Each of the pixels 110 illustrated in FIG. 18A is composed of three subpixels 110a, 110b, and 110c. The subpixels 110a, 110b, and 110c include light-emitting devices that emit light of different colors. The subpixels 110a, 110b, and 110c can be subpixels of three colors of red (R), green (G), and blue (B) or subpixels of three colors of yellow (Y), cyan (C), and magenta (M), for example. The number of types of subpixels is not limited to three, and four or more types of subpixels may be used. As examples of the four subpixels, subpixels of four colors of R, G, B, and white (W), subpixels of four colors of R, G, B, and Y, or four subpixels of R, G, B, and infrared light (IR) can be given.

In this specification and the like, the row direction and the column direction are sometimes referred to as the X direction and the Y direction, respectively. The X direction and the Y direction intersect with each other and are, for example, orthogonal to each other (see FIG. 18A).

FIG. 18A illustrates an example in which subpixels of different colors are arranged in the X direction and subpixels of the same color are arranged in the Y direction.

Although FIG. 18A illustrates an example in which the connection portion 140 is positioned on the lower side of the display portion in the top view, one embodiment of the present invention is not particularly limited. The connection portion 140 only needs to be provided on at least one of the upper side, the right side, the left side, and the lower side of the display portion in the top view, and may be provided to surround the four sides of the display portion. The top surface shape of the connection portion 140 can be a belt-like shape, an L shape, a U shape, a frame-like shape, or the like. Moreover, one connection portion 140 or a plurality of the connection portions 140 may be provided.

Figure 18B:
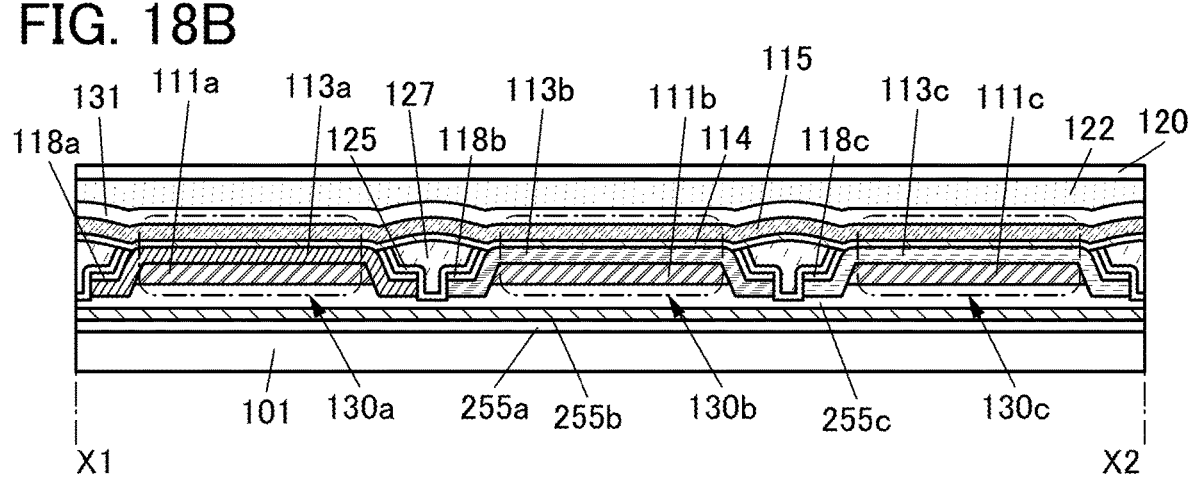
FIG. 18B is a cross-sectional view illustrating the example of the display panel.
Figure 19A:
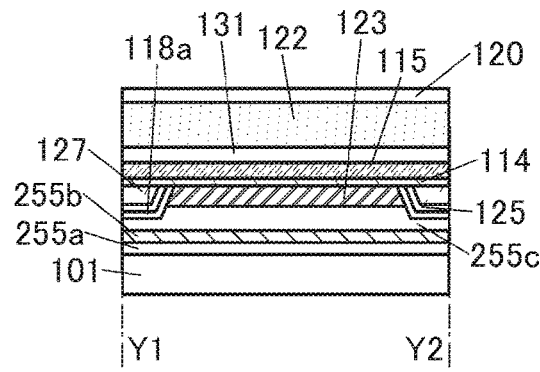
FIG. 19A to FIG. 19C are cross-sectional views illustrating examples of a display panel.
Figure 19B:
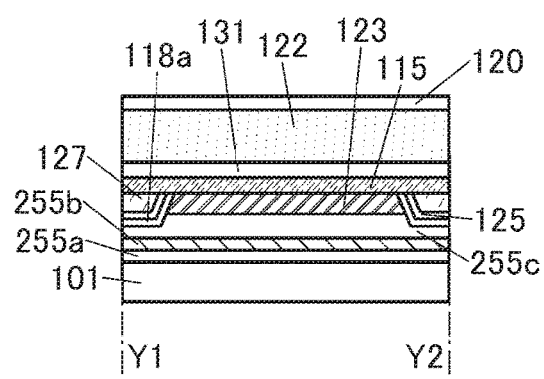
Figure 19C:
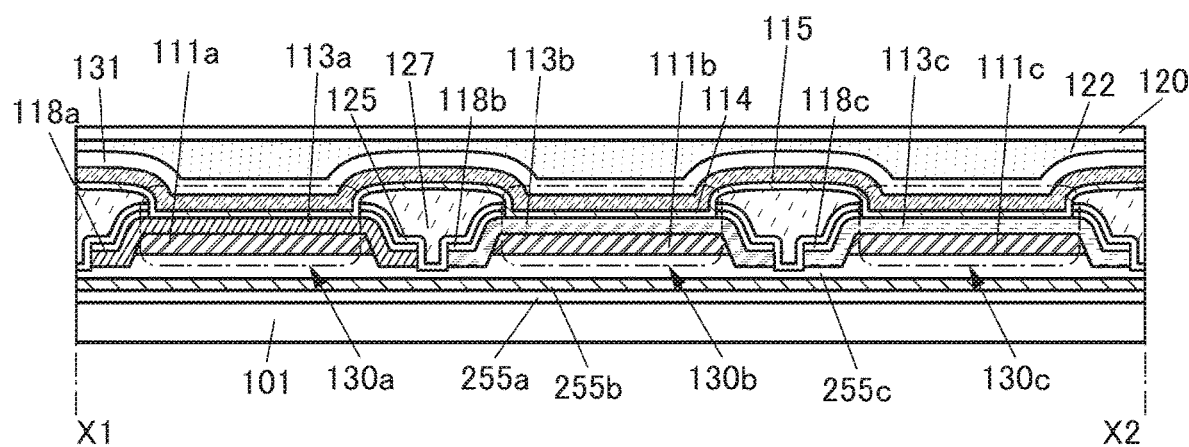

FIG. 18B and FIG. 19C are each a cross-sectional view taken along the dashed-dotted line X1-X2 in FIG. 18A. FIG. 19A and FIG. 19B are each a cross-sectional view taken along the dashed-dotted line Y1-Y2 in FIG. 18A.

FIG. 20A, FIG. 20B, FIG. 21A to FIG. 21C, and FIG. 22A to FIG. 22C each illustrate a cross section along the dashed-dotted line X1-X2 and a cross section along the dashed-dotted line Y1-Y2 in FIG. 18A side by side.

As illustrated in FIG. 18B, the display panel 100 includes insulating layers over a layer 101, light-emitting devices 130a, 130b, and 130c over the insulating layers, and a protective layer 131 provided to cover these light-emitting devices. A substrate 120 is bonded to the protective layer 131 with a resin layer 122. In a region between adjacent light-emitting devices, an insulating layer 125 and an insulating layer 127 over the insulating layer 125 are provided.

Although FIG. 18B and the like illustrate a plurality of cross sections of the insulating layer 125 and the insulating layer 127, the insulating layer 125 and the insulating layer 127 are each a continuous layer when the display panel 100 is seen from above. That is, the display panel 100 can have a structure that includes one insulating layer 125 and one insulating layer 127, for example. Note that the display panel 100 may include a plurality of the insulating layers 125 that are separated from each other and a plurality of the insulating layers 127 that are separated from each other.

The display panel of one embodiment of the present invention can have any of the following structures: a top-emission structure in which light is emitted in a direction opposite to the substrate where the light-emitting devices are formed, a bottom-emission structure in which light is emitted toward the substrate where the light-emitting devices are formed, and a dual-emission structure in which light is emitted toward both surfaces.

The layer 101 can have a stacked-layer structure in which a plurality of transistors are provided over a substrate and an insulating layer is provided to cover these transistors, for example. The insulating layer over the transistors may have a single-layer structure or a stacked-layer structure. In FIG. 18B and the like, an insulating layer 255a, an insulating layer 255b over the insulating layer 255a, and the insulating layer 255c over the insulating layer 255b are illustrated as the insulating layer over the transistors. These insulating layers may have a depressed portion between adjacent light-emitting devices. In the example illustrated in FIG. 18B and the like, the insulating layer 255c has a depressed portion.

As each of the insulating layer 255a, the insulating layer 255b, and the insulating layer 255c, any of a variety of inorganic insulating films such as an oxide insulating film, a nitride insulating film, an oxynitride insulating film, and a nitride oxide insulating film can be suitably used. As each of the insulating layer 255a and the insulating layer 255c, an oxide insulating film or an oxynitride insulating film, such as a silicon oxide film, a silicon oxynitride film, or an aluminum oxide film, is preferably used. As the insulating layer 255b, a nitride insulating film or a nitride oxide insulating film, such as a silicon nitride film or a silicon nitride oxide film, is preferably used. Specifically, it is preferable that a silicon oxide film be used as each of the insulating layer 255a and the insulating layer 255c and a silicon nitride film be used as the insulating layer 255b. The insulating layer 255b preferably has a function of an etching protective film.

Note that in this specification and the like, an oxynitride refers to a material in which an oxygen content is higher than a nitrogen content, and a nitride oxide refers to a material in which a nitrogen content is higher than an oxygen content. For example, silicon oxynitride refers to a material in which an oxygen content is higher than a nitrogen content, and silicon nitride oxide refers to a material in which a nitrogen content is higher than an oxygen content.

Structure examples of the layer 101 will be described later in Embodiment 6 and Embodiment 7.

The light-emitting devices 130a, 130b, and 130c emit light of different colors. Preferably, the light-emitting devices 130a, 130b, and 130c emit light of three colors, red (R), green (G), and blue (B), for example.

As the light-emitting devices 130a, 130b, and 130c, an OLED (Organic Light Emitting Diode) or a QLED (Quantum-dot Light Emitting Diode) is preferably used. Examples of a light-emitting substance (also referred to as a light-emitting material) contained in the light-emitting devices include a substance that emits fluorescent light (a fluorescent material), a substance that emits phosphorescent light (a phosphorescent material), and a substance that exhibits thermally activated delayed fluorescence (a thermally activated delayed fluorescent (TADF) material). As the light-emitting substance, an inorganic compound (a quantum dot material or the like) can also be used. As the TADF material, a material whose singlet excited state and triplet excited state are in a thermal equilibrium state may be used. Such a TADF material has a short emission lifetime (excitation lifetime), which allows an efficiency decrease in a high-luminance region of a light-emitting device to be inhibited.

The light-emitting device includes an EL layer between a pair of electrodes. The EL layer includes at least a light-emitting layer. In this specification and the like, one of the pair of electrodes is referred to as a pixel electrode and the other is referred to as a common electrode in some cases.

One of the pair of electrodes of the light-emitting device functions as an anode, and the other electrode functions as a cathode. The case where the pixel electrode functions as an anode and the common electrode functions as a cathode will be described below as an example in some cases.

End portions of a pixel electrode 111a, a pixel electrode 111b, and a pixel electrode 111c each preferably have a tapered shape. When the end portions of these pixel electrodes have a tapered shape, a first layer 113a, a second layer 113b, and a third layer 113c provided along the side surfaces of the pixel electrodes also have a tapered shape. When the side surfaces of the pixel electrodes have a tapered shape, coverage with the EL layers provided along the side surfaces of the pixel electrodes can be improved. Furthermore, when the side surfaces of the pixel electrodes have a tapered shape, a material (also referred to as dust, particles, or the like) in the fabrication step is easily removed by treatment such as cleaning, which is preferable.

Note that in this specification and the like, a tapered shape refers to a shape such that at least part of the side surface of a structure is inclined with respect to a substrate surface or a formation surface. For example, a tapered shape preferably includes a region where the angle between the inclined side surface and the substrate surface or the formation surface (such an angle is also referred to as a taper angle) is less than 90°.

The light-emitting device 130a includes the pixel electrode 111a over the insulating layer 255c, the island-shaped first layer 113a over the pixel electrode 111a, a common layer 114 over the island-shaped first layer 113a, and a common electrode 115 over the common layer 114. In the light-emitting device 130a, the first layer 113a and the common layer 114 can be collectively referred to as an EL layer.

Note that in this specification and the like, the term "island shape" refers to a state where two or more layers formed using the same material in the same step are physically separated from each other. For example, "island-shaped light-emitting layer" means a state where the light-emitting layer and its adjacent light-emitting layer are physically separated from each other.

The light-emitting device 130b includes the pixel electrode 111b over the insulating layer 255c, the island-shaped second layer 113b over the pixel electrode 111b, the common layer 114 over the island-shaped second layer 113b, and the common electrode 115 over the common layer 114. In the light-emitting device 130b, the second layer 113b and the common layer 114 can be collectively referred to as an EL layer.

The light-emitting device 130c includes the pixel electrode 111c over the insulating layer 255c, the island-shaped third layer 113c over the pixel electrode 111c, the common layer 114 over the island-shaped third layer 113c, and the common electrode 115 over the common layer 114. In the light-emitting device 130c, the third layer 113c and the common layer 114 can be collectively referred to as an EL layer.

There is no particular limitation on the structure of the light-emitting device in this embodiment, and the light-emitting device can have a single structure or a tandem structure.

In this embodiment, in the EL layers included in the light-emitting devices, the island-shaped layers provided in the respective light-emitting devices are referred to as the first layer 113a, the second layer 113b, and the third layer 113c, and the layer shared by the plurality of light-emitting devices is referred to as the common layer 114.

The first layer 113a, the second layer 113b, and the third layer 113c each include at least a light-emitting layer. Preferably, the first layer 113a, the second layer 113b, and the third layer 113c include a light-emitting layer emitting red light, a light-emitting layer emitting green light, and a light-emitting layer emitting blue light, respectively, for example.

The first layer 113a, the second layer 113b, and the third layer 113c may each include one or more of a hole-injection layer, a hole-transport layer, a hole-blocking layer, a charge-generation layer, an electron-blocking layer, an electron-transport layer, and an electron-injection layer.

The first layer 113a, the second layer 113b, and the third layer 113c may include a hole-injection layer, a hole-transport layer, a light-emitting layer, and an electron-transport layer, for example. In addition, an electron-blocking layer may be provided between the hole-transport layer and the light-emitting layer. Furthermore, an electron-injection layer may be provided over the electron-transport layer.

The first layer 113a, the second layer 113b, and the third layer 113c may include an electron-injection layer, an electron-transport layer, a light-emitting layer, and a hole-transport layer in this order, for example. In addition, a hole-blocking layer may be provided between the electron-transport layer and the light-emitting layer. Furthermore, a hole-injection layer may be provided over the hole-transport layer.

The first layer 113a, the second layer 113b, and the third layer 113c each preferably include a light-emitting layer and a carrier-transport layer (an electron-transport layer or a hole-transport layer) over the light-emitting layer. Since the surfaces of the first layer 113a, the second layer 113b, and the third layer 113c are exposed in the fabrication process of the display panel, providing the carrier-transport layer over the light-emitting layer inhibits the light-emitting layer from being exposed on the outermost surface, so that damage to the light-emitting layer can be reduced. Thus, the reliability of the light-emitting device can be increased.

The first layer 113a, the second layer 113b, and the third layer 113c may each include a first light-emitting unit, a charge-generation layer, and a second light-emitting unit, for example. Preferably, the first layer 113a, the second layer 113b, and the third layer 113c include two or more light-emitting units that emit red light, two or more light-emitting units that emit green light, and two or more light-emitting units that emit blue light, respectively, for example.

It is preferable that the second light-emitting unit include a light-emitting layer and a carrier-transport layer (an electron-transport layer or a hole-transport layer) over the light-emitting layer. Since the surface of the second light-emitting unit is exposed in the fabrication process of the display panel, providing the carrier-transport layer over the light-emitting layer inhibits the light-emitting layer from being exposed on the outermost surface, so that damage to the light-emitting layer can be reduced. Thus, the reliability of the light-emitting device can be increased.

The common layer 114 includes, for example, an electron-injection layer or a hole-injection layer. Alternatively, the common layer 114 may include a stack of an electron-transport layer and an electron-injection layer, and may include a stack of a hole-transport layer and a hole-injection layer. The common layer 114 is shared by the light-emitting devices 130a, 130b, and 130c.

The common electrode 115 is shared by the light-emitting devices 130a, 130b, and 130c. The common electrode 115 shared by the plurality of light-emitting devices is electrically connected to a conductive layer 123 provided in the connection portion 140 (see FIG. 19A and FIG. 19B). As the conductive layer 123, a conductive layer formed using the same material in the same step as the pixel electrode 111 is preferably used.

Note that FIG. 19A illustrates an example in which the common layer 114 is provided over the conductive layer 123 and the conductive layer 123 and the common electrode 115 are electrically connected to each other through the common layer 114. The common layer 114 is not necessarily provided in the connection portion 140. In FIG. 19B, the conductive layer 123 and the common electrode 115 are directly connected to each other. For example, by using a mask for defining a film formation area (also referred to as an area mask, a rough metal mask, or the like to be distinguished from a fine metal mask), the common layer 114 can be formed in a region different from a region where the common electrode 115 is formed.

The protective layer 131 is preferably provided over the light-emitting devices 130a, 130b, and 130c. Providing the protective layer 131 can improve the reliability of the light-emitting devices. The protective layer 131 may have a single-layer structure or a stacked-layer structure of two or more layers.

There is no limitation on the conductivity of the protective layer 131. For the protective layer 131, at least one of an insulating film, a semiconductor film, and a conductive film can be used.

The protective layer 131 that includes an inorganic film can inhibit deterioration of the light-emitting devices by preventing oxidation of the common electrode 115 and inhibiting entry of impurities (e.g., moisture and oxygen) into the light-emitting devices, for example; thus, the reliability of the display panel can be improved.

For the protective layer 131, an inorganic insulating film such as an oxide insulating film, a nitride insulating film, an oxynitride insulating film, or a nitride oxide insulating film can be used, for example. Examples of the oxide insulating film include a silicon oxide film, an aluminum oxide film, a gallium oxide film, a germanium oxide film, an yttrium oxide film, a zirconium oxide film, a lanthanum oxide film, a neodymium oxide film, a hafnium oxide film, and a tantalum oxide film. Examples of the nitride insulating film include a silicon nitride film and an aluminum nitride film. Examples of the oxynitride insulating film include a silicon oxynitride film and an aluminum oxynitride film. Examples of the nitride oxide insulating film include a silicon nitride oxide film and an aluminum nitride oxide film. In particular, the protective layer 131 preferably includes a nitride insulating film or a nitride oxide insulating film, and further preferably includes a nitride insulating film.

For the protective layer 131, an inorganic film containing In—Sn oxide (also referred to as ITO), In—Zn oxide, Ga—Zn oxide, Al—Zn oxide, indium gallium zinc oxide (In—Ga—Zn oxide, also referred to as IGZO), or the like can also be used. The inorganic film preferably has high resistance, specifically, higher resistance than the common electrode 115. The inorganic film may further contain nitrogen.

When light emitted from the light-emitting device is extracted through the protective layer 131, the protective layer 131 preferably has a high property of transmitting visible light. For example, ITO, IGZO, and aluminum oxide are preferable because they are inorganic materials having a high property of transmitting visible light.

The protective layer 131 can have, for example, a stacked-layer structure of an aluminum oxide film and a silicon nitride film over the aluminum oxide film, or a stacked-layer structure of an aluminum oxide film and an IGZO film over the aluminum oxide film. Such a stacked-layer structure can inhibit entry of impurities (such as water and oxygen) to the EL layer side.

Furthermore, the protective layer 131 may include an organic film. For example, the protective layer 131 may include both an organic film and an inorganic film. Examples of an organic material that can be used for the protective layer 131 include later-described organic insulating materials that can be used for an insulating layer 121.

The protective layer 131 may have a stacked-layer structure of two layers formed by different film formation methods. Specifically, the first layer of the protective layer 131 may be formed by an ALD method and the second layer of the protective layer 131 may be formed by a sputtering method.

In FIG. 18B and the like, an insulating layer covering an end portion of the top surface of the pixel electrode 111a is not provided between the pixel electrode 111a and the first layer 113a. An insulating layer covering an end portion of the top surface of the pixel electrode 111b is not provided between the pixel electrode 111b and the second layer 113b. Thus, the distance between adjacent light-emitting devices can be extremely shortened. Accordingly, the display panel can have high resolution or high definition.

In FIG. 18B and the like, a sacrificial layer 118a is positioned over the first layer 113a of the light-emitting device 130a, a sacrificial layer 118b is positioned over the second layer 113b of the light-emitting device 130b, and a sacrificial layer 118c is positioned over the third layer 113c of the light-emitting device 130c. The sacrificial layer 118a is a remaining portion of the sacrificial layer provided over the first layer 113a when the first layer 113a is processed. Similarly, the sacrificial layer 118b and the sacrificial layer 118c are remaining portions of the sacrificial layers provided when the second layer 113b and the third layer 113c are formed, respectively. Thus, in the display panel of one embodiment of the present invention, part of the sacrificial layer used for protecting the EL layer in the fabrication of the display panel may remain. For any two or all of the sacrificial layer 118a to the sacrificial layer 118c, the same material or different materials may be used.

In FIG. 18B, one end portion of the sacrificial layer 118a is aligned or substantially aligned with the end portion of the first layer 113a, and the other end portion of the sacrificial layer 118a is positioned over the first layer 113a. The sacrificial layer may remain between, for example, the EL layer processed into an island shape (the first layer 113a, the second layer 113b, or the third layer 113c) and the insulating layer 125 or the insulating layer 127.

As the sacrificial layer, one or more of a metal film, an alloy film, a metal oxide film, a semiconductor film, an organic insulating film, and an inorganic insulating film can be used, for example. As the sacrificial layer, any of a variety of inorganic insulating films that can be used as the protective layer 131 can be used. For example, an inorganic insulating material such as aluminum oxide, hafnium oxide, or silicon oxide can be used.

As illustrated in FIG. 19C, one or both of the insulating layer 125 and the insulating layer 127 may cover part of the top surface of the EL layer (the first layer 113a, the second layer 113b, or the third layer 113c) processed into an island shape. When one or both of the insulating layer 125 and the insulating layer 127 cover not only the side surface but also the top surface of the EL layer (the first layer 113a, the second layer 113b, or the third layer 113c) processed into an island shape, peeling of the EL layer can further be prevented and the reliability of the light-emitting device can be increased. The fabrication yield of the light-emitting device can also be increased. In the example in FIG. 19C, a stacked-layer structure of the first layer 113a, the sacrificial layer 118a, the insulating layer 125, and the insulating layer 127 is positioned over the end portion of the pixel electrode 111a. Similarly, a stacked-layer structure of the second layer 113b, the sacrificial layer 118b, the insulating layer 125, and the insulating layer 127 is positioned over the end portion of the pixel electrode 111b, and a stacked-layer structure of the third layer 113c, the sacrificial layer 118c, the insulating layer 125, and the insulating layer 127 is positioned over the end portion of the pixel electrode 111c.

There is no particular limitation on the size relationship between the widths of the pixel electrode and the island-shaped EL layer. The pixel electrode 111a and the first layer 113a are given as an example in the following description. Such description applies to the pixel electrode 111b and the second layer 113b, and the pixel electrode 111c and the third layer 113c.

FIG. 18B and the like illustrate an example in which the end portion of the first layer 113a is positioned outward from the end portion of the pixel electrode 111a. In FIG. 18B and the like, the first layer 113a is formed to cover the end portion of the pixel electrode 111a. Such a structure can increase the aperture ratio compared with the structure in which the end portion of the island-shaped EL layer is positioned inward from the end portion of the pixel electrode.

Covering the side surface of the pixel electrode with the EL layer inhibits contact between the pixel electrode and the common electrode 115, thereby inhibiting a short circuit in the light-emitting device. Furthermore, the distance between the light-emitting region (i.e., the region overlapping with the pixel electrode) in the EL layer and the end portion of the EL layer can be increased, resulting in higher reliability.

Figure 20A:
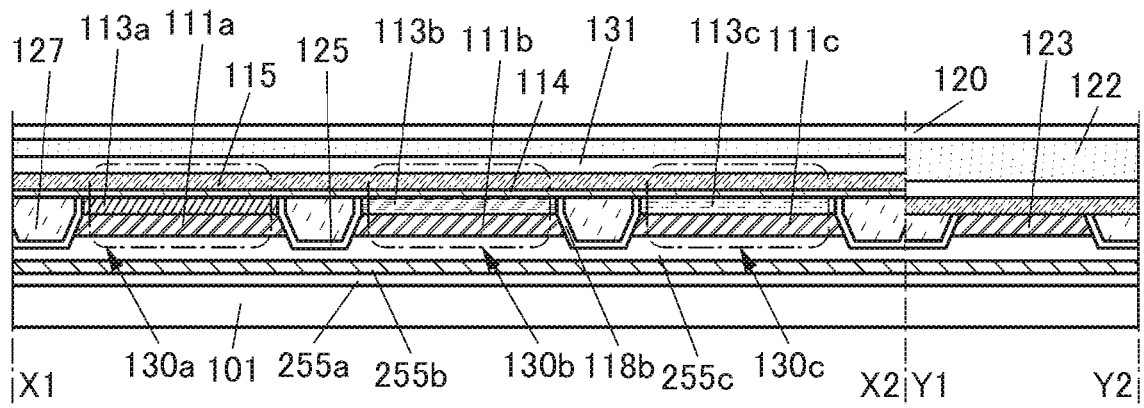
FIG. 20A and FIG. 20B are cross-sectional views illustrating examples of a display panel.
Figure 20B:
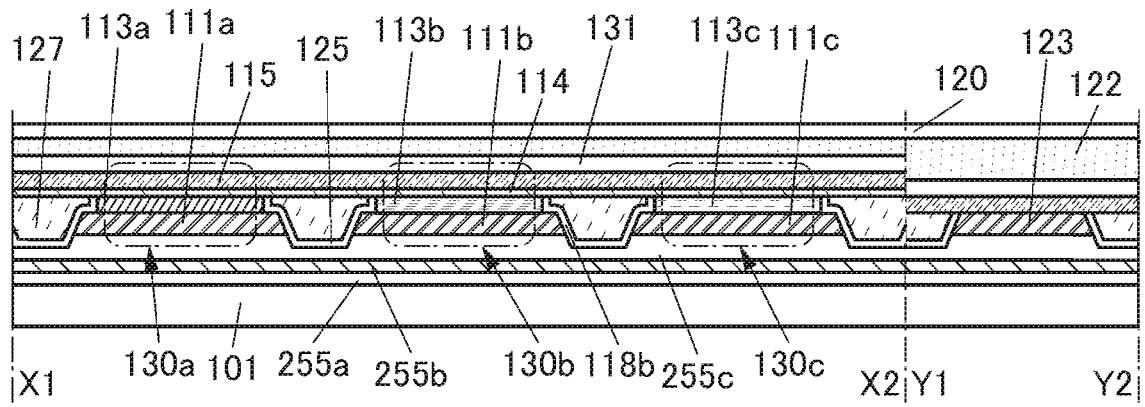

FIG. 20A illustrates an example in which the end portion of the top surface of the pixel electrode 111a and the end portion of the first layer 113a are aligned or substantially aligned with each other. FIG. 20A illustrates an example in which the end portion of the first layer 113a is positioned inward from the end portion of the bottom surface of the pixel electrode 111a. FIG. 20B illustrates an example in which the end portion of the first layer 113a is positioned inward from the end portion of the top surface of the pixel electrode 111a. In FIG. 20A and FIG. 20B, the end portion of the first layer 113a is positioned over the pixel electrode 111a.

As illustrated in FIG. 20A and FIG. 20B, when the end portion of the first layer 113a is positioned over the pixel electrode 111a, a reduction in the thickness of the first layer 113a at or near the end portion of the pixel electrode 111a can be inhibited to make the thickness of the first layer 113a uniform.

In the case where end portions are aligned or substantially aligned with each other and the case where top surface shapes are the same or substantially the same, it can be said that outlines of stacked layers at least partly overlap with each other in a top view. For example, the case of processing the upper layer and the lower layer with the use of the same mask pattern or mask patterns that are partly the same is included. However, in some cases, the outlines do not completely overlap with each other and the upper layer is positioned inward from the lower layer or the upper layer is positioned outward from the lower layer; such a case is also represented as "end portions are substantially aligned with each other" or "top surface shapes are substantially the same".

The end portion of the first layer 113a may have both a portion positioned outward from the end portion of the pixel electrode 111a and a portion positioned inward from the end portion of the pixel electrode 111a.

Figure 21A:
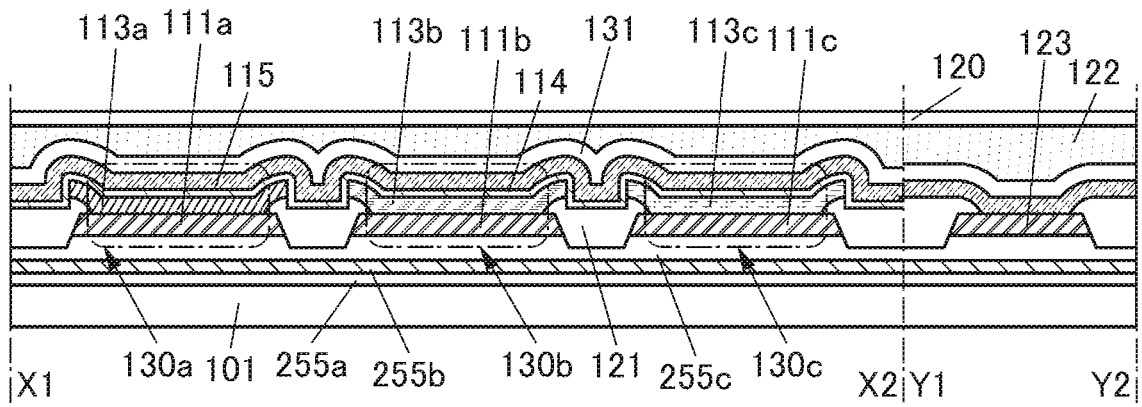
FIG. 21A to FIG. 21C are cross-sectional views illustrating examples of a display panel.
Figure 21B:
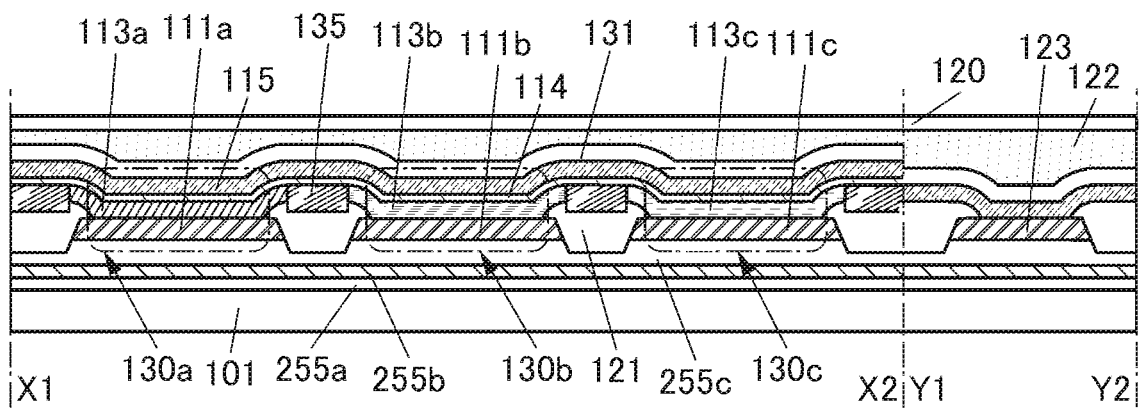
Figure 21C:
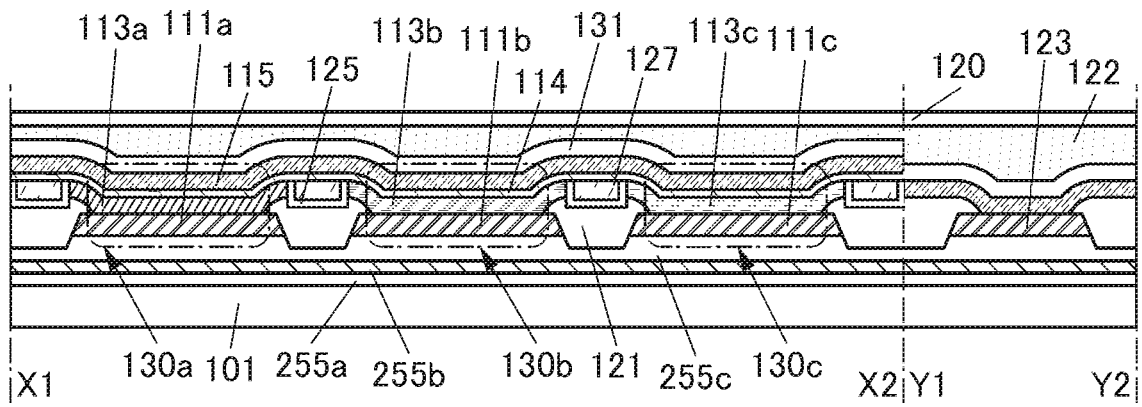

As illustrated in FIG. 21A to FIG. 21C, the insulating layer 121 covering the end portions of the top surfaces of the pixel electrodes 111a, 111b, and 111c may be provided. The first layer 113a, the second layer 113b, and the third layer 113c can each have a portion that is over and in contact with the pixel electrode and a portion that is over and in contact with the insulating layer 121. The insulating layer 121 can have a single-layer structure or a stacked-layer structure using one or both of an inorganic insulating film and an organic insulating film.

Examples of an organic insulating material that can be used for the insulating layer 121 include an acrylic resin, an epoxy resin, a polyimide resin, a polyamide resin, a polyimide-amide resin, a polysiloxane resin, a benzocyclobutene-based resin, and a phenol resin. As an inorganic insulating film that can be used as the insulating layer 121, an inorganic insulating film that can be used as the protective layer 131 can be used.

When an inorganic insulating film is used as the insulating layer 121, impurities are less likely to enter the light-emitting devices than the case of using an organic insulating film; thus, the reliability of the light-emitting devices can be improved. Furthermore, the insulating layer 121 can be thinner, so that high resolution can be easily achieved. Meanwhile, when an organic insulating film is used as the insulating layer 121, better step coverage than the case of using an inorganic insulating film can be obtained; thus, an influence of the shape of the pixel electrodes can be small. Therefore, a short circuit in the light-emitting devices can be prevented. Specifically, when an organic insulating film is used as the insulating layer 121, the insulating layer 121 can be processed into a tapered shape or the like.

Note that the insulating layer 121 is not necessarily provided. The aperture ratio of the subpixel can sometimes be increased when the insulating layer 121 is not provided. Alternatively, the distance between subpixels can be shortened and the resolution or the definition of the display panel can sometimes be increased.

Note that FIG. 21A illustrates an example in which the common layer 114 is also formed over the insulating layer 121 in a region between the first layer 113a and the second layer 113b, a region between the second layer 113b and the third layer 113c, and the like. As illustrated in FIG. 21B, a space 135 may be formed in each of the regions.

The space 135 contains, for example, one or more selected from air, nitrogen, oxygen, carbon dioxide, and Group 18 elements (typified by helium, neon, argon, xenon, and krypton). Alternatively, a resin or the like may fill the space 135.

As illustrated in FIG. 21C, the insulating layer 125 may be provided to cover the top surface of the insulating layer 121 and the side surfaces of the first layer 113a, the second layer 113b, and the third layer 113c, and the insulating layer 127 may be provided over the insulating layer 125.

The side surfaces of the pixel electrodes 111a, 111b, and 111c, the first layer 113a, the second layer 113b, and the third layer 113c are covered with the insulating layer 125 and the insulating layer 127. Thus, the common layer 114 (or the common electrode 115) can be inhibited from being in contact with the side surfaces of the pixel electrodes 111a, 111b, and 111c, the first layer 113a, the second layer 113b, and the third layer 113c, whereby a short circuit in the light-emitting devices can be inhibited. Thus, the reliability of the light-emitting devices can be increased.

The insulating layer 125 preferably covers at least one of the side surface of the pixel electrode and the side surface of the island-shaped EL layer, and further preferably covers both of the side surface of the pixel electrode and the side surface of the island-shaped EL layer. The insulating layer 125 can be in contact with the side surfaces of the pixel electrode and the island-shaped EL layer.

In FIG. 18B and the like, the end portion of the pixel electrode 111a is covered with the first layer 113a and the insulating layer 125 is in contact with the side surface of the first layer 113a. Similarly, the end portion of the pixel electrode 111b is covered with the second layer 113b, the end portion of the pixel electrode 111c is covered with the third layer 113c, and the insulating layer 125 is in contact with the side surface of the second layer 113b and the side surface of the third layer 113c.

The insulating layer 127 is provided over the insulating layer 125 to fill a depressed portion formed in the insulating layer 125. The insulating layer 127 can overlap with the side surfaces of the first layer 113a, the second layer 113b, and the third layer 113c with the insulating layer 125 therebetween.

The insulating layer 125 and the insulating layer 127 can fill a gap between the adjacent island-shaped layers, whereby the formation surfaces of layers (e.g., the carrier-injection layer and the common electrode) provided over the island-shaped layers can be less uneven and can be flatter. Thus, the coverage with the carrier-injection layer, the common electrode, and the like can be increased and disconnection of the common electrode can be prevented.

The common layer 114 and the common electrode 115 are provided over the first layer 113a, the second layer 113b, the third layer 113c, the insulating layer 125, and the insulating layer 127. At the stage before the insulating layer 125 and the insulating layer 127 are provided, a step is generated owing to a region where the pixel electrode and the EL layer are provided and a region where the pixel electrode and the EL layer are not provided (a region between the light-emitting devices). In the display panel of one embodiment of the present invention, the step can be planarized with the insulating layer 125 and the insulating layer 127, and the coverage with the common layer 114 and the common electrode 115 can be improved. Consequently, it is possible to inhibit poor connection due to disconnection of the common electrode 115. In addition, it is possible to inhibit an increase in electric resistance due to local thinning of the common electrode 115 by the step.

In order to improve the planarity of the formation surfaces of the common layer 114 and the common electrode 115, the top surface of the insulating layer 125 and the top surface of the insulating layer 127 are each preferably level or substantially level with the top surface at the end portion of at least one of the first layer 113a, the second layer 113b, and the third layer 113c. The top surface of the insulating layer 127 preferably has a flat surface; however, it may include a projecting portion, a convex curved surface, a concave curved surface, or a depressed portion.

The insulating layer 125 or the insulating layer 127 can be provided in contact with the island-shaped EL layers. Thus, peeling of the island-shaped EL layers can be prevented. Close contact between the insulating layer and the EL layer brings about the insulating layer's effect of fixing or bonding the adjacent island-shaped EL layers to each other. Thus, the reliability of the light-emitting device can be increased. In addition, the fabrication yield of the light-emitting device can be increased.

Figure 22A:
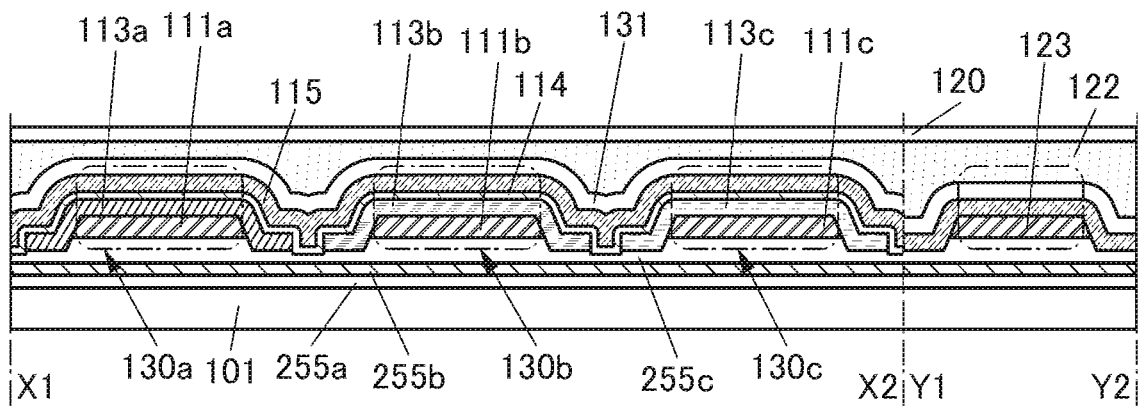
FIG. 22A to FIG. 22C are cross-sectional views illustrating examples of a display panel.

Note that as illustrated in FIG. 22A, the display panel does not necessarily include the insulating layer 125 or the insulating layer 127. FIG. 22A illustrates an example in which the common layer 114 is provided in contact with the top surface of the insulating layer 255c and the top and side surfaces of the first layer 113a, the second layer 113b, and the third layer 113c. Note that as illustrated in FIG. 21B, the space 135 may be provided in the region between the first layer 113a and the second layer 113b, the region between the second layer 113b and the third layer 113c, and the like.

Note that one of the insulating layer 125 and the insulating layer 127 is not necessarily provided. When the insulating layer 125 having a single-layer structure using an inorganic material is formed, for example, the insulating layer 125 can be used as a protective insulating layer for the EL layer. This leads to higher reliability of the display panel. For another example, when the insulating layer 127 having a single-layer structure using an organic material is formed, the insulating layer 127 can fill a gap between the adjacent island-shaped EL layers for planarization. In this way, the coverage with the common electrode 115 (upper electrode) formed over the island-shaped EL layer and the insulating layer 127 can be increased.

Figure 22B:
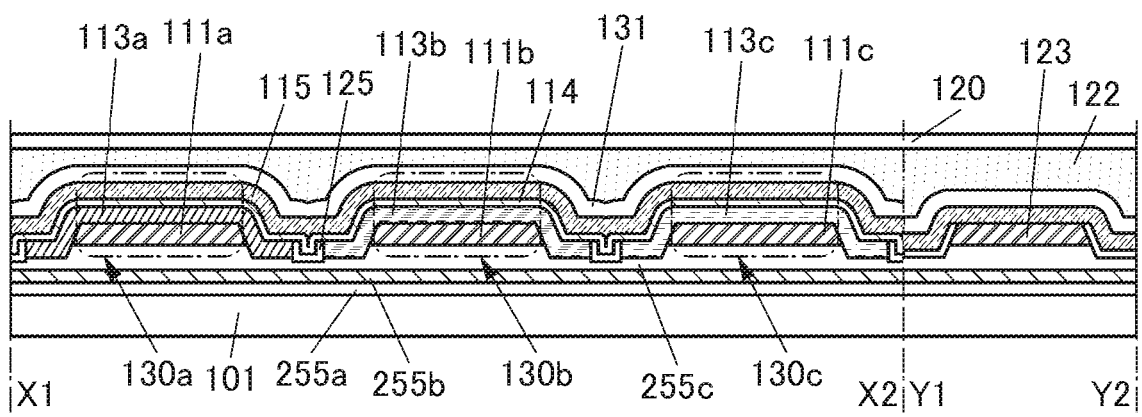

FIG. 22B illustrates an example of the case where the insulating layer 127 is not provided. Note that although FIG. 22B illustrates an example in which the common layer 114 is formed in the depressed portion of the insulating layer 125, a space may be formed in each of the regions.

The insulating layer 125 includes a region in contact with the side surface of the island-shaped EL layer and functions as a protective insulating layer of the EL layer. With the insulating layer 125, entry of impurities (such as oxygen and moisture) from the side surface of the island-shaped EL layer into its inside can be inhibited, and thus a highly reliable display panel can be obtained.

Figure 22C:
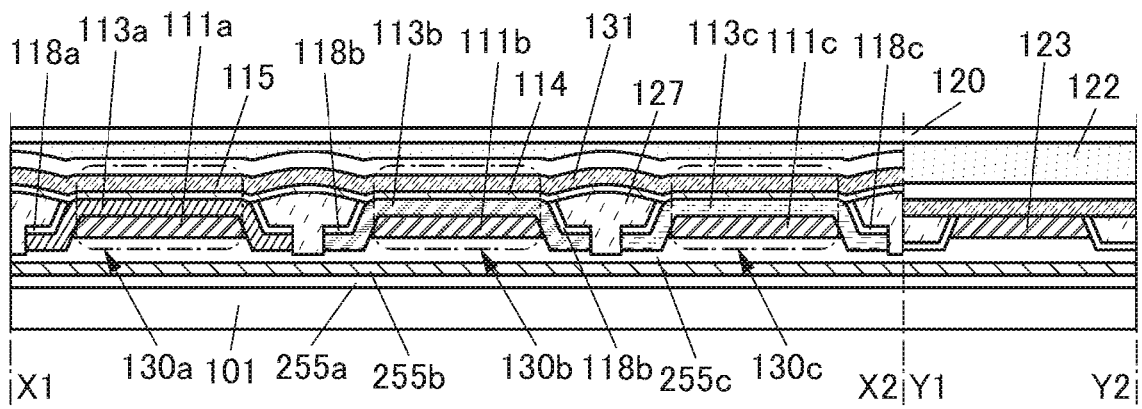

FIG. 22C illustrates an example of the case where the insulating layer 125 is not provided. In the case where the insulating layer 125 is not provided, the insulating layer 127 can be in contact with the side surface of the island-shaped EL layer. The insulating layer 127 can be provided to fill gaps between the island-shaped EL layers of the light-emitting devices.

In this case, an organic material that causes less damage to the EL layer is preferably used for the insulating layer 127. For example, it is preferable to use, for the insulating layer 127, an organic material such as polyvinyl alcohol (PVA), polyvinyl butyral, polyvinyl pyrrolidone, polyethylene glycol, polyglycerin, pullulan, water-soluble cellulose, or an alcohol-soluble polyamide resin.

Next, examples of materials and formation methods of the insulating layer 125 and the insulating layer 127 are described.

The insulating layer 125 can be an insulating layer containing an inorganic material. As the insulating layer 125, an inorganic insulating film such as an oxide insulating film, a nitride insulating film, an oxynitride insulating film, or a nitride oxide insulating film can be used, for example. The insulating layer 125 may have a single-layer structure or a stacked-layer structure. Examples of the oxide insulating film include a silicon oxide film, an aluminum oxide film, a magnesium oxide film, an indium gallium zinc oxide film, a gallium oxide film, a germanium oxide film, an yttrium oxide film, a zirconium oxide film, a lanthanum oxide film, a neodymium oxide film, a hafnium oxide film, and a tantalum oxide film. Examples of the nitride insulating film include a silicon nitride film and an aluminum nitride film. Examples of the oxynitride insulating film include a silicon oxynitride film and an aluminum oxynitride film. Examples of the nitride oxide insulating film include a silicon nitride oxide film and an aluminum nitride oxide film. Aluminum oxide is particularly preferable because it has high selectivity with the EL layer in etching and has a function of protecting the EL layer in forming the insulating layer 127 which is to be described later. In particular, when an inorganic insulating film such as an aluminum oxide film, a hafnium oxide film, or a silicon oxide film formed by an ALD method is used as the insulating layer 125, the insulating layer 125 having few pinholes and an excellent function of protecting the EL layer can be formed. The insulating layer 125 may have a stacked-layer structure of a film formed by an ALD method and a film formed by a sputtering method. For example, the insulating layer 125 may have a stacked-layer structure of an aluminum oxide film formed by an ALD method and a silicon nitride film formed by a sputtering method.

The insulating layer 125 preferably has a function of a barrier insulating layer against at least one of water and oxygen. Alternatively, the insulating layer 125 preferably has a function of inhibiting diffusion of at least one of water and oxygen. Alternatively, the insulating layer 125 preferably has a function of capturing or fixing (also referred to as gettering) at least one of water and oxygen.

When the insulating layer 125 has a function of a barrier insulating layer or a gettering function, entry of impurities (typically, at least one of water and oxygen) that might diffuse into the light-emitting devices from the outside can be inhibited. With this structure, a highly reliable light-emitting device and a highly reliable display panel can be provided.

The insulating layer 125 preferably has a low impurity concentration. In this case, deterioration of the EL layer due to entry of impurities from the insulating layer 125 into the EL layer can be inhibited. In addition, when having a low impurity concentration, the insulating layer 125 can have a high barrier property against at least one of water and oxygen. For example, the insulating layer 125 preferably has one of a sufficiently low hydrogen concentration and a sufficiently low carbon concentration, desirably has both of them.

Examples of the formation method of the insulating layer 125 include a sputtering method, a CVD method, a pulsed laser deposition (PLD) method, and an ALD method. The insulating layer 125 is preferably formed by an ALD method achieving good coverage.

When the substrate temperature in forming the insulating layer 125 is increased, the formed insulating layer 125, even with a small thickness, can have a low impurity concentration and a high barrier property against at least one of water and oxygen. Therefore, the substrate temperature is preferably higher than or equal to 60° C., further preferably higher than or equal to 80° C., still further preferably higher than or equal to 100° C., yet still further preferably higher than or equal to 120° C. Meanwhile, the insulating layer 125 is formed after formation of an island-shaped EL layer, and thus is preferably formed at a temperature lower than the upper temperature limit of the EL layer. Therefore, the substrate temperature is preferably lower than or equal to 200° C., further preferably lower than or equal to 180° C., still further preferably lower than or equal to 160° C., yet further preferably lower than or equal to 150° C., yet still further preferably lower than or equal to 140° C.

Examples of indicators of the upper temperature limit include the glass transition point, the softening point, the melting point, the thermal decomposition temperature, and the 5% weight loss temperature. The upper temperature limit of the EL layer can be, for example, any of the above temperatures, preferably the lowest temperature thereof.

As the insulating layer 125, an insulating film is preferably formed to have a thickness greater than or equal to 3 nm, greater than or equal to 5 nm, or greater than or equal to 10 nm and less than or equal to 200 nm, less than or equal to 150 nm, less than or equal to 100 nm, or less than or equal to 50 nm.

The insulating layer 127 provided over the insulating layer 125 has a function of filling the depressed portion of the insulating layer 125 that is formed between adjacent light-emitting devices. In other words, the insulating layer 127 has an effect of improving the planarity of the formation surface of the common electrode 115. As the insulating layer 127, an insulating layer containing an organic material can be suitably used. For the insulating layer 127, an acrylic resin, a polyimide resin, an epoxy resin, an imide resin, a polyamide resin, a polyimide-amide resin, a silicone resin, a siloxane resin, a benzocyclobutene-based resin, a phenol resin, precursors of these resins, or the like can be used, for example. Examples of organic materials that may be used for the insulating layer 127 include polyvinyl alcohol (PVA), polyvinyl butyral, polyvinyl pyrrolidone, polyethylene glycol, polyglycerin, pullulan, water-soluble cellulose, and an alcohol-soluble polyamide resin. Alternatively, a photosensitive resin can be used for the insulating layer 127. A photoresist may be used for the photosensitive resin. As the photosensitive resin, a positive material or a negative material can be used.

The insulating layer 127 may be formed using a material absorbing visible light. When the insulating layer 127 absorbs light emitted from the light-emitting device, leakage of light (stray light) from the light-emitting device to an adjacent light-emitting device through the insulating layer 127 can be inhibited. Thus, the display quality of the display panel can be improved. Since no polarizing plate is required to improve the display quality of the display panel, the weight and thickness of the display panel can be reduced.

Examples of the material absorbing visible light include a material containing a pigment of black or any other color, a material containing a dye, a light-absorbing resin material (e.g., polyimide), and a resin material that can be used for color filters (a color filter material). A resin material obtained by stacking or mixing color filter materials of two or three or more colors is preferably used to enhance the effect of blocking visible light. In particular, mixing color filter materials of three or more colors enables the formation of a black or nearly black resin layer.

For example, the insulating layer 127 can be formed by a wet film formation method such as spin coating, dipping, spray coating, ink-jetting, dispensing, screen printing, offset printing, a doctor knife method, slit coating, roll coating, curtain coating, or knife coating. Specifically, an organic insulating film that is to be the insulating layer 127 is preferably formed by spin coating.

The insulating layer 127 is formed at a temperature lower than the upper temperature limit of the EL layer. The typical substrate temperature in formation of the insulating layer 127 is lower than or equal to 200° C., preferably lower than or equal to 180° C., further preferably lower than or equal to 160° C., still further preferably lower than or equal to 150° C., yet still further preferably lower than or equal to 140° C.

FIG. 23A to FIG. 23F each illustrate a cross-sectional structure of a region 139 including the insulating layer 127 and its surroundings.

Figure 23A:
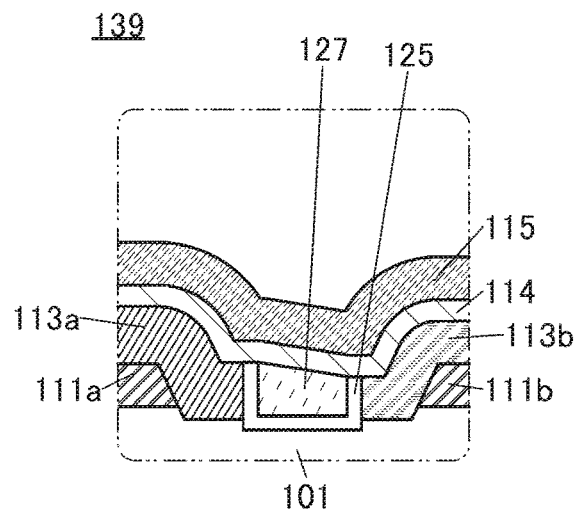
FIG. 23A to FIG. 23F are cross-sectional views illustrating examples of a display panel.

FIG. 23A illustrates an example in which the first layer 113a and the second layer 113b have different thicknesses. The top surface of the insulating layer 125 is level or substantially level with the top surface of the first layer 113a on the first layer 113a side, and is level or substantially level with the top surface of the second layer 113b on the second layer 113b side. The top surface of the insulating layer 127 has a gentle slope such that the side closer to the first layer 113a is higher and the side closer to the second layer 113b is lower. In this manner, the top surfaces of the insulating layer 125 and the insulating layer 127 are preferably level with the top surfaces of the adjacent EL layers. Alternatively, the top surfaces of the insulating layer 125 and the insulating layer 127 may be level with the top surface of any adjacent EL layer so that their top surfaces have a flat portion.

Figure 23B:
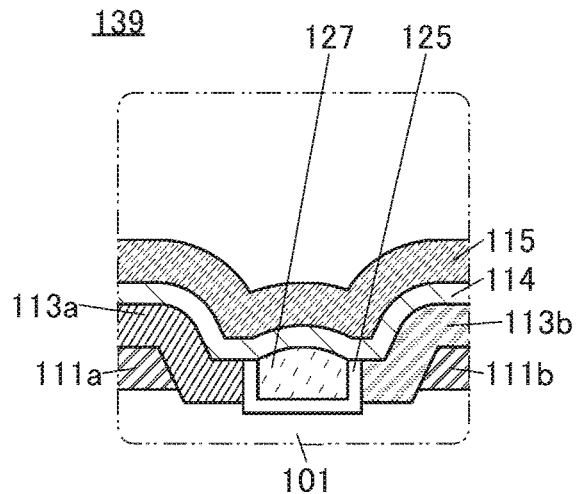

In FIG. 23B, the top surface of the insulating layer 127 includes a region whose level is higher than those of the top surface of the first layer 113a and the top surface of the second layer 113b. As illustrated in FIG. 23B, the top surface of the insulating layer 127 can have a shape such that its center and the vicinity thereof are bulged, i.e., a shape including a convex curved surface, in a cross-sectional view.

Figure 23C:
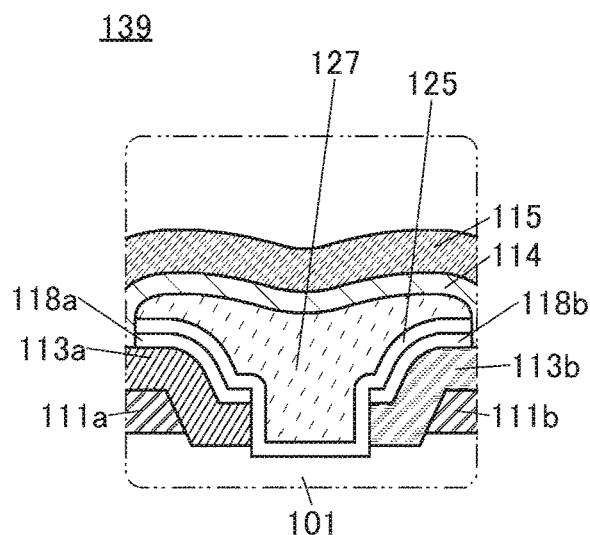

In the cross-sectional view of FIG. 23C, the top surface of the insulating layer 127 has a shape that is gently bulged toward the center, i.e., has a convex curved surface, and has a shape such that its center and the vicinity thereof are depressed, i.e., has a concave curved surface. The insulating layer 127 includes a region that is higher in level than the top surface of the first layer 113a and the top surface of the second layer 113b. The region 139 of the display panel includes a region where the first layer 113a, the sacrificial layer 118a, the insulating layer 125, and the insulating layer 127 are stacked in this order. The region 139 of the display panel includes a region where the second layer 113b, the sacrificial layer 118b, the insulating layer 125, and the insulating layer 127 are stacked in this order.

Figure 23D:
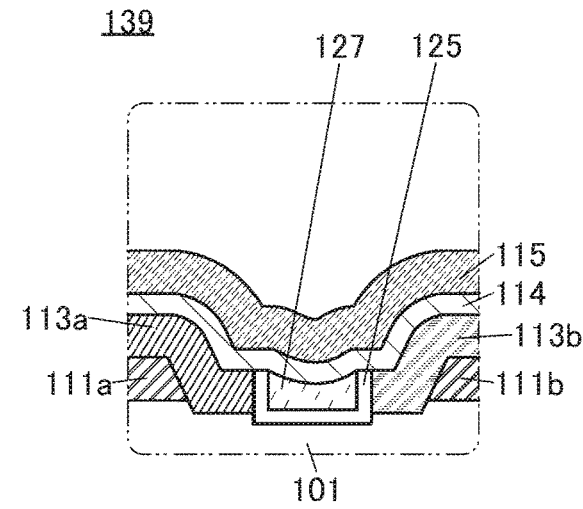

In FIG. 23D, the top surface of the insulating layer 127 includes a region whose level is lower than those of the top surface of the first layer 113a and the top surface of the second layer 113b. In the cross-sectional view, the top surface of the insulating layer 127 has a shape such that its center and the vicinity thereof are depressed, i.e., a shape including a concave curved surface.

Figure 23E:
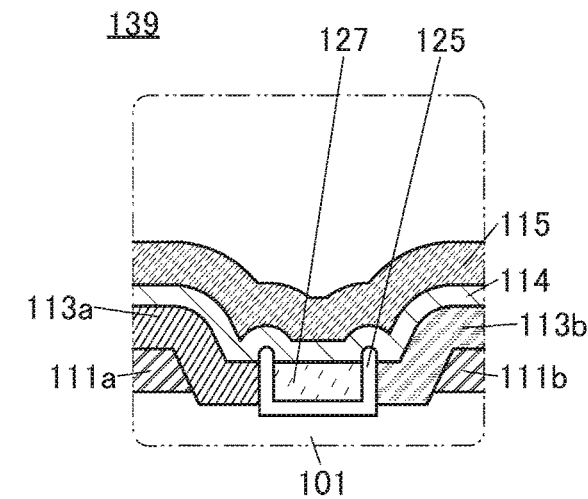

In FIG. 23E, the top surface of the insulating layer 125 includes a region whose level is higher than those of the top surface of the first layer 113a and the top surface of the second layer 113b. That is, the insulating layer 125 protrudes from the formation surface of the common layer 114 and forms a projecting portion.

In formation of the insulating layer 125, for example, when the insulating layer 125 is formed to be level or substantially level with the sacrificial layer, the insulating layer 125 may protrude as illustrated in FIG. 23E.

Figure 23F:
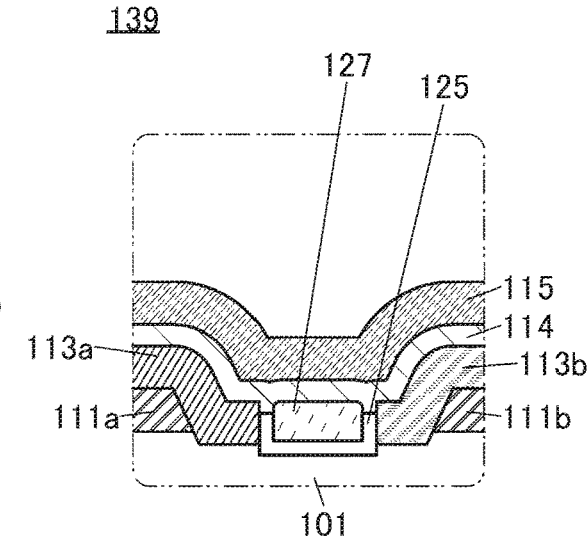

In FIG. 23F, the top surface of the insulating layer 125 includes a region whose level is lower than those of the top surface of the first layer 113a and the top surface of the second layer 113b. That is, the insulating layer 125 forms a depressed portion on the formation surface of the common layer 114.

As described above, the insulating layer 125 and the insulating layer 127 can have a variety of shapes.

In the display panel of this embodiment, the distance between the light-emitting devices can be shortened. Specifically, the distance between the light-emitting devices, the distance between the EL layers, or the distance between the pixel electrodes can be less than 10 µm, less than or equal to 5 µm, less than or equal to 3 µm, less than or equal to 2 µm, less than or equal to 1 µm, less than or equal to 500 nm, less than or equal to 200 nm, less than or equal to 100 nm, less than or equal to 90 nm, less than or equal to 70 nm, less than or equal to 50 nm, less than or equal to 30 nm, less than or equal to 20 nm, less than or equal to 15 nm, or less than or equal to 10 nm. In other words, the display panel of this embodiment includes a region where the distance between two adjacent island-shaped EL layers is less than or equal to 1 µm, preferably less than or equal to 0.5 µm (500 nm), further preferably less than or equal to 100 nm.

A light-blocking layer may be provided on the surface of the substrate 120 that faces the resin layer 122. A variety of optical members can be arranged on the outer surface of the substrate 120. Examples of the optical members include a polarizing plate, a retardation plate, a light diffusion layer (e.g., a diffusion film), an anti-reflective layer, and a light-condensing film. Furthermore, an antistatic film inhibiting the attachment of dust, a water repellent film suppressing the attachment of stain, a hard coat film inhibiting generation of a scratch caused by the use, an impact-absorbing layer, or the like may be provided as a surface protective layer on the outer surface of the substrate 120. For example, a glass layer or a silica layer ($SiO_x$ layer) is preferably provided as the surface protective layer to inhibit the surface contamination and generation of a scratch. The surface protective layer may be formed using DLC (diamond like carbon), aluminum oxide ($AlO_x$), a polyester-based material, a polycarbonate-based material, or the like. For the surface protective layer, a material having high visible-light transmittance is preferably used. The surface protective layer is preferably formed using a material with high hardness.

For the substrate 120, glass, quartz, ceramic, sapphire, a resin, a metal, an alloy, a semiconductor, or the like can be used. The substrate on the side from which light from the light-emitting device is extracted is formed using a material that transmits the light. When the substrate 120 is formed using a flexible material, the flexibility of the display panel can be increased. Furthermore, a polarizing plate may be used as the substrate 120.

For the substrate 120, any of the following can be used, for example: polyester resins such as polyethylene terephthalate (PET) and polyethylene naphthalate (PEN), a polyacrylonitrile resin, an acrylic resin, a polyimide resin, a polymethyl methacrylate resin, a polycarbonate (PC) resin, a polyethersulfone (PES) resin, polyamide resins (e.g., nylon and aramid), a polysiloxane resin, a cycloolefin resin, a polystyrene resin, a polyamide-imide resin, a polyurethane resin, a polyvinyl chloride resin, a polyvinylidene chloride resin, a polypropylene resin, a polytetrafluoroethylene (PTFE) resin, an ABS resin, and cellulose nanofiber. Glass that is thin enough to have flexibility may be used as the substrate 120.

In the case where a circularly polarizing plate overlaps with the display panel, a highly optically isotropic substrate is preferably used as the substrate included in the display panel. A highly optically isotropic substrate has a low birefringence (in other words, a small amount of birefringence).

The absolute value of a retardation (phase difference) of a highly optically isotropic substrate is preferably less than or equal to 30 nm, further preferably less than or equal to 20 nm, still further preferably less than or equal to 10 nm.

Examples of the films having high optical isotropy include a triacetyl cellulose (TAC, also referred to as cellulose triacetate) film, a cycloolefin polymer (COP) film, a cycloolefin copolymer (COC) film, and an acrylic film.

In the case where a film is used for the substrate and the film absorbs water, the shape of a display panel might be changed, e.g., creases are generated. Thus, for the substrate, a film with a low water absorption rate is preferably used. For example, the water absorption rate of the film is preferably lower than or equal to 1%, further preferably lower than or equal to 0.1%, still further preferably lower than or equal to 0.01%.

For the resin layer 122, any of a variety of curable adhesives such as a photocurable adhesive like an ultraviolet curable adhesive, a reactive curable adhesive, a thermosetting adhesive, and an anaerobic adhesive can be used. Examples of these adhesives include an epoxy resin, an acrylic resin, a silicone resin, a phenol resin, a polyimide resin, an imide resin, a PVC (polyvinyl chloride) resin, a PVB (polyvinyl butyral) resin, and an EVA (ethylene vinyl acetate) resin. In particular, a material with low moisture permeability, such as an epoxy resin, is preferable. A two-component-mixture-type resin may be used. An adhesive sheet or the like may be used.

Figure 24A:
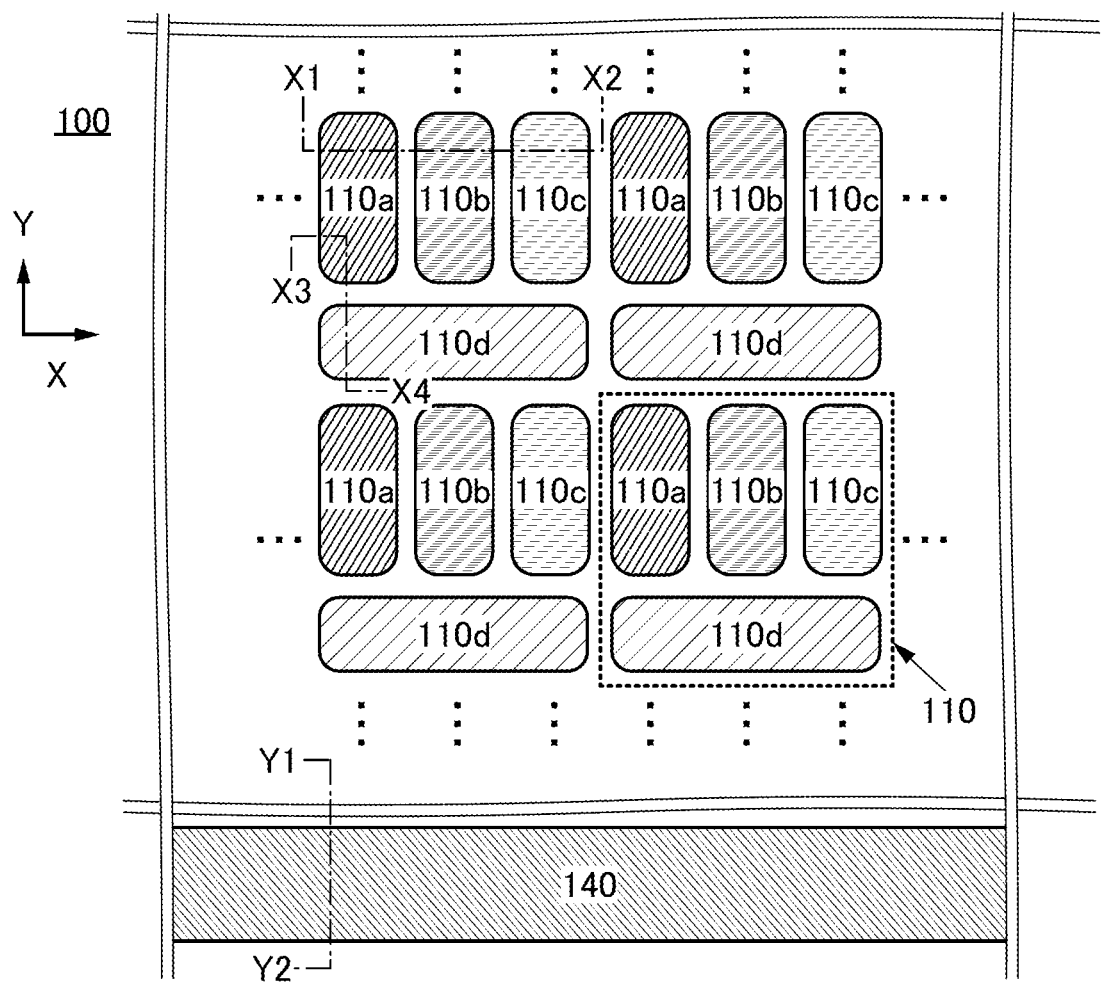
FIG. 24A is a top view illustrating an example of a display panel.

As illustrated in FIG. 24A, the pixel can include four types of subpixels.

FIG. 24A is a top view of the display panel 100. The display panel 100 includes a display portion in which the plurality of pixels 110 are arranged in a matrix, and the connection portion 140 outside the display portion.

Each of the pixels 110 illustrated in FIG. 24A is composed of four types of subpixels 110*a*, 110*b*, 110*c*, and 110*d*.

The subpixels 110*a*, 110*b*, 110*c*, and 110*d* can include light-emitting devices that emit light of different colors. For example, the subpixels 110*a*, 110*b*, 110*c*, and 110*d* can be subpixels of four colors of R, G, B, and W, subpixels of four colors of R, G, B, and Y, or four subpixels of R, G, B, and R.

The display panel of one embodiment of the present invention may include a light-receiving device in the pixel.

Three of the four subpixels included in the pixel 110 illustrated in FIG. 24A may each include a light-emitting device and the other one may include a light-receiving device. In that case, the light-receiving device is preferably used for each of the imaging pixels 106 described in Embodiment 4.

For example, a pn or pin photodiode can be used as the light-receiving device. The light-receiving device functions as a photoelectric conversion device (also referred to as a photoelectric conversion element) that detects light entering the light-receiving device and generates charge. The amount of charge generated from the light-receiving device depends on the amount of light entering the light-receiving device.

It is particularly preferable to use, as the light-receiving device, an organic photodiode including a layer containing an organic compound. An organic photodiode, which is easily made thin, lightweight, and large in area and has a high degree of freedom for shape and design, can be used in a variety of display panels.

In one embodiment of the present invention, organic EL devices are used as the light-emitting devices, and an organic photodiode is used as the light-receiving device. The organic EL devices and the organic photodiode can be formed over the same substrate. Thus, the organic photodiode can be incorporated in the display panel including the organic EL devices.

The light-receiving device includes at least an active layer that functions as a photoelectric conversion layer between a pair of electrodes. In this specification and the like, one of the pair of electrodes may be referred to as a pixel electrode and the other may be referred to as a common electrode.

One of the pair of electrodes of the light-receiving device functions as an anode, and the other electrode functions as a cathode. Hereinafter, the case where the pixel electrode functions as an anode and the common electrode functions as a cathode is described as an example. When the light-receiving device is driven by application of reverse bias between the pixel electrode and the common electrode, light entering the light-receiving device can be detected and charge can be generated and extracted as current. Alternatively, the pixel electrode may function as a cathode and the common electrode may function as an anode.

A fabrication method similar to that of the light-emitting device can be employed for the light-receiving device. An island-shaped active layer (also referred to as a photoelectric conversion layer) included in the light-receiving device is formed by processing a film that is to be the active layer and formed on the entire surface, not by using a pattern of a metal mask; thus, the island-shaped active layer can have a uniform thickness. In addition, a sacrificial layer provided over the active layer can reduce damage to the active layer in the fabrication process of the display panel, increasing the reliability of the light-receiving device.

Figure 24B:
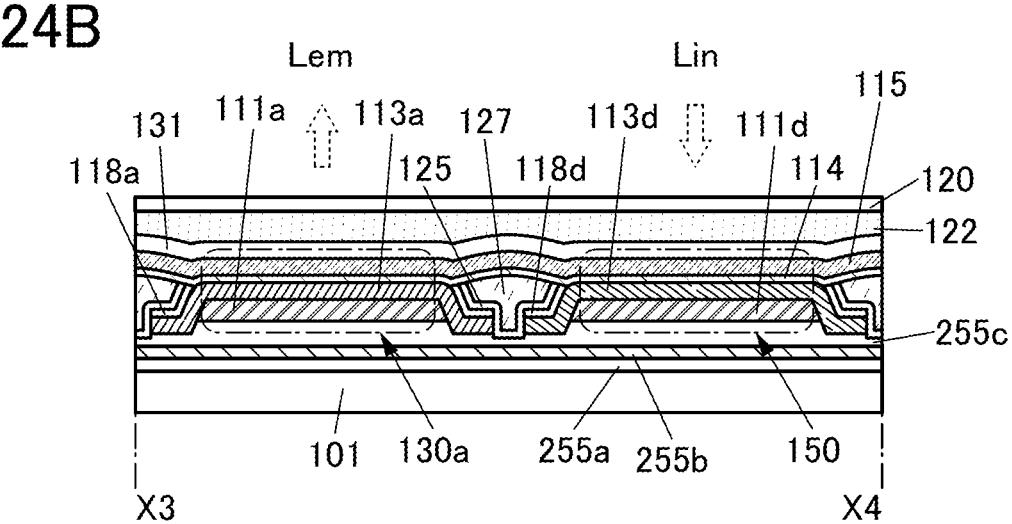
FIG. 24B is a cross-sectional view illustrating the example of the display panel.

FIG. 24B is a cross-sectional view along the dashed-dotted line X3-X4 in FIG. 24A. See FIG. 18B for a cross-sectional view along the dashed-dotted line X1-X2 in FIG. 24A, and see FIG. 19A or FIG. 19B for a cross-sectional view along the dashed-dotted line Y1-Y2 in FIG. 24A.

As illustrated in FIG. 24B, in the display panel 100, an insulating layer is provided over the layer 101, the light-emitting device 130a and a light-receiving device 150 are provided over the insulating layer, the protective layer 131 is provided to cover the light-emitting device 130a and the light-receiving device 150, and the substrate 120 is bonded with the resin layer 122. In a region between the light-emitting device and the light-receiving device adjacent to each other, the insulating layer 125 and the insulating layer 127 over the insulating layer 125 are provided.

FIG. 24B illustrates an example in which light from the light-emitting device 130a is emitted to the substrate 120 side, and light is incident on the light-receiving device 150 from the substrate 120 side (see light Lem and light Lin).

The structure of the light-emitting device 130a is as described above.

The light-receiving device 150 includes a pixel electrode 111d over the insulating layer 255c, a fourth layer 113d over the pixel electrode 111d, the common layer 114 over the fourth layer 113d, and the common electrode 115 over the common layer 114. The fourth layer 113d includes at least an active layer.

The fourth layer 113d is provided in the light-receiving device 150, not in the light-emitting devices. The common layer 114 is a continuous layer shared by the light-emitting devices and the light-receiving device.

Here, a layer shared by the light-receiving device and the light-emitting device may have different functions in the light-emitting device and the light-receiving device. In this specification, the name of a component is based on its function in the light-emitting device in some cases. For example, a hole-injection layer functions as a hole-injection layer in the light-emitting device and functions as a hole-transport layer in the light-receiving device. Similarly, an electron-injection layer functions as an electron-injection layer in the light-emitting device and functions as an electron-transport layer in the light-receiving device. A layer shared by the light-receiving device and the light-emitting device may have the same function in both the light-emitting device and the light-receiving device. The hole-transport layer functions as a hole-transport layer in both the light-emitting device and the light-receiving device, and the electron-transport layer functions as an electron-transport layer in both the light-emitting device and the light-receiving device.

The sacrificial layer 118a is positioned between the first layer 113a and the insulating layer 125, and a sacrificial layer 118d is positioned between the fourth layer 113d and the insulating layer 125. The sacrificial layer 118a is a remaining portion of the sacrificial layer provided over the first layer 113a when the first layer 113a is processed. The sacrificial layer 118d is a remaining portion of the sacrificial layer provided over the fourth layer 113d that includes the active layer when the fourth layer 113d is processed. The sacrificial layer 118a and the sacrificial layer 118d may include the same material or different materials.

The display panel whose pixel includes the light-emitting device and the light-receiving device can detect the contact or approach of an object while displaying an image because the pixel has a light-receiving function. For example, all the subpixels included in the display panel can display an image; alternatively, some of the subpixels can emit light as a light source, and the other subpixels can display an image.

In the display panel of one embodiment of the present invention, the light-emitting devices are arranged in a matrix in the display portion, and an image can be displayed on the display portion. Furthermore, the light-receiving devices are arranged in a matrix in the display portion, and the display portion has one or both of an image capturing function and a sensing function in addition to an image displaying function. The display portion can be used as an image sensor or a touch sensor. That is, by detecting light with the display portion, an image can be captured or the approach or contact of an object (e.g., a finger, a hand, or a pen) can be detected. Furthermore, in the display panel of one embodiment of the present invention, the light-emitting devices can be used as a light source of the sensor. Accordingly, a light-receiving portion and a light source do not need to be provided separately from the display panel; hence, the number of components of an electronic device can be reduced. For example, a fingerprint authentication device, a capacitive touch panel for scroll operation, or the like is not necessarily provided separately from the electronic device. Thus, with the use of the display panel of one embodiment of the present invention, the electronic device can be provided with reduced manufacturing cost.

In the display panel of one embodiment of the present invention, when an object reflects (or scatters) light emitted from the light-emitting device included in the display portion, the light-receiving device can detect the reflected light (or scattered light); thus, image capturing or touch detection is possible even in a dark place.

In the case where the light-receiving device is used as an image sensor, the display panel can capture an image with the use of the light-receiving device. For example, the display panel of this embodiment can be used as a scanner.

For example, data on biological information such as a fingerprint or a palm print can be obtained with the use of the image sensor. That is, a biometric authentication sensor can be incorporated in the display panel. When the display panel incorporates a biometric authentication sensor, the number of components of an electronic device can be reduced as compared with the case where a biometric authentication sensor is provided separately from the display panel; thus, the size and weight of the electronic device can be reduced.

In the case where the light-receiving device is used as the touch sensor, the display panel can detect the approach or contact of an object with the use of the light-receiving device.

The display panel of one embodiment of the present invention can have one or both of an image capturing function and a sensing function in addition to an image displaying function. Thus, the display panel of one embodiment of the present invention can be regarded as being highly compatible with the function other than the display function.

Next, materials that can be used for the light-emitting device will be described.

A conductive film that transmits visible light is used as the electrode through which light is extracted, which is either the pixel electrode or the common electrode. A conductive film that reflects visible light is preferably used as the electrode through which light is not extracted. In the case where the display panel includes a light-emitting device emitting infrared light, a conductive film that transmits visible light and infrared light is used as the electrode through which light is extracted, and a conductive film that reflects visible light and infrared light is preferably used as the electrode through which light is not extracted.

A conductive film that transmits visible light may be used also for an electrode through which light is not extracted. In that case, this electrode is preferably provided between a reflective layer and the EL layer. That is, light emitted from the EL layer may be reflected by the reflective layer to be extracted from the display panel.

As a material that forms the pair of electrodes (the pixel electrode and the common electrode) of the light-emitting device, a metal, an alloy, an electrically conductive compound, a mixture thereof, and the like can be used as appropriate. Specific examples include indium tin oxide (In—Sn oxide, also referred to as ITO), In—Si—Sn oxide (also referred to as ITSO), indium zinc oxide (In—Zn oxide), In—W—Zn oxide, an alloy containing aluminum (an aluminum alloy) such as an alloy of aluminum, nickel, and lanthanum (Al—Ni—La), and an alloy of silver, palladium, and copper (Ag—Pd—Cu, also referred to as APC). In addition, it is possible to use a metal such as aluminum (Al), titanium (Ti), chromium (Cr), manganese (Mn), iron (Fe), cobalt (Co), nickel (Ni), copper (Cu), gallium (Ga), zinc (Zn), indium (In), tin (Sn), molybdenum (Mo), tantalum (Ta), tungsten (W), palladium (Pd), gold (Au), platinum (Pt), silver (Ag), yttrium (Y), or neodymium (Nd) or an alloy containing an appropriate combination of any of these metals. It is also possible to use a Group 1 element or a Group 2 element in the periodic table, which is not described above (e.g., lithium (Li), cesium (Cs), calcium (Ca), or strontium (Sr)), a rare earth metal such as europium (Eu) or ytterbium (Yb), an alloy containing an appropriate combination of any of these elements, graphene, or the like.

The light-emitting device preferably has a microcavity structure. Therefore, one of the pair of electrodes of the light-emitting device preferably includes an electrode having properties of transmitting and reflecting visible light (a semi-transmissive and semi-reflective electrode), and the other preferably includes an electrode having a property of reflecting visible light (a reflective electrode). When the light-emitting device has a microcavity structure, light obtained from the light-emitting layer can be resonated between the electrodes, whereby light emitted from the light-emitting device can be intensified.

The transparent electrode has a light transmittance higher than or equal to 40%. For example, an electrode having a visible light (light at wavelengths greater than or equal to 400 nm and less than 750 nm) transmittance higher than or equal to 40% is preferably used in the light-emitting device. The visible light reflectance of the semi-transmissive and semi-reflective electrode is higher than or equal to 10% and lower than or equal to 95%, preferably higher than or equal to 30% and lower than or equal to 80%. The visible light reflectance of the reflective electrode is higher than or equal to 40% and lower than or equal to 100%, preferably higher than or equal to 70% and lower than or equal to 100%. These electrodes preferably have a resistivity lower than or equal to $1 \times 10^{-2}$ Ωcm.

The light-emitting layer contains a light-emitting material (also referred to as a light-emitting substance). The light-emitting layer can include one or more kinds of light-emitting substances. As the light-emitting substance, a substance that exhibits an emission color of blue, violet, bluish violet, green, yellowish green, yellow, orange, red, or the like is used as appropriate. Alternatively, as the light-emitting substance, a substance that emits near-infrared light can be used.

Examples of the light-emitting substance include a fluorescent material, a phosphorescent material, a TADF material, and a quantum dot material.

Examples of the fluorescent material include a pyrene derivative, an anthracene derivative, a triphenylene derivative, a fluorene derivative, a carbazole derivative, a dibenzothiophene derivative, a dibenzofuran derivative, a dibenzoquinoxaline derivative, a quinoxaline derivative, a pyridine derivative, a pyrimidine derivative, a phenanthrene derivative, and a naphthalene derivative.

Examples of the phosphorescent material include an organometallic complex (in particular, an iridium complex) having a 4H-triazole skeleton, a 1H-triazole skeleton, an imidazole skeleton, a pyrimidine skeleton, a pyrazine skeleton, or a pyridine skeleton; an organometallic complex (in particular, an iridium complex) having a phenylpyridine derivative including an electron-withdrawing group as a ligand; a platinum complex; and a rare earth metal complex.

The light-emitting layer may contain one or more kinds of organic compounds (e.g., a host material and an assist material) in addition to the light-emitting substance (a guest material). As one or more kinds of organic compounds, one or both of the hole-transport material and the electron-transport material can be used. Alternatively, as one or more kinds of organic compounds, a bipolar material or a TADF material may be used.

The light-emitting layer preferably includes, for example, a phosphorescent material and a combination of a hole-transport material and an electron-transport material that easily forms an exciplex. With such a structure, light emission can be efficiently obtained by ExTET (Exciplex-Triplet Energy Transfer), which is energy transfer from an exciplex to a light-emitting substance (a phosphorescent material). When a combination of materials is selected to form an exciplex that exhibits light emission whose wavelength overlaps with the wavelength of the lowest-energy-side absorption band of the light-emitting substance, energy can be transferred smoothly and light emission can be obtained efficiently. With the above structure, high efficiency, low-voltage driving, and a long lifetime of a light-emitting device can be achieved at the same time.

In addition to the light-emitting layer, the first layer 113a, the second layer 113b, and the third layer 113c may further include layers containing a substance with a high hole-injection property, a substance with a high hole-transport property, a hole-blocking material, a substance with a high electron-transport property, a substance with a high electron-injection property, an electron-blocking material, a substance with a bipolar property (a substance with a high electron-transport property and a high hole-transport property), and the like.

Either a low molecular compound or a high molecular compound can be used in the light-emitting device, and an inorganic compound may also be included. Each layer included in the light-emitting device can be formed by a method such as an evaporation method (including a vacuum evaporation method), a transfer method, a printing method, an ink-jet method, or a coating method.

For example, the first layer 113a, the second layer 113b, and the third layer 113c may each include one or more of a hole-injection layer, a hole-transport layer, a hole-blocking layer, an electron-blocking layer, an electron-transport layer, and an electron-injection layer.

The common layer 114 can include one or more of a hole-injection layer, a hole-transport layer, a hole-blocking layer, an electron-blocking layer, an electron-transport layer, and an electron-injection layer. For example, a carrier-injection layer (a hole-injection layer or an electron-injection layer) may be formed as the common layer 114. Note that the light-emitting device does not necessarily include the common layer 114.

The first layer 113a, the second layer 113b, and the third layer 113c each preferably include a light-emitting layer and a carrier-transport layer over the light-emitting layer. Accordingly, the light-emitting layer is inhibited from being exposed on the outermost surface in the fabrication process of the display panel 100, so that damage to the light-emitting layer can be reduced. Thus, the reliability of the light-emitting device can be increased.

A hole-injection layer is a layer injecting holes from an anode to a hole-transport layer, and a layer containing a material with a high hole-injection property. Examples of the material with a high hole-injection property include an aromatic amine compound and a composite material containing a hole-transport material and an acceptor material (electron-accepting material).

A hole-transport layer is a layer transporting holes, which are injected from an anode by a hole-injection layer, to a light-emitting layer. The hole-transport layer is a layer containing a hole-transport material. As the hole-transport material, a substance having a hole mobility higher than or equal to $1\times10^{-6}$ cm$^2$/Vs is preferable. Note that other substances can also be used as long as the substances have a hole-transport property higher than an electron-transport property. As the hole-transport material, a material having a high hole-transport property, such as a π-electron rich heteroaromatic compound (e.g., a carbazole derivative, a thiophene derivative, or a furan derivative) or an aromatic amine (a compound having an aromatic amine skeleton), is preferable.

An electron-transport layer is a layer transporting electrons, which are injected from a cathode by an electron-injection layer, to a light-emitting layer. The electron-transport layer is a layer containing an electron-transport material. As the electron-transport material, a substance having an electron mobility higher than or equal to $1\times10^{-6}$ cm$^2$/Vs is preferable. Note that other substances can also be used as long as the substances have an electron-transport property higher than a hole-transport property. As the electron-transport material, it is possible to use a material having a high electron-transport property, such as a metal complex having a quinoline skeleton, a metal complex having a benzoquinoline skeleton, a metal complex having an oxazole skeleton, a metal complex having a thiazole skeleton, an oxadiazole derivative, a triazole derivative, an imidazole derivative, an oxazole derivative, a thiazole derivative, a phenanthroline derivative, a quinoline derivative having a quinoline ligand, a benzoquinoline derivative, a quinoxaline derivative, a dibenzoquinoxaline derivative, a pyridine derivative, a bipyridine derivative, a pyrimidine derivative, or a π-electron deficient heteroaromatic compound such as a nitrogen-containing heteroaromatic compound.

An electron-injection layer is a layer injecting electrons from a cathode to an electron-transport layer, and a layer containing a material with a high electron-injection property. As the material with a high electron-injection property, an alkali metal, an alkaline earth metal, or a compound thereof can be used. As the material with a high electron-injection property, a composite material containing an electron-transport material and a donor material (electron-donating material) can also be used.

The electron-injection layer can be formed using an alkali metal, an alkaline earth metal, or a compound thereof, such as lithium, cesium, ytterbium, lithium fluoride (LiF), cesium fluoride (CsF), calcium fluoride (CaF$_x$, where X is a given number), 8-(quinolinolato)lithium (abbreviation: Liq), 2-(2-pyridyl)phenolatolithium (abbreviation: LiPP), 2-(2-pyridyl)-3-pyridinolato lithium (abbreviation: LiPPy), 4-phenyl-2-(2-pyridyl)phenolatolithium (abbreviation: LiPPP), lithium oxide (LiO$_x$), or cesium carbonate, for example. In addition, the electron-injection layer may have a stacked-layer structure of two or more layers. In the stacked-layer structure, for example, lithium fluoride can be used for the first layer and ytterbium can be used for the second layer.

Alternatively, the electron-injection layer may be formed using an electron-transport material. For example, a compound having an unshared electron pair and an electron deficient heteroaromatic ring can be used as the electron-transport material. Specifically, a compound having at least one of a pyridine ring, a diazine ring (a pyrimidine ring, a pyrazine ring, and a pyridazine ring), and a triazine ring can be used.

Note that the lowest unoccupied molecular orbital (LUMO) level of the organic compound having an unshared electron pair is preferably higher than or equal to −3.6 eV and lower than or equal to −2.3 eV. In general, the highest occupied molecular orbital (HOMO) level and the LUMO level of an organic compound can be estimated by cyclic voltammetry (CV), photoelectron spectroscopy, optical absorption spectroscopy, inverse photoelectron spectroscopy, or the like.

For example, 4,7-diphenyl-1,10-phenanthroline (abbreviation: BPhen), 2,9-di(naphthalen-2-yl)-4,7-diphenyl-1,10-phenanthroline (abbreviation: NBPhen), diquinoxalino[2,3-a:2',3'-c]phenazine (abbreviation: HATNA), 2,4,6-tris[3'-(pyridin-3-yl)biphenyl-3-yl]-1,3,5-triazine (abbreviation: TmPPPyTz), or the like can be used as the organic compound having an unshared electron pair. Note that NBPhen has a higher glass transition temperature (Tg) than BPhen and thus has high heat resistance.

In the case of fabricating a tandem light-emitting device, a charge-generation layer (also referred to as an intermediate layer) is provided between two light-emitting units. The intermediate layer has a function of injecting electrons into one of the two light-emitting units and injecting holes to the other when voltage is applied between the pair of electrodes.

For the charge-generation layer, for example, a material that can be used for the electron-injection layer, such as lithium, can be suitably used. For the charge-generation layer, for example, a material that can be used for the hole-injection layer can be suitably used. For the charge-generation layer, a layer containing a hole-transport material and an acceptor material (electron-accepting material) can be used. For the charge-generation layer, a layer containing an electron-transport material and a donor material can be used. Forming such a charge-generation layer can inhibit an increase in the driving voltage in the case of stacking light-emitting units.

Thin films included in the display panel (e.g., insulating films, semiconductor films, and conductive films) can be formed by a sputtering method, a CVD method, a vacuum evaporation method, a PLD method, an ALD method, or the like. Examples of a CVD method include a PECVD method and a thermal CVD method. As an example of the thermal CVD method, a metal organic chemical vapor deposition (MOCVD: Metal Organic CVD) method can be given.

Alternatively, thin films included in the display panel (e.g., insulating films, semiconductor films, and conductive films) can be formed by a method such as spin coating, dipping, spray coating, ink-jetting, dispensing, screen printing, offset printing, doctor blade coating, slit coating, roll coating, curtain coating, or knife coating.

Specifically, for fabrication of the light-emitting device, a vacuum process such as an evaporation method and a solution process such as a spin coating method or an ink-jet method can be used. Examples of an evaporation method include physical vapor deposition methods (PVD methods) such as a sputtering method, an ion plating method, an ion beam evaporation method, a molecular beam evaporation method, and a vacuum evaporation method, and a chemical vapor deposition method (CVD method). Specifically, the functional layers (e.g., the hole-injection layer, the hole-transport layer, the light-emitting layer, the electron-transport layer, and the electron-injection layer) included in the EL layers can be formed by a method such as an evaporation method (e.g., a vacuum evaporation method), a coating method (e.g., a dip coating method, a die coating method, a bar coating method, a spin coating method, or a spray coating method), or a printing method (e.g., an ink-jet method, a screen printing (stencil) method, an offset printing (planography) method, a flexography (relief printing) method, a gravure printing method, or a micro-contact printing method).

Thin films included in the display panel can be processed by a photolithography method or the like. Alternatively, thin films may be processed by a nanoimprinting method, a sandblasting method, a lift-off method, or the like. Alternatively, island-shaped thin films may be directly formed by a film formation method using a shielding mask such as a metal mask.

There are the following two typical examples of a photolithography method. In one of the methods, a resist mask is formed over a thin film that is to be processed, the thin film is processed by etching or the like, and then the resist mask is removed. In the other method, a photosensitive thin film is formed and then processed into a desired shape by light exposure and development.

As the light used for light exposure in the photolithography method, for example, an i-line (wavelength: 365 nm), a g-line (wavelength: 436 nm), an h-line (wavelength: 405 nm), or combined light of any of them can be used. Alternatively, ultraviolet light, KrF laser light, ArF laser light, or the like can be used. In addition, light exposure may be performed by liquid immersion exposure technique. As the light used for the light exposure, extreme ultraviolet light (EUV) or X-rays may be used. Furthermore, instead of the light used for the light exposure, an electron beam can also be used. Extreme ultraviolet light, X-rays, or an electron beam is preferably used to enable extremely minute processing. Note that in the case of performing light exposure by scanning of a beam such as an electron beam, a photomask is not needed.

For etching of thin films, a dry etching method, a wet etching method, a sandblasting method, or the like can be used.

As described above, in the method for fabricating the display panel of this embodiment, the island-shaped EL layers are formed not by using a metal mask having a fine pattern but by processing an EL layer formed over the entire surface. Thus, the size of the island-shaped EL layer or even the size of the subpixel can be smaller than that obtained through the formation with a metal mask. Accordingly, a high-resolution display panel or a display panel with a high aperture ratio, which has been difficult to achieve, can be obtained.

Since light-emitting devices for different emission colors are separately formed in the display panel of one embodiment of the present invention, the carrier balance can be easily adjusted and the emission color at a low luminance is less different from that at a high luminance. Each subpixel includes an island-shaped EL layer, which can inhibit generation of leakage current between the subpixels. Accordingly, degradation of the display quality of the display panel can be inhibited. In addition, the display panel can have both high resolution and high display quality.

This embodiment can be combined with the other embodiments as appropriate.

Embodiment 6

In this embodiment, a display panel of one embodiment of the present invention will be described with reference to FIG. 25 to FIG. 28.

[Pixel Layout]

In this embodiment, pixel layouts different from that in FIG. 18A are mainly described. There is no particular limitation on the arrangement of subpixels, and a variety of methods can be employed. Examples of the arrangement of subpixels include stripe arrangement, S-stripe arrangement, matrix arrangement, delta arrangement, Bayer arrangement, and PenTile arrangement.

Examples of a top surface shape of the subpixel include polygons such as a triangle, a quadrangle (including a rectangle and a square), and a pentagon; polygons with rounded corners; an ellipse; and a circle. Here, the top surface shape of the subpixel corresponds to the top surface shape of a light-emitting region of the light-emitting device.

The pixel 110 illustrated in FIG. 25A employs S-stripe arrangement. The pixel 110 illustrated in FIG. 25A is composed of three subpixels 110a, 110b, and 110c. For example, as illustrated in FIG. 27A, the subpixel 110a may be a blue subpixel B, the subpixel 110b may be a red subpixel R, and the subpixel 110c may be a green subpixel G.

The pixel 110 illustrated in FIG. 25B includes the subpixel 110a whose top surface has a rough trapezoidal shape with rounded corners, the subpixel 110b whose top surface has a rough triangle shape with rounded corners, and the subpixel 110c whose top surface has a rough quadrangle or rough hexagonal shape with rounded corners. The subpixel 110a has a larger light-emitting area than the subpixel 110b. In this manner, the shapes and sizes of the subpixels can be determined independently. For example, the size of a subpixel including a light-emitting device with higher reliability can be smaller. For example, as illustrated in FIG. 27B, the subpixel 110a may be the green subpixel G, the subpixel 110b may be the red subpixel R, and the subpixel 110c may be the blue subpixel B.

Pixels 124a and 124b illustrated in FIG. 25C employ PenTile arrangement. FIG. 25C illustrates an example in which the pixels 124a each including the subpixel 110a and the subpixel 110b and the pixels 124b each including the subpixel 110b and the subpixel 110c are alternately arranged. For example, as illustrated in FIG. 27C, the subpixel 110a may be the red subpixel R, the subpixel 110b may be the green subpixel G, and the subpixel 110c may be the blue subpixel B.

The pixels 124a and 124b illustrated in FIG. 25D and FIG. 25E employ delta arrangement. The pixel 124a includes two subpixels (the subpixels 110a and 110b) in the upper row (first row) and one subpixel (the subpixel 110c) in the lower row (second row). The pixel 124b includes one subpixel (the subpixel 110c) in the upper row (first row) and two subpixels (the subpixels 110a and 110b) in the lower row (second row). For example, as illustrated in FIG. 27D, the subpixel 110*a* may be the red subpixel R, the subpixel 110*b* may be the green subpixel G, and the subpixel 110*c* may be the blue subpixel B.

FIG. 25D illustrates an example in which the top surface of each subpixel has a rough quadrangle shape with rounded corners, and FIG. 25E illustrates an example in which the top surface shape of each subpixel is circular.

FIG. 25F illustrates an example in which subpixels of different colors are arranged in a zigzag manner. Specifically, the positions of the top sides of two subpixels arranged in the column direction (e.g., the subpixel 110*a* and the subpixel 110*b* or the subpixel 110*b* and the subpixel 110*c*) are not aligned in the top view. For example, as illustrated in FIG. 27E, the subpixel 110*a* may be the red subpixel R, the subpixel 110*b* may be the green subpixel G, and the subpixel 110*c* may be the blue subpixel B.

In a photolithography method, as a pattern to be formed by processing becomes finer, the influence of light diffraction becomes more difficult to ignore; accordingly, the fidelity in transferring a photomask pattern by light exposure is degraded, and it becomes difficult to process a resist mask into a desired shape. Thus, a pattern with rounded corners is likely to be formed even with a rectangular photomask pattern. Consequently, the top surface of a subpixel may have a polygonal shape with rounded corners, an elliptical shape, a circular shape, or the like.

Furthermore, in the method for fabricating the display panel of one embodiment of the present invention, the EL layer is processed into an island shape with the use of a resist mask. A resist film formed over the EL layer needs to be cured at a temperature lower than the upper temperature limit of the EL layer. Thus, the resist film is insufficiently cured in some cases depending on the upper temperature limit of the material of the EL layer and the curing temperature of the resist material. An insufficiently cured resist film may have a shape different from a desired shape by processing. As a result, the top surface of the EL layer may have a polygonal shape with rounded corners, an elliptical shape, a circular shape, or the like. For example, when a resist mask with a square top surface shape is intended to be formed, a resist mask with a circular top surface shape may be formed, and the top surface shape of the EL layer may be circular.

Note that to obtain a desired top surface shape of the EL layer, a technique of correcting a mask pattern in advance such that a transferred pattern agrees with a design pattern (an OPC (Optical Proximity Correction) technique) may be used. Specifically, with the OPC technique, a pattern for correction is added to a corner portion or the like of a figure on a mask pattern.

Also in the pixel 110 illustrated in FIG. 18A, which employs stripe arrangement, for example, the subpixel 110*a* can be the red subpixel R, the subpixel 110*b* can be the green subpixel G, and the subpixel 110*c* can be the blue subpixel B as illustrated in FIG. 27F.

As illustrated in FIG. 26A to FIG. 26H, the pixel can include four types of subpixels.

Figure 26A:
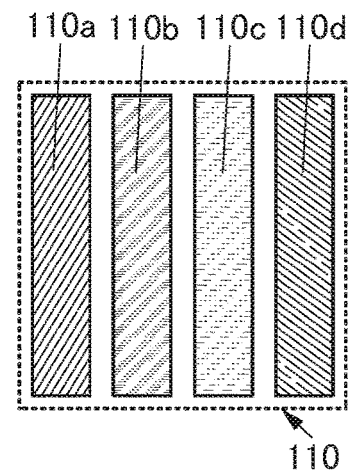
FIG. 26A to FIG. 26H are top views illustrating examples of a pixel.
Figure 26B:
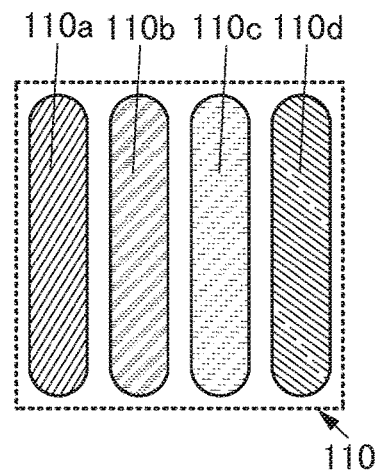
Figure 26C:
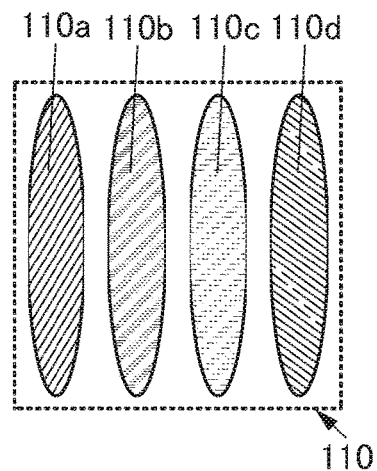

The pixels 110 illustrated in FIG. 26A to FIG. 26C employ stripe arrangement.

FIG. 26A illustrates an example in which each subpixel has a rectangular top surface shape, FIG. 26B illustrates an example in which each subpixel has a top surface shape formed by combining two half circles and a rectangle, and FIG. 26C illustrates an example in which each subpixel has an elliptical top surface shape.

Figure 26D:
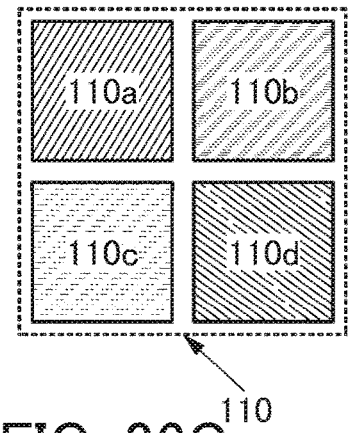
Figure 26E:
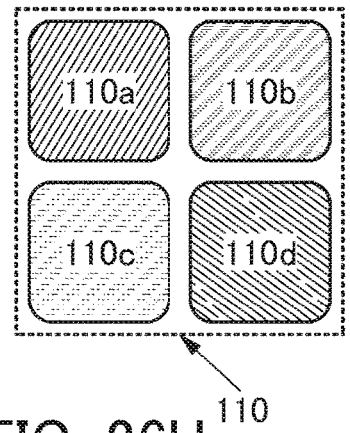
Figure 26F:
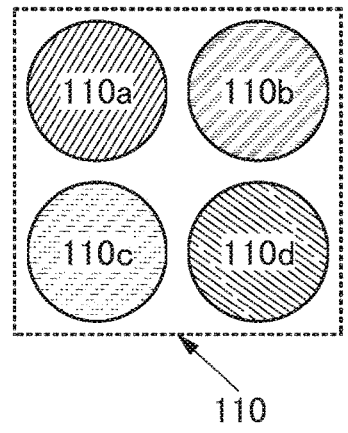

The pixels 110 illustrated in FIG. 26D to FIG. 26F employ matrix arrangement.

FIG. 26D illustrates an example in which each subpixel has a square top surface shape, FIG. 26E illustrates an example in which each subpixel has a rough square top surface shape with rounded corners, and FIG. 26F illustrates an example in which each subpixel has a circular top surface shape.

Figure 26G:
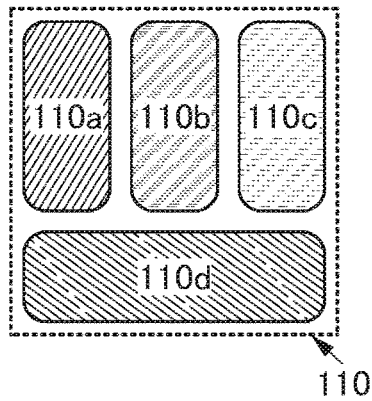
Figure 26H:
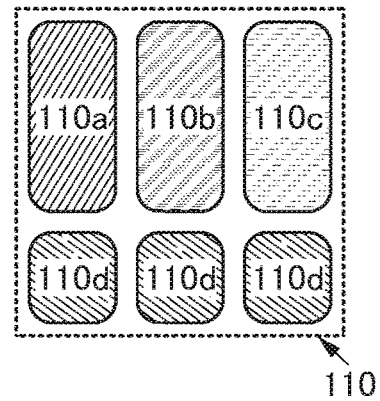

FIG. 26G and FIG. 26H each illustrate an example in which one pixel 110 is composed of two rows and three columns.

The pixel 110 illustrated in FIG. 26G includes three subpixels (the subpixels 110*a*, 110*b*, and 110*c*) in the upper row (first row) and one subpixel (the subpixel 110*d*) in the lower row (second row). In other words, the pixel 110 includes the subpixel 110*a* in the left column (first column), the subpixel 110*b* in the center column (second column), the subpixel 110*c* in the right column (third column), and the subpixel 110*d* across these three columns.

The pixel 110 illustrated in FIG. 26H includes three subpixels (the subpixels 110*a*, 110*b*, and 110*c*) in the upper row (first row) and three subpixels 110*d* in the lower row (second row). In other words, the pixel 110 includes the subpixel 110*a* and the subpixel 110*d* in the left column (first column), the subpixel 110*b* and another subpixel 110*d* in the center column (second column), and the subpixel 110*c* and another subpixel 110*d* in the right column (third column). Aligning the positions of the subpixels in the upper row and the lower row as illustrated in FIG. 26H enables dust and the like that would be produced in the manufacturing process to be removed efficiently. Thus, a display panel with high display quality can be provided.

The pixels 110 illustrated in FIG. 26A to FIG. 26H are each composed of the four subpixels 110*a*, 110*b*, 110*c*, and 110*d*. The subpixels 110*a*, 110*b*, 110*c*, and 110*d* include light-emitting devices that emit light of different colors. The subpixels 110*a*, 110*b*, 110*c*, and 110*d* can be, for example, subpixels of four colors of R, G, B, and white (W), subpixels of four colors of R, G, B, and Y, or four subpixels of R, G, B, and infrared light (IR). For example, the subpixels 110*a*, 110*b*, 110*c*, and 110*d* can be red, green, blue, and white subpixels, respectively, as illustrated in FIG. 27G to FIG. 27J.

The display panel of one embodiment of the present invention may include a light-receiving device in the pixel.

Three of the four subpixels included in each of the pixels 110 illustrated in FIG. 27G to FIG. 27J may include light-emitting devices and the other one may include a light-receiving device.

For example, the subpixels 110*a*, 110*b*, and 110*c* may be subpixels of three colors of R, G, and B, and the subpixel 110*d* may be a subpixel including a light-receiving device.

Figure 28A:
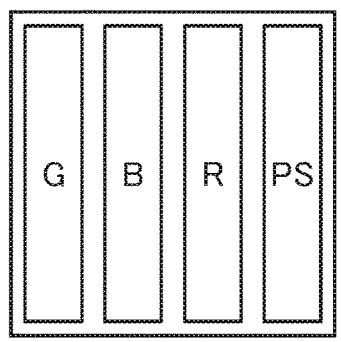
FIG. 28A to FIG. 28D are top views illustrating examples of a pixel.
Figure 28B:
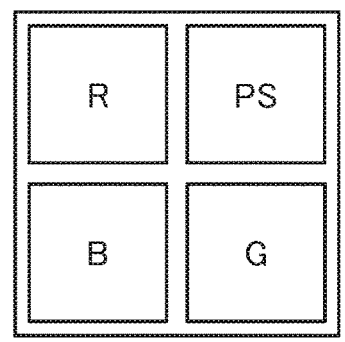

Pixels illustrated in FIG. 28A and FIG. 28B each include the subpixel G, the subpixel B, the subpixel R, and a subpixel PS. Note that the arrangement order of the subpixels is not limited to the structures illustrated in the drawings and can be determined as appropriate. For example, the positions of the subpixel G and the subpixel R may be interchanged with each other.

The pixel illustrated in FIG. 28A employs stripe arrangement. The pixel illustrated in FIG. 28B employs matrix arrangement.

The subpixel R includes a light-emitting device that emits red light. The subpixel G includes a light-emitting device that emits green light. The subpixel B includes a light-emitting device that emits blue light.

The subpixel PS includes a light-receiving device. There is no particular limitation on the wavelength of light detected by the subpixel PS. The subpixel PS can have a structure capable of detecting one or both of infrared light and visible light.

Figure 28C:
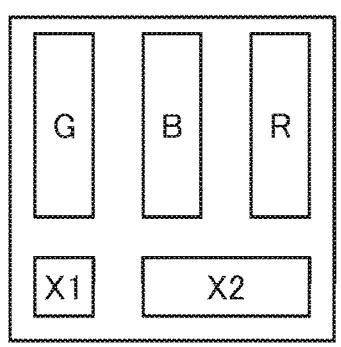
Figure 28D:
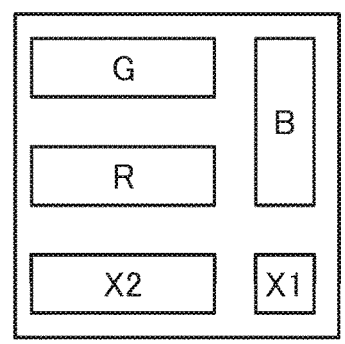

Pixels illustrated in FIG. 28C and FIG. 28D each include the subpixel G, the subpixel B, the subpixel R, a subpixel X1, and a subpixel X2. Note that the arrangement order of the subpixels is not limited to the structures illustrated in the drawings and can be determined as appropriate. For example, the positions of the subpixel G and the subpixel R may be interchanged with each other.

FIG. 28C illustrates an example in which one pixel is provided in two rows and three columns. Three subpixels (the subpixel G, the subpixel B, and the subpixel R) are provided in the upper row (first row). In FIG. 28C, two subpixels (the subpixel X1 and the subpixel X2) are provided in the lower row (second row).

FIG. 28D illustrates an example in which one pixel is composed of three rows and two columns. In FIG. 28D, the pixel includes the subpixel G in the first row, the subpixel R in the second row, and the subpixel B across these two rows. In addition, two subpixels (the subpixel X1 and the subpixel X2) are provided in the third row. In other words, the pixel illustrated in FIG. 28D includes three subpixels (the subpixel G, the subpixel R, and the subpixel X2) in the left column (first column) and two subpixels (the subpixel B and the subpixel X1) in the right column (second column).

The layout of the subpixels R, G, and B illustrated in FIG. 28C is stripe arrangement. The layout of the subpixels R, G, and B illustrated in FIG. 28D is what is called S stripe arrangement. Thus, high display quality can be achieved.

At least one of the subpixel X1 and the subpixel X2 preferably includes the light-receiving device (i.e., at least one of the subpixel X1 and the subpixel X2 is preferably the subpixel PS).

Note that the pixel layout including the subpixel PS is not limited to the structures illustrated in FIG. 28A to FIG. 28D.

The subpixel X1 or the subpixel X2 can include a light-emitting device that emits infrared light (IR), for example. In that case, the subpixel PS preferably detects infrared light. For example, with one of the subpixel X1 and the subpixel X2 used as a light source, reflected light of light emitted from the light source can be detected by the other of the subpixel X1 and the subpixel X2 while an image is displayed using the subpixels R, G, and B.

A structure including a light-receiving device can be used for both the subpixel X1 and the subpixel X2. In that case, the wavelength range of light detected by the subpixel X1 may be the same as, different from, or partially the same as the wavelength range of light detected by the subpixel X2. For example, one of the subpixel X1 and the subpixel X2 may mainly detect visible light and the other may mainly detect infrared light.

The light-receiving area of the subpixel X1 is smaller than the light-receiving area of the subpixel X2. A smaller light-receiving area leads to a narrower image-capturing range, inhibits a blur in a captured image, and improves the definition. Thus, the use of the subpixel X1 enables higher-resolution or higher-definition image capturing than the use of the light-receiving device included in the subpixel X2. For example, image capturing for personal authentication with the use of a fingerprint, a palm print, the iris, the shape of a blood vessel (including the shape of a vein and the shape of an artery), a face, or the like is possible by using the subpixel X1.

The light-receiving device included in the subpixel PS preferably detects visible light, and preferably detects one or more of blue light, violet light, bluish violet light, green light, yellowish green light, yellow light, orange light, red light, and the like. The light-receiving device included in the subpixel PS may detect infrared light.

In the case where the subpixel X2 has a structure including the light-receiving device, the subpixel X2 can be used in a touch sensor (also referred to as a direct touch sensor), a near touch sensor (also referred to as a hover sensor, a hover touch sensor, a contactless sensor, or a touchless sensor), or the like. The wavelength of light detected by the subpixel X2 can be determined as appropriate depending on the application purpose. For example, the subpixel X2 preferably detects infrared light. Thus, a touch can be detected even in a dark place.

Here, a touch sensor or a near touch sensor can detect an approach or contact of an object (e.g., a finger, a hand, or a pen).

The touch sensor can detect an object when the display panel and the object come in direct contact with each other. The near touch sensor can detect an object even when the object is not in contact with the display panel. For example, the display panel is preferably capable of detecting an object when the distance between the display panel and the object is greater than or equal to 0.1 mm and less than or equal to 300 mm, preferably greater than or equal to 3 mm and less than or equal to 50 mm. With this structure, the display panel can be operated without an object directly contacting with the display panel; in other words, the display panel can be operated in a contactless (touchless) manner. With the above-described structure, the display panel can have a reduced risk of being dirty or damaged, or can be operated without the object directly touching a dirt (e.g., dust or a virus) attached to the display panel.

The refresh rate of the display panel of one embodiment of the present invention can be variable. For example, the refresh rate is adjusted (adjusted within the range of 1 Hz to 240 Hz, for example) in accordance with contents displayed on the display panel, whereby power consumption can be reduced. The driving frequency of the touch sensor or the near touch sensor may be changed in accordance with the refresh rate. In the case where the refresh rate of the display panel is 120 Hz, for example, the driving frequency of the touch sensor or the near touch sensor can be higher than 120 Hz (typically 240 Hz). This structure reduces power consumption and increases the response speed of the touch sensor or the near touch sensor.

Figure 28E:
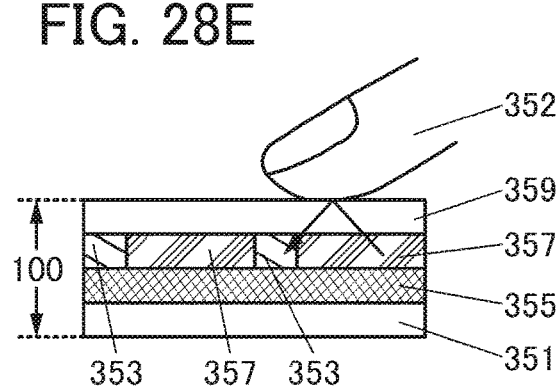
FIG. 28E to FIG. 28G are cross-sectional views illustrating examples of a display panel.
Figure 28F:
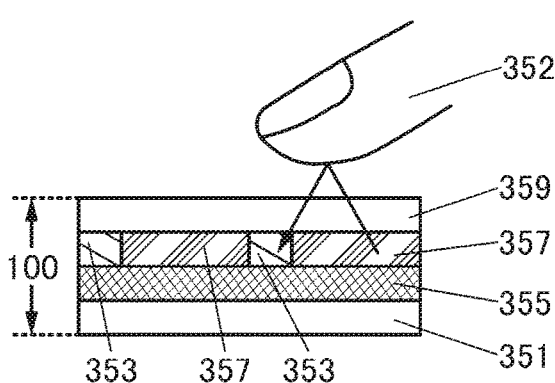
Figure 28G:
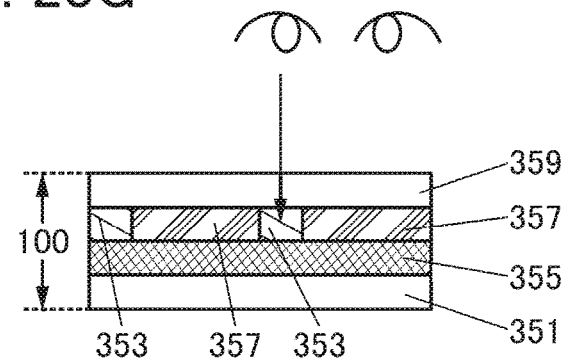

The display panel 100 illustrated in FIG. 28E to FIG. 28G includes a layer 353 including a light-receiving device, a functional layer 355, and a layer 357 including a light-emitting device, between a substrate 351 and a substrate 359.

The functional layer 355 includes a circuit for driving a light-receiving device and a circuit for driving a light-emitting device. A switch, a transistor, a capacitor, a resistor, a wiring, a terminal, and the like can be provided in the functional layer 355. Note that in the case where the light-emitting device and the light-receiving device are driven by a passive-matrix method, a structure not provided with a switch or a transistor may be employed.

For example, after light emitted from the light-emitting device in the layer 357 including a light-emitting device is reflected by a finger 352 that touches the display panel 100 as illustrated in FIG. 28E, the light-receiving device in the layer 353 including a light-receiving device detects the reflected light. Thus, the touch of the finger 352 on the display panel 100 can be detected.

Alternatively, the display panel may have a function of detecting an object that is close to (but is not touching) the display panel as illustrated in FIG. 28F and FIG. 28G or capturing an image of such an object. FIG. 28F illustrates an example in which a human finger is detected, and FIG. 28G illustrates an example in which information on the periphery, surface, or inside of the human eye (e.g., the number of blinks, the movement of an eyeball, and the movement of an eyelid) is detected.

In the display panel of this embodiment, an image of the periphery of an eye, the surface of the eye, or the inside (fundus or the like) of the eye of a user of a wearable device can be captured with the use of the light-receiving device. Therefore, the wearable device can have a function of detecting one or more selected from a blink, movement of an iris, and movement of an eyelid of the user.

As described above, the pixel composed of the subpixels each including the light-emitting device can employ any of a variety of layouts in the display panel of one embodiment of the present invention. The display panel of one embodiment of the present invention can have a structure in which the pixel includes both a light-emitting device and a light-receiving device. Also in this case, any of a variety of layouts can be employed.

This embodiment can be combined with the other embodiments as appropriate.

Embodiment 7

In this embodiment, display panels of embodiments of the present invention will be described with reference to FIG. 29 to FIG. 39.

The display panel of this embodiment can be a high-resolution display panel. Accordingly, the display panel of this embodiment can be used for display portions of information terminals (wearable devices) such as watch-type and bracelet-type information terminals and display portions of wearable devices capable of being worn on a head, such as a VR device like a head-mounted display and a glasses-type AR device.

The display panel of this embodiment can be a high-definition display panel or a large-sized display panel. Accordingly, the display panel of this embodiment can be used for display portions of electronic devices such as a digital camera, a digital video camera, a digital photo frame, a mobile phone, a portable game console, a portable information terminal, and an audio reproducing device, in addition to display portions of electronic devices with a relatively large screen, such as a television device, a desktop or laptop personal computer, a monitor of a computer and the like, digital signage, and a large game machine such as a pachinko machine.

Since the light-emitting devices for different emission colors are separately formed in the display panel of this embodiment, the difference between the chromaticity at low luminance emission and that at high luminance emission is small. Furthermore, since the EL layers of the light-emitting devices are separated from each other in the display panel of this embodiment, generation of crosstalk between adjacent subpixels can be inhibited even when the display panel has high resolution. Accordingly, the display panel can have high resolution and high display quality.

Thus, the display panel of this embodiment can be used for the display portion of the electronic device of one embodiment of the present invention.

[Display Module]

Figure 29A:
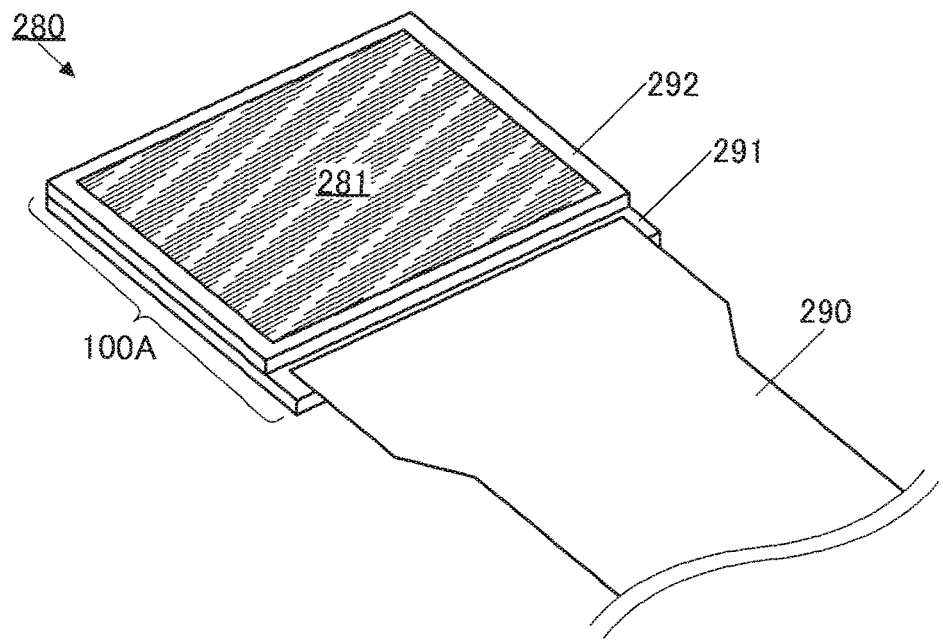
FIG. 29A and FIG. 29B are perspective views illustrating an example of a display panel.

FIG. 29A is a perspective view of a display module 280. The display module 280 includes a display panel 100A and an FPC 290. Note that the display panel included in the display module 280 is not limited to the display panel 100A and may be any of a display panel 100B to a display panel 100F described later.

The display module 280 includes a substrate 291 and a substrate 292. The display module 280 includes a display portion 281. The display portion 281 is a region of the display module 280 where an image is displayed, and is a region where light from pixels provided in a pixel portion 284 described later can be seen.

Figure 29B:
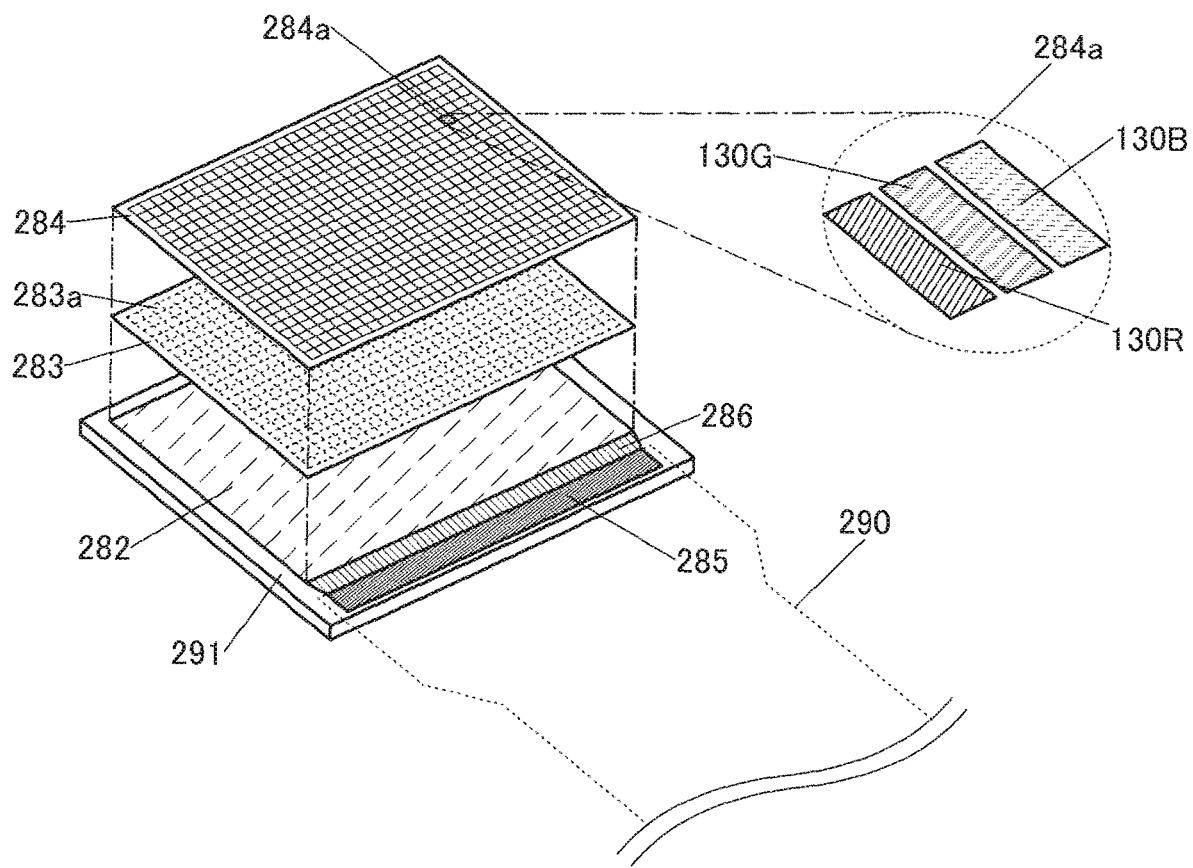

FIG. 29B is a perspective view schematically illustrating a structure on the substrate 291 side. Over the substrate 291, a circuit portion 282, a pixel circuit portion 283 over the circuit portion 282, and the pixel portion 284 over the pixel circuit portion 283 are stacked. A terminal portion 285 to be connected to the FPC 290 is provided in a portion over the substrate 291 that does not overlap with the pixel portion 284. The terminal portion 285 and the circuit portion 282 are electrically connected to each other through a wiring portion 286 formed of a plurality of wirings.

The pixel portion 284 includes a plurality of pixels 284a arranged periodically. An enlarged view of one pixel 284a is illustrated on the right side of FIG. 29B. The pixel 284a includes a light-emitting device 130R that emits red light, a light-emitting device 130G that emits green light, and a light-emitting device 130B that emits blue light.

The display portion 281 corresponds to the display portion 11 described in Embodiment 1. The pixels 284a correspond to the pixels 17 described in Embodiment 1. The pixels 284a correspond to the pixels 110 described in Embodiment 4.

The pixel circuit portion 283 includes a plurality of pixel circuits 283a arranged periodically.

One pixel circuit 283a is a circuit that controls light emission of three light-emitting devices included in one pixel 284a. One pixel circuit 283a may be provided with three circuits for controlling light emission of the respective light-emitting devices. For example, the pixel circuit 283a can include at least one selection transistor, one current control transistor (driving transistor), and a capacitor for one light-emitting device. In this case, a gate signal is input to a gate of the selection transistor, and a source signal is input to a source of the selection transistor. With such a structure, an active-matrix display panel is achieved.

The circuit portion 282 includes a circuit for driving the pixel circuits 283a in the pixel circuit portion 283. For example, one or both of a gate line driver circuit and a source line driver circuit are preferably included. In addition, at least one of an arithmetic circuit, a memory circuit, a power supply circuit, and the like may be included.

The FPC 290 functions as a wiring for supplying a video signal, a power supply potential, or the like to the circuit portion 282 from the outside. An IC may be mounted on the FPC 290.

The display module 280 can have a structure in which one or both of the pixel circuit portion 283 and the circuit portion 282 are stacked below the pixel portion 284; thus, the aperture ratio (the effective display area ratio) of the display portion 281 can be extremely high. For example, the aperture ratio of the display portion 281 can be higher than or equal to 40% and lower than 100%, preferably higher than or equal to 50% and lower than or equal to 95%, further preferably higher than or equal to 60% and lower than or equal to 95%. Furthermore, the pixels 284a can be arranged extremely densely and thus the display portion 281 can have an extremely high resolution. For example, the pixels 284a are preferably arranged in the display portion 281 with a resolution higher than or equal to 2000 ppi, preferably higher than or equal to 3000 ppi, further preferably higher than or equal to 5000 ppi, still further preferably higher than or equal to 6000 ppi, and lower than or equal to 20000 ppi or lower than or equal to 30000 ppi.

Such a display module 280 has an extremely high resolution, and thus can be suitably used for a VR device such as a head-mounted display or a glasses-type AR device. For example, even with a structure in which the display portion of the display module 280 is seen through a lens, pixels of the extremely-high-resolution display portion 281 included in the display module 280 are prevented from being seen when the display portion is enlarged by the lens, so that display providing a high sense of immersion can be performed. Without being limited thereto, the display module 280 can be suitably used for electronic devices including a relatively small display portion. For example, the display module 280 can be suitably used in a display portion of a wearable electronic device, such as a watch.

[Display Panel 100A]

Figure 30A:
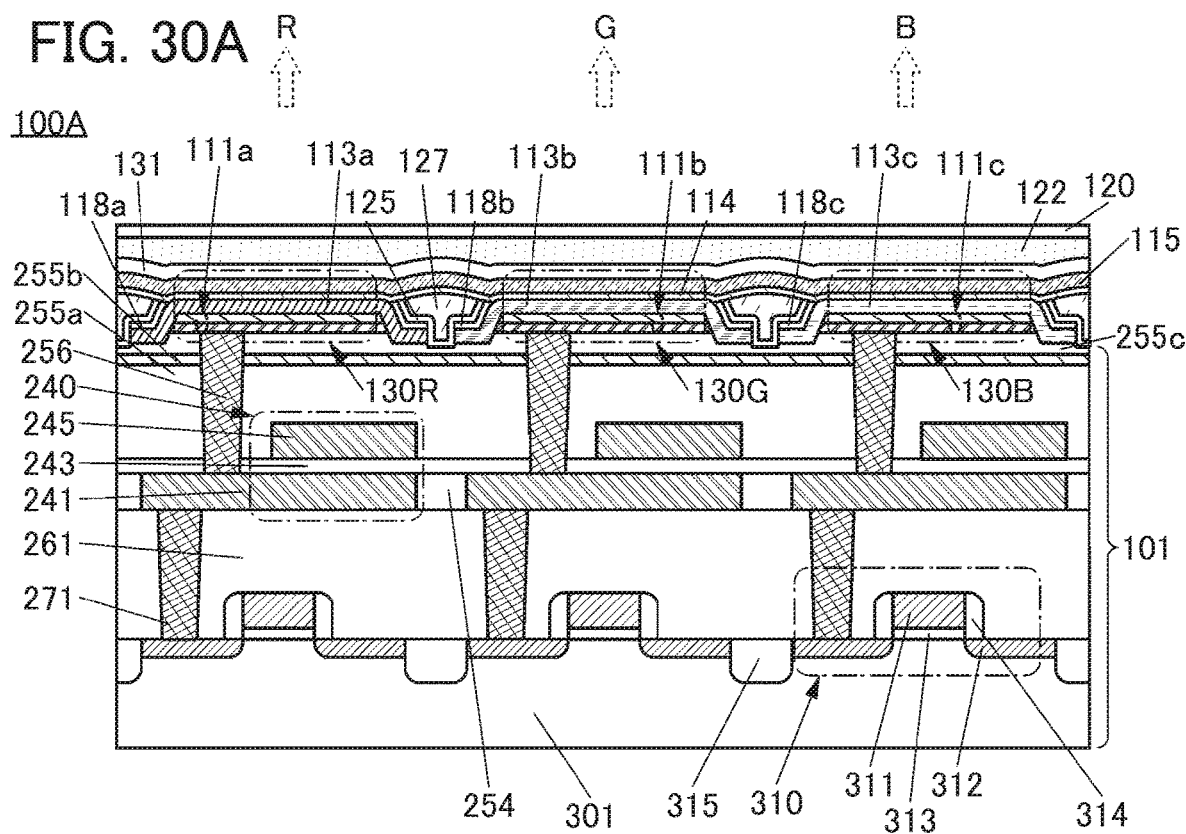
FIG. 30A and FIG. 30B are cross-sectional views illustrating examples of a display panel.

The display panel 100A illustrated in FIG. 30A includes a substrate 301, the light-emitting devices 130R, 130G, and 130B, a capacitor 240, and a transistor 310.

The substrate 301 corresponds to the substrate 291 in FIG. 29A and FIG. 29B. A stacked-layer structure including the substrate 301 and the components thereover up to the insulating layer 255c corresponds to the layer 101 in Embodiment 5.

The transistor 310 is a transistor including a channel formation region in the substrate 301. As the substrate 301, a semiconductor substrate such as a single crystal silicon substrate can be used, for example. The transistor 310 includes part of the substrate 301, a conductive layer 311, low-resistance regions 312, an insulating layer 313, and an insulating layer 314. The conductive layer 311 functions as a gate electrode. The insulating layer 313 is positioned between the substrate 301 and the conductive layer 311 and functions as a gate insulating layer. The low-resistance region 312 is a region where the substrate 301 is doped with an impurity, and functions as one of a source and a drain. The insulating layer 314 is provided to cover the side surface of the conductive layer 311 and functions as an insulating layer.

An element isolation layer 315 is provided between two adjacent transistors 310 to be embedded in the substrate 301.

An insulating layer 261 is provided to cover the transistor 310, and the capacitor 240 is provided over the insulating layer 261.

The capacitor 240 includes a conductive layer 241, a conductive layer 245, and an insulating layer 243 positioned therebetween. The conductive layer 241 functions as one electrode of the capacitor 240, the conductive layer 245 functions as the other electrode of the capacitor 240, and the insulating layer 243 functions as a dielectric of the capacitor 240.

The conductive layer 241 is provided over the insulating layer 261 and is embedded in an insulating layer 254. The conductive layer 241 is electrically connected to one of the source and the drain of the transistor 310 through a plug 271 embedded in the insulating layer 261. The insulating layer 243 is provided to cover the conductive layer 241. The conductive layer 245 is provided in a region overlapping with the conductive layer 241 with the insulating layer 243 therebetween.

The insulating layer 255a is provided to cover the capacitor 240, the insulating layer 255b is provided over the insulating layer 255a, and the insulating layer 255c is provided over the insulating layer 255b.

As each of the insulating layer 255a, the insulating layer 255b, and the insulating layer 255c, any of a variety of inorganic insulating films such as an oxide insulating film, a nitride insulating film, an oxynitride insulating film, and a nitride oxide insulating film can be suitably used. As each of the insulating layer 255a and the insulating layer 255c, an oxide insulating film or an oxynitride insulating film, such as a silicon oxide film, a silicon oxynitride film, or an aluminum oxide film, is preferably used. As the insulating layer 255b, a nitride insulating film or a nitride oxide insulating film, such as a silicon nitride film or a silicon nitride oxide film, is preferably used. Specifically, it is preferable that a silicon oxide film be used as each of the insulating layer 255a and the insulating layer 255c and a silicon nitride film be used as the insulating layer 255b. The insulating layer 255b preferably has a function of an etching protective film. Although this embodiment describes an example in which a depressed portion is provided in the insulating layer 255c, a depressed portion is not necessarily provided in the insulating layer 255c.

The light-emitting device 130R, the light-emitting device 130G, and the light-emitting device 130B are provided over the insulating layer 255c. FIG. 30A illustrates an example in which the light-emitting device 130R, the light-emitting device 130G, and the light-emitting device 130B each have the stacked-layer structure illustrated in FIG. 18B.

Since the light-emitting devices for different emission colors are separately formed in the display panel 100A, the difference between the chromaticity at low luminance emission and that at high luminance emission is small. Furthermore, since the first layer 113a, the second layer 113b, and the third layer 113c are separated and are apart from each other, generation of crosstalk between adjacent subpixels can be inhibited even when the display panel has high resolution. Accordingly, the display panel can have high resolution and high display quality.

An insulator is provided in a region between adjacent light-emitting devices. In FIG. 30A and the like, the insulating layer 125 and the insulating layer 127 over the insulating layer 125 are provided in this region.

The sacrificial layer 118a is positioned over the first layer 113a of the light-emitting device 130R, the sacrificial layer 118b is positioned over the second layer 113b of the light-emitting device 130G, and the sacrificial layer 118c is positioned over the third layer 113c of the light-emitting device 130B.

The pixel electrode 111a, the pixel electrode 111b, and the pixel electrode 111c of the light-emitting device are each electrically connected to one of the source and the drain of the transistor 310 through a plug 256 embedded in the insulating layer 243, the insulating layer 255a, the insulating layer 255b, and the insulating layer 255c, the conductive layer 241 embedded in the insulating layer 254, and the plug 271 embedded in the insulating layer 261. The top surface of the insulating layer 255c is level or substantially level with the top surface of the plug 256. A variety of conductive materials can be used for the plugs.

The protective layer 131 is provided over the light-emitting device 130R, the light-emitting device 130G, and the light-emitting device 130B. The substrate 120 is bonded to the protective layer 131 with the resin layer 122. Embodiment 5 can be referred to for the details of the light-emitting devices and the components thereover up to the substrate 120. The substrate 120 corresponds to the substrate 292 in FIG. 29A.

An insulating layer covering the end portion of the top surface of the pixel electrode 111a is not provided between the pixel electrode 111a and the first layer 113a. An insulating layer covering the end portion of the top surface of the pixel electrode 111b is not provided between the pixel electrode 111b and the second layer 113b. Thus, the distance between adjacent light-emitting devices can be extremely shortened. Accordingly, the display panel can have high resolution or high definition.

Although the display panel 100A includes the light-emitting devices 130R, 130G, and 130B in this example, the display panel of this embodiment may further include a light-receiving device.

Figure 30B:
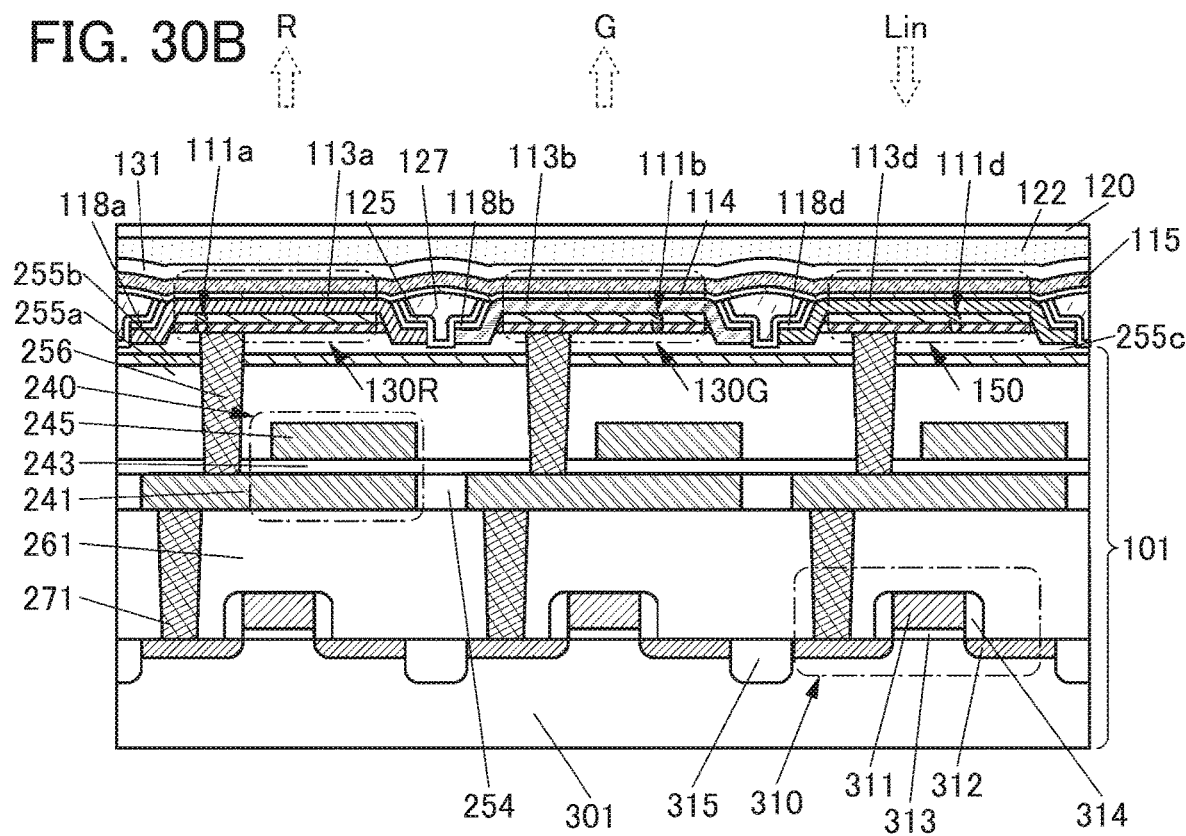

The display panel illustrated in FIG. 30B includes the light-emitting devices 130R and 130G and the light-receiving device 150. The light-receiving device 150 includes the pixel electrode 111d, the fourth layer 113d, the common layer 114, and the common electrode 115 that are stacked. Embodiment 5 can be referred to for the details of the components of the light-receiving device 150.

[Display Panel 100B]

Figure 31:
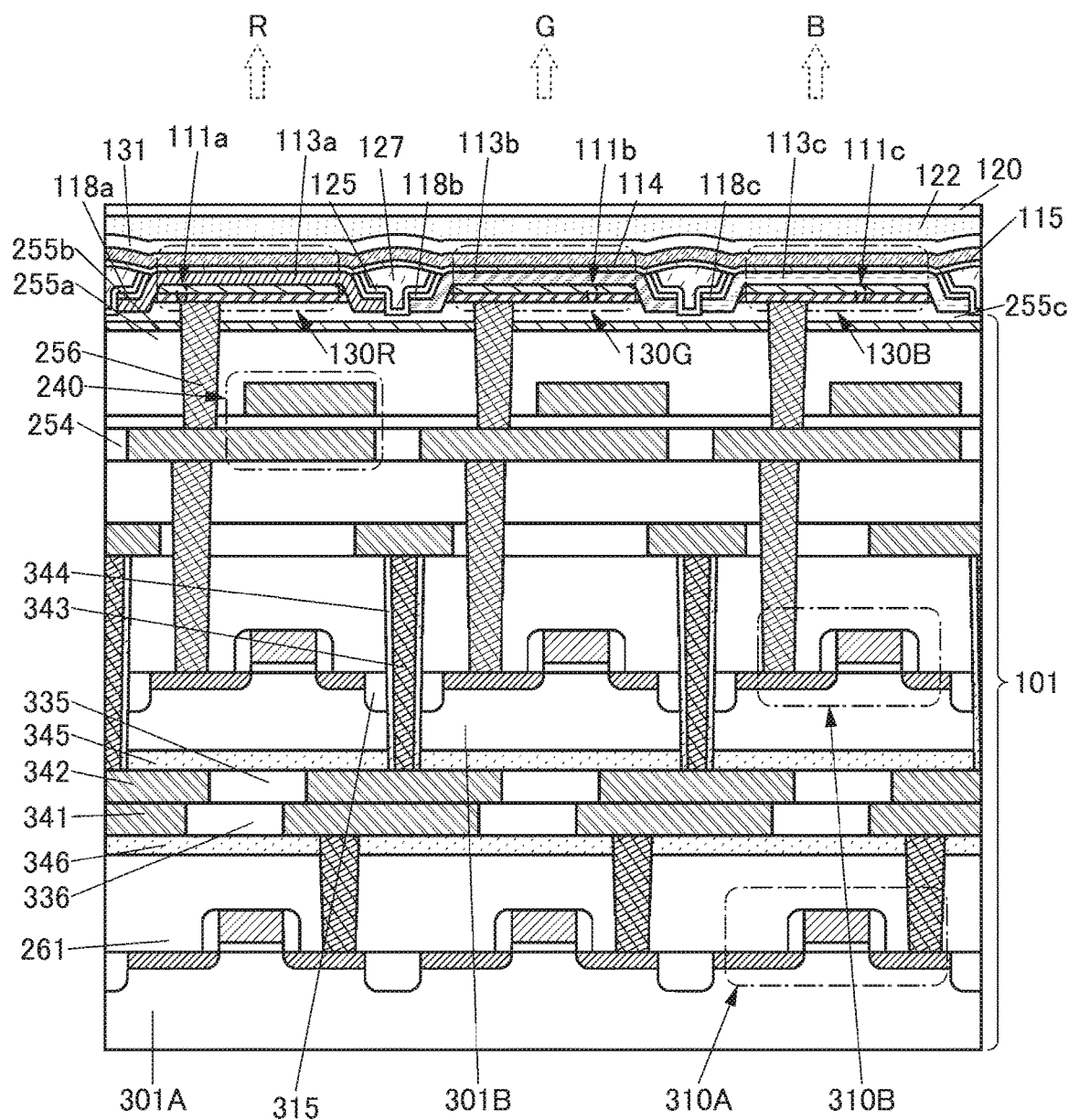
FIG. 31 is a cross-sectional view illustrating an example of a display panel.

The display panel 100B illustrated in FIG. 31 has a structure in which a transistor 310A and a transistor 310B in each of which a channel is formed in a semiconductor substrate are stacked. Note that in the description of the display panel below, portions similar to those of the above-mentioned display panel are not described in some cases.

In the display panel 100B, a substrate 301B provided with the transistor 310B, the capacitor 240, and the light-emitting devices is bonded to a substrate 301A provided with the transistor 310A.

Here, an insulating layer 345 is preferably provided on the bottom surface of the substrate 301B. An insulating layer 346 is preferably provided over the insulating layer 261 provided over the substrate 301A. The insulating layers 345 and 346 are insulating layers functioning as protective layers and can inhibit diffusion of impurities into the substrate 301B and the substrate 301A. For the insulating layers 345 and 346, an inorganic insulating film that can be used for the protective layer 131 or an insulating layer 332 can be used.

The substrate 301B is provided with a plug 343 that penetrates the substrate 301B and the insulating layer 345. An insulating layer 344 is preferably provided to cover the side surface of the plug 343. The insulating layer 344 functions as a protective layer and can inhibit diffusion of impurities into the substrate 301B. For the insulating layer 344, an inorganic insulating film that can be used for the protective layer 131 can be used.

A conductive layer 342 is provided under the insulating layer 345 on the rear surface of the substrate 301B (the surface opposite to the substrate 120). The conductive layer 342 is preferably provided to be embedded in an insulating layer 335. The bottom surfaces of the conductive layer 342 and the insulating layer 335 are preferably planarized. Here, the conductive layer 342 is electrically connected to the plug 343.

Over the substrate 301A, a conductive layer 341 is provided over the insulating layer 346. The conductive layer 341 is preferably provided to be embedded in an insulating layer 336. The top surfaces of the conductive layer 341 and the insulating layer 336 are preferably planarized.

The conductive layer 341 and the conductive layer 342 are bonded to each other, whereby the substrate 301A and the substrate 301B are electrically connected to each other. Here, improving the planarity of a plane formed by the conductive layer 342 and the insulating layer 335 and a plane formed by the conductive layer 341 and the insulating layer 336 allows the conductive layer 341 and the conductive layer 342 to be bonded to each other favorably.

The conductive layer 341 and the conductive layer 342 are preferably formed using the same conductive material. For example, a metal film containing an element selected from Al, Cr, Cu, Ta, Ti, Mo, and W, a metal nitride film containing the above element as a component (a titanium nitride film, a molybdenum nitride film, or a tungsten nitride film), or the like can be used. Copper is particularly preferably used for the conductive layer 341 and the conductive layer 342. In that case, it is possible to employ a Cu-to-Cu (copper-to-copper) direct bonding technique (a technique for achieving electrical continuity by connecting Cu (copper) pads).

[Display Panel 100C]

Figure 32:
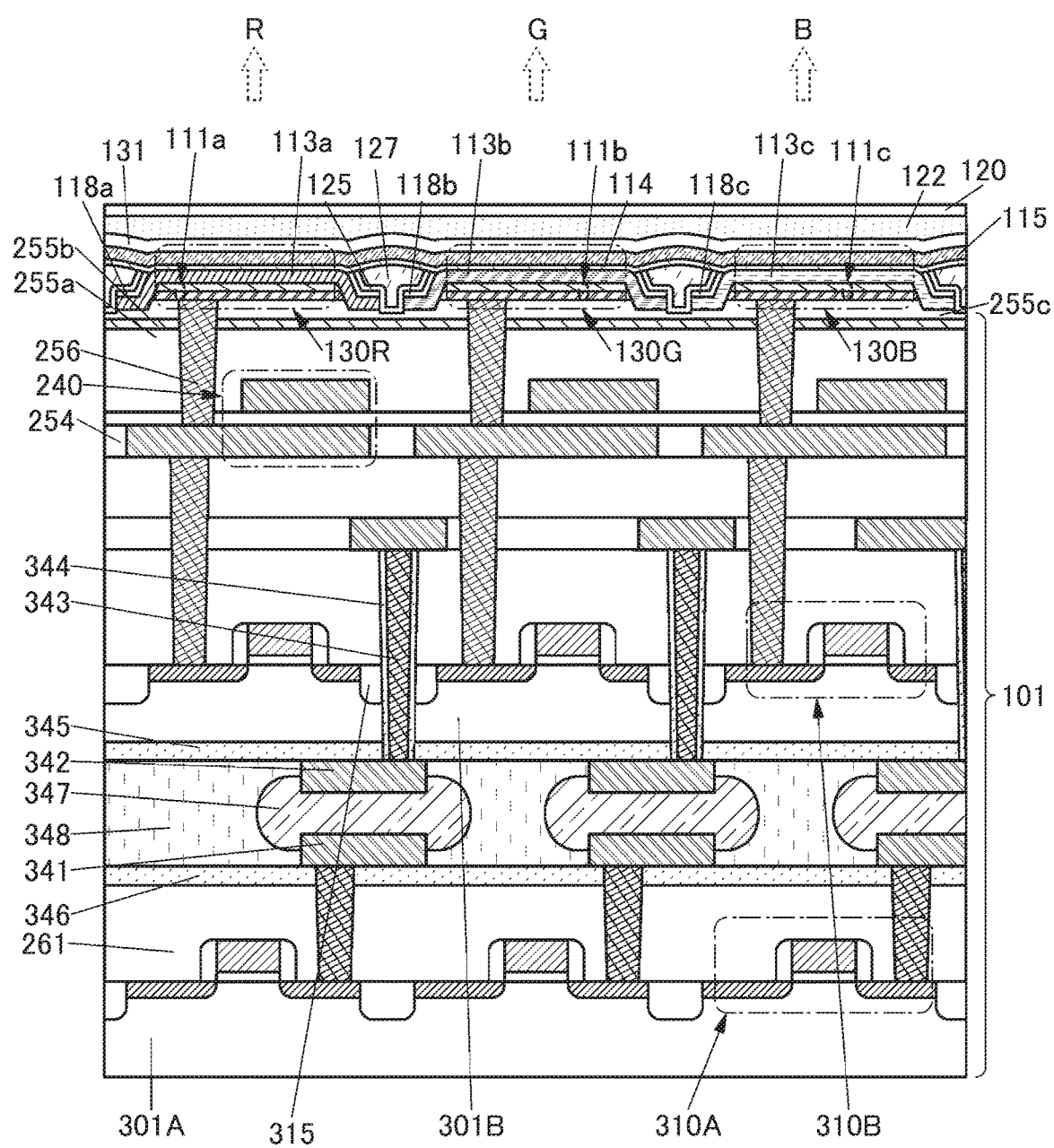
FIG. 32 is a cross-sectional view illustrating an example of a display panel.

The display panel 100C illustrated in FIG. 32 has a structure in which the conductive layer 341 and the conductive layer 342 are bonded to each other through a bump 347.

As illustrated in FIG. 32, providing the bump 347 between the conductive layer 341 and the conductive layer 342 enables the conductive layer 341 and the conductive layer 342 to be electrically connected to each other. The bump 347 can be formed using a conductive material containing gold (Au), nickel (Ni), indium (In), tin (Sn), or the like, for example. For another example, solder may be used for the bump 347. An adhesive layer 348 may be provided between the insulating layer 345 and the insulating layer 346. In the case where the bump 347 is provided, the insulating layer 335 and the insulating layer 336 may be omitted.

[Display Panel 100D]

Figure 33:
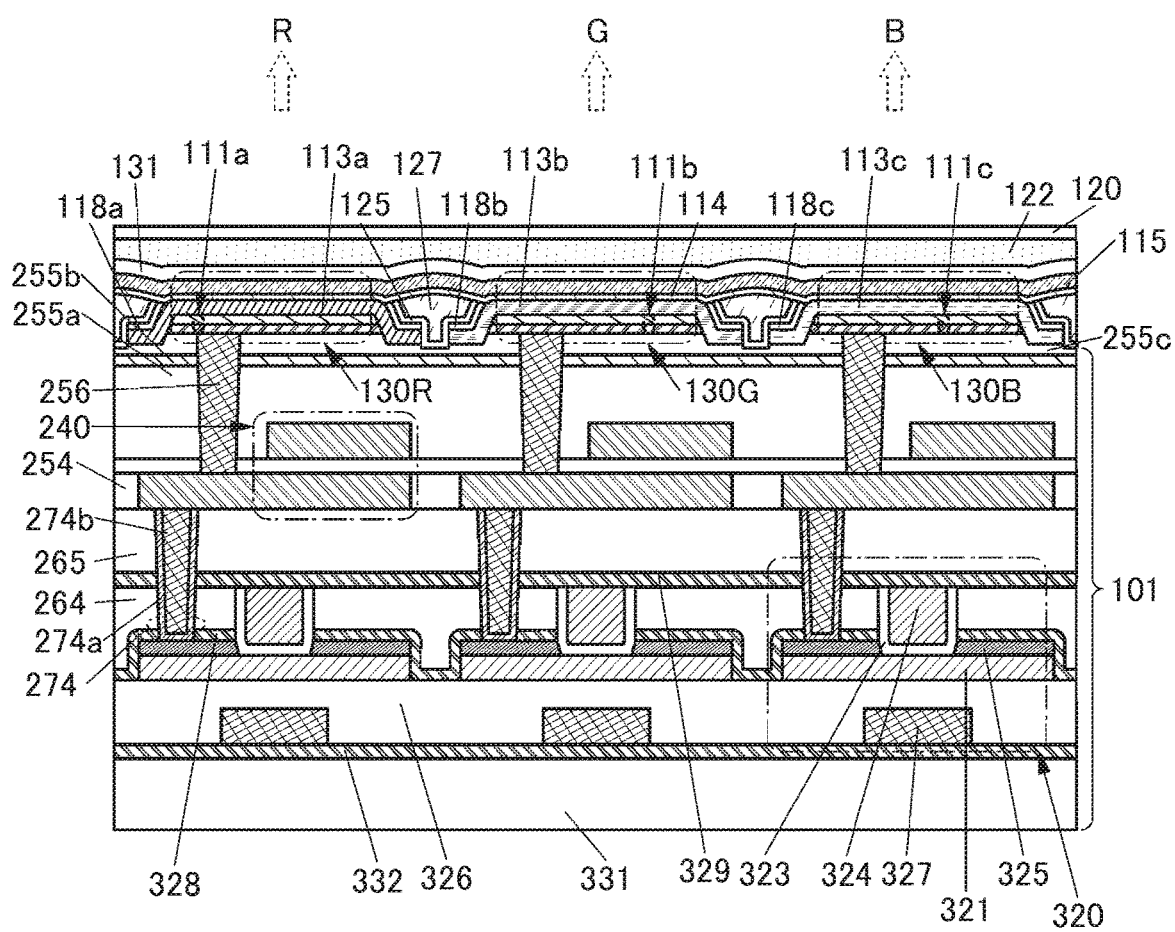
FIG. 33 is a cross-sectional view illustrating an example of a display panel.

The display panel 100D illustrated in FIG. 33 differs from the display panel 100A mainly in a structure of a transistor.

A transistor 320 is a transistor that contains a metal oxide (also referred to as an oxide semiconductor) in a semiconductor layer where a channel is formed (i.e., an OS transistor).

The transistor 320 includes a semiconductor layer 321, an insulating layer 323, a conductive layer 324, a pair of conductive layers 325, an insulating layer 326, and a conductive layer 327.

A substrate 331 corresponds to the substrate 291 in FIG. 29A and FIG. 29B. A stacked-layer structure including the substrate 331 and components thereover up to the insulating layer 255c corresponds to the layer 101 in Embodiment 5. As the substrate 331, an insulating substrate or a semiconductor substrate can be used.

The insulating layer 332 is provided over the substrate 331. The insulating layer 332 functions as a barrier layer that prevents diffusion of impurities such as water and hydrogen from the substrate 331 into the transistor 320 and release of oxygen from the semiconductor layer 321 to the insulating layer 332 side. As the insulating layer 332, for example, a film in which hydrogen or oxygen is less likely to diffuse than in a silicon oxide film, such as an aluminum oxide film, a hafnium oxide film, or a silicon nitride film, can be used.

The conductive layer 327 is provided over the insulating layer 332, and the insulating layer 326 is provided to cover the conductive layer 327. The conductive layer 327 functions as a first gate electrode of the transistor 320, and part of the insulating layer 326 functions as a first gate insulating layer. An oxide insulating film such as a silicon oxide film is preferably used as at least part of the insulating layer 326 that is in contact with the semiconductor layer 321. The top surface of the insulating layer 326 is preferably planarized.

The semiconductor layer 321 is provided over the insulating layer 326. The semiconductor layer 321 preferably includes a metal oxide (also referred to as an oxide semiconductor) film having semiconductor characteristics. The pair of conductive layers 325 are provided over and in contact with the semiconductor layer 321 and function as a source electrode and a drain electrode.

An insulating layer 328 is provided to cover the top surfaces and the side surfaces of the pair of conductive layers 325, the side surface of the semiconductor layer 321, and the like, and an insulating layer 264 is provided over the insulating layer 328. The insulating layer 328 functions as a barrier layer that prevents diffusion of impurities such as water and hydrogen from the insulating layer 264 and the like into the semiconductor layer 321 and release of oxygen from the semiconductor layer 321. As the insulating layer 328, an insulating film similar to the insulating layer 332 can be used.

An opening reaching the semiconductor layer 321 is provided in the insulating layer 328 and the insulating layer 264. The insulating layer 323 that is in contact with the side surfaces of the insulating layer 264, the insulating layer 328, and the conductive layer 325, and the top surface of the semiconductor layer 321, and the conductive layer 324 are embedded in the opening. The conductive layer 324 functions as a second gate electrode, and the insulating layer 323 functions as a second gate insulating layer.

The top surface of the conductive layer 324, the top surface of the insulating layer 323, and the top surface of the insulating layer 264 are subjected to planarization treatment so that their levels are equal to or substantially equal to each other, and an insulating layer 329 and an insulating layer 265 are provided to cover these layers.

The insulating layer 264 and the insulating layer 265 each function as an interlayer insulating layer. The insulating layer 329 functions as a barrier layer that prevents diffusion of impurities such as water and hydrogen from the insulating layer 265 and the like into the transistor 320. As the insulating layer 329, an insulating film similar to the insulating layer 328 and the insulating layer 332 can be used.

A plug 274 electrically connected to one of the pair of conductive layers 325 is provided to be embedded in the insulating layer 265, the insulating layer 329, the insulating layer 264, and the insulating layer 328. Here, the plug 274 preferably includes a conductive layer 274a that covers the side surface of an opening in the insulating layer 265, the insulating layer 329, the insulating layer 264, and the insulating layer 328 and part of the top surface of the conductive layer 325, and a conductive layer 274b in contact with the top surface of the conductive layer 274a. In this case, a conductive material in which hydrogen and oxygen are less likely to diffuse is preferably used for the conductive layer 274a.

[Display Panel 100E]

Figure 34:
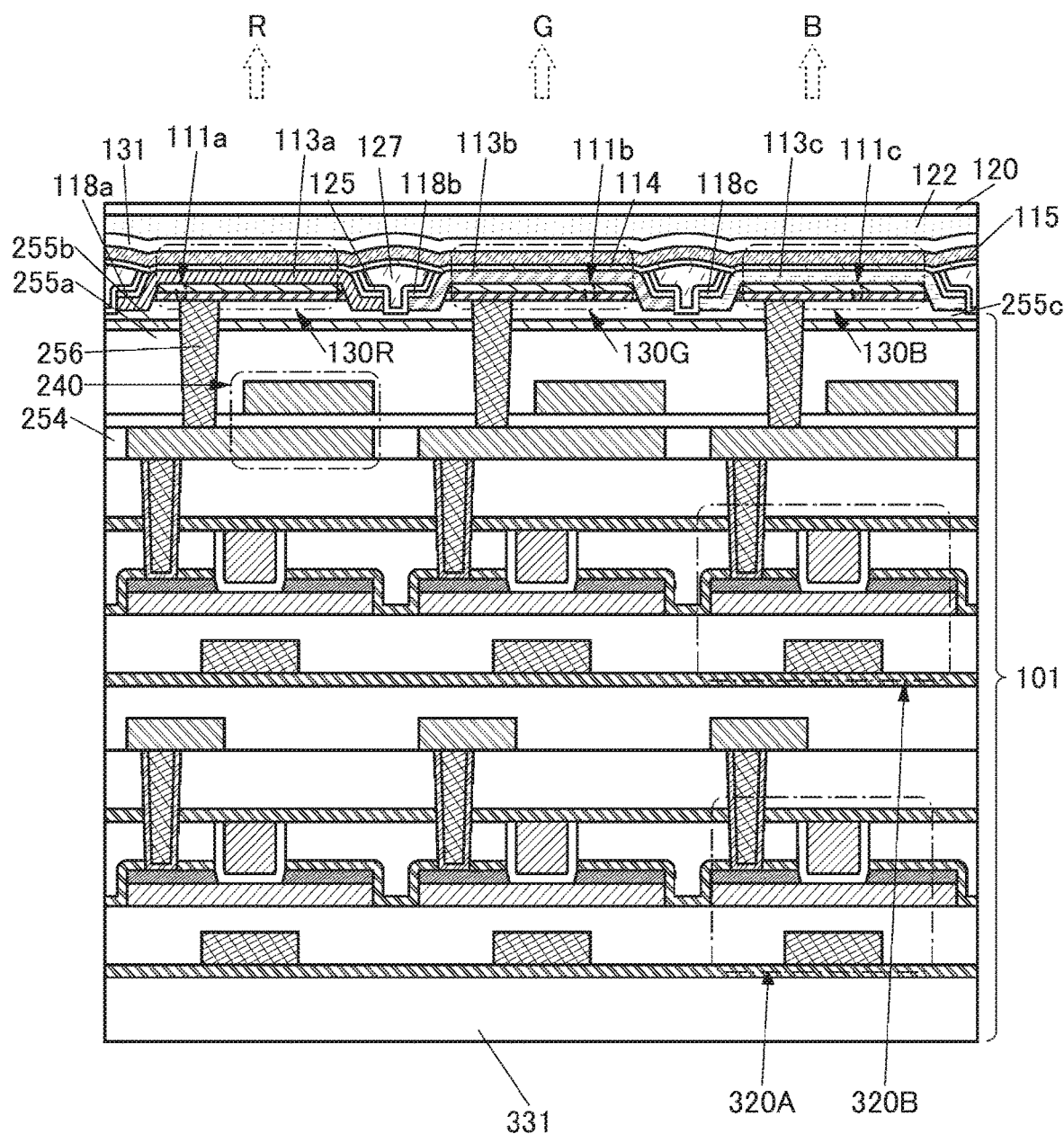
FIG. 34 is a cross-sectional view illustrating an example of a display panel.

The display panel 100E illustrated in FIG. 34 has a structure in which a transistor 320A and a transistor 320B each including an oxide semiconductor in a semiconductor where a channel is formed are stacked.

The description of the display panel 100D can be referred to for the transistor 320A, the transistor 320B, and the components around them.

Although the structure in which two transistors including an oxide semiconductor are stacked is described here, the present invention is not limited thereto. For example, three or more transistors may be stacked.

[Display Panel 100F]

Figure 35:
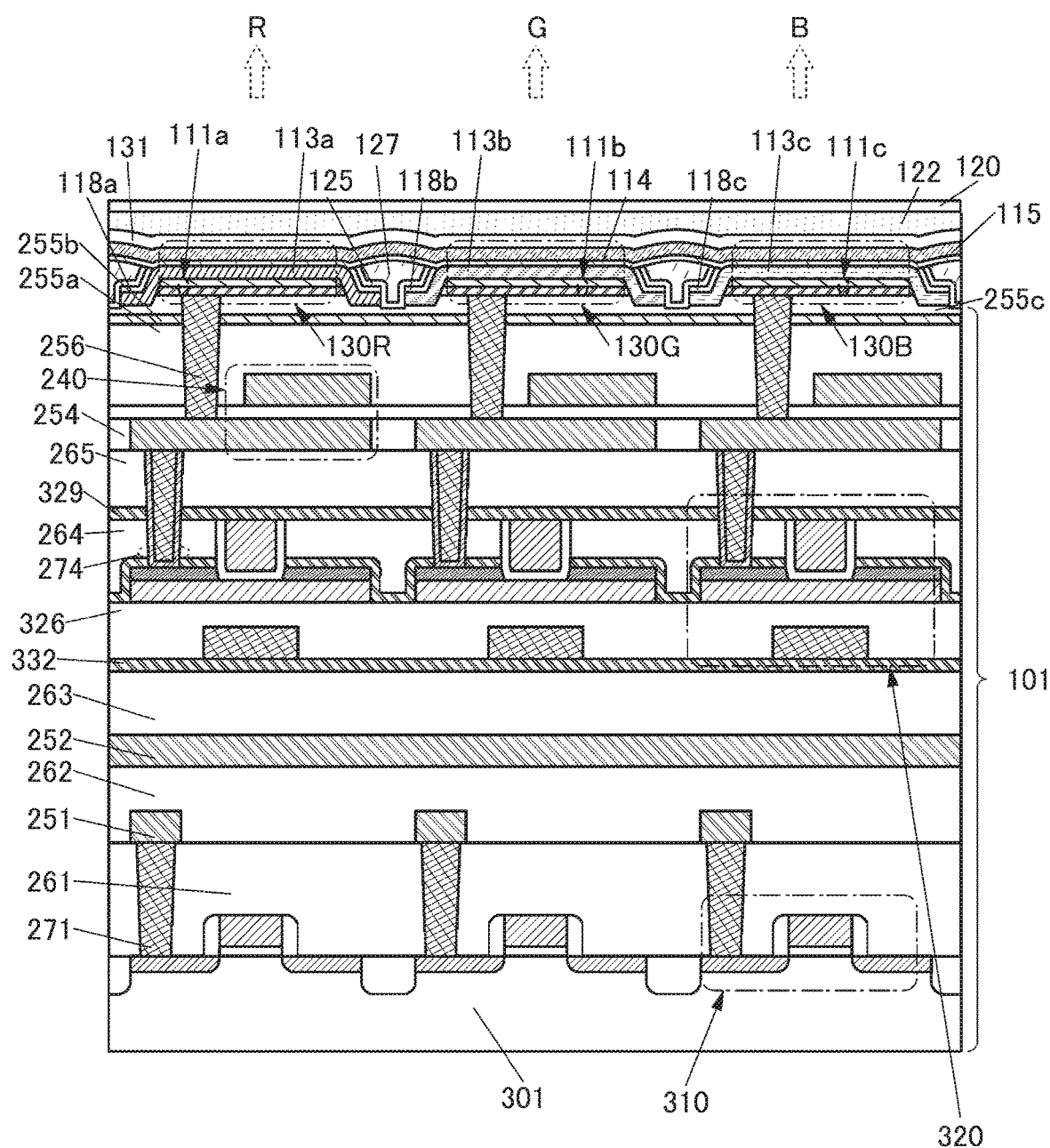
FIG. 35 is a cross-sectional view illustrating an example of a display panel.

The display panel 100F illustrated in FIG. 35 has a structure in which the transistor 310 whose channel is formed in the substrate 301 and the transistor 320 including a metal oxide in the semiconductor layer where the channel is formed are stacked.

The insulating layer 261 is provided to cover the transistor 310, and a conductive layer 251 is provided over the insulating layer 261. An insulating layer 262 is provided to cover the conductive layer 251, and a conductive layer 252 is provided over the insulating layer 262. The conductive layer 251 and the conductive layer 252 each function as a wiring. An insulating layer 263 and the insulating layer 332 are provided to cover the conductive layer 252, and the transistor 320 is provided over the insulating layer 332. The insulating layer 265 is provided to cover the transistor 320, and the capacitor 240 is provided over the insulating layer 265. The capacitor 240 and the transistor 320 are electrically connected to each other through the plug 274.

The transistor 320 can be used as a transistor included in the pixel circuit. The transistor 310 can be used as a transistor included in the pixel circuit or a transistor included in a driver circuit (a gate line driver circuit or a source line driver circuit) for driving the pixel circuit. The transistor 310 and the transistor 320 can also be used as transistors included in a variety of circuits such as an arithmetic circuit and a memory circuit.

With such a structure, not only the pixel circuit but also the driver circuit and the like can be formed directly under the light-emitting devices; thus, the display panel can be downsized as compared with the case where a driver circuit is provided around a display region.

[Display Panel 100G]

Figure 36:
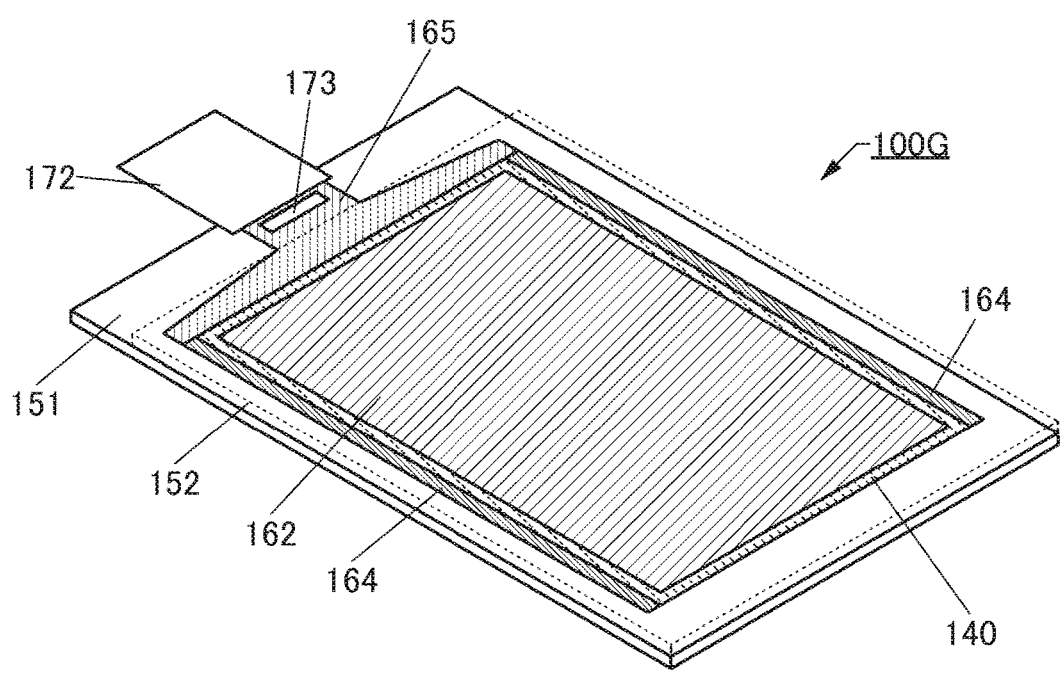
FIG. 36 is a perspective view illustrating an example of a display panel.
Figure 37A:
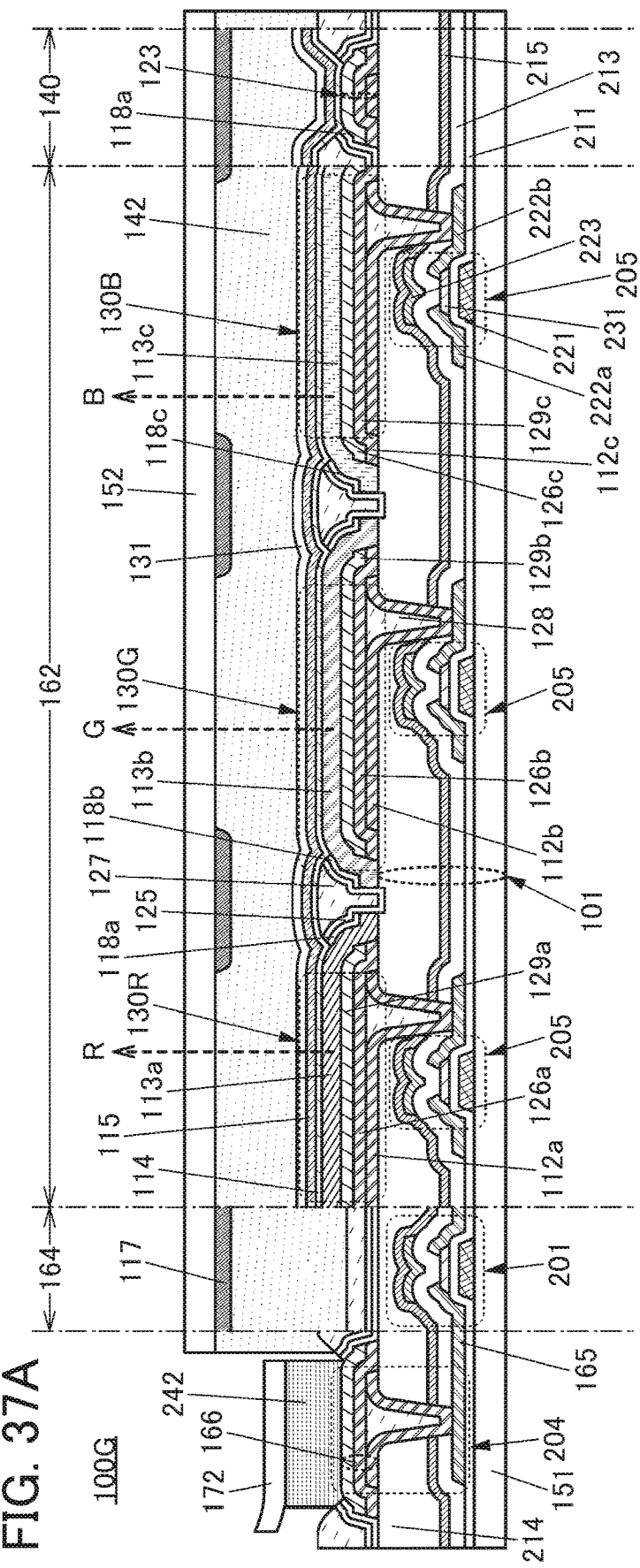
FIG. 37A is a cross-sectional view illustrating an example of a display panel.

FIG. 36 is a perspective view of a display panel 100G, and FIG. 37A is a cross-sectional view of the display panel 100G.

In the display panel 100G, a substrate 152 and a substrate 151 are bonded to each other. In FIG. 36, the substrate 152 is denoted by a dashed line.

The display panel 100G includes a display portion 162, the connection portion 140, a circuit 164, a wiring 165, and the like. FIG. 36 illustrates an example in which an IC 173 and an FPC 172 are mounted on the display panel 100G. Thus, the structure illustrated in FIG. 36 can be regarded as a display module including the display panel 100G, the IC (integrated circuit), and the FPC.

The connection portion 140 is provided outside the display portion 162. The connection portion 140 can be provided along one or more sides of the display portion 162. The number of connection portions 140 can be one or more. FIG. 36 illustrates an example in which the connection portion 140 is provided to surround the four sides of the display portion. A common electrode of a light-emitting device is electrically connected to a conductive layer in the connection portion 140, so that a potential can be supplied to the common electrode.

As the circuit 164, a scan line driver circuit can be used, for example.

The wiring 165 has a function of supplying a signal and power to the display portion 162 and the circuit 164. The signal and power are input to the wiring 165 from the outside through the FPC 172 or input to the wiring 165 from the IC 173.

FIG. 36 illustrates an example in which the IC 173 is provided over the substrate 151 by a COG (Chip On Glass) method, a COF (Chip on Film) method, or the like. An IC including a scan line driver circuit, a signal line driver circuit, or the like can be used as the IC 173, for example. Note that the display panel 100G and the display module are not necessarily provided with an IC. The IC may be mounted on the FPC by a COF method or the like.

FIG. 37A illustrates an example of cross sections of part of a region including the FPC 172, part of the circuit 164, part of the display portion 162, part of the connection portion 140, and part of a region including an end portion of the display panel 100G.

The display panel 100G illustrated in FIG. 37A includes a transistor 201, a transistor 205, the light-emitting device 130R that emits red light, the light-emitting device 130G that emits green light, the light-emitting device 130B that emits blue light, and the like between the substrate 151 and the substrate 152.

The stacked-layer structure of each of the light-emitting devices 130R, 130G, and 130B is the same as that illustrated in FIG. 18B except for the structure of the pixel electrode. Embodiment 5 can be referred to for the details of the light-emitting devices.

Since the light-emitting devices for different emission colors are separately formed in the display panel 100G, the difference between the chromaticity at low luminance emission and that at high luminance emission is small. Furthermore, since the first layer 113*a*, the second layer 113*b*, and the third layer 113*c* are separated and are apart from each other, generation of crosstalk between adjacent subpixels can be inhibited even when the display panel has high resolution. Accordingly, the display panel can have high resolution and high display quality.

The light-emitting device 130R includes a conductive layer 112*a*, a conductive layer 126*a* over the conductive layer 112*a*, and a conductive layer 129*a* over the conductive layer 126*a*. All of the conductive layers 112*a*, 126*a*, and 129*a* can be referred to as pixel electrodes, or one or two of them can be referred to as pixel electrodes.

The light-emitting device 130G includes a conductive layer 112*b*, a conductive layer 126*b* over the conductive layer 112*b*, and a conductive layer 129*b* over the conductive layer 126*b*.

The light-emitting device 130B includes a conductive layer 112*c*, a conductive layer 126*c* over the conductive layer 112*c*, and a conductive layer 129*c* over the conductive layer 126*c*.

The conductive layer 112*a* is connected to a conductive layer 222*b* included in the transistor 205 through an opening provided in an insulating layer 214 and the like. An end portion of the conductive layer 126*a* is positioned outward from an end portion of the conductive layer 112*a*. The end portion of the conductive layer 126*a* and an end portion of the conductive layer 129*a* are aligned or substantially aligned with each other. For example, a conductive layer functioning as a reflective electrode can be used as the conductive layer 112*a* and the conductive layer 126*a*, and a conductive layer functioning as a transparent electrode can be used as the conductive layer 129*a*.

Detailed description of the conductive layers 112*b*, 126*b*, and 129*b* of the light-emitting device 130G and the conductive layers 112*c*, 126*c*, and 129*c* of the light-emitting device 130B is omitted because these conductive layers are similar to the conductive layers 112*a*, 126*a*, and 129*a* of the light-emitting device 130R.

Depressed portions are formed in the conductive layers 112*a*, 112*b*, and 112*c* to cover the openings provided in the insulating layer 214 and the like. A layer 128 is embedded in each of the depressed portions.

The layer 128 has a planarization function for the depressed portions of the conductive layers 112*a*, 112*b*, and 112*c*. The conductive layers 126*a*, 126*b*, and 126*c* electrically connected to the conductive layers 112*a*, 112*b*, and 112*c*, respectively, are provided over the conductive layers 112*a*, 112*b*, and 112*c* and the layer 128. Thus, regions overlapping with the depressed portions of the conductive layers 112*a*, 112*b*, and 112*c* can also be used as the light-emitting regions, increasing the aperture ratio of the pixels.

The layer 128 may be an insulating layer or a conductive layer. Any of a variety of inorganic insulating materials, organic insulating materials, and conductive materials can be used for the layer 128 as appropriate. In particular, the layer 128 is preferably formed using an insulating material.

An insulating layer containing an organic material can be suitably used for the layer 128. For the layer 128, an acrylic resin, a polyimide resin, an epoxy resin, a polyamide resin, a polyimide-amide resin, a siloxane resin, a benzocyclobutene-based resin, a phenol resin, a precursor of any of these resins, or the like can be used, for example. A photosensitive resin can also be used for the layer 128. As the photosensitive resin, a positive material or a negative material can be used.

When a photosensitive resin is used, the layer 128 can be formed through only light-exposure and development steps, reducing the influence of dry etching, wet etching, or the like on the surfaces of the conductive layers 112*a*, 112*b*, and 112*c*. When the layer 128 is formed using a negative photosensitive resin, the layer 128 can sometimes be formed using the same photomask (light-exposure mask) as the photomask used for forming the opening in the insulating layer 214.

The top and side surfaces of the conductive layer 126*a* and the top and side surfaces of the conductive layer 129*a* are covered with the first layer 113*a*. Similarly, the top and side surfaces of the conductive layer 126*b* and the top and side surfaces of the conductive layer 129*b* are covered with the second layer 113*b*. Moreover, the top and side surfaces of the conductive layer 126*c* and the top and side surfaces of the conductive layer 129*c* are covered with the third layer 113*c*. Accordingly, regions provided with the conductive layers 126*a*, 126*b*, and 126*c* can be entirely used as the light-emitting regions of the light-emitting devices 130R, 130G, and 130B, increasing the aperture ratio of the pixels.

The side surfaces of the first layer 113*a*, the second layer 113*b*, and the third layer 113*c* are covered with the insulating layers 125 and 127. The sacrificial layer 118*a* is positioned between the first layer 113*a* and the insulating layer 125. The sacrificial layer 118*b* is positioned between the second layer 113*b* and the insulating layer 125, and the sacrificial layer 118*c* is positioned between the third layer 113*c* and the insulating layer 125. The common layer 114 is provided over the first layer 113*a*, the second layer 113*b*, the third layer 113*c*, and the insulating layers 125 and 127, and the common electrode 115 is provided over the common layer 114. The common layer 114 and the common electrode 115 are each one continuous film provided to be shared by a plurality of light-emitting devices.

The protective layer 131 is provided over each of the light-emitting devices 130R, 130G, and 130B. The protective layer 131 covering the light-emitting devices can inhibit an impurity such as water from entering the light-emitting devices, and increase the reliability of the light-emitting devices.

The protective layer 131 and the substrate 152 are bonded to each other with an adhesive layer 142. A solid sealing structure, a hollow sealing structure, or the like can be employed to seal the light-emitting devices. In FIG. 37A, a solid sealing structure is employed in which a space between the substrate 152 and the substrate 151 is filled with the adhesive layer 142. Alternatively, a hollow sealing structure in which the space is filled with an inert gas (e.g., nitrogen or argon) may be employed. Here, the adhesive layer 142 may be provided not to overlap with the light-emitting devices. The space may be filled with a resin different from that of the frame-shaped adhesive layer 142.

The conductive layer 123 is provided over the insulating layer 214 in the connection portion 140. An example is illustrated in which the conductive layer 123 has a stacked-layer structure of a conductive film obtained by processing the same conductive film as the conductive layers 112a, 112b, and 112c; a conductive film obtained by processing the same conductive film as the conductive layers 126a, 126b, and 126c; and a conductive film obtained by processing the same conductive film as the conductive layers 129a, 129b, and 129c. An end portion of the conductive layer 123 is covered with the sacrificial layer 118a, the insulating layer 125, and the insulating layer 127. The common layer 114 is provided over the conductive layer 123, and the common electrode 115 is provided over the common layer 114. The conductive layer 123 and the common electrode 115 are electrically connected to each other through the common layer 114. Note that the common layer 114 is not necessarily formed in the connection portion 140. In this case, the conductive layer 123 and the common electrode 115 are in direct contact with each other to be electrically connected to each other.

The display panel 100G has a top-emission structure. Light emitted from the light-emitting device is emitted toward the substrate 152. For the substrate 152, a material having a high visible-light-transmitting property is preferably used. The pixel electrode contains a material that reflects visible light, and a counter electrode (the common electrode 115) contains a material that transmits visible light.

A stacked-layer structure including the substrate 151 and the components thereover up to the insulating layer 214 corresponds to the layer 101 in Embodiment 5.

The transistor 201 and the transistor 205 are formed over the substrate 151. These transistors can be fabricated using the same material in the same step.

An insulating layer 211, an insulating layer 213, an insulating layer 215, and the insulating layer 214 are provided in this order over the substrate 151. Part of the insulating layer 211 functions as a gate insulating layer of each transistor. Part of the insulating layer 213 functions as a gate insulating layer of each transistor. The insulating layer 215 is provided to cover the transistors. The insulating layer 214 is provided to cover the transistors and has a function of a planarization layer. Note that the number of gate insulating layers and the number of insulating layers covering the transistors are not limited and may each be one, or two or more.

A material in which impurities such as water and hydrogen do not easily diffuse is preferably used for at least one of the insulating layers covering the transistors. In that case, the insulating layer can function as a barrier layer. Such a structure can effectively inhibit diffusion of impurities into the transistors from the outside and increase the reliability of the display panel.

An inorganic insulating film is preferably used as each of the insulating layer 211, the insulating layer 213, and the insulating layer 215. As the inorganic insulating film, a silicon nitride film, a silicon oxynitride film, a silicon oxide film, a silicon nitride oxide film, an aluminum oxide film, or an aluminum nitride film can be used, for example. A hafnium oxide film, an yttrium oxide film, a zirconium oxide film, a gallium oxide film, a tantalum oxide film, a magnesium oxide film, a lanthanum oxide film, a cerium oxide film, a neodymium oxide film, or the like may be used. A stack including two or more of the above insulating films may also be used.

An organic insulating layer is suitable as the insulating layer 214 functioning as a planarization layer. Examples of materials that can be used for the organic insulating layer include an acrylic resin, a polyimide resin, an epoxy resin, a polyamide resin, a polyimide-amide resin, a siloxane resin, a benzocyclobutene-based resin, a phenol resin, and precursors of these resins. The insulating layer 214 may have a stacked-layer structure of an organic insulating layer and an inorganic insulating layer. The uppermost layer of the insulating layer 214 preferably has a function of an etching protective layer. Accordingly, a depressed portion can be prevented from being formed in the insulating layer 214 at the time of processing the conductive layer 112a, the conductive layer 126a, the conductive layer 129a, or the like. Alternatively, a depressed portion may be formed in the insulating layer 214 at the time of processing the conductive layer 112a, the conductive layer 126a, the conductive layer 129a, or the like.

Each of the transistor 201 and the transistor 205 includes a conductive layer 221 functioning as a gate, the insulating layer 211 functioning as a gate insulating layer, a conductive layer 222a and the conductive layer 222b functioning as a source and a drain, a semiconductor layer 231, the insulating layer 213 functioning as a gate insulating layer, and a conductive layer 223 functioning as a gate. Here, a plurality of layers obtained by processing the same conductive film are shown with the same hatching pattern. The insulating layer 211 is positioned between the conductive layer 221 and the semiconductor layer 231. The insulating layer 213 is positioned between the conductive layer 223 and the semiconductor layer 231.

There is no particular limitation on the structure of the transistors included in the display panel of this embodiment. For example, a planar transistor, a staggered transistor, an inverted staggered transistor, or the like can be used. A top-gate transistor structure or a bottom-gate transistor structure may be employed. Alternatively, gates may be provided above and below the semiconductor layer where a channel is formed.

The structure in which the semiconductor layer where a channel is formed is held between two gates is used for the transistor 201 and the transistor 205. The two gates may be connected to each other and supplied with the same signal to drive the transistor. Alternatively, a potential for controlling the threshold voltage may be supplied to one of the two gates and a potential for driving may be supplied to the other to control the threshold voltage of the transistor.

There is no particular limitation on the crystallinity of a semiconductor material used for the transistors, and any of an amorphous semiconductor and a semiconductor having crystallinity (a microcrystalline semiconductor, a polycrystalline semiconductor, a single crystal semiconductor, or a semiconductor partly including crystal regions) may be used. A semiconductor having crystallinity is preferably used, in which case degradation of the transistor characteristics can be inhibited.

The semiconductor layer of the transistor preferably includes a metal oxide (also referred to as an oxide semiconductor). That is, a transistor including a metal oxide in its channel formation region (hereinafter, an OS transistor) is preferably used for the display panel of this embodiment.

As examples of the oxide semiconductor having crystallinity, a CAAC (c-axis-aligned crystalline)-OS, an nc (nanocrystalline)-OS, and the like can be given.

Alternatively, a transistor containing silicon in its channel formation region (a Si transistor) may be used. As examples of silicon, single crystal silicon, polycrystalline silicon, amorphous silicon, and the like can be given. In particular, a transistor containing low-temperature polysilicon (LTPS) in its semiconductor layer (hereinafter, also referred to as an LTPS transistor) can be used. The LTPS transistor has high field-effect mobility and excellent frequency characteristics.

With the use of Si transistors such as LTPS transistors, a circuit required to be driven at a high frequency (e.g., a source driver circuit) can be formed on the same substrate as a display portion. Thus, external circuits mounted on the display panel can be simplified, and parts costs and mounting costs can be reduced.

An OS transistor has extremely higher field-effect mobility than a transistor containing amorphous silicon. In addition, the OS transistor has an extremely low leakage current between a source and a drain in an off state (hereinafter, also referred to as off-state current), and charge accumulated in a capacitor that is connected in series to the transistor can be retained for a long period. Furthermore, power consumption of the display panel can be reduced with the use of an OS transistor.

The off-state current value per micrometer of channel width of the OS transistor at room temperature can be less than or equal to 1 aA ($1 \times 10^{-18}$ A), less than or equal to 1 zA ($1 \times 10^{-21}$ A), or less than or equal to 1 yA ($1 \times 10^{-24}$ A). Note that the off-state current value per micrometer of channel width of a Si transistor at room temperature is greater than or equal to 1 fA ($1 \times 10^{-15}$ A) and less than or equal to 1 pA ($1 \times 10^{-12}$ A). In other words, the off-state current of an OS transistor is lower than that of a Si transistor by approximately ten orders of magnitude.

To increase the emission luminance of the light-emitting device included in the pixel circuit, the amount of current fed through the light-emitting device needs to be increased. For this, it is necessary to increase the source-drain voltage of a driving transistor included in the pixel circuit. Since an OS transistor has a higher breakdown voltage between the source and the drain than a Si transistor, a high voltage can be applied between the source and the drain of the OS transistor. Accordingly, when an OS transistor is used as the driving transistor included in the pixel circuit, the amount of current flowing through the light-emitting device can be increased, so that the emission luminance of the light-emitting device can be increased.

When transistors operate in a saturation region, a change in source-drain current with respect to a change in gate-source voltage can be smaller in an OS transistor than in a Si transistor. Accordingly, when an OS transistor is used as the driving transistor included in the pixel circuit, the amount of current flowing between the source and the drain can be set minutely by a change in gate-source voltage; hence, the amount of current flowing through the light-emitting device can be controlled. Accordingly, the number of gray levels in the pixel circuit can be increased.

Regarding saturation characteristics of current flowing when transistors operate in a saturation region, even in the case where the source-drain voltage of an OS transistor increases gradually, a more stable current (saturation current) can be fed through the OS transistor than through a Si transistor. Thus, by using an OS transistor as the driving transistor, a stable current can be fed through light-emitting devices even when the current-voltage characteristics of the EL devices vary, for example. That is, when the OS transistor operates in the saturation region, the source-drain current hardly changes with an increase in the source-drain voltage; hence, the emission luminance of the light-emitting device can be stable.

As described above, with the use of an OS transistor as a driving transistor included in the pixel circuit, it is possible to achieve "inhibition of black floating", "increase in emission luminance", "increase in gray level", "inhibition of variation in light-emitting devices", and the like.

The metal oxide used for the semiconductor layer preferably contains indium, M (M is one or more selected from gallium, aluminum, silicon, boron, yttrium, tin, copper, vanadium, beryllium, titanium, iron, nickel, germanium, zirconium, molybdenum, lanthanum, cerium, neodymium, hafnium, tantalum, tungsten, and magnesium), and zinc, for example. Specifically, M is preferably one or more selected from aluminum, gallium, yttrium, and tin.

It is particularly preferable that an oxide containing indium (In), gallium (Ga), and zinc (Zn) (also referred to as IGZO) be used for the semiconductor layer. Alternatively, it is preferable to use an oxide containing indium, tin, and zinc. Further alternatively, it is preferable to use an oxide containing indium, gallium, tin, and zinc. Alternatively, it is preferable to use an oxide containing indium (In), aluminum (Al), and zinc (Zn) (also referred to as IAZO). Alternatively, it is preferable to use an oxide containing indium (In), aluminum (Al), gallium (Ga), and zinc (Zn) (also referred to as IAGZO).

When the semiconductor layer is an In-M-Zn oxide, the atomic ratio of In is preferably higher than or equal to the atomic ratio of Min the In-M-Zn oxide. Examples of the atomic ratio of the metal elements in such an In-M-Zn oxide include In:M:Zn=1:1:1 or a composition in the neighborhood thereof, In:M:Zn=1:1:1.2 or a composition in the neighborhood thereof, In:M:Zn=1:3:2 or a composition in the neighborhood thereof, In:M:Zn=1:3:4 or a composition in the neighborhood thereof, In:M:Zn=2:1:3 or a composition in the neighborhood thereof, In:M:Zn=3:1:2 or a composition in the neighborhood thereof, In:M:Zn=4:2:3 or a composition in the neighborhood thereof, In:M:Zn=4:2:4.1 or a composition in the neighborhood thereof, InM:Zn 5=5:1:3 or a composition in the neighborhood thereof, In:M:Zn=5:1:6 or a composition in the neighborhood thereof, In:M:Zn=5:1:7 or a composition in the neighborhood thereof, In:M:Zn=5:1:8 or a composition in the neighborhood thereof, In:M:Zn=6:1:6 or a composition in the neighborhood thereof, and InM:Zn=5:2:5 or a composition in the neighborhood thereof. Note that a composition in the neighborhood includes the range of ±30% of an intended atomic ratio.

For example, when the atomic ratio is described as In:Ga:Zn=4:2:3 or a composition in the neighborhood thereof, the case is included where Ga is greater than or equal to 1 and less than or equal to 3 and Zn is greater than or equal to 2 and less than or equal to 4 with In being 4. When the atomic ratio is described as In:Ga:Zn=5:1:6 or a composition in the neighborhood thereof, the case is included where Ga is greater than 0.1 and less than or equal to 2 and Zn is greater than or equal to 5 and less than or equal to 7 with In being 5. When the atomic ratio is described as In:Ga:Zn=1:1:1 or a composition in the neighborhood thereof, the case is included where Ga is greater than 0.1 and less than or equal to 2 and Zn is greater than 0.1 and less than or equal to 2 with In being 1.

The transistor included in the circuit 164 and the transistor included in the display portion 162 may have the same structure or different structures. One structure or two or more types of structures may be employed for a plurality of transistors included in the circuit 164. Similarly, one structure or two or more types of structures may be employed for a plurality of transistors included in the display portion 162.

All of the transistors included in the display portion 162 may be OS transistors or all of the transistors included in the display portion 162 may be Si transistors; alternatively, some of the transistors included in the display portion 162 may be OS transistors and the others may be Si transistors.

For example, when both an LTPS transistor and an OS transistor are used in the display portion 162, the display panel can have low power consumption and high driving capability. A structure in which an LTPS transistor and an OS transistor are combined is referred to as LTPO in some cases. Note that as a further suitable example, a structure can be given in which an OS transistor is used as, for example, a transistor functioning as a switch for controlling electrical continuity between wirings and an LTPS transistor is used as, for example, a transistor for controlling current.

For example, one of the transistors included in the display portion 162 functions as a transistor for controlling current flowing through the light-emitting device and can be referred to as a driving transistor. One of a source and a drain of the driving transistor is electrically connected to the pixel electrode of the light-emitting device. An LTPS transistor is preferably used as the driving transistor. Accordingly, the amount of current flowing through the light-emitting device can be increased in the pixel circuit.

Another transistor included in the display portion 162 functions as a switch for controlling selection and non-selection of the pixel and can be referred to as a selection transistor. A gate of the selection transistor is electrically connected to a gate line, and one of a source and a drain thereof is electrically connected to a source line (signal line). An OS transistor is preferably used as the selection transistor. Accordingly, the gray level of the pixel can be maintained even with an extremely low frame frequency (e.g., lower than or equal to 1 fps); thus, power consumption can be reduced by stopping the driver in displaying a still image.

As described above, the display panel of one embodiment of the present invention can have all of a high aperture ratio, high resolution, high display quality, and low power consumption.

Note that the display panel of one embodiment of the present invention has a structure including the OS transistor and the light-emitting device having an MML (metal maskless) structure. Here, the light-emitting device having an MML structure refers to a light-emitting device fabricated without using a metal mask or an FMM (fine metal mask or high-resolution metal mask). With this structure, the leakage current that might flow through the transistor and the leakage current that might flow between adjacent light-emitting devices (also referred to as lateral leakage current, side leakage current, or the like) can be extremely low. With the structure, a viewer can notice any one or more of the image crispness, the image sharpness, a high chroma, and a high contrast ratio in an image displayed on the display panel. When the leakage current that might flow through the transistor and the lateral leakage current between light-emitting devices are extremely low, display with little leakage of light at the time of black display can be achieved.

Figure 37C:
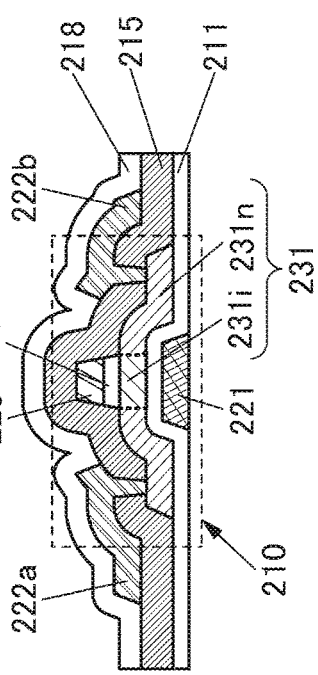
FIG. 37B and FIG. 37C are cross-sectional views illustrating examples of transistors.
Figure 37B:
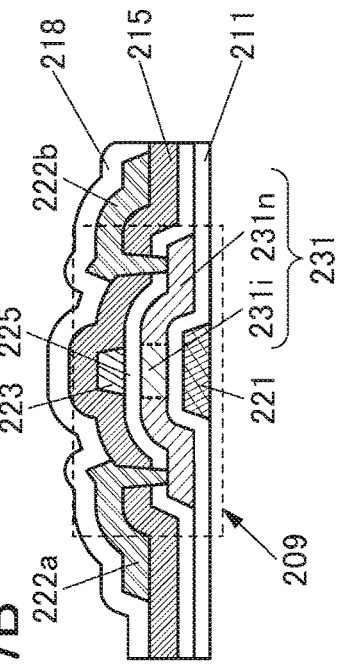

FIG. 37B and FIG. 37C illustrate other structure examples of transistors.

A transistor 209 and a transistor 210 each include the conductive layer 221 functioning as a gate, the insulating layer 211 functioning as a gate insulating layer, the semiconductor layer 231 including a channel formation region 231*i* and a pair of low-resistance regions 231*n*, the conductive layer 222*a* connected to one of the pair of low-resistance regions 231*n*, the conductive layer 222*b* connected to the other of the pair of low-resistance regions 231*n*, an insulating layer 225 functioning as a gate insulating layer, the conductive layer 223 functioning as a gate, and the insulating layer 215 covering the conductive layer 223. The insulating layer 211 is positioned between the conductive layer 221 and the channel formation region 231*i*. The insulating layer 225 is positioned at least between the conductive layer 223 and the channel formation region 231*i*. Furthermore, an insulating layer 218 covering the transistor may be provided.

FIG. 37B illustrates an example of the transistor 209 in which the insulating layer 225 covers the top surface and the side surface of the semiconductor layer 231. The conductive layer 222*a* and the conductive layer 222*b* are connected to the low-resistance regions 231*n* through openings provided in the insulating layer 225 and the insulating layer 215. One of the conductive layer 222*a* and the conductive layer 222*b* functions as a source, and the other functions as a drain.

Meanwhile, in the transistor 210 illustrated in FIG. 37C, the insulating layer 225 overlaps with the channel formation region 231*i* of the semiconductor layer 231 and does not overlap with the low-resistance regions 231*n*. The structure illustrated in FIG. 37C can be formed by processing the insulating layer 225 with the conductive layer 223 as a mask, for example. In FIG. 37C, the insulating layer 215 is provided to cover the insulating layer 225 and the conductive layer 223, and the conductive layer 222*a* and the conductive layer 222*b* are connected to the low-resistance regions 231*n* through the openings in the insulating layer 215.

A connection portion 204 is provided in a region of the substrate 151 that does not overlap with the substrate 152. In the connection portion 204, the wiring 165 is electrically connected to the FPC 172 through a conductive layer 166 and a connection layer 242. An example is illustrated in which the conductive layer 166 has a stacked-layer structure of a conductive film obtained by processing the same conductive film as the conductive layers 112*a*, 112*b*, and 112*c*, a conductive film obtained by processing the same conductive film as the conductive layers 126*a*, 126*b*, and 126*c*, and a conductive film obtained by processing the same conductive film as the conductive layers 129*a*, 129*b*, and 129*c*. The conductive layer 166 is exposed on the top surface of the connection portion 204. Thus, the connection portion 204 and the FPC 172 can be electrically connected to each other through the connection layer 242.

A light-blocking layer 117 is preferably provided on the surface of the substrate 152 that faces the substrate 151. The light-blocking layer 117 can be provided between adjacent light-emitting devices, in the connection portion 140, and in the circuit 164, for example. A variety of optical members can be arranged on the outer surface of the substrate 152.

The material that can be used for the substrate 120 can be used for each of the substrate 151 and the substrate 152.

The material that can be used for the resin layer 122 can be used for the adhesive layer 142.

As the connection layer 242, an anisotropic conductive film (ACF), an anisotropic conductive paste (ACP), or the like can be used.

[Display Panel 100H]

A display panel 100H illustrated in FIG. 38A differs from the display panel 100G mainly in having a bottom-emission structure.

Light emitted from the light-emitting device is emitted toward the substrate 151 side. For the substrate 151, a material having a high visible-light-transmitting property is preferably used. By contrast, there is no limitation on the light-transmitting property of a material used for the substrate 152.

The light-blocking layer 117 is preferably formed between the substrate 151 and the transistor 201 and between the substrate 151 and the transistor 205. FIG. 38A illustrates an example in which the light-blocking layer 117 is provided over the substrate 151, an insulating layer 153 is provided over the light-blocking layer 117, and the transistors 201 and 205 and the like are provided over the insulating layer 153.

The light-emitting device 130R includes the conductive layer 112a, the conductive layer 126a over the conductive layer 112a, and the conductive layer 129a over the conductive layer 126a.

The light-emitting device 130G includes the conductive layer 112b, the conductive layer 126b over the conductive layer 112b, and the conductive layer 129b over the conductive layer 126b.

A material having a high visible-light-transmitting property is used for each of the conductive layers 112a, 112b, 126a, 126b, 129a, and 129b. A material reflecting visible light is preferably used for the common electrode 115.

Although FIG. 37A, FIG. 38A, and the like illustrate an example in which the top surface of the layer 128 includes a flat portion, the shape of the layer 128 is not particularly limited. FIG. 38B to FIG. 38D illustrate variation examples of the layer 128.

As illustrated in FIG. 38B and FIG. 38D, the top surface of the layer 128 can have a shape such that its center and the vicinity thereof are depressed, i.e., a shape including a concave curved surface, in a cross-sectional view.

As illustrated in FIG. 38C, the top surface of the layer 128 can have a shape such that its center and the vicinity thereof are bulged, i.e., a shape including a convex curved surface, in a cross-sectional view.

The top surface of the layer 128 may include one or both of a convex curved surface and a concave curved surface. The number of convex curved surfaces and the number of concave curved surfaces included in the top surface of the layer 128 are not limited and can each be one or more.

The level of the top surface of the layer 128 and the level of the top surface of the conductive layer 112a may be equal to or substantially equal to each other, or may be different from each other. For example, the level of the top surface of the layer 128 may be either lower or higher than the level of the top surface of the conductive layer 112a.

FIG. 38B can be regarded as illustrating an example in which the layer 128 fits in the depressed portion formed in the conductive layer 112a. By contrast, as illustrated in FIG. 38D, the layer 128 may exist also outside the depressed portion formed in the conductive layer 112a, that is, the layer 128 may be formed to have a top surface wider than the depressed portion.

[Display Panel 100J]

Figure 39:
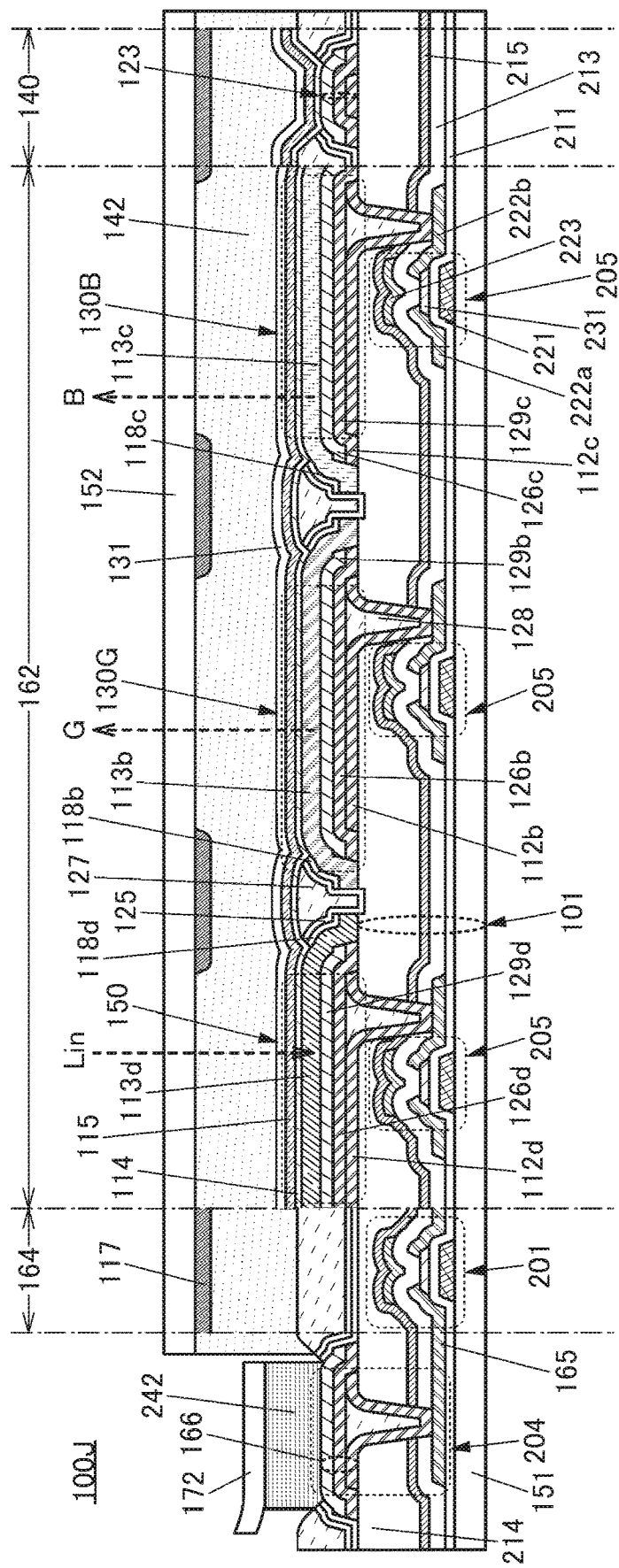
FIG. 39 is a cross-sectional view illustrating an example of a display panel.

A display panel 100J illustrated in FIG. 39 is different from the display panel 100G mainly in including the light-receiving device 150.

The light-receiving device 150 includes a conductive layer 112d, a conductive layer 126d over the conductive layer 112d, and a conductive layer 129d over the conductive layer 126d.

The conductive layer 112d is connected to the conductive layer 222b included in the transistor 205 through an opening provided in the insulating layer 214 and the like.

The top and side surfaces of the conductive layer 126d and the top and side surfaces of the conductive layer 129d are covered with the fourth layer 113d. The fourth layer 113d includes at least an active layer.

The side surface of the fourth layer 113d is covered with the insulating layers 125 and 127. The sacrificial layer 118d is positioned between the fourth layer 113d and the insulating layer 125. The common layer 114 is provided over the fourth layer 113d and the insulating layers 125 and 127, and the common electrode 115 is provided over the common layer 114. The common layer 114 is a continuous film provided to be shared by the light-receiving device and the light-emitting devices.

For example, any of the pixel layout described in Embodiment 5 with reference to FIG. 24A and the pixel layouts described in Embodiment 6 with reference to FIG. 28A to FIG. 28D can be used for the display panel 100J. The light-receiving device 150 can be provided in at least one of the subpixel PS, the subpixel X1, the subpixel X2, and the like. Embodiment 5 can be referred to for the details of the display panel including the light-receiving device.

This embodiment can be combined with the other embodiments as appropriate.

Embodiment 8

In this embodiment, a structure example of a transistor that can be used in the display panel of one embodiment of the present invention will be described. Specifically, the case of using a transistor containing silicon as a semiconductor where a channel is formed will be described.

One embodiment of the present invention is a display panel that includes a light-emitting device and a pixel circuit. For example, three kinds of light-emitting devices emitting light of red (R), green (G), and blue (B) are included, whereby a full-color display panel can be achieved.

Transistors containing silicon in their semiconductor layers where channels are formed are preferably used as all transistors included in the pixel circuit for driving the light-emitting device. As examples of silicon, single crystal silicon, polycrystalline silicon, amorphous silicon, and the like can be given. In particular, a transistor containing low-temperature polysilicon (LTPS) in its semiconductor layer (hereinafter, also referred to as an LTPS transistor) is preferably used. The LTPS transistor has high field-effect mobility and excellent frequency characteristics.

With the use of transistors containing silicon, such as LTPS transistors, a circuit required to be driven at a high frequency (e.g., a source driver circuit) can be formed on the same substrate as a display portion. Thus, external circuits mounted on the display panel can be simplified, and parts costs and mounting costs can be reduced.

It is preferable to use transistors including a metal oxide (hereinafter, also referred to as an oxide semiconductor) in their semiconductor layers where channels are formed (such transistors are hereinafter also referred to as OS transistors) as at least one of the transistors included in the pixel circuit. An OS transistor has extremely higher field-effect mobility than a transistor containing amorphous silicon. In addition, an OS transistor has an extremely low leakage current between a source and a drain in an off state (hereinafter, also referred to as off-state current), and charge accumulated in a capacitor that is connected in series to the transistor can be retained for a long period. Furthermore, power consumption of the display panel can be reduced with the use of an OS transistor.

When an LTPS transistor is used as one or more of the transistors included in the pixel circuit and an OS transistor is used as the rest, a display panel with low power consumption and high driving capability can be achieved. In a further suitable example, it is preferable that an OS transistor be used as a transistor functioning as a switch for controlling electrical continuity between wirings and an LTPS transistor be used as a transistor for controlling current.

For example, one of the transistors provided in the pixel circuit functions as a transistor for controlling current flowing through the light-emitting device and can be referred to as a driving transistor. One of a source and a drain of the driving transistor is electrically connected to the pixel electrode of the light-emitting device. An LTPS transistor is preferably used as the driving transistor. In this case, the amount of current flowing through the light-emitting device can be increased in the pixel circuit.

Another transistor provided in the pixel circuit functions as a switch for controlling selection and non-selection of the pixel and can be referred to as a selection transistor. A gate of the selection transistor is electrically connected to a gate line, and one of a source and a drain thereof is electrically connected to a source line (signal line). An OS transistor is preferably used as the selection transistor. Accordingly, the gray level of the pixel can be maintained even with an extremely low frame frequency (e.g., lower than or equal to 1 fps); thus, power consumption can be reduced by stopping the driver in displaying a still image.

More specific structure examples will be described below with reference to drawings.

Structure Example 2 of Display Panel

Figure 40A:
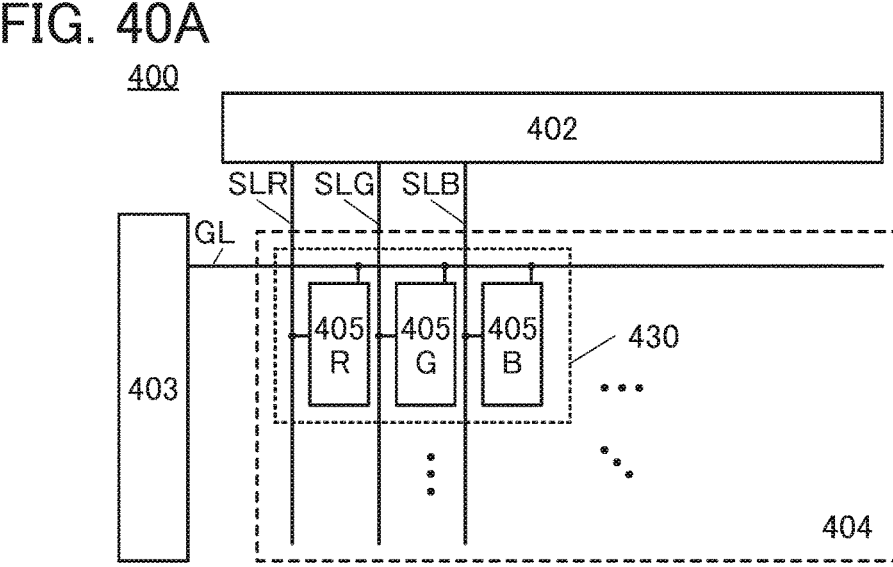
FIG. 40A is a block diagram illustrating an example of a display panel.

FIG. 40A illustrates a block diagram of a display panel 400. The display panel 400 includes a display portion 404, a driver circuit portion 402, a driver circuit portion 403, and the like.

The display portion 404 includes a plurality of pixels 430 arranged in a matrix. The pixels 430 each include a subpixel 405R, a subpixel 405G, and a subpixel 405B. The subpixel 405R, the subpixel 405G, and the subpixel 405B each include a light-emitting device functioning as a display device.

The display portion 404 corresponds to the display portion 11 described in Embodiment 1. The pixels 430 correspond to the pixels 17 described in Embodiment 1. The pixels 430 correspond to the pixels 110 described in Embodiment 4.

Each of the pixels 430 is electrically connected to a wiring GL, a wiring SLR, a wiring SLG, and a wiring SLB. The wiring SLR, the wiring SLG, and the wiring SLB are electrically connected to the driver circuit portion 402. The wiring GL is electrically connected to the driver circuit portion 403. The driver circuit portion 402 functions as a source line driver circuit (also referred to as a source driver), and the driver circuit portion 403 functions as a gate line driver circuit (also referred to as a gate driver). The wiring GL functions as a gate line, and the wiring SLR, the wiring SLG, and the wiring SLB each function as a source line.

The subpixel 405R includes a light-emitting device that emits red light. The subpixel 405G includes a light-emitting device that emits green light. The subpixel 405B includes a light-emitting device that emits blue light. Thus, the display panel 400 can perform full-color display. Note that the pixel 430 may include a subpixel including a light-emitting device emitting light of another color. For example, the pixel 430 may include, in addition to the three subpixels, a subpixel including a light-emitting device emitting white light, a subpixel including a light-emitting device emitting yellow light, or the like.

The wiring GL is electrically connected to the subpixel 405R, the subpixel 405G, and the subpixel 405B arranged in a row direction (an extending direction of the wiring GL). The wiring SLR, the wiring SLG, and the wiring SLB are electrically connected to the subpixels 405R, the subpixels 405G, and the subpixels 405B (not illustrated) arranged in a column direction (an extending direction of the wiring SLR and the like), respectively.

Structure Example of Pixel Circuit

Figure 40B:
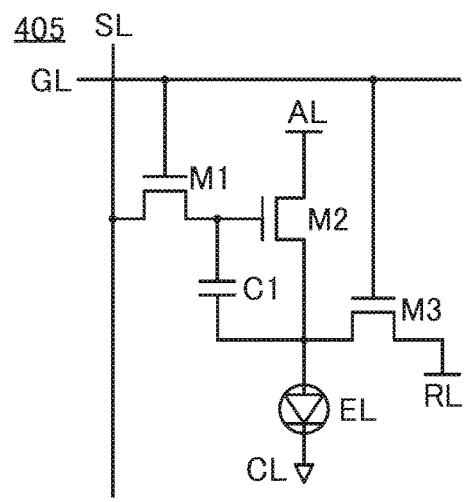
FIG. 40B to FIG. 40D are diagrams illustrating examples of a pixel circuit.

FIG. 40B illustrates an example of a circuit diagram of a pixel 405 that can be used as the subpixel 405R, the subpixel 405G, and the subpixel 405B. The pixel 405 includes a transistor M1, a transistor M2, a transistor M3, a capacitor C1, and a light-emitting device EL. The wiring GL and a wiring SL are electrically connected to the pixel 405. The wiring SL corresponds to any of the wiring SLR, the wiring SLG, and the wiring SLB illustrated in FIG. 40A.

A gate of the transistor M1 is electrically connected to the wiring GL, one of a source and a drain of the transistor M1 is electrically connected to the wiring SL, and the other of the source and the drain of the transistor M1 is electrically connected to one electrode of the capacitor C1 and a gate of the transistor M2. One of a source and a drain of the transistor M2 is electrically connected to a wiring AL, and the other of the source and the drain of the transistor M2 is electrically connected to one electrode of the light-emitting device EL, the other electrode of the capacitor C1, and one of a source and a drain of the transistor M3. A gate of the transistor M3 is electrically connected to the wiring GL, and the other of the source and the drain of the transistor M3 is electrically connected to a wiring RL. The other electrode of the light-emitting device EL is electrically connected to a wiring CL.

A data potential D is supplied to the wiring SL. A selection signal is supplied to the wiring GL. The selection signal includes a potential for bringing a transistor into a conducting state and a potential for bringing a transistor into a non-conducting state.

A reset potential is supplied to the wiring RL. An anode potential is supplied to the wiring AL. A cathode potential is supplied to the wiring CL. In the pixel 405, the anode potential is a potential higher than the cathode potential. The reset potential supplied to the wiring RL can be set such that a potential difference between the reset potential and the cathode potential is lower than the threshold voltage of the light-emitting device EL. The reset potential can be a potential higher than the cathode potential, a potential equal to the cathode potential, or a potential lower than the cathode potential.

The transistor M1 and the transistor M3 each function as a switch. The transistor M2 functions as a transistor for controlling current flowing through the light-emitting device EL. For example, it can be said that the transistor M1 functions as a selection transistor and the transistor M2 functions as a driving transistor.

Here, it is preferable to use LTPS transistors as all of the transistor M1 to the transistor M3. Alternatively, it is preferable to use OS transistors as the transistor M1 and the transistor M3 and to use an LTPS transistor as the transistor M2.

Alternatively, OS transistors may be used as all of the transistor M1 to the transistor M3. In this case, an LTPS transistor can be used as at least one of a plurality of transistors included in the driver circuit portion 402 and a plurality of transistors included in the driver circuit portion 403, and OS transistors can be used as the other transistors. For example, OS transistors can be used as the transistors provided in the display portion 404, and LTPS transistors can be used as the transistors provided in the driver circuit portion 402 and the driver circuit portion 403.

As the OS transistor, a transistor including an oxide semiconductor in its semiconductor layer where a channel is formed can be used. The metal oxide used for the semiconductor layer preferably contains indium, M (M is one or more selected from gallium, aluminum, silicon, boron, yttrium, tin, copper, vanadium, beryllium, titanium, iron, nickel, germanium, zirconium, molybdenum, lanthanum, cerium, neodymium, hafnium, tantalum, tungsten, and magnesium), and zinc, for example. Specifically, M is preferably one or more selected from aluminum, gallium, yttrium, and tin. It is particularly preferable to use an oxide containing indium, gallium, and zinc (also referred to as IGZO) for the semiconductor layer of the OS transistor. Alternatively, it is preferable to use an oxide containing indium, tin, and zinc. Further alternatively, it is preferable to use an oxide containing indium, gallium, tin, and zinc.

A transistor using an oxide semiconductor having a wider band gap and lower carrier density than silicon can achieve an extremely low off-state current. Thus, such a low off-state current enables long-term retention of charge accumulated in a capacitor that is connected to the transistor in series. Therefore, it is particularly preferable to use a transistor including an oxide semiconductor as the transistor M1 and the transistor M3 each of which is connected to the capacitor C1 in series. The use of the transistor including an oxide semiconductor as each of the transistor M1 and the transistor M3 can prevent leakage of charge retained in the capacitor C1 through the transistor M1 or the transistor M3. Furthermore, since charge retained in the capacitor C1 can be retained for a long time, a still image can be displayed for a long time without rewriting data in the pixel 405.

Note that although the transistor is illustrated as an n-channel transistor in FIG. 40B, a p-channel transistor can also be used.

The transistors included in the pixel 405 are preferably formed to be arranged over the same substrate.

Transistors each including a pair of gates overlapping with each other with a semiconductor layer therebetween can be used as the transistors included in the pixel 405.

In the transistor including a pair of gates, the same potential is supplied to the pair of gates electrically connected to each other, which brings advantage that the transistor can have a higher on-state current and improved saturation characteristics. A potential for controlling the threshold voltage of the transistor may be supplied to one of the pair of gates. Furthermore, when a constant potential is supplied to one of the pair of gates, the stability of the electrical characteristics of the transistor can be improved. For example, one of the gates of the transistor may be electrically connected to a wiring to which a constant potential is supplied or may be electrically connected to a source or a drain of the transistor.

Figure 40C:
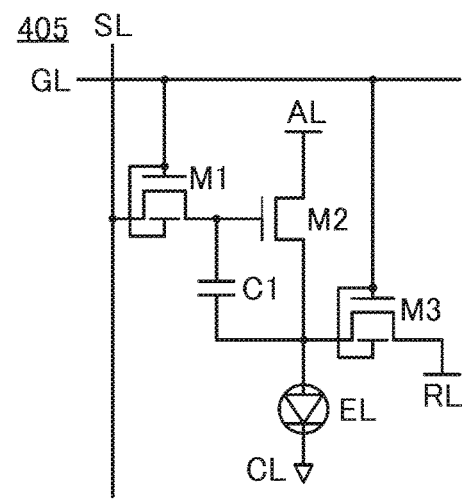

The pixel 405 illustrated in FIG. 40C is an example in which a transistor including a pair of gates is used as each of the transistor M1 and the transistor M3. In each of the transistor M1 and the transistor M3, the pair of gates are electrically connected to each other. Such a structure can shorten the period in which data is written to the pixel 405.

Figure 40D:
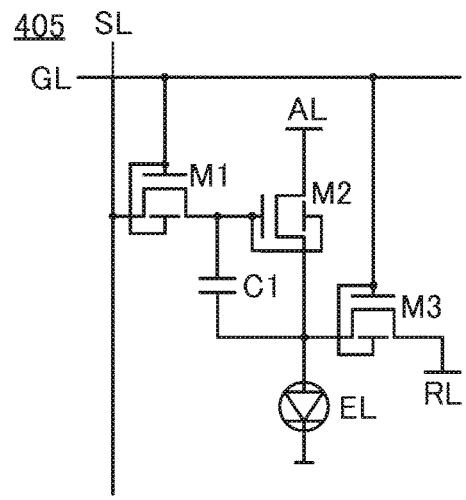

The pixel 405 illustrated in FIG. 40D is an example in which a transistor including a pair of gates is used as the transistor M2 in addition to the transistor M1 and the transistor M3. A pair of gates of the transistor M2 are electrically connected to each other. When such a transistor is used as the transistor M2, the saturation characteristics are improved, whereby emission luminance of the light-emitting device EL can be controlled easily and the display quality can be increased.

Structure Example of Transistor

Cross-sectional structure examples of a transistor that can be used in the display panel described above will be described below.

Structure Example 1

Figure 41A:
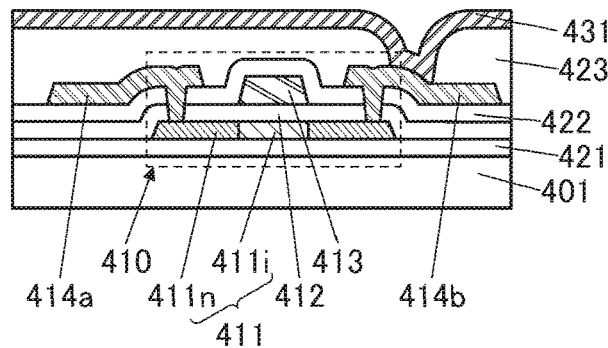
FIG. 41A to FIG. 41D are diagrams illustrating examples of transistors.

FIG. 41A is a cross-sectional view including a transistor 410.

The transistor 410 is provided over a substrate 401 and contains polycrystalline silicon in its semiconductor layer. For example, the transistor 410 corresponds to the transistor M2 in the pixel 405. That is, FIG. 41A illustrates an example in which one of a source and a drain of the transistor 410 is electrically connected to a conductive layer 431 of the light-emitting device.

The transistor 410 includes a semiconductor layer 411, an insulating layer 412, a conductive layer 413, and the like. The semiconductor layer 411 includes a channel formation region 411*i* and low-resistance regions 411*n*. The semiconductor layer 411 contains silicon. The semiconductor layer 411 preferably contains polycrystalline silicon. Part of the insulating layer 412 functions as a gate insulating layer. Part of the conductive layer 413 functions as a gate electrode.

Note that the semiconductor layer 411 can include a metal oxide exhibiting semiconductor characteristics (also referred to as an oxide semiconductor). In this case, the transistor 410 can be referred to as an OS transistor.

The low-resistance region 411*n* is a region containing an impurity element. For example, in the case where the transistor 410 is an n-channel transistor, phosphorus, arsenic, or the like is added to the low-resistance region 411*n*. Meanwhile, in the case where the transistor 410 is a p-channel transistor, boron, aluminum, or the like is added to the low-resistance region 411*n*. In addition, in order to control the threshold voltage of the transistor 410, the above-described impurity may be added to the channel formation region 411*i*.

An insulating layer 421 is provided over the substrate 401. The semiconductor layer 411 is provided over the insulating layer 421. The insulating layer 412 is provided to cover the semiconductor layer 411 and the insulating layer 421. The conductive layer 413 is provided at a position that is over the insulating layer 412 and overlaps with the semiconductor layer 411.

An insulating layer 422 is provided to cover the conductive layer 413 and the insulating layer 412. A conductive layer 414*a* and a conductive layer 414*b* are provided over the insulating layer 422. The conductive layer 414*a* and the conductive layer 414*b* are electrically connected to the low-resistance regions 411*n* in the opening portions provided in the insulating layer 422 and the insulating layer 412. Part of the conductive layer 414*a* functions as one of a source electrode and a drain electrode and part of the conductive layer 414*b* functions as the other of the source electrode and the drain electrode. An insulating layer 423 is provided to cover the conductive layer 414a, the conductive layer 414b, and the insulating layer 422.

The conductive layer 431 functioning as a pixel electrode is provided over the insulating layer 423. The conductive layer 431 is provided over the insulating layer 423 and is electrically connected to the conductive layer 414b through an opening provided in the insulating layer 423.

Although not illustrated here, an EL layer and a common electrode can be stacked over the conductive layer 431.

Structure Example 2

Figure 41B:
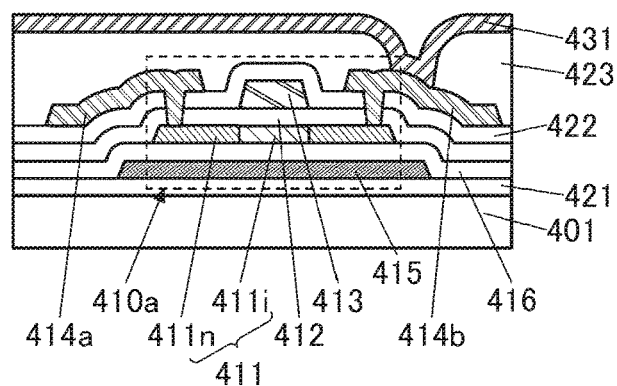

FIG. 41B illustrates a transistor 410a including a pair of gate electrodes. The transistor 410a illustrated in FIG. 41B is different from the transistor in FIG. 41A mainly in including a conductive layer 415 and an insulating layer 416.

The conductive layer 415 is provided over the insulating layer 421. The insulating layer 416 is provided to cover the conductive layer 415 and the insulating layer 421. The semiconductor layer 411 is provided such that at least the channel formation region 411i overlaps with the conductive layer 415 with the insulating layer 416 therebetween.

In the transistor 410a illustrated in FIG. 41B, part of the conductive layer 413 functions as a first gate electrode, and part of the conductive layer 415 functions as a second gate electrode. At this time, part of the insulating layer 412 functions as a first gate insulating layer, and part of the insulating layer 416 functions as a second gate insulating layer.

Here, to electrically connect the first gate electrode to the second gate electrode, the conductive layer 413 is electrically connected to the conductive layer 415 through an opening portion provided in the insulating layer 412 and the insulating layer 416 in a region not illustrated. To electrically connect the second gate electrode to a source or a drain, the conductive layer 415 is electrically connected to the conductive layer 414a or the conductive layer 414b through an opening portion provided in the insulating layer 422, the insulating layer 412, and the insulating layer 416 in a region not illustrated.

In the case where LTPS transistors are used as all of the transistors included in the pixel 405, the transistor 410 illustrated in FIG. 41A as an example or the transistor 410a illustrated in FIG. 41B as an example can be used. In this case, the transistors 410a may be used as all of the transistors included in the pixel 405, the transistors 410 may be used as all of the transistors, or the transistor 410a and the transistor 410 may be used in combination.

Structure Example 3

Described below is an example of a structure including both a transistor containing silicon in its semiconductor layer and a transistor containing a metal oxide in its semiconductor layer.

Figure 41C:
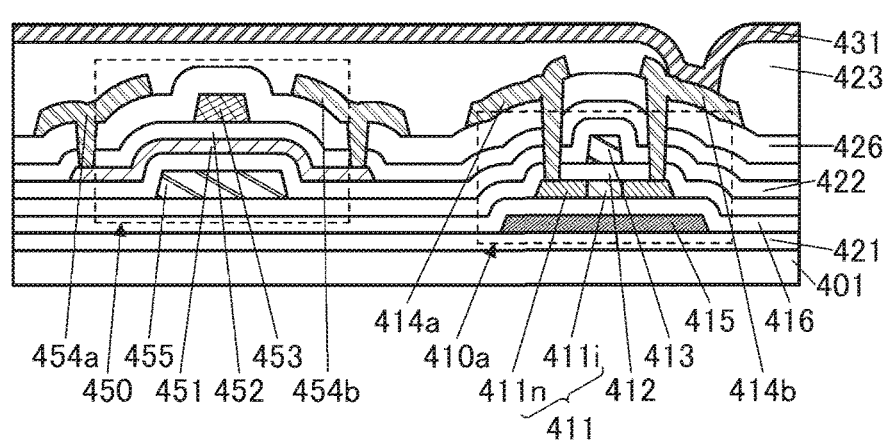

FIG. 41C is a schematic cross-sectional view including the transistor 410a and a transistor 450.

Structure example 1 described above can be referred to for the transistor 410a. Although an example of using the transistor 410a is described here, a structure including the transistor 410 and the transistor 450 or a structure including all of the transistor 410, the transistor 410a, and the transistor 450 may alternatively be employed.

The transistor 450 is a transistor including a metal oxide in its semiconductor layer. The structure in FIG. 41C illustrates an example in which the transistor 450 and the transistor 410a respectively correspond to the transistor M1 and the transistor M2 in the pixel 405. That is, FIG. 41C illustrates an example in which one of a source and a drain of the transistor 410a is electrically connected to the conductive layer 431.

Moreover, FIG. 41C illustrates an example in which the transistor 450 includes a pair of gates.

The transistor 450 includes a conductive layer 455, the insulating layer 422, a semiconductor layer 451, an insulating layer 452, a conductive layer 453, and the like. Part of the conductive layer 453 functions as a first gate of the transistor 450, and part of the conductive layer 455 functions as a second gate of the transistor 450. In this case, part of the insulating layer 452 functions as a first gate insulating layer of the transistor 450, and part of the insulating layer 422 functions as a second gate insulating layer of the transistor 450.

The conductive layer 455 is provided over the insulating layer 412. The insulating layer 422 is provided to cover the conductive layer 455. The semiconductor layer 451 is provided over the insulating layer 422. The insulating layer 452 is provided to cover the semiconductor layer 451 and the insulating layer 422. The conductive layer 453 is provided over the insulating layer 452 and includes a region overlapping with the semiconductor layer 451 and the conductive layer 455.

An insulating layer 426 is provided to cover the insulating layer 452 and the conductive layer 453. A conductive layer 454a and a conductive layer 454b are provided over the insulating layer 426. The conductive layer 454a and the conductive layer 454b are electrically connected to the semiconductor layer 451 in opening portions provided in the insulating layer 426 and the insulating layer 452. Part of the conductive layer 454a functions as one of a source electrode and a drain electrode and part of the conductive layer 454b functions as the other of the source electrode and the drain electrode. The insulating layer 423 is provided to cover the conductive layer 454a, the conductive layer 454b, and the insulating layer 426.

Here, the conductive layer 414a and the conductive layer 414b electrically connected to the transistor 410a are preferably formed by processing the same conductive film as the conductive layer 454a and the conductive layer 454b. In FIG. 41C, the conductive layer 414a, the conductive layer 414b, the conductive layer 454a, and the conductive layer 454b are formed on the same plane (i.e., in contact with the top surface of the insulating layer 426) and contain the same metal element. In this case, the conductive layer 414a and the conductive layer 414b are electrically connected to the low-resistance regions 411n through openings provided in the insulating layer 426, the insulating layer 452, the insulating layer 422, and the insulating layer 412. This is preferable because the fabrication process can be simplified.

Moreover, the conductive layer 413 functioning as the first gate electrode of the transistor 410a and the conductive layer 455 functioning as the second gate electrode of the transistor 450 are preferably formed by processing the same conductive film. FIG. 41C illustrates a structure in which the conductive layer 413 and the conductive layer 455 are formed on the same plane (i.e., in contact with the top surface of the insulating layer 412) and contain the same metal element. This is preferable because the fabrication process can be simplified.

Figure 41D:
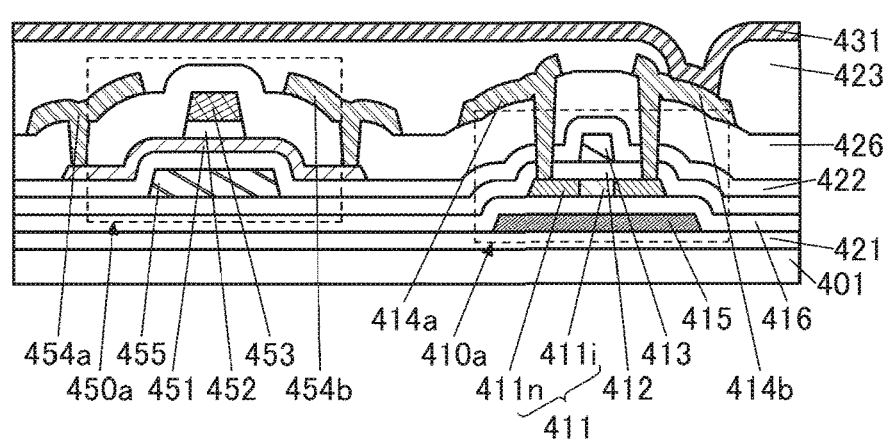

In the structure in FIG. 41C, the insulating layer 452 functioning as the first gate insulating layer of the transistor 450 covers an end portion of the semiconductor layer 451; however, the insulating layer 452 may be processed to have the same or substantially the same top surface shape as the conductive layer 453 as in the transistor 450*a* illustrated in FIG. 41D.

Note that in this specification and the like, the expression "top surface shapes are substantially the same" means that at least outlines of stacked layers partly overlap with each other. For example, the case of processing the upper layer and the lower layer with the use of the same mask pattern or mask patterns that are partly the same is included. However, in some cases, the outlines do not completely overlap with each other and the upper layer is positioned inward from the lower layer or the upper layer is positioned outward from the lower layer; such cases are also represented by the expression "top surface shapes are substantially the same".

Although the example in which the transistor 410*a* corresponds to the transistor M2 and is electrically connected to the pixel electrode is illustrated here, one embodiment of the present invention is not limited thereto. For example, a structure in which the transistor 450 or the transistor 450*a* corresponds to the transistor M2 may be employed. In that case, the transistor 410*a* corresponds to the transistor M1, the transistor M3, or another transistor.

This embodiment can be combined with the other embodiments as appropriate.

Embodiment 9

In this embodiment, a light-emitting device that can be used in the display panel of one embodiment of the present invention will be described.

Figure 42A:
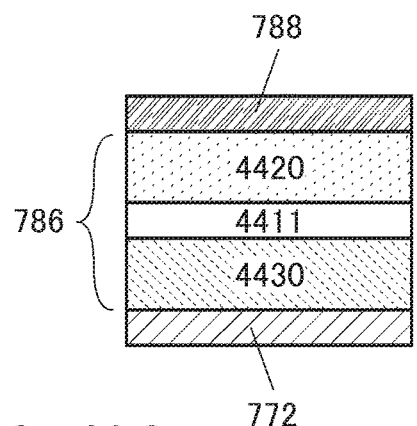
FIG. 42A to FIG. 42F are diagrams illustrating structure examples of a light-emitting device.

As illustrated in FIG. 42A, the light-emitting device includes an EL layer 786 between a pair of electrodes (a lower electrode 772 and an upper electrode 788). The EL layer 786 can be formed of a plurality of layers such as a layer 4420, a light-emitting layer 4411, and a layer 4430. The layer 4420 can include, for example, a layer containing a substance with a high electron-injection property (an electron-injection layer) and a layer containing a substance with a high electron-transport property (an electron-transport layer). The light-emitting layer 4411 contains a light-emitting compound, for example. The layer 4430 can include, for example, a layer containing a substance with a high hole-injection property (a hole-injection layer) and a layer containing a substance with a high hole-transport property (a hole-transport layer).

The structure including the layer 4420, the light-emitting layer 4411, and the layer 4430, which is provided between the pair of electrodes, can function as a single light-emitting unit, and the structure in FIG. 42A is referred to as a single structure in this specification.

Figure 42B:
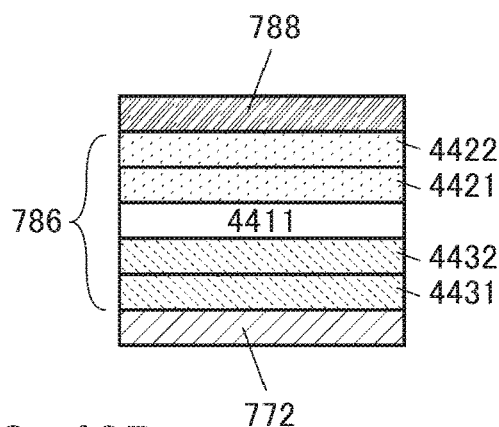

FIG. 42B is a variation example of the EL layer 786 included in the light-emitting device illustrated in FIG. 42A. Specifically, the light-emitting device illustrated in FIG. 42B includes a layer 4431 over the lower electrode 772, a layer 4432 over the layer 4431, the light-emitting layer 4411 over the layer 4432, a layer 4421 over the light-emitting layer 4411, a layer 4422 over the layer 4421, and the upper electrode 788 over the layer 4422. When the lower electrode 772 is an anode and the upper electrode 788 is a cathode, for example, the layer 4431 functions as a hole-injection layer, the layer 4432 functions as a hole-transport layer, the layer 4421 functions as an electron-transport layer, and the layer 4422 functions as an electron-injection layer. Alternatively, when the lower electrode 772 is a cathode and the upper electrode 788 is an anode, the layer 4431 functions as an electron-injection layer, the layer 4432 functions as an electron-transport layer, the layer 4421 functions as a hole-transport layer, and the layer 4422 functions as a hole-injection layer. With such a layer structure, carriers can be efficiently injected to the light-emitting layer 4411, and the efficiency of the recombination of carriers in the light-emitting layer 4411 can be increased.

Figure 42C:
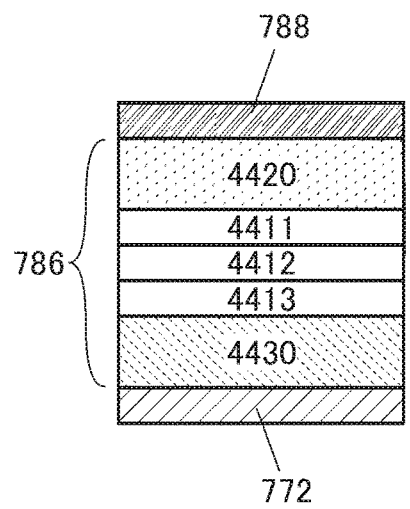
Figure 42D:
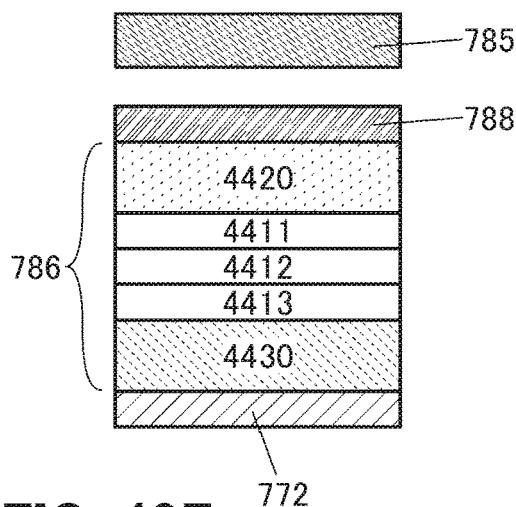

Note that the structure in which a plurality of light-emitting layers (light-emitting layers 4411, 4412, and 4413) are provided between the layer 4420 and the layer 4430 as illustrated in FIG. 42C and FIG. 42D is also a variation of the single structure.

Figure 42E:
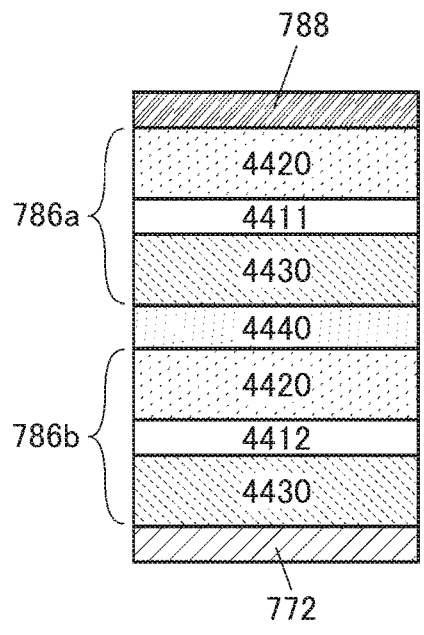
Figure 42F:
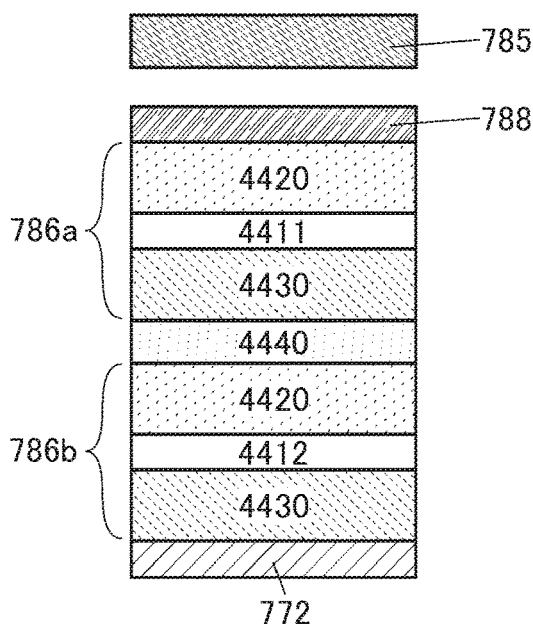

A structure in which a plurality of light-emitting units (an EL layer 786*a* and an EL layer 786*b*) are connected in series with a charge-generation layer 4440 therebetween as illustrated in FIG. 42E or FIG. 42F is referred to as a tandem structure in this specification. Note that a tandem structure may be referred to as a stack structure. The tandem structure enables a light-emitting device to emit light at high luminance.

In FIG. 42C and FIG. 42D, light-emitting materials that emit light of the same color, or moreover, the same light-emitting material may be used for the light-emitting layer 4411, the light-emitting layer 4412, and the light-emitting layer 4413. For example, a light-emitting material that emits blue light may be used for the light-emitting layer 4411, the light-emitting layer 4412, and the light-emitting layer 4413. A color conversion layer may be provided as a layer 785 illustrated in FIG. 42D.

Alternatively, light-emitting materials that emit light of different colors may be used for the light-emitting layer 4411, the light-emitting layer 4412, and the light-emitting layer 4413. White light emission can be obtained when the light-emitting layer 4411, the light-emitting layer 4412, and the light-emitting layer 4413 emit light of complementary colors. A color filter (also referred to as a coloring layer) may be provided as the layer 785 illustrated in FIG. 42D. When white light passes through a color filter, light of a desired color can be obtained.

In FIG. 42E and FIG. 42F, light-emitting materials that emit light of the same color, or moreover, the same light-emitting material may be used for the light-emitting layer 4411 and the light-emitting layer 4412. Alternatively, light-emitting materials that emit light of different colors may be used for the light-emitting layer 4411 and the light-emitting layer 4412. White light emission can be obtained when the light-emitting layer 4411 and the light-emitting layer 4412 emit light of complementary colors. FIG. 42F illustrates an example in which the layer 785 is further provided. One or both of a color conversion layer and a color filter (coloring layer) can be used as the layer 785.

Note that also in FIG. 42C, FIG. 42D, FIG. 42E, and FIG. 42F, the layer 4420 and the layer 4430 may each have a stacked-layer structure of two or more layers as illustrated in FIG. 42B.

A structure in which light-emitting devices of different emission colors (e.g., blue (B), green (G), and red (R)) are separately formed is referred to as an SBS (Side By Side) structure in some cases.

The emission color of the light-emitting device can be red, green, blue, cyan, magenta, yellow, white, or the like depending on the material that constitutes the EL layer 786. Furthermore, the color purity can be further increased when the light-emitting device has a microcavity structure.

The light-emitting device that emits white light preferably contains two or more kinds of light-emitting substances in the light-emitting layer. To obtain white light emission, two or more kinds of light-emitting substances are selected such that their emission colors are complementary. For example, when an emission color of a first light-emitting layer and an emission color of a second light-emitting layer are complementary colors, the light-emitting device can be configured to emit white light as a whole. The same applies to a light-emitting device including three or more light-emitting layers.

The light-emitting layer preferably contains two or more light-emitting substances that emit light of R (red), G (green), B (blue), Y (yellow), O (orange), and the like. Alternatively, a light-emitting layer preferably contains two or more light-emitting substances each of which emits light containing two or more of spectral components of R, G, and B.

This embodiment can be combined with the other embodiments as appropriate.

Embodiment 10

In this embodiment, electronic devices of embodiments of the present invention will be described with reference to FIG. 43 and FIG. 44.

Electronic devices of this embodiment each include the display panel of one embodiment of the present invention in a display portion. The display panel of one embodiment of the present invention can be easily increased in resolution and definition and can achieve high display quality. Thus, the display panel of one embodiment of the present invention can be used for a display portion of any of a variety of electronic devices.

Examples of the electronic devices include electronic devices with a relatively large screen, such as a television device, a desktop or laptop personal computer, a monitor of a computer or the like, digital signage, and a large game machine such as a pachinko machine; a digital camera; a digital video camera; a digital photo frame; a mobile phone; a portable game console; a portable information terminal; and an audio reproducing device.

In particular, the display panel of one embodiment of the present invention can have a high resolution, and thus can be suitably used for an electronic device having a relatively small display portion. Examples of such an electronic device include watch-type and bracelet-type information terminal devices (wearable devices), and wearable devices capable of being worn on a head, such as a VR device like a head-mounted display, a glasses-type AR device, and an MR device.

The definition of the display panel of one embodiment of the present invention is preferably as high as HD (number of pixels: 1280×720), FHD (number of pixels: 1920×1080), WQHD (number of pixels: 2560×1440), WQXGA (number of pixels: 2560×1600), 4K (number of pixels: 3840×2160), or 8K (number of pixels: 7680×4320). In particular, a definition of 4K, 8K, or higher is preferable. The pixel density (resolution) of the display panel of one embodiment of the present invention is preferably higher than or equal to 100 ppi, further preferably higher than or equal to 300 ppi, still further preferably higher than or equal to 500 ppi, yet further preferably higher than or equal to 1000 ppi, yet still further preferably higher than or equal to 2000 ppi, yet still further preferably higher than or equal to 3000 ppi, yet still further preferably higher than or equal to 5000 ppi, yet still further preferably higher than or equal to 7000 ppi. With the use of such a display panel having one or both of high definition and high resolution, the electronic device can provide higher realistic sensation, sense of depth, and the like in personal use such as portable use and home use. There is no particular limitation on the screen ratio (aspect ratio) of the display panel of one embodiment of the present invention. For example, the display panel is compatible with a variety of screen ratios such as 1:1 (a square), 4:3, 16:9, and 16:10.

The electronic device in this embodiment may include a sensor (a sensor having a function of measuring force, displacement, position, speed, acceleration, angular velocity, rotational frequency, distance, light, liquid, magnetism, temperature, a chemical substance, sound, time, hardness, an electric field, current, voltage, power, radiation, a flow rate, humidity, gradient, oscillation, odor, or infrared rays).

The electronic device in this embodiment can have a variety of functions. For example, the electronic device can have a function of displaying a variety of information (a still image, a moving image, a text image, and the like) on the display portion, a touch panel function, a function of displaying a calendar, date, time, and the like, a function of executing a variety of software (programs), a wireless communication function, and a function of reading out a program or data stored in a recording medium.

Figure 43A:
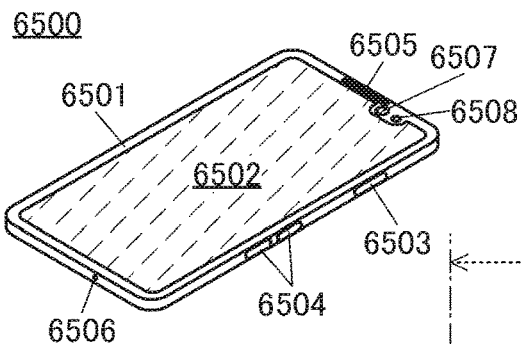
FIG. 43A to FIG. 43F are diagrams illustrating examples of electronic devices.

An electronic device 6500 illustrated in FIG. 43A is a portable information terminal that can be used as a smartphone.

The electronic device 6500 includes a housing 6501, a display portion 6502, a power button 6503, buttons 6504, a speaker 6505, a microphone 6506, a camera 6507, a light source 6508, and the like. The display portion 6502 has a touch panel function.

The display panel of one embodiment of the present invention can be used for the display portion 6502.

Figure 43B:
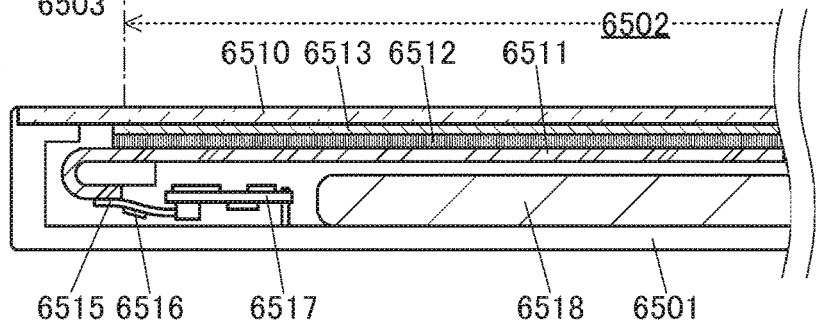

FIG. 43B is a schematic cross-sectional view including an end portion of the housing 6501 on the microphone 6506 side.

A protection member 6510 having a light-transmitting property is provided on a display surface side of the housing 6501, and a display panel 6511, an optical member 6512, a touch sensor panel 6513, a printed circuit board 6517, a battery 6518, and the like are provided in a space surrounded by the housing 6501 and the protection member 6510.

The display panel 6511, the optical member 6512, and the touch sensor panel 6513 are fixed to the protection member 6510 with an adhesive layer (not illustrated).

Part of the display panel 6511 is folded back in a region outside the display portion 6502, and an FPC 6515 is connected to the part that is folded back. An IC 6516 is mounted on the FPC 6515. The FPC 6515 is connected to a terminal provided on the printed circuit board 6517.

A flexible display of one embodiment of the present invention can be used as the display panel 6511. Thus, an extremely lightweight electronic device can be achieved. Since the display panel 6511 is extremely thin, the battery 6518 with high capacity can be mounted without an increase in the thickness of the electronic device. Moreover, part of the display panel 6511 is folded back such that a connection portion with the FPC 6515 is provided on the back side of a pixel portion, whereby an electronic device with a narrow frame can be achieved.

Figure 43C:
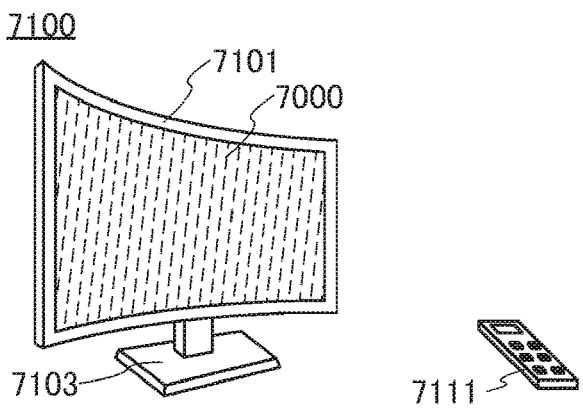

FIG. 43C illustrates an example of a television device. In a television device 7100, a display portion 7000 is incorporated in a housing 7101. Here, the housing 7101 is supported by a stand 7103.

The display panel of one embodiment of the present invention can be used for the display portion 7000.

Operation of the television device 7100 illustrated in FIG. 43C can be performed with an operation switch provided in the housing 7101 and a separate remote control 7111. Alternatively, the display portion 7000 may include a touch sensor, and the television device 7100 may be operated by touch on the display portion 7000 with a finger or the like. The remote control 7111 may be provided with a display portion for displaying information output from the remote control 7111. With operation keys or a touch panel provided in the remote control 7111, channels and volume can be controlled and videos displayed on the display portion 7000 can be operated.

Note that the television device 7100 has a structure in which a receiver, a modem, and the like are provided. A general television broadcast can be received with the receiver. When the television device is connected to a communication network by wire or wirelessly via the modem, one-way (from a transmitter to a receiver) or two-way (between a transmitter and a receiver or between receivers, for example) data communication can be performed.

Figure 43D:
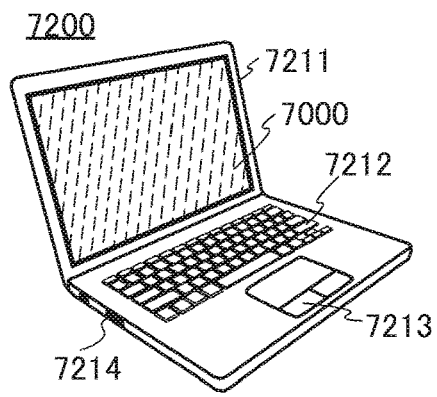

FIG. 43D illustrates an example of a laptop personal computer. A laptop personal computer 7200 includes a housing 7211, a keyboard 7212, a pointing device 7213, an external connection port 7214, and the like. In the housing 7211, the display portion 7000 is incorporated.

The display panel of one embodiment of the present invention can be used for the display portion 7000.

Figure 43E:
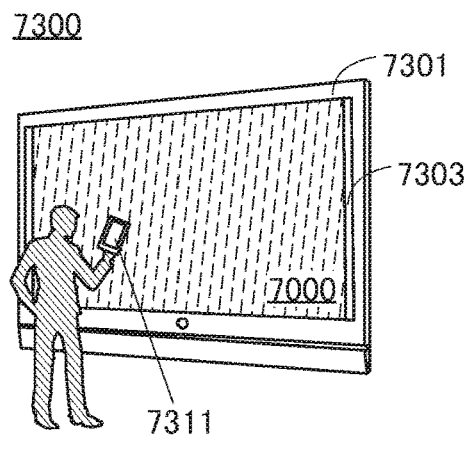
Figure 43F:
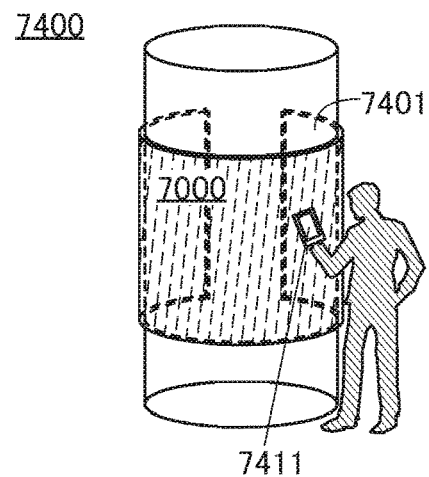

FIG. 43E and FIG. 43F illustrate examples of digital signage.

Digital signage 7300 illustrated in FIG. 43E includes a housing 7301, the display portion 7000, a speaker 7303, and the like. The digital signage 7300 can also include an LED lamp, an operation key (including a power switch or an operation switch), a connection terminal, a variety of sensors, a microphone, and the like.

FIG. 43F is digital signage 7400 attached to a cylindrical pillar 7401. The digital signage 7400 includes the display portion 7000 provided along a curved surface of the pillar 7401.

The display panel of one embodiment of the present invention can be used for the display portion 7000 illustrated in each of FIG. 43E and FIG. 43F.

A larger area of the display portion 7000 can increase the amount of information that can be provided at a time. The larger display portion 7000 attracts more attention, so that the effectiveness of the advertisement can be increased, for example.

A touch panel is preferably used in the display portion 7000, in which case intuitive operation by a user is possible in addition to display of an image or a moving image on the display portion 7000. Moreover, for an application for providing information such as route information or traffic information, usability can be enhanced by intuitive operation.

As illustrated in FIG. 43E and FIG. 43F, it is preferable that the digital signage 7300 or the digital signage 7400 be capable of working with an information terminal 7311 or an information terminal 7411 such as a smartphone a user has through wireless communication. For example, information of an advertisement displayed on the display portion 7000 can be displayed on a screen of the information terminal 7311 or the information terminal 7411. By operation of the information terminal 7311 or the information terminal 7411, display on the display portion 7000 can be switched.

It is possible to make the digital signage 7300 or the digital signage 7400 execute a game with the use of the screen of the information terminal 7311 or the information terminal 7411 as an operation means (controller). Thus, an unspecified number of users can join in and enjoy the game concurrently.

Electronic devices illustrated in FIG. 44A to FIG. 44G include a housing 9000, a display portion 9001, a speaker 9003, an operation key 9005 (including a power switch or an operation switch), a connection terminal 9006, a sensor 9007 (a sensor having a function of measuring force, displacement, position, speed, acceleration, angular velocity, rotational frequency, distance, light, liquid, magnetism, temperature, a chemical substance, sound, time, hardness, an electric field, current, voltage, power, radiation, a flow rate, humidity, gradient, oscillation, odor, or infrared rays), a microphone 9008, and the like.

The electronic devices illustrated in FIG. 44A to FIG. 44G have a variety of functions. For example, the electronic devices can have a function of displaying a variety of information (a still image, a moving image, a text image, and the like) on the display portion, a touch panel function, a function of displaying a calendar, date, time, and the like, a function of controlling processing with the use of a variety of software (programs), a wireless communication function, and a function of reading out and processing a program or data stored in a recording medium. Note that the functions of the electronic devices are not limited thereto, and the electronic devices can have a variety of functions. The electronic devices may include a plurality of display portions. In addition, the electronic devices may each include a camera or the like and have a function of capturing a still image or a moving image and storing the captured image in a recording medium (an external recording medium or a recording medium incorporated in the camera), a function of displaying the captured image on the display portion, or the like.

The details of the electronic devices illustrated in FIG. 44A to FIG. 44G will be described below.

Figure 44A:
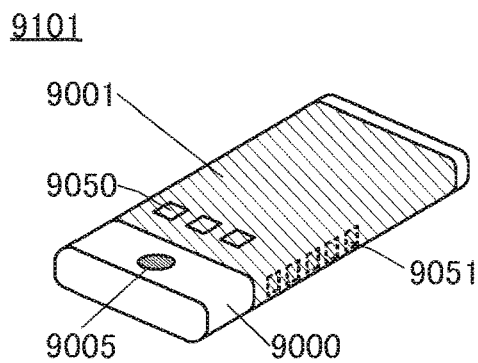
FIG. 44A to FIG. 44G are diagrams illustrating examples of electronic devices.

FIG. 44A is a perspective view illustrating a portable information terminal 9101. The portable information terminal 9101 can be used as a smartphone, for example. Note that the portable information terminal 9101 may include the speaker 9003, the connection terminal 9006, the sensor 9007, or the like. The portable information terminal 9101 can display characters and image information on its plurality of surfaces. FIG. 44A illustrates an example in which three icons 9050 are displayed. Furthermore, information 9051 indicated by dashed rectangles can be displayed on another surface of the display portion 9001. Examples of the information 9051 include notification of reception of an e-mail, an SNS message, or an incoming call, the title and sender of an e-mail, an SNS message, or the like, the date, the time, remaining battery, and the radio field intensity. Alternatively, the icon 9050 or the like may be displayed at the position where the information 9051 is displayed.

Figure 44B:
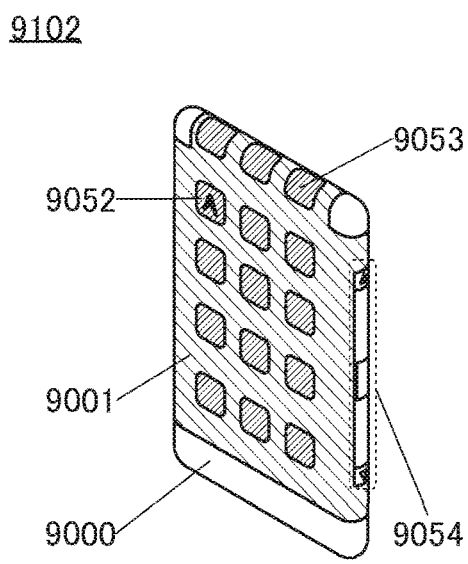

FIG. 44B is a perspective view illustrating a portable information terminal 9102. The portable information terminal 9102 has a function of displaying information on three or more surfaces of the display portion 9001. Here, an example is illustrated in which information 9052, information 9053, and information 9054 are displayed on different surfaces. For example, a user can check the information 9053 displayed in a position that can be observed from above the portable information terminal 9102, with the portable information terminal 9102 put in a breast pocket of his/her clothes. The user can see the display without taking out the portable information terminal 9102 from the pocket and decide whether to answer the call, for example.

Figure 44C:
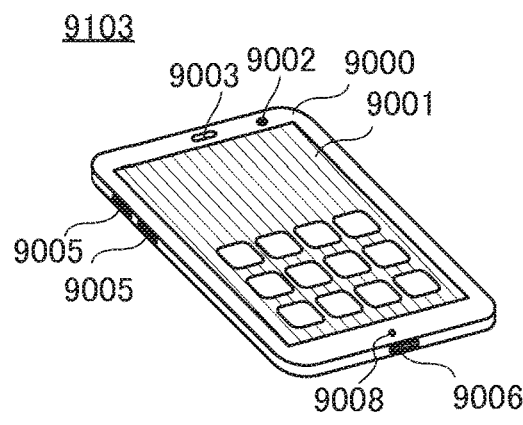

FIG. 44C is a perspective view illustrating a tablet terminal 9103. The tablet terminal 9103 is capable of executing a variety of applications such as mobile phone calls, e-mailing, viewing and editing texts, music reproduction, Internet communication, and a computer game, for example. The tablet terminal 9103 includes the display portion 9001, a camera 9002, the microphone 9008, and the speaker 9003 on the front surface of the housing 9000; the operation keys 9005 as buttons for operation on the left side surface of the housing 9000; and the connection terminal 9006 on the bottom surface of the housing 9000.

Figure 44D:
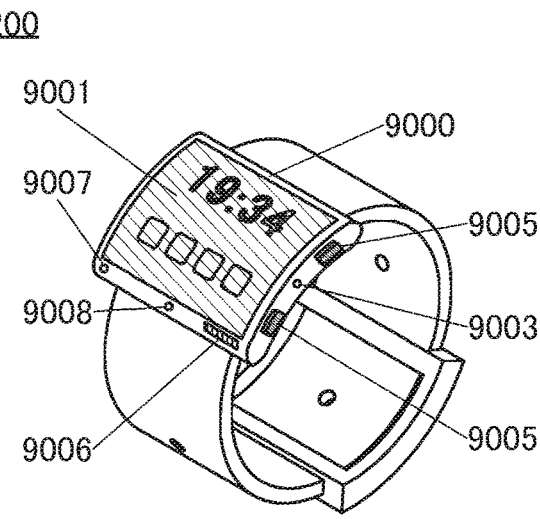

FIG. 44D is a perspective view illustrating a watch-type portable information terminal 9200. For example, the portable information terminal 9200 can be used as a Smartwatch (registered trademark). The display surface of the display portion 9001 is curved, and display can be performed on the curved display surface. Furthermore, for example, mutual communication between the portable information terminal 9200 and a headset capable of wireless communication can be performed, and thus hands-free calling is possible. With the connection terminal 9006, the portable information terminal 9200 can perform mutual data transmission with another information terminal and charging. Note that the charging operation may be performed by wireless power feeding.

Figure 44E:
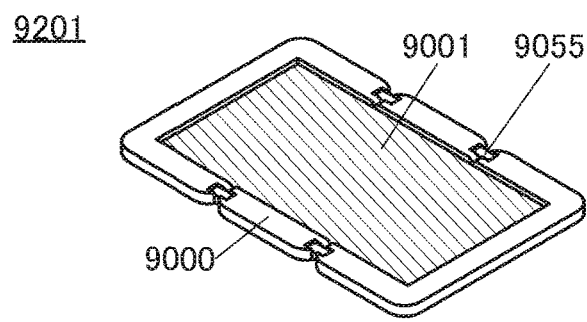
Figure 44F:
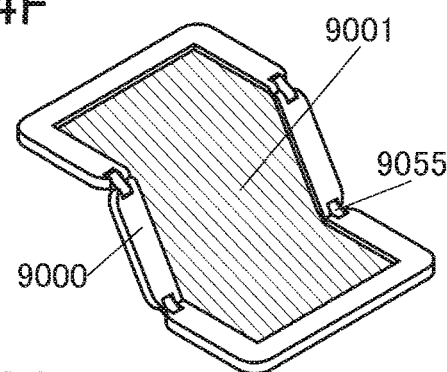
Figure 44G:
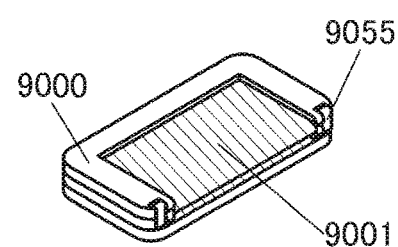

FIG. 44E to FIG. 44G are perspective views illustrating a foldable portable information terminal 9201. FIG. 44E is a perspective view of an opened state of the portable information terminal 9201, FIG. 44G is a perspective view of a folded state thereof, and FIG. 44F is a perspective view of a state in the middle of change from one of FIG. 44E and FIG. 44G to the other. The portable information terminal 9201 is highly portable in the folded state and is highly browsable in the opened state because of a seamless large display region. The display portion 9001 of the portable information terminal 9201 is supported by three housings 9000 joined together by hinges 9055. The display portion 9001 can be folded with a radius of curvature greater than or equal to 0.1 mm and less than or equal to 150 mm, for example.

This embodiment can be combined with the other embodiments as appropriate.

REFERENCE NUMERALS

10: electronic device, 10A: electronic device, 10B: electronic device, 10C: electronic device, 10D: electronic device, 10E: electronic device, 11: display portion, 11c: notch portion, 12: camera, 12_1: camera, 12_2: camera, 12_5: camera, 13: camera, 13_1: camera, 13_2: camera, 14: image processing portion, 15: frame, 16: communication portion, 17: pixel, 18: support, 19: light source, 20: computer, 25: housing, 26: communication portion, 30: display apparatus, 30C: display apparatus, 30E: display apparatus, 40: user, 51: image, 52: image, 52_1: image, 52_2: image, 54: image, 55: avatar, 56: feature point, 70: generator, 71: training data, 72: data, 73: learning result, 100: display panel, 100A: display panel, 100B: display panel, 100C: display panel, 100D: display panel, 100E: display panel, 100F: display panel, 100G: display panel, 100H: display panel, 100J: display panel, 101: layer, 104: camera, 105: external light, 106: imaging pixel, 107: substrate, 109: display portion, 109h: display region, 109I: display region, 110: pixel, 110a: subpixel, 110b: subpixel, 110c: subpixel, 110d: subpixel, 111: pixel electrode, 111a: pixel electrode, 111b: pixel electrode, 111c: pixel electrode, 111d: pixel electrode, 112a: conductive layer, 112b: conductive layer, 112c: conductive layer, 112d: conductive layer, 113a: first layer, 113b: second layer, 113c: third layer, 113d: fourth layer, 114: common layer, 115: common electrode, 117: light-blocking layer, 118a: sacrificial layer, 118b: sacrificial layer, 118c: sacrificial layer, 118d: sacrificial layer, 120: substrate, 121: insulating layer, 122: resin layer, 123: conductive layer, 124a: pixel, 124b: pixel, 125: insulating layer, 126a: conductive layer, 126b: conductive layer, 126c: conductive layer, 126d: conductive layer, 127: insulating layer, 128: layer, 129a: conductive layer, 129b: conductive layer, 129c: conductive layer, 129d: conductive layer, 130a: light-emitting device, 130b: light-emitting device, 130B: light-emitting device, 130c: light-emitting device, 130G: light-emitting device, 130R: light-emitting device, 131: protective layer, 135: space, 139: region, 140: connection portion, 142: adhesive layer, 150: light-receiving device, 151: substrate, 152: substrate, 153: insulating layer, 162: display portion, 164: circuit, 165: wiring, 166: conductive layer, 172: FPC, 173: IC, 201: transistor, 204: connection portion, 205: transistor, 209: transistor, 210: transistor, 211: insulating layer, 213: insulating layer, 214: insulating layer, 215: insulating layer, 218: insulating layer, 221: conductive layer, 222a: conductive layer, 222b: conductive layer, 223: conductive layer, 225: insulating layer, 231: semiconductor layer, 231i: channel formation region, 231n: low-resistance region, 240: capacitor, 241: conductive layer, 242: connection layer, 243: insulating layer, 245: conductive layer, 251: conductive layer, 252: conductive layer, 254: insulating layer, 255a: insulating layer, 255b: insulating layer, 255c: insulating layer, 256: plug, 261: insulating layer, 262: insulating layer, 263: insulating layer, 264: insulating layer, 265: insulating layer, 271: plug, 274: plug, 274a: conductive layer, 274b: conductive layer, 280: display module, 281: display portion, 282: circuit portion, 283: pixel circuit portion, 283a: pixel circuit, 284: pixel portion, 284a: pixel, 285: terminal portion, 286: wiring portion, 290: FPC, 291: substrate, 292: substrate, 301: substrate, 301A: substrate, 301B: substrate, 310: transistor, 310A: transistor, 310B: transistor, 311: conductive layer, 312: low-resistance region, 313: insulating layer, 314: insulating layer, 315: element isolation layer, 320: transistor, 320A: transistor, 320B: transistor, 321: semiconductor layer, 323: insulating layer, 324: conductive layer, 325: conductive layer, 326: insulating layer, 327: conductive layer, 328: insulating layer, 329: insulating layer, 331: substrate, 332: insulating layer, 335: insulating layer, 336: insulating layer, 341: conductive layer, 342: conductive layer, 343: plug, 344: insulating layer, 345: insulating layer, 346: insulating layer, 347: bump, 348: adhesive layer, 351: substrate, 352: finger, 353: layer, 355: functional layer, 357: layer, 359: substrate, 400: display panel, 401: substrate, 402: driver circuit portion, 403: driver circuit portion, 404: display portion, 405: pixel, 405B: subpixel, 405G: subpixel, 405R: subpixel, 410: transistor, 410a: transistor, 411: semiconductor layer, 411i: channel formation region, 411n: low-resistance region, 412: insulating layer, 413: conductive layer, 414a: conductive layer, 414b: conductive layer, 415: conductive layer, 416: insulating layer, 421: insulating layer, 422: insulating layer, 423: insulating layer, 426: insulating layer, 430: pixel, 431: conductive layer, 450: transistor, 450a: transistor, 451: semiconductor layer, 452: insulating layer, 453: conductive layer, 454a: conductive layer, 454b: conductive layer, 455: conductive layer, 772: lower electrode, 785: layer, 786: EL layer, 786a: EL layer, 786b: EL layer,

788: upper electrode, 1000_1: electronic device, 1000_2: electronic device, 1000_3: electronic device, 1000_4: electronic device, 1000_5: electronic device, 1010_1: image, 1010_2: image, 1010_3: image, 1010_4: image, 1010_5: image, 1020_1: user, 1020_2: user, 1020_3: user, 1020_4: user, 1020_5: user, 1030_1: point of view, 2000_1: electronic device, 2000_2: electronic device, 2000_3: electronic device, 2000_4: electronic device, 2000_5: electronic device, 2020_1: lecturer, 2020_2: student, 2020_3: student, 2020_4: student, 2020_5: student, 2030_2: point of view, 2030_3: point of view, 2030_4: point of view, 4411: light-emitting layer, 4412: light-emitting layer, 4413: light-emitting layer, 4420: layer, 4421: layer, 4422: layer, 4430: layer, 4431: layer, 4432: layer, 4440: charge-generation layer, 6500: electronic device, 6501: housing, 6502: display portion, 6503: power button, 6504: button, 6505: speaker, 6506: microphone, 6507: camera, 6508: light source, 6510: protection member, 6511: display panel, 6512: optical member, 6513: touch sensor panel, 6515: FPC, 6516: IC, 6517: printed circuit board, 6518: battery, 7000: display portion, 7100: television device, 7101: housing, 7103: stand, 7111: remote control, 7200: laptop personal computer, 7211: housing, 7212: keyboard, 7213: pointing device, 7214: external connection port, 7300: digital signage, 7301: housing, 7303: speaker, 7311: information terminal, 7400: digital signage, 7401: pillar, 7411: information terminal, 9000: housing, 9001: display portion, 9002: camera, 9003: speaker, 9005: operation key, 9006: connection terminal, 9007: sensor, 9008: microphone, 9050: icon, 9051: information, 9052: information, 9053: information, 9054: information, 9055: hinge, 9101: portable information terminal, 9102: portable information terminal, 9103: tablet terminal, 9200: portable information terminal, 9201: portable information terminal

The invention claimed is:

1. An electronic device comprising:
a display portion comprising a first camera; a second camera; and an image processing portion,
wherein the second camera is positioned in a region not overlapping with the display portion,
wherein the first camera is configured to generate a first image of a subject,
wherein the second camera is configured to generate a second image of the subject,
wherein the image processing portion comprises a generator performing learning using training data,
wherein the training data comprises an image comprising a face of a person, and
wherein the image processing portion is configured to make the first image clear when the first image is input to the generator and track a gaze of the subject on the basis of the second image.

2. The electronic device according to claim 1, further comprising a light source emitting infrared light,
wherein the light source is positioned in a region not overlapping with the display portion,
wherein the light source is used for detection of the gaze of the subject, and
wherein the gaze of the subject is tracked by repeating the detection of the gaze of the subject.

3. An electronic device comprising:
a display portion comprising a first camera; a second camera; a third camera; and an image processing portion,
wherein the second camera and the third camera are each independently positioned in a region not overlapping with the display portion,
wherein the first camera is configured to generate a first image of a subject,
wherein the second camera is configured to generate a second image of the subject,
wherein the third camera is configured to generate a third image of the subject, and
wherein the image processing portion is configured to make the first image clear, recognize a face of the subject from the clear first image, recognize a three-dimensional shape of the face of the subject from the second image and the third image, and create an avatar from the face of the subject and the three-dimensional shape of the face of the subject.

4. The electronic device according to claim 1, wherein the first camera is positioned behind a pixel in the display portion when seen from the subject.

5. The electronic device according to claim 1, wherein the first camera is positioned in a region comprising a pixel in the display portion when seen from the subject.

6. An electronic device comprising:
a display portion comprising a first camera and a fourth camera; and an image processing portion,
wherein the first camera is configured to generate a first image of a subject,
wherein the fourth camera is configured to generate a fourth image of the subject,
wherein the image processing portion comprises a generator performing learning using training data,
wherein the training data comprises an image comprising a face of a person, and
wherein the image processing portion is configured to activate one of the first camera and the fourth camera and make the first image or the fourth image clear when the first image or the fourth image generated using the activated one of the first camera and the fourth camera is input to the generator.

7. The electronic device according to claim 6, wherein the first camera and the fourth camera are positioned behind a pixel in the display portion when seen from the subject.

8. The electronic device according to claim 6, wherein the first camera and the fourth camera are positioned in a region comprising a pixel in the display portion when seen from the subject.

9. The electronic device according to claim 3, wherein the first camera is positioned behind a pixel in the display portion when seen from the subject.

10. The electronic device according to claim 3, wherein the first camera is positioned in a region comprising a pixel in the display portion when seen from the subject.

* * * * *